(12) United States Patent
Ozturk et al.

(10) Patent No.: US 12,153,156 B2
(45) Date of Patent: Nov. 26, 2024

(54) METHOD, APPARATUS, AND SYSTEM FOR WIRELESS MONITORING WITH IMPROVED ACCURACY

(71) Applicants: Muhammed Zahid Ozturk, Beltsville, MD (US); Sai Deepika Regani, Campbell, CA (US); Beibei Wang, Clarksville, MD (US); K. J. Ray Liu, Potomac, MD (US); Hung-Quoc Duc Lai, Parkville, MD (US); Yi Han, Ellicott City, MD (US); Oscar Chi-Lim Au, Rockville, MD (US)

(72) Inventors: Muhammed Zahid Ozturk, Beltsville, MD (US); Sai Deepika Regani, Campbell, CA (US); Beibei Wang, Clarksville, MD (US); K. J. Ray Liu, Potomac, MD (US); Hung-Quoc Duc Lai, Parkville, MD (US); Yi Han, Ellicott City, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 41 days.

(21) Appl. No.: 18/144,321

(22) Filed: May 8, 2023

(65) Prior Publication Data

US 2023/0273291 A1 Aug. 31, 2023

Related U.S. Application Data

(63) Continuation-in-part of application No. 18/144,092, filed on May 5, 2023, and a continuation-in-part of
(Continued)

(51) Int. Cl.
*G01S 7/00* (2006.01)
*G01S 13/00* (2006.01)
*H04W 24/08* (2009.01)

(52) U.S. Cl.
CPC ............ *G01S 7/006* (2013.01); *G01S 13/003* (2013.01); *H04W 24/08* (2013.01)

(58) Field of Classification Search
CPC ........ G01S 13/003; G01S 13/56; G01S 7/006; G01S 7/415; H04W 24/08
See application file for complete search history.

(56) References Cited

U.S. PATENT DOCUMENTS

2014/0143688 A1* 5/2014 Hou .................. G06F 3/017
    715/760
2018/0239005 A1* 8/2018 Dussan ............... G01S 7/4865

OTHER PUBLICATIONS

Joshi et al., "WiDeo: Fine-grained Device-free Motion Tracing using RF Backscatter", The Proceedings of the 12th USENIX Symposium on Networked Systems Design and Implementation (NSDI '15), pp. 189-204 (Year: 2015).*

* cited by examiner

*Primary Examiner* — Zhiyu Lu

(57) ABSTRACT

Methods, apparatus and systems for wireless monitoring with improved accuracy are described. In one example, a described method comprises: transmitting a wireless signal through a wireless multipath channel of a venue, wherein the wireless multipath channel is impacted by a motion of an object in the venue; receiving the wireless signal through the wireless multipath channel, wherein the received wireless signal differs from the transmitted wireless signal due to the wireless multipath channel and the motion; obtaining a time series of channel information (TSCI) of the wireless multipath channel based on the received wireless signal; performing a classification of a sliding time window by ana-
(Continued)

lyzing channel information (CI) of the TSCI in the sliding time window; computing a motion information (MI) for the sliding time window based on the TSCI and the classification of the sliding time window; and monitoring the motion of the object based on the MI.

19 Claims, 33 Drawing Sheets

Related U.S. Application Data application No. 18/108,563, filed on Feb. 10, 2023, and a continuation-in-part of application No. 17/959,487, filed on Oct. 4, 2022, and a continuation-in-part of application No. PCT/US2022/045708, filed on Oct. 4, 2022, and a continuation-in-part of application No. 17/960,080, filed on Oct. 4, 2022, and a continuation-in-part of application No. 17/945,995, filed on Sep. 15, 2022, and a continuation-in-part of application No. 17/891,037, filed on Aug. 18, 2022, and a continuation-in-part of application No. 17/888,429, filed on Aug. 15, 2022, now Pat. No. 11,771,366, and a continuation-in-part of application No. 17/838,244, filed on Jun. 12, 2022, and a continuation-in-part of application No. 17/838,231, filed on Jun. 12, 2022, and a continuation-in-part of application No. 17/838,228, filed on Jun. 12, 2022, and a continuation-in-part of application No. 17/827,902, filed on May 30, 2022, and a continuation-in-part of application No. 17/539,058, filed on Nov. 30, 2021, now abandoned, and a continuation-in-part of application No. 17/537,432, filed on Nov. 29, 2021, and a continuation-in-part of application No. 17/352,306, filed on Jun. 20, 2021, and a continuation-in-part of application No. 17/352,185, filed on Jun. 18, 2021, and a continuation-in-part of application No. 17/180,766, filed on Feb. 20, 2021, and a continuation-in-part of application No. 17/149,625, filed on Jan. 14, 2021, and a continuation-in-part of application No. 17/149,667, filed on Jan. 14, 2021, and a continuation-in-part of application No. 17/113,023, filed on Dec. 5, 2020, now Pat. No. 11,770,197, and a continuation-in-part of application No. 17/019,270, filed on Sep. 13, 2020, and a continuation-in-part of application No. 16/909,913, filed on Jun. 23, 2020, and a continuation-in-part of application No. 16/871,004, filed on May 10, 2020, and a continuation-in-part of application No. 16/790,610, filed on Feb. 13, 2020, and a continuation-in-part of application No. 15/326,112, filed on Jan. 13, 2017, now abandoned.

(60) Provisional application No. 63/388,625, filed on Jul. 12, 2022, provisional application No. 63/354,184, filed on Jun. 21, 2022, provisional application No. 63/349,082, filed on Jun. 4, 2022.

Figure: Overlap Versus Non-overlap

|  | $f_{start}$ (GHz) | $f_{end}$ (GHz) | $\Delta f$ (MHz) | S |
|---|---|---|---|---|
| No-Overlap | 4.9 | 5.9 | 10 | 101 |
| Overlap | 4.8909375 | 5.9090625 | 8.28125 | 124 |

Table: Comparison Between Overlap and No-overlap Schemes

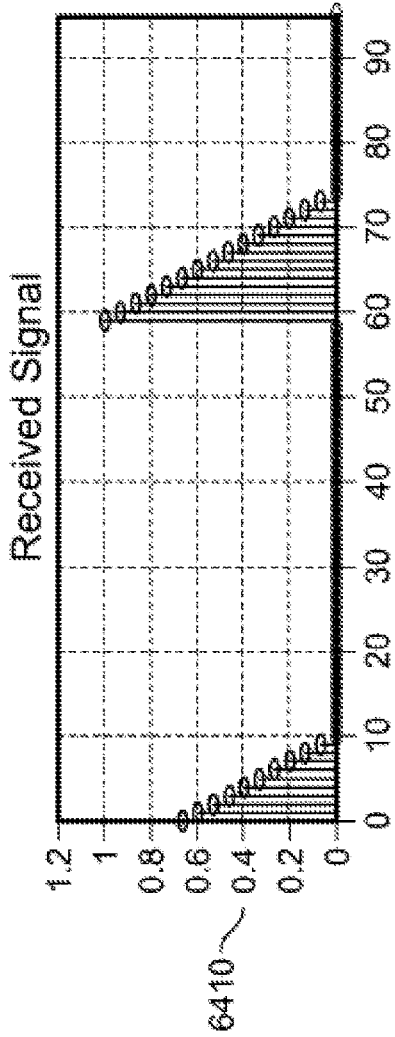
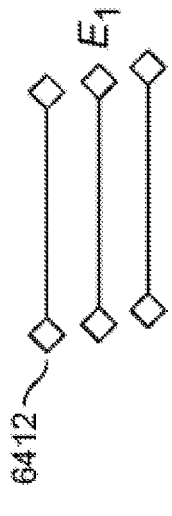
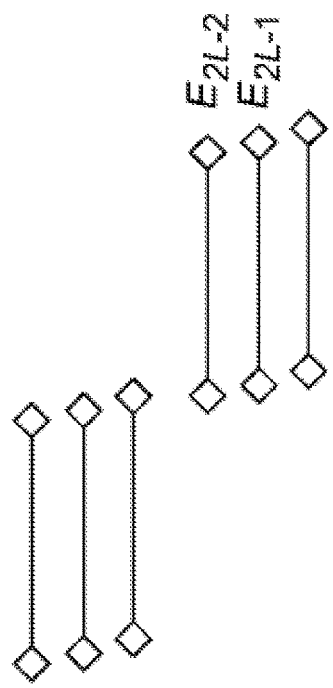
FIG. 15

METHOD, APPARATUS, AND SYSTEM FOR WIRELESS MONITORING WITH IMPROVED ACCURACY

CROSS-REFERENCE TO RELATED APPLICATIONS

The present application hereby incorporates by reference the entirety of the disclosures of, and claims priority to, each of the following cases:
(a) U.S. patent application Ser. No. 18/144,092, entitled "WIRELESS POSITIONING SYSTEMS", filed on May 5, 2023,
(b) U.S. patent application Ser. No. 15/326,112, entitled "WIRELESS POSITIONING SYSTEMS", filed on Jan. 13, 2017, which is a national stage entry of PCT patent application PCT/US2015/041037, entitled "WIRELESS POSITIONING SYSTEMS", filed on Jul. 17, 2015,
(c) U.S. patent application Ser. No. 16/790,610, entitled "METHOD, APPARATUS, AND SYSTEM FOR WIRELESS GAIT RECOGNITION", filed Feb. 13, 2020,
(d) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(e) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(f) U.S. patent application Ser. No. 17/113,023, entitled "METHOD, APPARATUS, AND SYSTEM FOR ACCURATE WIRELESS MONITORING", filed on Dec. 5, 2020,
(g) U.S. patent application Ser. No. 17/019,270, entitled "METHOD, APPARATUS, AND SYSTEM FOR VEHICLE WIRELESS MONITORING", filed on Sep. 13, 2020,
(h) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(i) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(j) U.S. patent application Ser. No. 17/180,766, entitled "METHOD, APPARATUS, AND SYSTEM FOR WIRELESS MOTION RECOGNITION", filed on Feb. 20, 2021,
(k) U.S. patent application Ser. No. 17/352,185, entitled "METHOD, APPARATUS, AND SYSTEM FOR WIRELESS MICRO MOTION MONITORING", filed on Jun. 18, 2021,
(l) U.S. patent application Ser. No. 17/352,306, entitled "METHOD, APPARATUS, AND SYSTEM FOR WIRELESS MONITORING TO ENSURE SECURITY", filed on Jun. 20, 2021,
(m) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021,
(n) U.S. patent application Ser. No. 17/539,058, entitled "METHOD, APPARATUS, AND SYSTEM FOR HUMAN IDENTIFICATION BASED ON HUMAN RADIO BIOMETRIC INFORMATION", filed on Nov. 30, 2021,
(o) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022,
(p) U.S. Provisional Patent application 63/349,082, entitled "METHOD, APPARATUS, AND SYSTEM FOR WIRELESS SENSING VOICE ACTIVITY DETECTION", filed on Jun. 4, 2022,
(q) U.S. patent application Ser. No. 17/838,228, entitled "METHOD, APPARATUS, AND SYSTEM FOR WIRELESS SENSING BASED ON CHANNEL INFORMATION", filed on Jun. 12, 2022,
(r) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022,
(s) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022,
(t) U.S. Provisional Patent application 63/354,184, entitled "METHOD, APPARATUS, AND SYSTEM FOR MOTION LOCALIZATION AND OUTLIER REMOVAL", filed on Jun. 21, 2022,
(u) U.S. Provisional Patent application 63/388,625, entitled "METHOD, APPARATUS, AND SYSTEM FOR WIRELESS SENSING AND INDOOR LOCALIZATION", filed on Jul. 12, 2022,
(v) U.S. patent application Ser. No. 17/888,429, entitled "METHOD, APPARATUS, AND SYSTEM FOR RADIO BASED SLEEP TRACKING", filed on Aug. 15, 2022,
(w) U.S. patent application Ser. No. 17/891,037, entitled "METHOD, APPARATUS, AND SYSTEM FOR MAP RECONSTRUCTION BASED ON WIRELESS TRACKING", filed on Aug. 18, 2022.
(x) U.S. patent application Ser. No. 17/945,995, entitled "METHOD, APPARATUS, AND SYSTEM FOR WIRELESS VITAL MONITORING USING HIGH FREQUENCY SIGNALS", filed on Sep. 15, 2022,
(y) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022,
(z) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022,
(aa) PCT Patent application PCT/US22/45708, entitled "METHOD, APPARATUS, AND SYSTEM FOR WIRELESS SENSING MEASUREMENT AND REPORTING", filed on Oct. 4, 2022,
(bb) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023.

TECHNICAL FIELD

The present teaching generally relates to wireless monitoring. More specifically, the present teaching relates to improving accuracy and efficiency of the wireless monitoring based on motion information computation and time window classification.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless monitoring using wireless channel information (CI) has received a lot of attention in the era of IoT. However, CI, e g channel state information (CSI) or channel frequency information (CFI), may be interrupted by many factors, such as hardware imperfection, thermal noise, etc. In addition, there may be many outliers which, if without preprocessing, will affect the performance of wireless monitoring significantly.

One challenge that may be addressed in the future using novel wireless signaling protocols is high-speed and efficient wireless data transfer to and from huge numbers of potentially closely spaced devices. The demand for high-speed and low-latency wireless communication capabilities has increased dramatically in recent years. Supporting large traffic demands will be a challenge for future wireless networks. One challenge will be supporting the huge number of wireless devices with ever-growing demands for higher data rates within the allocated spectrum. Another will be the scheduling delay that is expected to accompany large numbers of coexisting wireless devices competing for network service and to significantly deteriorate the user experience in many delay-sensitive applications. Some network users have already started to feel the impact of such delays in places such as airports, conference halls, and stadiums where it is difficult to access the wireless network with hundreds of other devices around. Such poor user experiences may become the norm if new technologies are not introduced to deal with the predicted growth of wireless traffic.

Several technologies have been utilized to tackle this challenge. One straightforward approach is to install more access points (APs) in a given coverage area such that each AP can service a smaller number of users (TDs) and therefore more traffic can be offloaded to the wired backhaul networks. However, APs that utilize the widely adopted and deployed OFDM protocols can interfere with each other when they are deployed too close together. Sophisticated interference mitigation and resource allocation algorithms may be used to enable the closely spaced APs to accommodate multiple users. For instance, in the IEEE 802.11 (WiFi) standard, the overall available spectrum is currently approximately 72 MHz in the 2.4 GHz band but adjacent APs may be restricted to utilizing 22 MHz or less of the available spectrum because they may each need to operate in different spectral bands to reduce interference with each other and with the TDs. But this kind of frequency division multiplexing may hinder closely-spaced APs from fully utilizing the available spectrum and therefore supporting the predicted user demands of the future. Moreover, in such schemes, channel planning can be time-consuming and may fail altogether, either because of a lack of communication and/or coordination among multiple APs, or a lack of enough independent spectral bands to support the traffic demands. The system may suffer when APs are added or removed from the network because the channel planning may need to be done all over again. Femtocell networks may suffer from similar issues since the interference between macro- and/or femto-base stations or among multiple femto-base stations need to be coordinated and mitigated by division of the network resources; that is reducing the spectral allocation to individual users or cells. Therefore, while installing more OFDM (or similar existing protocol) based access points in a given wireless coverage area may be straightforward and a suitable solution for some applications, this solution alone does not appear to scale well enough to meet the predicted growth in traffic demands of future wireless network capabilities.

Another possible approach is to use multiple-input-multiple-output (MIMO) techniques such as have been incorporated in some existing OFDM based schemes such as WiFi and LTE (Long Term Evolution) to improve the spectral efficiency and/or reduce the scheduling delay of wireless networks. For example, multi-user multiple-input-multiple-output (MU-MIMO) techniques are able to support multiple simultaneous transmissions.

However, in addition to the difficulty in operating multiple antennas, the number of supported simultaneous transmissions may be limited. Therefore, this solution alone may not be sufficient for the high network densification challenge described above. Recently, researchers have begun to investigate so-called massive MIMO techniques that use many more antennas than active terminals so that the extra antennas can help focus the wireless signal energy into smaller regions and support some level of spatial multiplexing in addition to frequency multiplexing. While the massive MIMO technique brings some unique benefits beyond the traditional MIMO system, the cost and complexity of implementing these schemes scales up with the number of antennas, which may hinder it from being widely adopted. The principle of utilizing extra antennas can also be applied in distributed antenna systems where some additional antennas are placed close to the users. The wireless signal energy can be focused into a small area through the coordination of the local antennas and thus the system may be able to provide high data rates for certain terminal devices. However, the complexity of the system and of coordinating the antennas grows with the system size, which may limit the scalability of this solution. Therefore, there is a need for wireless communication technologies that can efficiently and cost-effectively meet the ever increasing demands for wireless access to the internet.

Another challenge that may be addressed using novel wireless signaling protocols is accurate indoor position identification and tracking. The global positioning system (GPS) uses signals from satellites to provide users and devices equipped with GPS equipment location and time information. When a user is navigating inside buildings, GPS signals may be weak or unavailable. In some examples, Wi-Fi signals from wireless access points can be used to determine coarse positions. For example, a wireless device can measure the average received signal strength (RSS) and use the RSS indicator (RSSI) of the received wireless signal to estimate its distance from a wireless access point. Such systems may be able to estimate that a device is a certain distance from an access point, but may not be able to indicate the relative orientation of the device, that is, whether the device is in front or in back or on the side of the access point. In some situations, signals from multiple wireless access points can be used to estimate the position of the device using triangulation, but such schemes have not reported indoor positioning accuracies greater than a few meters. Other known techniques for determining position of a device in an indoor environment include so-called time of arrival (ToA) or time of flight (ToF) techniques, time difference of arrival (TDoA), and angle of arrival (AoA) techniques. These techniques also achieve positioning accuracies of a few meters. Therefore, there is a need for positioning technologies that can determine and/or track the position of a user or a device with high resolution accuracy.

Highly accurate indoor positioning technologies may be adapted for other applications such as gesture recognition, home security and indoor surveillance systems. Using wireless or "radio" technologies may have advantages over current solutions because low-radiation level radio systems are safe and do not require line-of-sight between a transmitter and a receiver may be implemented using current off-the-shelf components.

SUMMARY

The present teaching relates to improving accuracy and efficiency of the wireless monitoring based on motion information computation and time window classification.

In one embodiment, a system for wireless monitoring is described. The system comprises: a first wireless device, and a processor. The set of heterogeneous wireless devices comprise: a first device, a second device, a second wireless device and a processor. The first wireless device is configured to transmit a wireless signal through a wireless multipath channel of a venue. The wireless multipath channel is impacted by a motion of an object in the venue. The second wireless device is configured to receive the wireless signal through the wireless multipath channel. The received wireless signal differs from the transmitted wireless signal due to the wireless multipath channel and the motion of the object. The processor is configured for: obtaining a time series of channel information (TSCI) of the wireless multipath channel based on the received wireless signal using a processor, a memory communicatively coupled with the processor and a set of instructions stored in the memory; performing a classification of a sliding time window by analyzing channel information (CI) of the TSCI in the sliding time window; computing a motion information (MI) for the sliding time window based on the TSCI and the classification of the sliding time window; and monitoring the motion of the object based on the MI.

In another embodiment, a method performed by a wireless monitoring system, is described. The method comprises: transmitting a wireless signal from a first wireless device through a wireless multipath channel of a venue, wherein the wireless multipath channel is impacted by a motion of an object in the venue; receiving the wireless signal by a second wireless device through the wireless multipath channel, wherein the received wireless signal differs from the transmitted wireless signal due to the wireless multipath channel and the motion of the object; obtaining a time series of channel information (TSCI) of the wireless multipath channel based on the received wireless signal using a processor, a memory communicatively coupled with the processor and a set of instructions stored in the memory; performing a classification of a sliding time window by analyzing channel information (CI) of the TSCI in the sliding time window; computing a motion information (MI) for the sliding time window based on the TSCI and the classification of the sliding time window; and monitoring the motion of the object based on the MI.

Other concepts relate to software for implementing the present teaching on wireless monitoring based on motion information computation and time window classification. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 15 shows an example of a representation of a technique for determining a synchronization index, according to some embodiments of the present disclosure.

DETAILED DESCRIPTION

Figure 1A:
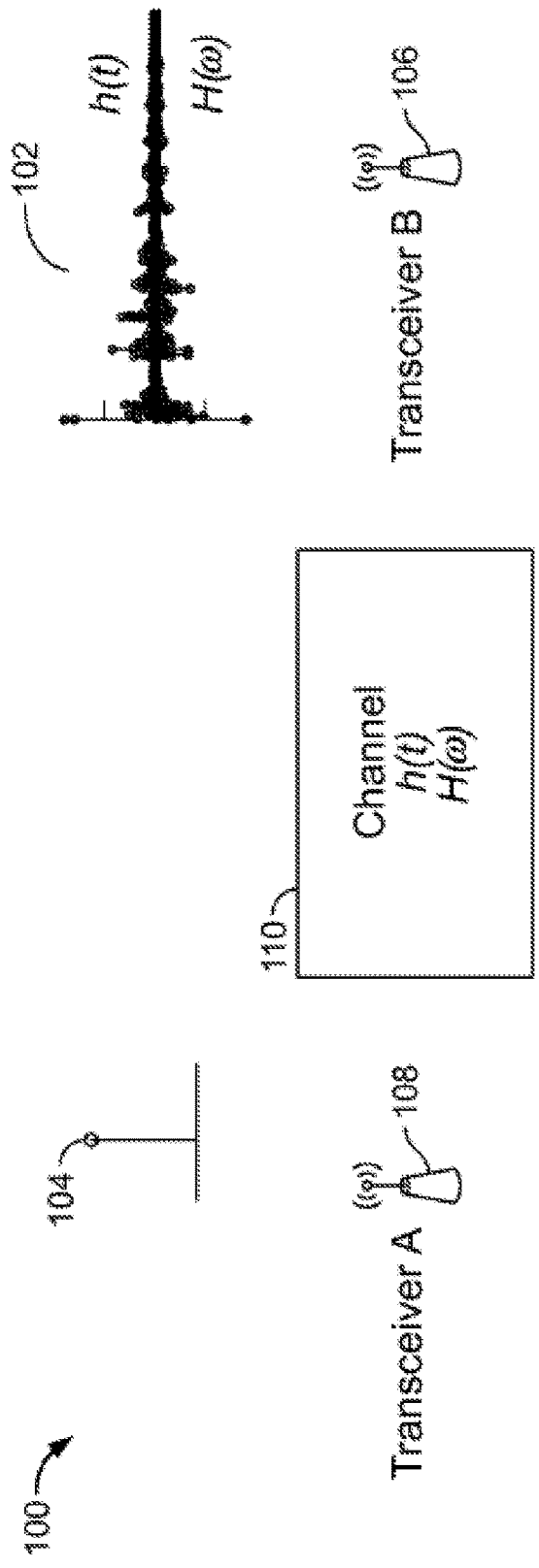
FIG. 1A shows an exemplary embodiment of a wireless system that includes two transceivers, according to some embodiments of the present disclosure.

The symbol "I" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behaviodgesture/gait/ extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless- enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI. Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/ Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/ caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/ district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/ payload characteristics/network/ID/SSID/characteristics/ settings/parameters. Particular MAC address/selected channel may be changed/adjusted/varied/modified over time (e.g. according to time table/rule/policy/mode/condition/ situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/ another device/local/edge/cloud server).

Wireless connection (e.g. association/authentication) between Type1 device and nearby/portable/another device may be established (e.g. using signal handshake). Type1 device may send first handshake signal (e.g. sounding frame/ probe signal/request-to-send RTS) to the nearby/portable/ another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/ acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/ another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/ fully parallel. Parallel triggering may be achieved using additional device (s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/ OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/ second (sounding) rates respectively, perhaps to first/second MAC addresses respectively. Some first/second channels/ signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/ signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e g channels/signals/ rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/ access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/ strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferiodunsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/ scheme/channel/bandwidth/system state/TSCI/TSMA/task/ task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/pre Bence/movement/daily/activity/history/event.

Classifier may comprise linear/nonlinear/binary/multi-class/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/ second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/$L\_k$/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long- term/historical/repetitive/repeated/repeatable/recurring/periodic/pseudoperiodic/regular/habitual/incremental/average/initial/final/current/past/future/predicted/changing/deviational/change/time/frequency/orthogonal/non- orthogonal/transform/decomposition/deterministic/stochastic/probabilistic/dominant/key/prominent/representative/characteristic/significant/insignificant/indicative/common/averaged/shared/typical/prototypical/ persistent/abnormal/abrupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/exemplary/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object.

Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/bwdbucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalatodelevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life- threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/ animation/webpage/text/message/notification/reminder/ enquiry/warning, detect/recognize/monitor/interpret/ analyze/record/store user/intruder/object input/motion/ gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/ clearning/entertainment/IoT/security/siren/access system/ device/doodwindow/garage/lift/elevatodescalator/speaker/ television/light/peripheral/accessory/wearable/furniture/ appliance/amenity/gadget/alarm/camera/gaming/coffee/ cooking/heater/fan/housekeeping/home/office machine/ device/robot/vacuum cleaner/assembly line), (d) miscellaneous task, any of: transmission/coding/encryption/ storage/analysis of data/parameters/analytics/derived data, upgrading/administration/configuration/coordination/broadcasting/synchronization/networking/encryption/communication/protection/compression/storage/database/archiving/ query/cloud computing/presentation/augmented/virtual reality/other processing/task. Task may be performed by some of: Type1/Type2/nearby/portable/another device, and/ or hub/local/edge/cloud server.

Task may also comprise: detect/recognize/monitor/locate/ interpret/analyze/record/store user/visitor/intruder/object/ pet, interact/engage/converse/dialog/exchange with user/object/visitor/intruder/human/baby/pet, detect/locate/localize/ recognize/monitor/analyze/interpret/learn/train/respond/ execute/synthesize/generate/record/store/summarize health/ well-being/daily-life/activity/behavior/pattern/exercise/ food-intake/restroom visit/work/play/rest/sleep/relaxation/ danger/routine/timing/habit/trend/normality/normalcy/ anomaly/regularity/irregularity/change/presence/motion/ gesture/gait/expression/emotion/state/stage/voice/ command/instruction/question/query/music/sound/ location/movement/fall-down/threat/discomfort/sickness/ environment/, generate/retrieve/play/display/render/ synthesize dialog/exchange/response/presentation/report/ experience/media/multimedia/expression/sound/speech/ music/image/imaging/video/animation/webpage/text/ message/notification/reminder/enquiry/warning, detect/ recognize/monitor/interpret/analyze/record/store user/ intruder/object input/motion/gesture/location/activity), detect/check/monitor/locate/manage/control/adjust/configure/lock/unlock/arm/disarm/open/close/fully/partially/activ e/turn on/off some system/device/object (e.g. vehicle/ robot/drone/electrical/mechanical/air-conditioning/heating/ ventilation/HVAC/lighting/cleaning/entertainment/IoT/ security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/ heater/fan/housekeeping/home/office machine/device/ vacuum cleaner/assembly line/window/garage/door/blind/ curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/ response/warning/clarification/notification/report) automatically upon detection, do something for user automatically upon detecting user presence, turn on/off/wake/control/adjust/dim light/music/radio/TV/HiFi/STB/computer/speaker/ smart device/air-conditioning/ventilation/heating system/ curtains/light shades, turn on/off/pre-heat/control coffeemachine/hot-water-pot/cooker/oven/microwave oven/ another cooking device, check/manage temperature/setting/ weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/ channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/ field/voice/music/song/dialog system, using visual tool such as TV/entertainment system/computer/notebook/tablet/display/light/color/brightness/patterns symbols, using haptic/ virtual reality/gesture/tool, using smart device/appliance/ material/furniture/fixture, using server/hub device/cloud/ fog/edge server/home/mesh network, using messaging/ notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/settop box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from nighttime to day-time profile, turn on bedroom light, turn on restroom light as user approaches restroom, check radio/ streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/ close garage door, turn on/off garage/driveway light, close/ lock all windows/doors (if user forgets), turn off appliance (e.g. stove/microwave/oven), turn on/arm security system, adjust light/air-conditioning/heating/ventilation systems to "away" profile to save energy, and/or send alerts/reports/ updates to user's smart phone.

Motion may comprise any of: no-motion, motion sequence, resting/non-moving motion, movement/change in position/location, daily/weekly/monthly/yearly/repeating/ activity/behavior/action/routine, transient/time-varying/falldown/repeating/repetitive/periodic/pseudo-periodic motion/ breathing/heartbeat, deterministic/non-deterministic/ probabilistic/chaotic/random motion, complex/combination motion, non-/pseudo-/cyclo-/stationary random motion, change in electro-magnetic characteristics, human/animal/ plant/body/machine/mechanical/vehicle/drone motion, air-/ wind-/weather-/water-/fluid-/ground/sub-surface/seismic motion, man-machine interaction, normal/abnormal/danger- ous/warning/suspicious motion, imminent/rain/fire/flood/ tsunami/explosion/collision, head/facial/eye/mouth/tongue/ neck/finger/hand/arm/shoulder/upper/lower/body/chest/ abdominal/hip/leg/foot/joint/knee/elbow/skin/below-skin/ subcutaneous tissue/blood vessel/intravenous/organ/heart/ lung/stomach/intestine/bowel/eating/breathing/talking/ singing/dancing/coordinated motion, facial/eye/mouth expression, and/or hand/arm/gesture/gait/UI/keystroke/typ- ing stroke.

Type1/Type2 device may comprise heterogeneous IC, low-noise amplifier (LNA), power amplifier, transmit-re- ceive switch, media access controller, baseband radio, and/ or 2.4/3.65/4.9/5/6/sub-7/over-7/28/60/76 GHz/another radio. Heterogeneous IC may comprise processor/memory/ software/firmware/instructions. It may support broadband/ wireless/mobile/mesh/cellular network, WLAN/WAN/ MAN, standard/IEEE/3GPP/WiFi/4G/LTE/5G/6G/7G/8G, IEEE 802.11/a/b/g/n/ac/ad/af/ah/ax/ay/az/be/bf/15/16, and/ or Bluetooth/BLE/NFC/Zigbee/WiMax.

Processor may comprise any of: general-/special-/pur- pose/embedded/multi-core processor, microprocessor/mi- crocontroller, multi-/parallel/CISC/RISC processor, CPU/ GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/ optical/organic/storage system/network, network/cloud/ edge/local/external/internal storage, and/or any non-transi- tory storage medium. Set of instructions may comprise machine executable codes in hardware/IC/software/firm- ware, and may be embedded/pre-loaded/loaded upon-boot- up/on-the-fly/on-demand/pre-installed/installed/down- loaded.

Processing/preprocessing/postprocessing may be applied to data (e.g. TSCI/feature/characteristics/STI/MI/test quan- tity/intermediate/data/analytics) and may have multiple steps. Step/pre-/post-/processing may comprise any of: com- puting function of operands/LOS/non-LOS/single-link/ multi-link/component/item/quantity, magnitude/norm/ phase/feature/energy/timebase/similarity/distance/ characterization score/measure computation/extraction/ correction/cleaning, linear/nonlinear/FIR/IIR/MA/AR/ ARMA/Kalman/particle filtering, lowpass/bandpass/ highpass/median/rank/quartile/percentile/mode/selective/ adaptive filtering, interpolation/intrapolation/extrapolation/ decimation/subsampling/upsampling/resampling, matched filtering/enhancement/restoration/denoising/smoothing/ conditioning/spectral analysis/mean subtraction/removal, linear/nonlinear/inverse/frequency/time transform, Fourier transform (FT)/DTFT/DFT/FFT/wavelet/Laplace/Hilbert/ Hadamard/trigonometric/sine/cosine/DCT/power-of-2/ sparse/fast/frequency transform, zero/cyclic/padding, graph- based transform/processing, decomposition/orthogonal/non- orthogonal/over-complete projection/eigen-decomposition/ SVD/PCA/ICA/compressive sensing, grouping/folding/ sorting/comparison/soft/hard/thresholding/clipping, first/ second/high order derivative/integration/convolution/ multiplication/division/addition/subtraction, local/global/ maximization/minimization, recursive/iterative/constrained/ batch processing, least mean square/absolute error/ deviation, cost function optimization, neural network/ detection/recognition/classification/identification/ estimation/labeling/association/tagging/mapping/ remapping/training/clustering/machine/supervised/ unsupervised/semi-supervised learning/network, vector/ quantization/encryption/compression/matching pursuit/ scrambling/coding/storing/retrieving/transmitting/ receiving/time-domain/frequency- domain/normalization/ scaling/expansion/representing/merging/combining/ splitting/tracking/monitoring/shape/silhouette/motion/ activity/analysis, pdf/histogram estimation/importance/ Monte Carlo sampling, error detection/protection/ correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/ union/intersection, vector operation/addition/subtraction/ multiplication/division, and/or another operation. Process- ing may be applied individually/jointly. Acceleration using GPU/DSP/coprocessor/multicore/multiprocessing may be applied.

Function may comprise: characteristics/feature/magni- tude/phase/energy, scalar/vector/discrete/continuous/poly- nomial/exponential/logarithmic/trigonometric/transcenden- tal/logical/piecewise/linear/algebraic/nonlinear/circular/ piecewise linear/real/complex/vector- valued/inverse/ absolute/indicator/limiting/floodrounding/sign/composite/ sliding/moving function, derivative/integration, function of function, one-to-one/one-to-many/many-to-one/many-to- many function, mean/mode/median/percentile/max/min/ range/statistics/histogram, local/global max/min/zero-cross- ing, variance/variation/spread/dispersion/deviation/standard deviation/divergence/range/interquartile range/total varia- tion/absolute/total deviation, arithmetic/geometric/har- monic/trimmed mean/square/cube/root/power, thresholding/ clipping/rounding/truncation/quantization/approximation, time function processed with an operation (e.g. filtering), sine/cosine/tangent/cotangent/secant/cosecant/elliptical/ parabolic/hyperbolic/game/zeta function, probabilistic/sto- chastic/random/ergodic/stationary/deterministic/periodic/ repeated function, inverse/transformation/frequency/ discrete time/Laplace/Hilbert/sine/cosine/triangular/ wavelet/integer/power-of-2/sparse transform, orthogonal/ non-orthogonal/eigen projection/decomposition/eigenvalue/ singular value/PCA/ICA/SVD/compressive sensing, neural network, feature extraction, function of moving window of neighboring items of time series, filtering function/convo- lution, short-time/discrete transform/Fourier/cosine/sine/ Hadamard/wavelet/sparse transform, matching pursuit, approximation, graph-based processing/transform/graph signal processing, classification/identification/class/group/ category/labeling, processing/preprocessing/postprocessing, machine/learning/detection/estimation/feature extraction/ learning network/feature extraction/denoising/signal enhancement/coding/encryption/mapping/vector quantiza- tion/remapping/lowpass/highpass/bandpass/matched/Kal- man/particle/FIR/IIR/MA/AR/ARMA/median/mode/adap- tive filtering, first/second/high order derivative/integration/ zero crossing/smoothing, up/down/random/importance/ Monte Carlo sampling/resampling/converting, interpolation/extrapolation, short/long term statistics/auto/ cross correlation/moment generating function/time averag- ing/weighted averaging, special/Bessel/Beta/Gamma/ Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/user/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/doodwindow/open/close/fall-down/accident/burning/freezing/water-/wind-/air-movement event, repeated/pseudo-periodic event (e g running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance—from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/worldwalkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/ oven/microwave/fan/heater/air-con/router/phone/computer/ tablet/accessory/plug/pipe/lamp/smoke detector/furniture/ fixture/shelf/cabinet/doodwindow/lock/sofa/table/chair/ piano/utensil/wearable/watch/tag/key/ticket/belt/wallet/pen/ hat/necklace/implantable/phone/eyeglasses/glass panel/ gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

In exemplary positioning systems, users or devices may send at least one location-specific waveform to a locator, which may also be a wireless module of any type, such as a router, an access point, a base station, a computer, a repeater, a handheld device, and the like. The locator may compare the received location-specific waveform to a predicted waveform, a computer generated waveform, a stored waveform, a previously generated waveform, and the like, that can be or has been associated with a particular location or set of position coordinates. The received location-specific waveforms may be compared in a variety of ways including, but not limited to, convolving one waveform with another, convolving one waveform with a time-reversed version of another, correlating the waveforms, normalizing and subtracting one waveform from the other, and the like, to determine how similar the waveforms are. If the waveforms are determined to be similar enough, then the device sending the received location-specific waveform will be deemed to be at the particular location associated with the predicted, computer generated, stored, and/or previously generated waveform used in the comparison calculation. Exemplary embodiments of wireless positioning systems are described in which the positioning systems using location-specific waveforms have been shown to achieve location better than 5 cm using the inventive apparatuses and methods disclosed here.

In general, in one aspect, a method of determining the position of a device is provided. The method includes at a first device, receiving a probe signal sent from a second device through a multipath channel. The probe signal received at the first device has a waveform that is different from the waveform sent by the second device due to influence of the multipath channel. The method also includes estimating a channel impulse response based on the probe signal received at the first device. The method also includes determining a time-reversed signal based on the estimated channel impulse response. The method also includes determining a position of the second device based on the time-reversed signal and stored channel impulse responses that are stored in a storage device.

Implementations of the method may include one or more of the following features. The stored channel impulse responses can be derived from probe signals sent from a plurality of positions, each stored channel impulse response derived from a corresponding probe signal sent from a corresponding position, each stored channel impulse response being associated with the position from which the corresponding probe signal was sent. The method can include for each of a plurality of positions, determining a feature value based on a function of the time-reversed signal and the stored channel impulse response associated with the position, and determining the position of the second device based on the position associated with a largest feature value among the feature values. The feature value associated with a position can also be a function of the stored channel impulse response or responses associated with one or more neighboring positions. The feature value associated with a position can be a function of the stored channel impulse responses derived from probe signals sent from the position at a plurality of time periods. Determining the feature value associated with a position can include calculating a convolution of the time-reversed signal and the stored channel impulse response associated with the position. The probe signal can be modulated by a carrier wave, and the position of the second device can be determined with an accuracy within one wavelength, one-half of a wavelength, or one-tenth of a wavelength of the carrier wave. The probe signal can include one or more pulse signals. The probe signal can include one or more pseudorandom codes. The probe signal can include one or more Golay sequences. Information about the position of the second device can be transmitted to the second device, e.g., using time-reversal wireless communication. The method can include receiving coarse positioning data from the second device, selecting a subset of stored channel impulse responses based on the coarse positioning data, and determining the position of the second device based on the time-reversed signal and the subset of stored channel impulse responses.

In some embodiments, feature values may be used to determine the position of a device. For example, if the feature value represents the result of a mathematical function performed on a time-reversed version of a measured channel impulse response and each of a number of reference channel impulse responses, then there may be a set of feature values that are generated that describe how closely matched each of the reference channel impulse responses is to the (time-reversed version of the) measured channel response. In those embodiments, the reference channel impulse response that yielded the highest feature value may be deemed to be associated with the same positional coordinates as the measured device. In some embodiments, the feature values may be normalized and the reference channel impulse response that yielded a feature value closest to 1 may be deemed to be the one associated with the same coordinates as the measured device. In some embodiments, if none of the calculated feature values exceed a certain threshold, then the system may report that the location of the device cannot be determined or cannot be determined with high certainty. In some embodiments, a normalized feature value greater than 0.5, 0.75, 0.8, 0.9, 0.95, or 0.98 may be required to determine that a reference channel impulse response is an accurate enough match to a measured channel impulse response. In some embodiments, a normalized feature value less than 1, 0.95, 0.9, 0.8, 0.75, 0.5, 0.25 or 0.1 may be required to determine that none of the reference channel impulse responses is a close enough match to the measured channel impulse response.

In some embodiments, feature values may be used to determine the position of a device. For example, if the feature value represents the result of a mathematical function performed on a measured channel impulse response and a time-reversed version of each of a number of reference channel impulse responses, then there may be a set of feature values that are generated that describe how closely matched each of the reference channel impulse responses is to the (time-reversed version of the) measured channel response. In those embodiments, the reference channel impulse response that yielded the highest feature value may be deemed to be associated with the same positional coordinates as the measured device. In some embodiments, the feature values may be normalized and the reference channel impulse response that yielded a feature value closest to 1 may be deemed to be the one associated with the same coordinates as the measured device. In some embodiments, if none of the calculated feature values exceed a certain threshold, then the system may report that the location of the device cannot be determined or cannot be determined with high certainty. In some embodiments, a normalized feature value greater than 0.5, 0.75, 0.8, 0.9, 0.95, or 0.98 may be required to determine that a reference channel impulse response is an accurate enough match to a measured channel impulse response. In some embodiments, a normalized feature value less than 1, 0.95, 0.9, 0.8, 0.75, 0.5, 0.25 or 0.1 may be required to determine that none of the reference channel impulse responses is a close enough match to the measured channel impulse response.

In general, in another aspect, an apparatus to facilitate determining the position of a device is provided. The apparatus includes a storage storing first data representing channel impulse responses derived from probe signals sent from a plurality of positions and second data representing coordinates of the positions.

Implementations of the apparatus may include one or more of the following features. The apparatus can include a data processor configured to determine a position of a terminal device based on a time-reversed signal determined based on a time-reversed version of a channel impulse response that is estimated based on a channel probing signal sent from the terminal device and the stored channel impulse responses.

In general, in another aspect, an apparatus for determining position information is provided. The apparatus includes a transmit module configured to send a channel probing signal to a base station through a multipath channel; and a receive module to receive position data from the base station, the position data having information about coordinates of a position of the apparatus, in which the base station determines the position of the apparatus based on a time-reversed signal derived from a time-reversed version of a channel impulse response that is derived from the received channel probing signal and stored channel impulse responses.

Implementations of the apparatus may include one or more of the following features. The apparatus can include a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

In general, in another aspect, a method of determining the position of a device is provided. The method includes from each of multiple positions within a venue, transmitting a probe signal to a base station through a multipath channel; at the base station, for each of the received probe signals, estimating a channel impulse response and associating the channel impulse response with the position from which the corresponding probe signal was sent; storing, in a storage, first data representing the estimated channel impulse responses and second data representing the positions associated with the channel impulse responses.

Implementations of the method may include one or more of the following features. The multiple positions can be spaced apart equal to or less than a wavelength, one-half of the wavelength, or one-tenth of the wavelength of a carrier wave of the probe signal. Scattering elements can be used to scatter the probe signal towards multiple propagation paths when being transmitted to the base station. At each of the multiple positions, position coordinates can be determined using laser beams. The second data can include coordinates of each of the positions. The method can include moving a robot to each of the multiple positions and transmitting the probe signal from the robot to the base station. The method can include moving an unmanned aerial vehicle to each of the multiple positions and transmitting the probe signal from the unmanned aerial vehicle to the base station. The method can include at each position within the venue, transmitting probe signals to the base station at multiple time periods, and at the base station storing first data representing channel impulse responses corresponding to the probe signals transmitted at the multiple time periods. The method can include determining a position of a device within the venue based on the stored first data and second data. The venue can include at least one of a house, a museum, a building, a shopping mall, an amusement park, a convention center, a hotel, a subway station, a train station, an airport, an underground terrain, a cruise ship, a tunnel, or a region having several structures or buildings.

In general, in another aspect, a method for determining the position of a terminal device is provided. The method includes at a terminal device, sending a radio frequency signal through a multipath channel to a base station that has a storage storing channel impulse responses each associated with one of a plurality of positions; and receiving information about a position of the terminal device from the base station, in which the base station determines the position of the terminal device based on a time-reversed signal derived from the radio frequency signal sent from the terminal device and the stored channel impulse responses.

Implementations of the method may include one or more of the following features. The radio frequency signal can have a frequency in a range between 0.1 GHz to 100 GHz. The radio frequency signal can have a bandwidth equal to or greater than 20 MHz. The method can include determining a coarse position of the terminal device using at least one of Wi-Fi, Bluetooth, or cellular signals, sending information about the coarse position to the base station, and receiving fine position information from the base station. The base station can select a subset of the stored channel responses from among the stored channel responses based on the coarse position information, and determine the fine position of the terminal device based on the time-reversed signal and the subset of stored channel impulse responses.

In general, in another aspect, a method for determining the position of a device is provided. The method includes determining a coarse position of a device in a venue using at least one of Wi-Fi, Bluetooth, or cellular signals; and determining a fine position of the device in the venue based on a time-reversed signal and stored channel impulse responses, each of the stored channel impulse response being associated with a known position.

Implementations of the method may include one or more of the following features. The method can include receiving a probe signal sent from the device, estimating a channel impulse response based on the received probe signal, and determining the time-reversed signal based on a time-reversed version of the estimated channel impulse response. Each stored channel response can be derived from a probe signal sent from the known position associated with the stored channel impulse response.

In general, in another aspect, a method includes at a terminal device, establishing a communication link with a first base station using time-reversal wireless communication; and receiving a first downlink signal from the first base station using time-reversal wireless communication, the downlink signal including first information about a position of the terminal device.

Implementations of the method may include one or more of the following features. Establishing a communication link with a first base station can include sending a channel probing signal from the terminal device to the first base station. The method can include at the terminal device, establishing a communication link with a second base station using time-reversal wireless communication; receiving a second downlink signal from the second base station using time-reversal wireless communication, the second downlink signal including second information about the position of the terminal device; and determining the position of the terminal device based on the first and second information.

In general, in another aspect, a method of determining the position of a device is provided. The method includes at a first device, receiving a probe signal sent from a second device through a multipath channel; estimating a channel impulse response based on the probe signal received at the first device; and applying a time-reversal classifier to determine a position of the second device based on the estimated channel impulse response and stored channel impulse responses, each stored channel impulse response being associated with a known position.

Implementations of the method may include the following feature. The method can include sending information about the position of the second device to the second device.

In general, in another aspect, a method includes at a base station, broadcasting a combined signal that is a combination of multiple downlink signals, each downlink signal having coordinate data associated with a particular position, the downlink signal having a waveform configured to focus at the particular position.

Implementations of the method may include one or more of the following features. The method can include performing a handshake process with a terminal device to provide timing information useful for the terminal device to determine the timing of the broadcast of the combined signal.

In general, in another aspect, a method of determining the position of a terminal device is provided. The method includes at a terminal device, performing a handshake process with a base station to receive timing information useful for determining a timing of a broadcast of a combined signal that is a combination of multiple downlink signals, each downlink signal having coordinate data associated with a particular position, the downlink signal having a waveform configured to focus at the particular position; receiving a downlink signal from the base station, the downlink signal having a waveform configured to focus at the particular position where the terminal device is positioned; and determining coordinates of the position of the terminal device based on the received downlink signal.

In general, in another aspect, a method of determining the position of a device is provided. The method includes determining a coarse position of a terminal device; sending data representing the coarse position to a server; downloading, from the server, information about channel impulse responses associated with positions at or near the coarse position; receiving a channel probing signal from a beacon; estimating a channel impulse response based on the received channel probing signal; determining a time-reversed signal based on the estimated channel impulse response; and determining a fine position of the terminal device based on the time-reversed signal and the downloaded channel impulse responses.

In another aspect, an apparatus includes a circuit to receive a probe signal sent from a second device through a multipath channel. The probe signal received at the apparatus has a waveform that is different from the waveform sent by the second device due to influence of the multipath channel. The apparatus also includes a data processor configured to estimate a channel impulse response based on the received probe signal. The data processor is also configured to determine a time-reversed signal based on the estimated channel impulse response. The data processor is also configured to determine a position of the second device based on the time-reversed signal and stored channel impulse responses that are stored in a storage device.

Implementations of the apparatus may include one or more of the following features. The stored channel impulse responses can be derived from probe signals sent from a plurality of positions, each stored channel impulse response derived from a corresponding probe signal sent from a corresponding position, each stored channel impulse response being associated with the position from which the corresponding probe signal was sent. The data processor can be configured to: for each of a plurality of positions, determine a feature value based on a function of the time-reversed signal and the stored channel impulse response associated with the position, and determine the position of the second device based on the position associated with a largest feature value among the feature values. The feature value associated with a position can also be a function of the stored channel impulse response or responses associated with one or more neighboring positions. The feature value associated with a position can be a function of the stored channel impulse responses derived from probe signals sent from the position at a plurality of time periods. Determining the feature value associated with a position can include calculating a convolution of the time-reversed signal and the stored channel impulse response associated with the position. The probe signal can include one or more pulse signals. The probe signal can include one or more pseudorandom codes. The probe signal can include one or more Golay sequences. The apparatus can include a transmit circuit to transmit information about the position of the second device to the second device.

In another aspect, a system for monitoring at least one macroscopic object in an arrangement of macroscopic objects includes one or more wireless transmitters. Each wireless transmitter is at a different spatial location, and each wireless transmitter is configured to transmit one or more wireless signals. Each wireless signal has a bandwidth and a center frequency. The system also includes one or more wireless receivers. Each wireless receiver is at a different spatial location, and each wireless receiver is configured to receive at least one of the one or more wireless signals transmitted from each wireless transmitter. The system also includes an electronic processor coupled to at least the one or more wireless receivers. The electronic processor is configured to compare information derived from the received one or more wireless signals to information in a database. The electronic processor is also configured to determine information about the arrangement of macroscopic objects based on the comparison. The electronic processor is also configured to generate an output based on the determined information. The number of the one or more transmitters is M, the number of the one or more wireless signals for the m-th transmitter is $N_m$, the number of the one or more wireless receivers is K, and the bandwidth of the n-th wireless signal from the m-th transmitter that is received by the k-th wireless receiver is $b_{mnk}$. The system has a collective bandwidth B greater than 50 MHz, where $$B = \sum_{m=1}^{M}\sum_{n=1}^{N_m}\sum_{k=1}^{K} b_{mnk}$$

and where the derived information that is compared to the information in the database spans the collective bandwidth.

Implementations of the system may include one or more of the following features. The one or more wireless receivers can receive two or more wireless signals that are transmitted from the one or more wireless transmitters through one or more wireless channels, and comparing information derived from the received one or more wireless signals to information in a database can include comparing a composite channel response derived from the received two or more wireless signals, or information derived from the composite channel response derived from the received two or more wireless signals, with information stored in the database. The one or more wireless receivers can receive two or more wireless signals having different center frequencies. The information stored in the database can include composite channel responses each derived from previously received two or more wireless signals, or information derived from composite channel responses each derived from previously received two or more wireless signals. The information stored in the database can include wideband channel responses, and the method can include processing a wideband channel response to simulate a narrower band channel response. Comparing the composite channel response with information in the database can include determining a plurality of time-reversal resonating strengths between the composite channel response derived from the received two or more wireless signals and the composite channel responses stored in the database. The electronic processor can be configured to identify the stored composite channel response that results in a maximum time-reversal resonating strength. The stored composite channel response resulting in the maximum time-reversal resonating strength can be associated with a particular location, and determining information about the arrangement of macroscopic objects based on the comparison can include determining that the one or more wireless receivers that receive the two or more wireless signals are at the particular location or in a vicinity of the particular location. The stored composite channel response resulting in the maximum time-reversal resonating strength can be associated with a particular arrangement of macroscopic objects, and determining information about the arrangement of macroscopic objects based on the comparison can include determining that the macroscopic objects have the particular arrangement.

The information about the arrangement of macroscopic objects can include an indication of a change in the arrangement of macroscopic objects. The macroscopic objects can exclude the one or more wireless transmitters and the one or more wireless receivers. The one or more wireless receivers can be stationary relative to the one or more wireless transmitters. The macroscopic objects can include at least one of the one or more wireless transmitters and receivers, and wherein the change in the arrangement of macroscopic objects can be a change in location of one of the one or more wireless transmitters and receivers relative to the other macroscopic objects. The arrangement of macroscopic objects can be located in a rich multipath venue. The venue can include at least one of an enclosed structure or a partially enclosed structure. The enclosed structure can include a building. The building can include at least one of walls, doors, or windows. Determining information about the arrangement of macroscopic objects can include determining information about the arrangement of at least one of doors or windows. The one or more wireless transmitters and the one or more wireless receivers can be located at one side of a wall, and determining information about the arrangement of macroscopic objects can include determining information about the arrangement of macroscopic objects that are located on another side of the wall.

The collective bandwidth B can be greater than 60 MHz, greater than 80 MHz, greater than 100 MHz, greater than 125 MHz, greater than 500 MHz, or greater than 1 GHz. The one or more wireless transmitters can be housed in a first wireless device. The one or more wireless transmitters can have different antennas but share a common encoder. The one or more wireless receivers can be housed in a second wireless device. The one or more wireless receivers can have different antennas but share a common decoder. The information derived from the received wireless signals can include channel state information. The one or more transmitters can transmit two or more wireless signals on two or more channels, the derived information can include portions of information derived from signals transmitted through two or more channels, each channel can have a bandwidth less than 50 MHz, each portion of derived information can include channel response information of the respective channel, and the bandwidths of the two or more channels associated with the portions of information can collectively span more than 50 MHz. The one or more transmitters can transmit two or more wireless signals on two or more channels in compliance with IEEE 802.11 standard, and each channel can have a bandwidth of about 20 MHz, 22 MHz, or 40 MHz. The derived information can include portions of information derived from signals transmitted through two or more channels that have different center frequencies. The two or more channels can have overlapping frequency bands. The two or more channels can have non-overlapping frequency bands. In the system described above, in some examples, M=1, K=1, N1=1, and $b_{111}$>50 MHz. In some examples M=1, K=1, N1>=2, and B=$\Sigma_{n=1}^{N_1} b_n$>50 MHz. In some examples, M=1, and K>=2. In some examples, N1=1. In some examples, M>=2, and K=1. In some examples, $N_m$=1, for each m. In some examples, M>=2, and K>=2. In some examples, $N_m$=1, for each m.

The information in the database can include information derived from previously received one or more wireless signals when the macroscopic objects have a first arrangement. The information in the database can include channel state information derived from the previously received one or more wireless signals. Determining information about the arrangement of macroscopic objects can include determining whether a current arrangement of the macroscopic objects is different from the first arrangement. Determining whether the current arrangement of the macroscopic objects is different from the first arrangement can include determining whether a current arrangement of one or more doors or windows is different from the arrangement of the one or more doors or windows at an earlier time.

In another aspect, a system for monitoring a venue includes a storage device configured to store a combination of first channel state information derived from a first wireless signal transmitted through a first channel that uses a first plurality of subcarriers and second channel state information derived from a second wireless signal transmitted through a second channel that uses a second plurality of subcarriers, or first information derived from the combination of the first and second channel state information. The system also includes a receiver configured to receive a third wireless signal transmitted through the first channel and a fourth wireless signal transmitted through the second channel. The system also includes a data processor configured to determine third channel state information based on the received third wireless signal. The data processor is also configured to determine fourth channel state information based on the received fourth wireless signal. The data processor is also configured to perform at least one of (i) compare a combination of the third and fourth channel state information with the stored combination of the first and second channel state information, or (ii) compare second information derived from a combination of the third and fourth channel state information with the stored first information. The data processor is also configured to determine information about an arrangement of objects in the venue based on the comparison. The data processor is also configured to generate an output based on the determined information about the arrangement of the objects.

Implementations of the system may include one or more of the following features. The first and second channels can occupy different frequency bands that do not overlap. Each of the first and second channels can have a bandwidth of less than 50 MHz, and a sum of the bandwidths of the first and second channels can be larger than 50 MHz. The first and second channels can have frequency bands that overlap, each of the first and second channels can have a bandwidth less than 50 MHz, and the first and second channels in combination can span more than 50 MHz. The first, second, third, and fourth wireless signals can comply with IEEE 802.11 standard. The system can include at least one of a mobile phone, a network router, a network access point, a smoke detector, a notebook computer, a desktop computer, a tablet computer, a lighting device, an electric appliance, a robot, a television, a radio, an audio device, a video device, a camera, a camcorder, or a projector. The system can include a transmitter to transmit the first and second wireless signals, and the transmitter and the receiver can share one or more antennas for transmitting and receiving the first and second wireless signals. The first and second wireless signals can be transmitted from a first set of one or more antennas, and the first and second wireless signals can be received at a second set of one or more antennas that are different from the first set of one or more antennas. The system can be configured to detect a change in position of at least one of a door or a window. The storage device can be configured to store records of channel state information, each record can include at least one of (i) N1 channel state information derived from N1 wireless signals transmitted through N1 channels, each channel using a plurality of subcarriers, or (ii) information derived from the N1 channel state information, in which N1 is equal to or greater than 3, the receiver can be configured to receive N1 wireless signals transmitted through the N1 channels. The data processor can be configured to determine N1 channel state information based on the received N1 wireless signals, perform at least one of (i) comparing a combination of the determined N1 channel state information with the stored records, or (ii) comparing information derived from the determined N1 channel state information with the stored records, and determining information about an arrangement of objects in the venue based on the comparison. The combination of N1 channels can span more than 50 MHz.

In another aspect, a system includes a receiver configured to receive a first wireless signal that includes one or more frames having a format that complies with IEEE 802.11 standard. Each of the one or more frames has at least one preamble. The system also includes a data processor configured to determine first channel state information based on the at least one preamble in the wireless signal. The data processor is also configured to associate the first channel state information with a first location or a first arrangement of objects. The data processor is also configured to store the first channel state information and information about the first location or the first arrangement of objects in a local storage device, or provide the first channel state information and information about the first location or the first arrangement of objects for storage in a remote storage device.

Implementations of the system may include one or more of the following features. The receiver can be configured to receive a second wireless signal after the first channel state information and information about the first location or the first arrangement of objects have been stored in the local or remote storage device, the second wireless signal can include one or more frames having a format that complies with the IEEE 802.11 standard, each of the one or more frames having at least one preamble. The data processor can be configured to: determine second channel state information based on the at least one preamble in the second wireless signal, retrieve the first channel state information from the local or remote storage device, compare the second channel state information with the first channel state information, and generate an output when the second channel state information matches the first channel state information. The at least one preamble of the second wireless signal can include a long preamble. Each of the one or more frames of the second wireless signal can include multiple preambles. The data processor can be further configured to classify one or both of the first channel state information and the second channel state information into one or more clusters. The data processor can be further configured to average the one or more clusters. Comparing the second channel state information with the first channel state information can include determining a time-reversal resonating strength based on the first and second channel state information. The first wireless signal can be sent from at least one of a wireless network router or a wireless network access point. The receiver can receive the first wireless signal without joining a network provided by the network router or access point. The data processor can be configured to provide a user interface to enable a user to provide information about the first location or the first arrangement of objects. The user interface can display a map and enable the user to indicate a location on the map, and the data processor can be configured to associate the location indicated by the user with the first channel state information. The data processor can be configured to determine a first identifier of a device that transmits the first wireless signal, associating the first channel state information with the first identifier, and storing the first identifier along with the first channel state information in the local or remote storage device.

In another aspect, a system includes a receiver configured to receive a first wireless signal that includes one or more frames having a format that complies with IEEE 802.11 standard. Each of the one or more frames has at least one preamble. The system also includes a data processor configured to determine first channel state information based on the at least one preamble in the wireless signal. The data processor is also configured to compare the first channel state information with pre-stored channel state information. The data processor is also configured to determine information about a location or an arrangement of objects based on the comparison.

Implementations of the system may include one or more of the following features. Comparing the first channel state information with pre-stored channel state information can include determining a time-reversal resonating strength based on the first channel state information and pre-stored channel state information. The pre-stored channel state information can be stored in at least one of a local storage device or a remote storage device. The data processor can be configured to determine an identifier of a transmitter that transmits the first wireless signal, and retrieving pre-stored channel state information associated with the identifier. Comparing the first channel state information with pre-stored channel state information can include comparing the first channel state information with the pre-stored channel state information associated with the identifier of the transmitter. The transmitter can include at least one of a wireless network router or a wireless network access point, and the identifier comprises a service set identifier (SSID).

In another aspect, a system includes a receiver configured to receive a first set of at least two wireless signals transmitted through at least one wireless channel that collectively span more than 50 MHz. The system also includes a data processor configured to determine a first composite channel response based on the first set of at least two wireless signals. The data processor is also configured to associate the first composite channel response with a first location or a first arrangement of objects. The data processor is also configured to store the first composite channel response and information about the first location or the first arrangement of objects in a local storage device, or provide the first composite channel response and information about the first location or the first arrangement of objects for storage in a remote storage device.

Implementations of the system may include one or more of the following features. The receiver can be configured to receive a second set of at least two wireless signals transmitted through at least one wireless channel that collectively span more than 50 MHz, and the data processor can be configured to: determine a second composite channel response based on the second set of at least two wireless signals, retrieve the first composite channel response from the local or remote storage device, compare the second composite channel response with the first composite channel response, and generate an output when the second composite channel response matches the first composite channel response. The data processor can be further configured to generate an output when the second composite channel response does not match the first composite channel response. The data processor can be configured to determine a particular location associated with a composite channel response that best matches the second composite channel response, in which the output causes a message to be generated, the message indicating that the receiver is near the particular location. The output can cause a message to be generated, the message indicating that a resolution of the positioning system should be adjusted. The output can cause a message to be generated, the message indicating that a received signal strength of the second set of at least two wireless signals is being used by the system to determine a location of the source of the second set of at least two wireless signals. Comparing the second composite channel response with the first composite channel response can include determining a time-reversal resonating strength based on the first and second composite channel responses. The first set of at least two wireless signals can be sent from at least one of a wireless network router or a wireless network access point. The receiver can receive the first set of at least two wireless signals without joining a wireless network provided by the network router or access point. The data processor can be configured to provide a user interface to enable a user to provide information about the first location or the first arrangement of objects. The user interface can display a map and enable the user to indicate a location on the map, and the data processor can be configured to associate the location indicated by the user with the first composite channel response. The data processor can be configured to determine a first identifier of a device that transmits the first wireless signal, associate the first composite channel response with the first identifier, and store the first identifier along with the first composite channel response in the local or remote storage device.

In another aspect, a system includes a receiver configured to receive a first set of two or more wireless signals transmitted through at least one wireless channel that collectively span more than 50 MHz. The system also includes a data processor configured to determine a first composite channel response based on the first set of at least two wireless signals. The data processor is also configured to compare the first composite channel response with at least one pre-stored composite channel response. The data processor is also configured to determine information about a location or an arrangement of objects based on the comparison.

Implementations of the system may include one or more of the following features. Comparing the first composite channel response with pre-stored composite channel response can include determining a time-reversal resonating strength based on the first composite channel response and pre-stored composite channel response. The pre-stored composite channel response can be stored in at least one of a local storage device or a remote storage device. The data processor can be configured to determine an identifier of a transmitter that transmits the first set of at least two wireless signals, and retrieve at least one pre-stored composite channel response associated with the identifier. Comparing the first composite channel response with the at least one pre-stored composite channel response can include comparing the first composite channel response with the at least one pre-stored channel state information associated with the identifier of the transmitter. The transmitter can include at least one of a wireless network router or a wireless network access point, and the identifier comprises a service set identifier (SSID).

In another aspect, a system for monitoring a venue includes a storage device to store sets of state information. Each set of state information is derived from channel state information for a first channel and channel state information for a second channel. The first channel uses a first plurality of subcarriers, and the second channel uses a second plurality of subcarriers. The first and second channels have different center frequencies. Each set of state information is associated with a state of a venue, and at least some of the different sets of state information are associated with different states of the venue. At least some of the different states represent different arrangements of objects in the venue. The system also includes a receiver configured to receive a first wireless signal transmitted through the first channel that uses the first plurality of subcarriers, and a second wireless signal transmitted through the second channel that uses the second plurality of subcarriers. The system also includes a data processor configured to determine first channel state information based on the received first wireless signal. The data processor is also configured to determine second channel state information based on the received second wireless signal. The data processor is also configured to determine a current set of state information based on a combination of the first and second channel state information. The data processor is also configured to compare the current set of state information with the sets of state information stored in the storage device. The data processor is also configured to determine information about a current arrangement of objects in the venue based on the comparison. The data processor is also configured to generate an output based on the determined information about the current arrangement of objects in the venue.

Implementations of the system may include one or more of the following features. The first and second channels can occupy different frequency bands that do not overlap. Each of the first and second channels can have a bandwidth of less than 50 MHz, and a sum of the bandwidths of the first and second channels can be larger than 50 MHz. The first and second channels can have frequency bands that overlap, each of the first and second channels can have a bandwidth less than 50 MHz, and the first and second channels in combination can span more than 50 MHz. The first and second wireless signals can comply with IEEE 802.11 standard. The system can include a transmitter configured to transmit the first and second wireless signals. The transmitter and the receiver can share one or more antennas for transmitting and receiving the first and second wireless signals. The first and second wireless signals can be transmitted from a first set of one or more antennas, and the first and second wireless signals can be received at a second set of one or more antennas that are different from the first set of one or more antennas. The system can include at least one of a mobile phone, a network router, a network access point, a smoke detector, a notebook computer, a desktop computer, a tablet computer, a lighting device, an electric appliance, a robot, a television, a radio, an audio device, a video device, a camera, a camcorder, or a projector. The data processor can be configured to determine whether at least one of a door or a window in the venue has moved relative to a past position of the door or the window. The stored sets of state information can be associated with positions in the venue, and the data processor can be configured to determine a position of the receiver in the venue based on a result of the comparison of the current set of state information with the sets of state information stored in the storage device. Each set of state information can be derived from channel state information for N1 channels, each channel can use a plurality of subcarriers, different channels can have different center frequencies, in which N1 can be equal to or greater than 3. The receiver can be configured to receive N1 wireless signals transmitted through the N1 channels, and the data processor can be configured to determine a current set of state information based on a combination of the N1 channel state information, compare the current set of state information with the sets of state information stored in the storage device, and determine information about a current arrangement of objects in the venue based on the comparison. The combination of N1 channels can span more than 50 MHz.

In another aspect, a system includes a receiver configured to receive a first wireless signal transmitted through a first channel that uses a first plurality of subcarriers, and receive a second wireless signal transmitted through a second channel that uses a second plurality of subcarriers. The first and second channels have different center frequencies. The system also includes a data processor configured to determine a condition in a venue based on first channel state information derived from the first wireless signal and second channel state information derived from the second wireless signal. The determining includes comparing at least one of (i) a combination of the first channel state information and the second channel state information, or (ii) first information derived from the combination of the first channel state information and the second channel state information, with stored records that include information derived from wireless signals previously transmitted through the first and second channels.

Implementations of the system may include one or more of the following features. The condition can include at least one of a location of the receiver, a configuration of an object in the venue, or a characteristic of a person in the venue. The venue can include a room or a building in which the receiver is located. The condition in the venue can include a configuration of at least one of a door or a window. The condition in the venue can include at least one of (i) a closed state of the door, (ii) an open state of the door, (iii) a closed state of the window, or (iv) an open state of the window. The condition in the venue can include a presence of a particular person at a particular location in the venue. The data processor can be configured to determine at least one of (i) whether a door in the venue is open or closed, (ii) whether a window in the venue is open or closed, or (iii) whether an object has moved relative to a position at an earlier time. The data processor can be configured to identify a particular person selected from a predetermined group of people. The first and second wireless signals can comply with IEEE 802.11 standard. The IEEE 802.11 standard can include at least one of iEEE 802.11a, IEEE 802.11b, IEEE 802.11g, IEEE 802.11n, IEEE 802.11ac, or IEEE 802.11ad standard. The first and second channels can be separated by at least one guard band. The first channel state information can include an amplitude and a phase of a channel response. Each of the stored records can include concatenated channel state information derived from a wireless signal previously transmitted through the first channel and channel state information derived from another wireless signal previously transmitted through the second channel Each of the stored records can include information derived from channel state information derived from a wireless signal previously transmitted through the first channel and channel state information derived from another wireless signal previously transmitted through the second channel Each of the stored records can include information derived from channel state information derived from wireless signals previously transmitted through the first and second channels from a device at a particular location in the venue, and at least some of the stored records are associated with different locations of the venue. A match between the combination of the first channel state information and the second channel state information, or first information derived from the combination of the first channel state information and the second channel state information, with information in one of the stored records can indicate that the receiver is at the location, or in a vicinity of the location, associated with the matched record. The receiver can be part of a first device, the data processor can be part of a second device, the first device wirelessly can send the first and second channel state information, or the first information derived from the first and second channel state information, to the second device to enable the data processor to determine the condition in the venue. The first and second channels can occupy different frequency bands that do not overlap. Each of the first and second channels can have a bandwidth of less than 60 MHz, and a sum of the bandwidths of the first and second channels is larger than 60 MHz. The first and second channels can have frequency bands that overlap, each of the first and second channels can have a bandwidth less than 60 MHz, and the first and second channels in combination span more than 60 MHz. The stored records can include entries in at least one of a table or a database. The receiver can be configured to receive N1 wireless signals transmitted through N1 channels, each channel can use a plurality of subcarriers, and different channels can have different center frequencies. The data processor can be configured to determine a condition in the venue based on N1 channel state information derived from the N1 wireless signals, including comparing at least one of (i) a combination of the N1 channel state information, or (ii) information derived from the combination of the N1 channel state information, with stored records that include information derived from wireless signals previously transmitted through the N1 channels. The combination of N1 channels can span more than 60 MHz.

In another aspect, a system includes a storage device configured to store records having information derived from wireless signals previously transmitted through at least a first channel and a second channel. The first channel uses a first plurality of subcarriers, the second channel uses a second plurality of subcarriers, the first and second channels have different center frequencies, and the at least first and second channels in combination span more than 60 MHz. The system also includes a data processor configured to determine a condition of at least one of a door or a window based on first channel state information derived from a first wireless signal transmitted through a first channel and second channel state information derived from a second wireless signal transmitted through a second channel. The determining includes comparing the first channel state information and the second channel state information, or information derived from the first channel state information and the second channel state information, with stored records having information derived from wireless signals previously transmitted through the first and second channels. The data processor is also configured to generate an output based on the comparison.

Implementations of the system may include one or more of the following features. The data processor can be configured to determine that at least one of the door or window has moved. A first one of the stored records can have information associated with a condition in which the door or window is closed, and a second one of the stored records can have information associated with a condition in which the door or window is open by a predetermined amount. The first wireless signal can comply with IEEE 802.11 standard. The storage device can be configured to store records of channel state information, each record can include at least one of (i) N1 channel state information derived from N1 wireless signals transmitted through N1 channels, each channel using a plurality of subcarriers, or (ii) information derived from the N1 channel state information, N1 is equal to or greater than 3, and a combination of the N1 channels span more than 60 MHz. The receiver can be configured to receive N1 wireless signals transmitted through the N1 channels, and the data processor can be configured to determine the condition of at least one of the door or the window based on N1 channel state information derived from the N1 wireless signal transmitted through the N1 channels, including comparing the N1 channel state information, or information derived from the N1 channel state information, with stored records having information derived from wireless signals previously transmitted through the N1 channels.

In another aspect, a method of monitoring an environment includes receiving a first wireless signal transmitted through a first channel that uses multiple subcarriers. The method also includes determining first channel state information based on the received first wireless signal. The method also includes receiving a second wireless signal transmitted through a second channel that uses multiple subcarriers. The second channel has a center frequency different from that of the first channel. The method also includes determining second channel state information based on the received second wireless signal. The method also includes storing a combination of the first and second channel state information, or first information derived from the combination of the first and second channel state information, in a storage device. The method also includes receiving a third wireless signal transmitted through the first channel that uses multiple subcarriers. The method also includes determining third channel state information based on the received third wireless signal. The method also includes receiving a fourth wireless signal transmitted through the second channel that uses multiple subcarriers. The method also includes determining fourth channel state information based on the received fourth wireless signal. The method also includes performing at least one of (i) comparing a combination of the third and fourth channel state information with the stored combination of the first and second channel state information, or (ii) comparing the stored first information with second information derived from a combination of the third and fourth channel state information. The method also includes detecting a change in an arrangement of objects in the environment based on the comparison. The method also includes generating an output indicating the change in the arrangement of objects in the environment.

Implementations of the method may include one or more of the following features. The first and second channels can occupy different frequency bands that do not overlap. Each of the first and second channels can have a bandwidth of less than 60 MHz, and a sum of the bandwidths of the first and second channels can be larger than 60 MHz. The first and second channels can have frequency bands that overlap, each of the first and second channels can have a bandwidth less than 60 MHz, and the first and second channels in combination can span more than 60 MHz. The first, second, third, and fourth wireless signals can be transmitted according to IEEE 802.11 standard. The first, second, third, and fourth wireless signals can be received using at least one of a mobile phone, a network router, a network access point, a smoke detector, a notebook computer, a desktop computer, a tablet computer, a lighting device, an electric appliance, a robot, a television, a radio, an audio device, a video device, a camera, a camcorder, or a projector. The method can include transmitting the first and second wireless signals using a same device that receives the first and second wireless signals. The first and second wireless signals can be transmitted by a second device that is different from a first device that receives the first and second wireless signals. Detecting a change in an arrangement of objects can include determining a change in position of at least one of a door or a window.

In another aspect, a method of monitoring an environment includes storing sets of state information in a storage device. Each set of state information is derived from channel state information for a first channel and channel state information for a second channel. The first channel uses a first plurality of subcarriers, and the second channel uses a second plurality of subcarriers. The first and second channels have different center frequencies. Each set of state information is associated with a state of a venue, and at least some of the different sets of state information are associated with different states of the venue. At least some of the different states represent different arrangements of objects in the venue. The method also includes receiving a first wireless signal transmitted through the first channel that uses the first plurality of subcarriers. The method also includes determining first channel state information based on the received first wireless signal. The method also includes receiving a second wireless signal transmitted through the second channel that uses the second plurality of subcarriers. The method also includes determining second channel state information based on the received second wireless signal. The method also includes determining a current set of state information based on a combination of the first and second channel state information. The method also includes comparing the current set of state information with the sets of state information stored in the storage device. The method also includes determining information about a current arrangement of objects in the venue based on the comparison. The method also includes generating an output based on the determined information about the current arrangement of objects in the venue.

Implementations of the method may include one or more of the following features. The first and second channels can occupy different frequency bands that do not overlap. Each of the first and second channels can have a bandwidth of less than 60 MHz, and a sum of the bandwidths of the first and second channels is larger than 60 MHz. The first and second channels can have frequency bands that overlap, each of the first and second channels can have a bandwidth less than 60 MHz, and the first and second channels in combination span more than 60 MHz. The first and second wireless signals can be transmitted according to IEEE 802.11 standard. The device that receives the first and second signals can also transmit the first and second wireless signals. The method can include transmitting the first and second wireless signals using a same device that receives the first and second wireless signals. The first and second wireless signals can be transmitted by a second device that is different from a first device that receives the first and second wireless signals. The first and second wireless signals can be received at least one of a mobile phone, a network router, a network access point, a smoke detector, a notebook computer, a desktop computer, a tablet computer, a lighting device, an electric appliance, a robot, a television, a radio, an audio device, a video device, a camera, a camcorder, or a projector. Determining information about a current arrangement of objects in the venue can include determining whether at least one of a door or a window in the venue has moved relative to a past position of the door or the window. The method can include storing sets of state information that are associated with positions in the venue, and determining information about the current arrangement of objects in the venue can include determining a position of a device that receives the first and second wireless signals.

In another aspect, a method includes receiving a first wireless signal transmitted through a first channel that uses a first plurality of subcarriers. The method also includes receiving a second wireless signal transmitted through a second channel that uses a second plurality of subcarriers. The first and second channels have different center frequencies. The method also includes determining a condition in a venue based on first channel state information derived from the first wireless signal and second channel state information derived from the second wireless signal. The determining includes comparing at least one of a combination of the first channel state information and the second channel state information, or (ii) first information derived from the combination of the first channel state information and the second channel state information, with stored records that include information derived from wireless signals previously transmitted through the first and second channels.

Implementations of the method may include one or more of the following features. The condition can include at least one of a location of a device that receives the first and second wireless signals, a configuration of an object in the venue, or a characteristic of a person in the venue. The venue can include a room or a building in which the device is located. The condition in the venue can include a configuration of at least one of a door or a window. The condition in the venue can include at least one of (i) a closed state of the door, an open state of the door, (iii) a closed state of the window, or (iv) an open state of the window. The condition in the venue can include a presence of a particular person at a particular location in the venue. Determining the condition in the venue can include determining at least one of (i) whether a door in the venue is open or closed, (ii) whether a window in the venue is open or closed, or (iii) whether an object has moved relative to a position at an earlier time. Determining the condition in the venue can include identifying a particular person selected from a predetermined group of people. The first and second wireless signals can be transmitted according to IEEE 802.11 standard. The IEEE 802.11 standard can include at least one of IEEE 802.11a, IEEE 802.11b, IEEE 802.11g, IEEE 802.11n, IEEE 802.11ac, or IEEE 802.11ad standard. The first and second channels can be separated by at least one guard band. The first channel state information can include an amplitude and a phase of a channel response. Each of the stored records can include concatenated channel state information derived from a wireless signal previously transmitted through the first channel and channel state information derived from another wireless signal previously transmitted through the second channel Each of the stored records can include information derived from channel state information derived from a wireless signal previously transmitted through the first channel and channel state information derived from another wireless signal previously transmitted through the second channel Each of the stored records can include information derived from channel state information derived from wireless signals previously transmitted through the first and second channels from a device at a particular location in the venue, and at least some of the stored records are associated with different locations of the venue. A match between the combination of the first channel state information and the second channel state information, or first information derived from the combination of the first channel state information and the second channel state information, with information in one of the stored records can indicate that a device that receives the first and second wireless signals is at the location associated with the matched record. A first device can determine the first and second channel state information and send the first and second channel state information to a second device, and the second device can determine the condition in the venue based on the first and second channel state information. A device that determines the first and second channel state information can also determine the condition in the venue. The first and second channels can occupy different frequency bands that do not overlap. Each of the first and second channels can have a bandwidth of less than 60 MHz, and a sum of the bandwidths of the first and second channels can be larger than 60 MHz. The first and second channels can have frequency bands that overlap, each of the first and second channels can have a bandwidth less than 60 MHz, and the first and second channels in combination can span more than 60 MHz. The stored records can include entries in at least one of a table or a database.

In another aspect, a method includes determining a condition of at least one of a door or a window based on first channel state information derived from a first wireless signal transmitted through a first channel and second channel state information derived from a second wireless signal transmitted through a second channel. The first channel uses a first plurality of subcarriers, the second channel uses a second plurality of subcarriers, the first and second channels have different center frequencies, and the first and second channels span more than 60 MHz. The determining includes comparing the first channel state information and the second channel state information, or information derived from the first channel state information and the second channel state information, with stored records having information derived from wireless signals previously transmitted through the first and second channels. The method also includes generating an output based on the comparison.

Implementations of the method may include one or more of the following features. The method can include determining that at least one of the door or window has moved. A first one of the stored records can have information associated with a condition in which the door or window is closed, and a second one of the stored records can have information associated with a condition in which the door or window is open by a predetermined amount. The first wireless signal can be a wireless packet that is transmitted through the first channel according to IEEE 802.11 standard.

Other aspects include other combinations of the features recited above and other features, expressed as methods, apparatus, systems, program products, and in other ways.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Some embodiments of the present teaching relate to wireless systems, devices, and methods that may take advantage of location-specific wireless signatures to improve communication, positioning, recognition, and security systems, to name a few. The technology takes advantage of rich multipaths in wireless signal propagation and may also take advantage of the physics of reciprocal responses that resonate with the environment to focus signal energy to specific positions. The technologies and techniques described herein may improve the resolution of indoor positioning systems, provide detection of any physical changes within a given environment and can be used to monitor the discrete movement of physical objects within space with spatial resolutions of 5 cm or less. In addition, the technology can support multiple connected devices within a wireless network to communicate at full or nearly full data rates with physical security with little impact from other devices or other wireless networks present within the same physical spectrum. The technology can also be used for event/object recognition via radio, e.g. computer vision without seeing.

Location specific signatures may be generated when a wireless signal launched by an antenna is scattered and/or reflected and/or diffused by the physical environment through which it travels. Multipath propagation may occur when portions of the launched signal are scattered away from the line-of-sight propagation path. These scattered components of the signal may eventually make their way to a given receiver antenna and/or back to the transmitting antenna but may arrive at different times and with varying amplitudes. In traditional wireless networks, such signal reflections, diffractions, echoes, or "multipaths" may be viewed as a problem because if left uncorrected, they may reduce the range and reliability of a communication link. This disclosure describes systems, technologies and techniques that may take advantage of multipath wireless signal propagation and that may be used in communication, indoor positioning and/or tracking, recognition, and security system applications, to name a few.

In this disclosure, the term "user" may refer to a device and/or an antenna. For example, in a system that has multiple devices communicating with a base station, the term "multi-user uplink" may refer to the uplink from multiple devices or from a device with multiple antennas, the term "multi-user downlink" may refer to the downlink to multiple devices or to a device with multiple antennas, and the term "inter-user interference" may refer to the interference among various devices.

In this disclosure, wireless signals may propagate between two devices and they may propagate away from one device and then back to it after being reflected and/or scattered. In some embodiments, a device may also be referred to as a base station, an access point, a locator, a transmitter, a receiver, a transceiver, a source, a router, a time reversal machine, an origin, a computer, a node, a gateway, a bridge, an antenna, and the like. In some embodiments, a device may also be referred to as a user, a terminal device, a mobile device, a phone, a computer, a tablet, a wearable electronic device such as a watch, a band, a wristband, an ankle band, a belt, a sensor, a piece of clothing and the like, an electronic card, fob, dongle, and the like, a "pinger", a bot, an antenna, and the like. In some embodiments that include more than one device and/or more than one antenna, the described roles of one device may be exchanged with the described roles of another device. In some embodiments described as having two devices, or an access point and a terminal device, or similar descriptions, it should be understood that those embodiments may also include more than two devices. For example, embodiments described as having an access point and a device may have multiple devices and/or may have multiple access points. Likewise, embodiments may have multiple base stations, locators, routers, transceivers, sources, transmitters, receivers, mobile devices, phones, tablets, computers, wearable electronic components, cards, fobs, dongles, pingers, devices, antennas, time reversal machines, origins, bots, and the like.

Location Specific Signatures

FIG. 1A shows an exemplary embodiment of a wireless system comprising two transceivers. In this embodiment, transceiver A 108, comprising an antenna, launches a wireless signal 104 that propagates through a wireless channel 110 and arrives at transceiver B 106, comprising an antenna, as a multipath wireless signal 102. In exemplary embodiments, at least one antenna may launch at least one wireless signal into a channel and at least one antenna may receive a signal from the wireless channel. In some embodiments, the transmitting and receiving antennas may be placed apart from each other, and in some embodiments, they may be co-located. For example, a device, computer, mobile device, access point and the like may comprise more than one antenna and the antennas may be operated as either or both transmit and receive antennas. In some embodiments, the at least one antenna may be a single antenna that may be used to both launch wireless signals into a channel and to receive multipath signals from the channel. In some embodiments, antennas may transmit and receive signals in different time slots, in different frequency bands, in different directions, and/or in different polarizations or they may transmit and receive signals at the same or similar times, in the same or similar frequency bands, in the same or similar directions and/or in the same or similar polarizations. In some embodiments, antennas and/or devices comprising antennas may adjust the timing, carrier frequency, direction and/or polarization of signal transmissions and signal receptions.

Throughout this disclosure, where systems, techniques and/or methods are described as using a transmit antenna and a receive antenna, it should be understood that in some embodiments, the transmit antenna and receive antenna may be physically the same antenna or may be antennas that are physically very close together. In some embodiments, the transmit antenna and receive antenna may be apart from each other. In some embodiments, transmit and receive antennas may be approximately 1 mm apart, 5 mm apart, 1 cm apart, 5 cm apart, 10 cm apart, 50 cm apart, 1 meter apart, 5 m apart, 10 meters apart, 50 meters apart or 100 meters apart. In some embodiments, antennas may be between 1 mm and 100 m apart. In some embodiments, antennas may be more than 100 m apart. In some embodiments, conducting planes may be used to provide some isolation between transmit and receive antennas and/or to shape radiation patterns.

Antennas in exemplary embodiments may be any type of electrical device that converts electric power or electric signals into radio waves, microwaves, microwave signals, or radio signals, and vice versa. By way of example but not limitation, the at least one antenna may be configured as a directional antenna or an omni-directional antenna. The at least one antenna may be some type of monopole antenna, dipole antenna, quadrupole antenna and the like. The at least one antenna may be some type of loop antenna and/or may be formed from a length of wire. The at least one antenna may be a patch antenna, a parabolic antenna, a horn antenna, a Yagi antenna, a folded dipole antenna, a multi-band antenna, a shortwave antenna, a microwave antenna, a coaxial antenna, a metamaterial antenna, a satellite antenna, a dielectric resonator antenna, a fractal antenna, a helical antenna, an isotropic radiator, a J-pole antenna, a slot antenna, a microstrip antenna, a conformal antenna, a dish antenna, a television antenna, a radio antenna, a random wire antenna, a sector antenna, a cellular antenna, a smart antenna, an umbrella antenna and the like. The at least one antenna may also be part of an antenna array such as a linear array antenna, a phased array antenna, a reflective array antenna, a directional array antenna, and the like. The at least one antenna may be a narrowband antenna or a broadband antenna, a high gain antenna or a low gain antenna, an adjustable or tunable antenna or a fixed antenna. Any type of antenna may be configured for use in the systems, methods and techniques described herein. In some embodiments, the radiation pattern associated with an exemplary antenna may be tunable and may be tuned to improve the performance of the exemplary systems, methods and techniques described herein.

In some embodiments, electrical signals may be applied to one or more antennas for wireless transmission and may be received from one or more antennas for processing. In some embodiments, wireless signals may be radio waves or microwaves. In some embodiments, wireless signals may have carrier frequencies anywhere in the range from kilohertz to terahertz. In some embodiments, antennas may comprise at least one of a filter, amplifier, switch, monitor port, impedance matching network, and the like. In some embodiments, electrical signals may be generated using analog and/or digital circuitry and may be used to drive at least one antenna. In some embodiments, electrical signals received from at least one antenna may be processed using analog and/or digital circuitry. In exemplary embodiments disclosed herein, electrical signals may be sampled, digitized, stored, compared, correlated, time reversed, amplified, attenuated, adjusted, compensated, integrated, processed and the like.

Figure 1B:
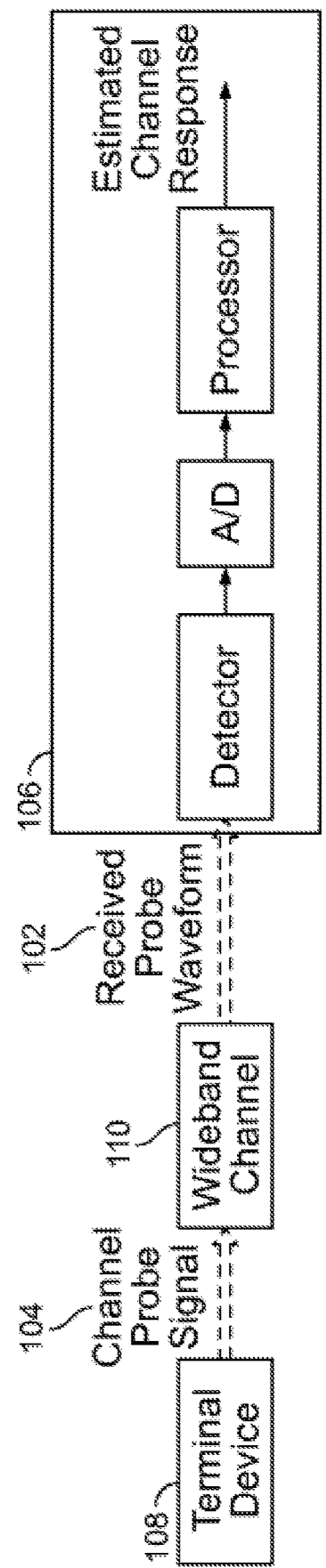
FIG. 1B shows a representation of a wireless signal being transmitted through a wideband channel, according to some embodiments of the present disclosure.

In this disclosure, the signal launched by a transmit antenna for the purpose of probing characteristics of the channel may sometimes be referred to as a probe signal or a channel probe signal or a channel probe waveform. FIG. 1B shows a representation of a wireless signal 104 being transmitted from a first device 108 to a second device 106 through a wideband channel 110. The channel probe signal 104 may traverse a wideband wireless channel 110 and arrive at a second device 106. The channel probe signal 104 received at the second device 106 may also be referred to as a received probe waveform 102. This received probe waveform 102 may be received and processed by a receiver comprising at least one antenna and a set of receiver electronics. In exemplary embodiments, the processing of the received probe waveform 102 may yield an estimated channel response for the wideband channel between devices 108 and 106. In some embodiments, probe and received signals may be analog signals that are converted to digital signals (and may be digital signals that are converted to analog signals) and may be processed and/or generated using digital signal processors (DSPs), field programmable gate arrays (FPGAs), Advanced RISC Machine (ARM) processors, microprocessors, computers, application specific integrated circuits (ASICs) and the like.

In the time domain, the channel impulse response of a communication link can be modeled as $$h_i[k] = \Sigma_{l=0}^{L-1} h_{i,l} \delta[k-l] \qquad \text{(Equ. 1)}$$

where $h_i[k]$ is the k-th tap of the CIR with length L, and $\delta[\ ]$ is the Dirac delta function. Note that the time domain representation of the channel response, h, and the frequency domain representation of the channel response, H, are related by the Fourier Transform. In some embodiments where a channel response is determined between two separate antennas i and j, the channel response function notation may include either or both indices as a subscript. For example, if a single access point is receiving signals from multiple devices, i, the channel response may be indicated as $h_i$ (or $H_i$ in the frequency domain). If multiple access points, j, are receiving signals from multiple devices, i, the channel response may be indicated as $h_{ij}$ (or $H_{ij}$ in the frequency domain). In some embodiments where a single antenna is both transmitting a probe signal and receiving a probe signal waveform, the indices i and j may represent time slots, frequencies, polarizations and the like.

In exemplary embodiments, the received probe waveform may be predicted by convolving the channel probe signal with the channel impulse response, if the channel impulse response is known. The channel impulse response or estimated channel response may be an approximation or an estimate of the actual channel impulse response. For example, the estimated channel response may be truncated to a certain channel length that is deemed to be an "accurate-enough" estimate of the channel or that is chosen to preferentially probe certain characteristics of the channel. In addition, the estimated channel response may be derived from a discretized approximation of a received probe waveform with the time and amplitude resolution of the discretized signal determined to be "accurate enough" for a particular application. The estimated channel response may be a filtered version of the actual channel response and may be an accurate-enough estimate of the channel. The determination of what is "accurate-enough" may depend on the application, the hardware components used in the wireless devices, the processing power of the devices, the allowed power consumption of the devices, the desired accuracy of the system performance, and the like.

If the probe signal transmitted by a device is a single pulse or impulse signal, then the received probe waveform may be an accurate enough estimate of the channel impulse response and little additional processing other than reception, discretization and storage of the received probe waveform may be necessary to obtain the estimated channel response. If the probe signal transmitted by a device is a waveform other than a single pulse or impulse signal, then a receiver may need to perform additional processing on the received probe waveform in order to determine the estimated channel response. In an exemplary embodiment, a receiver may detect and discretize a received probe waveform. Analog-to-digital (AID) converters may be used to perform the discretization. In some embodiments, a deconvolution process may use the discretized received probe waveform and a representation of the channel probe signal to yield the estimated channel response. In some embodiments, other mathematical functions may be used to yield estimated channel responses Channel impulse responses (CIRs) may also be referred to in this document as channel responses (CRs), CR signals, CIR signals, channel probe signal responses, and estimated channel responses Channel responses may be measured and/or computed and/or may be generated by a combination of measurement and computation. In this disclosure, channel responses and received probe waveforms may also be referred to as location-specific signatures.

In some embodiments, different channel probe signals may be chosen to increase or decrease the accuracy of the estimate of the channel response of a wideband channel. In exemplary embodiments, a channel probe signal may be a pulse or an impulse. In addition, the channel probe signal may be a series of pulses with regular, arbitrary or non-regular patterns. The channel probe signal may be a waveform. Waveforms may be substantially square waveforms, raised cosine waveforms, Gaussian waveforms, Lorentzian waveforms, or waveforms with shapes that have been designed to probe the channel in some optimal or desired way. For example, channel probe waveforms may be frequency chirped or may have frequency spectra that are tailored to probe the channel in some optimal or desired way. Probe waveforms may be multiple waveforms with different center frequencies and bandwidths. Probe waveforms may be amplitude modulated, phase modulated, frequency modulated, pulse position modulated, polarization modulated, or modulated in any combination of amplitude, phase, frequency, pulse position and polarization.

The waveform may have a temporal width that is substantially equal to a bit duration of a data stream that may be intended to be exchanged over the associated communication channel. The waveform may have a temporal width that is substantially half, substantially one quarter, substantially one tenth, substantially one hundredth, or less than a bit duration of a data stream intended to be exchanged over the associated communication channel. The probe signal/waveform may be a data pattern and may be a repeating data pattern. The probe signal may include packet and/or framing information, synchronization and/or clock recovery information, stream capture information, device ID and network and link layer operating information. The probe signal may have a frequency spectrum that has been tailored for the operating environment and/or the electronic components in the transmitters and/or receivers of the systems. The probe signal may be an estimate of the channel impulse response or may be an altered version of the estimate of the channel impulse response. For example, the probe signal may be a time-reversed version of the estimated channel response. The probe signal may be designed to compensate for and/or to accentuate signal distortions imposed by certain electronic components in the transmitters and/or receivers and/or imposed by certain environmental factors.

One exemplary type of a channel probing signal is a periodic pulse sequence. With such a channel probing signal, the received probe waveform may be a noisy version of the periodic channel pulse response. In some embodiments, a time-averaging scheme can be used to suppress the noise and extract the channel response.

In some embodiments, a time-averaging scheme may not provide a reliable measure of the channel response. To improve the channel response estimation, a longer sequence of pulses can be used to suppress the noise. To further improve the performance of the system, a short pseudo-random sequence of pulses can be used as the channel probing signal. In such a case, the received probe waveform can be the convolution of the pseudo-random sequence with the channel response.

In some embodiments, the pseudo-random sequence used as the probing signal may be known by a receiver. Then the channel response can be estimated using a correlation-based method where the received signal is convolved with the pseudo-random sequence. In general, the auto-correlation of the pseudo-random sequence may not be an ideal delta function because there can be inter-symbol interference and thus error in the estimated channel response. In some embodiments, such kinds of channel estimation error due to inter-symbol interference may be minimized or avoided by using orthogonal Golay complementary sequences, which may have an ideal delta shape for auto-correlation function, rather than a pseudo-random sequence.

In some embodiments, a wireless device may transmit a first wireless signal with a center frequency of $f_1$ GHz. In some embodiments, the first wireless signal may be a channel probe signal, a pulse signal, a frame signal, a pseudorandom noise (PN) sequence, a preamble signal, and the like. In some embodiments, the bandwidth of the wireless signal may be approximately 10 MHz, 20 MHz, 40 MHz, 60 MHz, 125 MHz, 250 MHz, 500 MHz, 1 GHz and the like. In some embodiments, a wireless device may send a second wireless signal with a center frequency of $f_2$ GHz. In some embodiments, the second wireless signal may be a channel probe signal, a pulse signal, a frame signal, a PN sequence, a preamble signal, and the like. In some embodiments, the bandwidth of the wireless signal may be approximately 10 MHz, 20 MHz, 40 MHz, 60 MHz, 125 MHz, 250 MHz, 500 MHz, 1 GHz and the like. In some embodiments, the frequency spectrum of the first wireless signal and the second wireless signal may include overlapping frequencies. In some embodiments, there may be no overlapping frequencies between the two wireless signals. In some embodiments, the frequency spectra of the different wireless signals may be separated by so-called guard-bands or guard-band frequencies. The channel response for the channel probed using the first wireless signal (for example at frequency $f_1$) may be represented as $H_{ij}(f_1)$. The channel response for the channel probed using the second wireless signal (for example at probe frequency $f_2$) may be represented as $H_{ij}(f_2)$. In some embodiments, more than two probe frequency signals may be used to probe the channel. The more than two probe frequency signals may have some overlapping frequencies or they may have no overlapping frequencies.

In some embodiments, a wireless device may use channel tuning and/or frequency hopping to tune to different wireless signal carrier frequencies to probe a wireless channel. In some embodiments, a wireless device may tune to different channels within a specified frequency band to probe the wireless channel. For example, a wireless device may first tune to one channel within the WiFi, (IEEE 802.11) signaling bandwidth and then to another channel within the wireless band. The frequency tuning may be from one channel to the next in a sequential fashion, but it may also hop from one channel to another in a random fashion anywhere within the WiFi band. In some embodiments, the different channels may have different channel bandwidths. In some embodiments, any wireless protocol may be used to generate probe signals and/or to analyze channel information in the received signal.

In some embodiments, multiple channel probe signals may be used to probe a channel. In some implementations, the same probe signal may be sent multiple times and the received probe waveforms may be averaged and/or compared. For example, a probe signal may be sent twice, 5 times, 10 times, 30 times, 50 times, 100 times, 500 times or 1000 times. In some embodiments, a probe signal may be sent once or may be sent any number of times between 2 and 1000 times. In some embodiments, a probe signal may be sent more than 1000 times. For example, in some monitoring and security applications, probe signals may be sent continuously. For example, probe signals at 1 probe signal per second, 10 probe signals per second, 100 probe signals per second, and the like may be sent continuously to monitor and probe a space. The rate at which probe signals are continually sent may be determined by the speed at which changes to an environment should be detected.

In some embodiments, only some of the received probe waveforms may be used for further processing. For example, some received probe waveforms and/or the estimated channel responses may be discarded or trimmed. The discarded and/or trimmed waveforms and or responses may be sufficiently different from other received waveforms and/or estimated responses that they may be deemed as outliers and not accurate-enough representations of the channel. In some embodiments, different probe signals may be sent at different times and/or in response to feedback from the receiver. For example, a probe signal at the transmitter may be tuned to improve the received probe waveforms, the estimated channel responses and/or the similarity of the received probe waveforms and/or the estimated channel responses. In some embodiments, a transmitter may send at least two different probe signals and a receiver may estimate channel responses based on either one, some or all of the at least two different received probe waveforms. In some embodiments, probe signals may be versions of previously measured and/or calculated channel responses and/or time reversed versions of the measured and/or calculated channel responses.

As will be discussed in more detail later in this disclosure, similarity or matching or correlation of waveforms, signatures and/or responses may be determined using virtual time reversal processing techniques, time-reversal resonating strengths, pattern recognition and/or matching, linear and/or nonlinear support vector machines and/or support vector networks, machine learning, data mining, classification, statistical classification, tagging, kernel tricks (e.g., kernel methods that apply kernel functions) and the like.

In some embodiments, processing a received probe waveform may include amplifying or attenuating any portion of the received signal. In some embodiments, a channel may be probed once or a channel may be probed more than once. In some embodiments, multiple received probe waveforms may be measured, processed, recorded and the like. In some embodiments, some channel responses may be averaged with others. In some embodiments, some channel responses may be discarded or not recorded. In some embodiments, some channel responses may be measured under different environmental conditions and stored. Such stored response signals may be used as reference signals to indicate the environmental conditions associated with the original measurements. In some embodiments, a newly measured channel response may be compared to a number of previously stored channel responses to determine which previously stored channel response most closely matches the newly measured channel response. Then, the environmental parameters of the most closely correlated or most closely matched previously stored channel response may be associated with the newly measured channel response. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

In an exemplary embodiment, the estimated channel response may be considered a location-specific waveform and/or signature because it represents the channel response between two devices at certain positions or between a device and the objects and/or structures in a venue or in a certain environment. As shown in FIG. 1B, if either a first device, in this example device 108, or a second device, in this example, 106, is moved, then at least some of the multiple propagation paths through which a signal propagates can change, thereby changing the channel response. If a single antenna is used for both transmitting and receiving signals, then objects and/or structures that are moved in a venue of environment may change the multiple propagation paths through which a signal propagates, thereby changing the channel response. The characteristics of the estimated channel waveform and how much they change as a function of position and/or orientation may depend on the venue, the environment, and the hardware components in the system, and the like.

Positioning Systems

This document discloses positioning systems that can achieve meter-level as well as centimeter-level or millimeter-level (or better) position accuracy by using wireless channel response information. Channel responses, also referred to as channel impulse responses (CIRs) and estimated channel responses can be location-specific signatures that characterize a wireless channel between, and therefore the relative position of, two devices or a single device and its environment Channel responses may be measured and/or computed and/or may be generated by a combination of measurement and computation.

In an exemplary embodiment of a wireless positioning system, a first device may be referred to as a base station, or an access point, or a locator, and may receive probe waveforms from a second device transmitting channel probe signals. The locator may be able to process a received probe waveform to generate a channel estimate for the channel between the locator and the device as it is positioned. The locator may also have access to a list or a database of previously determined channel responses with corresponding location information or the locator may have access to a tool that can generate predicted channel responses for devices at various locations relative to the locator. The locator may compare a channel estimate from the received probe waveform of the as-positioned device to stored and/or generated channel estimates and may associate a location with the as-positioned device if its estimated channel response is close enough to a stored and/or generated channel response.

In some implementations, a database of channel responses may be established, with each channel response being associated with one of a plurality of positions in a venue. The database of channel responses may be established by any or all or of a combination of a measurement, an estimation, a simulation, a calculation, a prediction, and the like. In an exemplary measurement technique, a device may be placed at various positions in a venue, and at each position, the coordinates of the device may be determined using a reference position measurement system, such as a laser interferometer position measurement system or by a user or device identifying its position on a 2D/3D visualization of the space. At each position, the device may send a probe signal, or multiple probe signals, that is/are received and/or detected by a locator. The locator may determine the channel responses based on the received probe waveforms, and may store the coordinates and the corresponding channel responses in a database. Due to reflections from, e.g., floor, ceiling, walls, and objects in the venue, the probe signals may propagate through multiple paths (multipaths) to the locator. When the device is at different locations in the venue, the probe signals transmitted from the terminal device to the locator may propagate through different multipaths, resulting in different channel responses received or detected at the locator. Thus, the information stored in the database may represent a mapping between the detected channel responses and corresponding coordinates in the venue. Later, when a device is placed at a position in the venue, the device may send another probe signal or set of probe signals to the locator. The locator may determine the channel response based on the received probe waveform or waveforms, and may look through the database to identify the positional coordinates that correspond to the most closely matching channel response. The positioning system may be especially useful in indoor environments where signals are subject to multiple reflections. The positioning system may also be especially useful in outdoor environments where tall buildings or various structures or other things may reflect and/or scatter electromagnetic signals creating multipath signals at a locator.

In some embodiments, a database of channel responses may be stored locally and/or remotely. For example, an installed access point may comprise a database of channel response information that is associated with the area or venue in which the access point is installed. In another example, an installed access point may communicate to a remote node in a network that may comprise a database of stored channel response functions. In some embodiments, the processing performed to determine the location of a device may be performed locally, at or near a locator or the processing may be performed on a remote resource. In some embodiments, storing and processing resources may be included in a single device, and/or may be co-located, and/or may be distributed throughout a network. In some embodiments, a database of channel resources may be accessible on the Internet or World-Wide-Web. In some embodiments, channel response information may be stored on multiple servers and/or in multiple locations. In some embodiments, information related to devices and their locations may be collected and/or processed and/or stored and/or made accessible to multiple users at multiple locations. In some embodiments, a database of channel responses may be used to provide mapping and indoor location information. In some embodiments, such a database could provide mapping functionality indoors. For example, a user may run an application on their device, or may access a remote server that sends indoor mapping information to the user. The user may be able to change the resolution of the mapping information, change the views of the mapping information, "zoom in" and "zoom out" of the mapping information using channel response information derived locally and/or from a network resource.

There are multiple exemplary techniques that a locator may use to "look through" a database and "identify" a correspondence between stored and recently determined channel responses. These techniques may include, but are not limited to, processing the stored and/or received data, comparing processed data to thresholds, identifying data that meet certain criteria such as having certain thresholds, and the like. Machine learning techniques may be applied to determine whether or not certain channel responses match, are correlated, are related, and the like. For example, using channel information as features or extracting features from the channel information, machine learning techniques such as support vector machine, decision tree, etc. can be used to learn a classifier for identifying the location. Processing of stored and/or received data may include but is not limited to sampling data, collecting data, eliminating data, statistically analyzing the data, performing mathematical functions such as multiplication, convolution, correlation, matched filtering, integration, averaging, addition, subtraction, normalization, classification, training, kernel tricks, and the like, on the data.

In exemplary embodiments, a locator may measure a location-specific signature from a device. In exemplary embodiments, the received probe waveform may be predicted by convolving the channel probe signal with the channel impulse response, if the channel impulse response is known. In some embodiments, wireless positioning systems may use a wider bandwidth compared to conventional radio-frequency based wireless systems, such as those based on Wi-Fi, Bluetooth, or cellular signals. When using a wider bandwidth, the fine structure of the measured channel responses may be more clearly distinguished causing the correlation among channel responses at different locations to decrease. As a result, the localization accuracy or resolution may improve as the bandwidth becomes wider. For applications that require less localization accuracy, a location-specific signature based positioning system may use narrower bandwidth signals and/or may provide filters or signal smoothing components in the signal path to increase the correlation of the channel responses at different locations. For applications that require more localization accuracy, a location-specific signature based positioning system may use wider bandwidth signals and/or higher bandwidth and/or higher resolution analog-to-digital and digital-to-analog converters. In some embodiments, the channel responses may be truncated to tune the location accuracy of the positioning system.

During the channel probing phase, the locator may need to obtain channel information that is sufficiently accurate in order to realize the required positioning accuracy of the system. In exemplary embodiments, time-reversed versions of the channel response may be used to determine device positions. Such embodiments may take advantage of the focusing effects of time-reversal systems. Devices and methods for obtaining wireless channel information in a channel probing phase of a data communication system may be referred to as time reversal handshaking. In some embodiments, channel probing is part of the handshaking process in the data communication system, and information obtained during the channel probing portion of the handshaking process can be used for, e.g., positioning, monitoring security, and gesture recognition. Techniques for time-reversal handshaking are described in U.S. patent application Ser. No. 14/183,648, titled "Handshaking Protocol. For Time-Reversal System," filed on Feb. 19, 2014, the contents of which are incorporated herein by reference in their entirety and described below with respect to FIGS. 12-19.

In some embodiments, a newly measured channel response may be compared to a number of previously stored channel response measurements to determine which previously stored channel response measurement most closely matches the newly measured channel response. For example, the change of position of a device may be determined by comparing positions of a device at different times. For example, a device could be mounted on doors or windows of a house and determining a change in position (or a change in estimated channel response) may be used to indicate that a door or window has been opened. Such a system could be used for intruder detection or home monitoring applications. In some embodiments, a device mounted on the shirt pocket or wrist of a senior citizen may be used to detect if the senior citizen has fallen to the ground. A device may be attached to a product in a warehouse and used to detect the type and location of the product and update inventory in real-time. A device may be held and/or carried by a person walking around in a shopping mall and used for targeted advertising or store navigation. In some embodiments, a device may be held or carried by a visitor and used for guided tours and/or to provide indoor navigation instructions.

Generating Reference Location-Specific Signatures with Known Locations

In exemplary embodiments, reference location-specific signatures for known locations may be compared against recently measured location-specific signatures. If the comparison indicates that those location specific signatures are similar enough to each other, then a location system may determine that the recently measured device is at the known position corresponding to the closely matched reference location-specific signature. In embodiments, there are a variety of ways to determine reference location-specific signatures for known locations.

In one exemplary embodiment, devices in a venue at known locations may send channel probe signals to a locator and the locator may determine the estimated channel responses for devices in those locations and store that data in a database. In some implementations, a mapping between locations in a venue and corresponding reference channel responses may be established experimentally or by measurement prior to the operation of the positioning system and then the mapping may be used to determine the locations of the terminal devices within the venue. In some implementations, a mapping between locations in a venue and corresponding reference channel responses may be established by computation and then mapping may be used to determine the locations of the terminal devices within the venue. In some implementations, a combination of experiments or measurements and computations are used.

In some implementations, reference channel responses may be established prior to the operation of the positioning system or they may be established on-the-fly or at the same time that the positioning system is operating. In some embodiments, pre-established reference channel responses may be periodically checked for accuracy or validity, for example by performing some or all of the techniques used to generate the reference channel responses in the first place and then calculating whether the newly estimated channel responses match the older stored channel responses. If they do not sufficiently match, then the newer channel response may replace the older channel response in the database. The determination of whether or not two or more channel responses match well enough may be user and/or application and/or system specific. Also, the steps that a system may initiate, such as replacing channel responses in a database, may also be user and/or application and/or system specific. In some embodiments, less than all of the reference channel responses may be checked and/or recalibrated.

In some embodiments, the reference channel responses may be continually expanded and/or improved. For example, certain sensors may be placed throughout a venue at known locations. As users approach the sensors, the users (or the users' devices) may trigger the sensor to communicate with the locator and the users' devices. This may cause the users' devices to send a channel probe signal so that the locator may check the accuracy of the current reference channel response associated with the sensor position and/or may add it to an existing database. In an exemplary embodiment, a pressure sensor in a floor may trigger the positioning system to collect a channel probe signal from a device when a person is standing in that position. Then, the locator may store the position of the sensor and the estimated channel response. It is envisioned that many types of sensors may be used in similar embodiments, for example thermal sensors, light sensors, motion sensors, intrusion sensors, cameras and the like. In addition, monitoring systems such as security cameras, NEST® thermostats, and the like may be used as sensors in the positioning systems described here.

In some embodiments, the hardware components in devices may impact the channel response between the device and the locator. For example, two devices with different antennas and receiver electronics may be characterized by different channel responses between themselves and the locator. In addition to having access to reference channel responses for known locations, the locator may also have access to reference channels for known locations and classes of hardware specifications. In some embodiments, a device may communicate with a locator to notify its hardware configuration so that the locator can choose the appropriate reference channel responses to use to determine the position of the device. As described previously, locators may continually, or periodically, or in response to a trigger event, add to or modify the reference channel responses used to determine device position. For example, a locator may update the reference channel responses when a new type of device sends it a probe signal.

Figure 2:
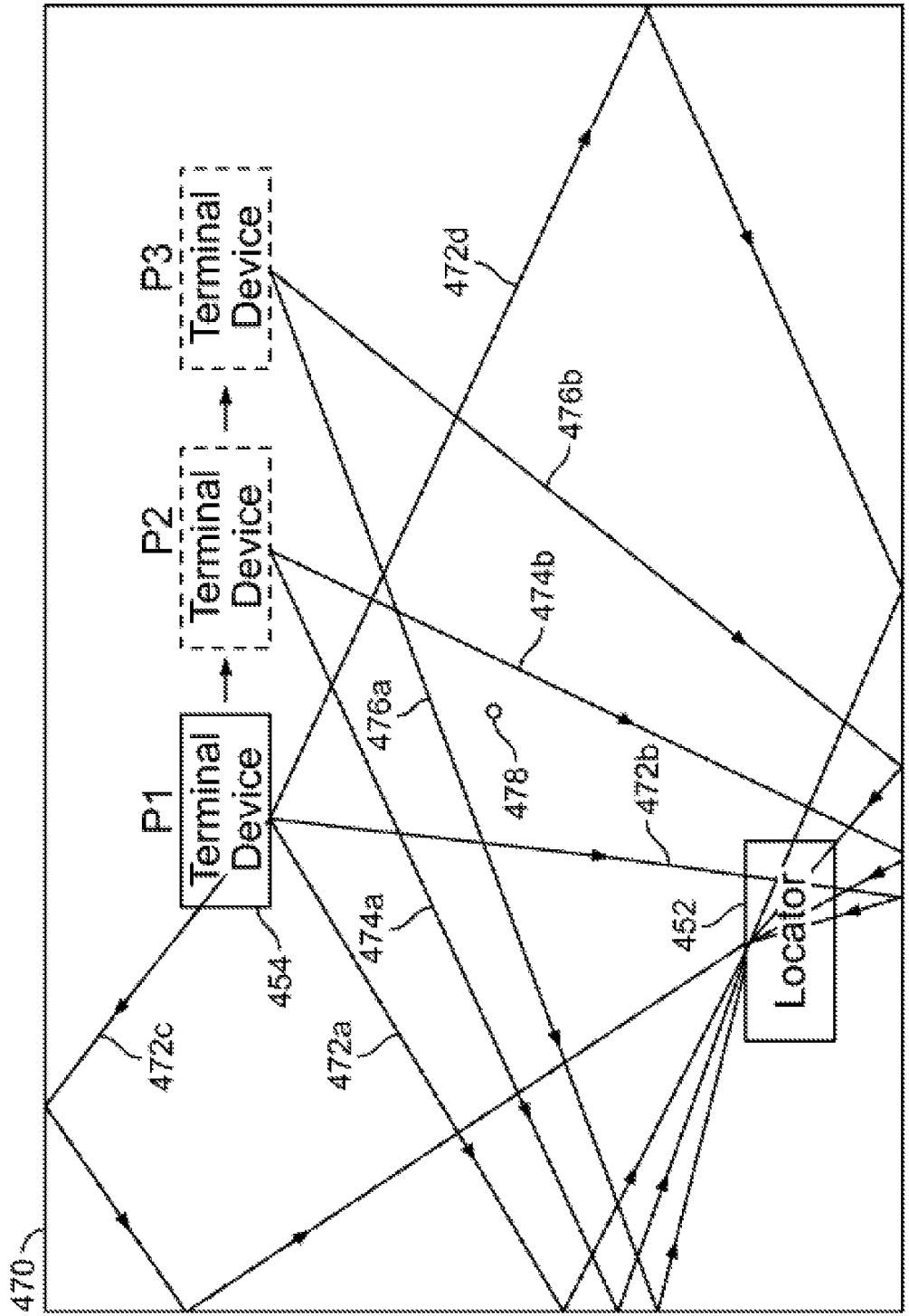
FIG. 2 shows an exemplary embodiment of a positioning system, according to some embodiments of the present disclosure.

An exemplary embodiment of a positioning system is shown in FIG. 2. In this embodiment, the system may also be used to build a database of reference location-specific channel responses before or during its operation as a positioning system. A terminal device 454 may be placed at a first position P1 within a venue 470, which can be, e.g., a room, an office, a hall way, a classroom, a house, a hotel, a building, a barn, a museum, a convention center, an amusement park, a stadium, a subway station, a train station, an airport, a shopping mall, an underground terrain, a cruise ship, a tunnel, or a region having several structures or buildings, and the like. The terminal device 454 may send a channel probe signal to a locator 452 through multiple propagation paths, such as 472a, 472b, 472c, 472d (only a few paths are shown in the figure, but there can be additional paths). The venue 470 may have several objects (not shown in the figure), such as walls and furniture that can reflect and/or scatter the probe signal. The locator 452 may receive the multipath signal and determine the channel response CR1 associated with the position P1.

A reference position measurement system (not shown in the figure), such as laser interferometer position measurement system, may determine the coordinates (e.g., (x1, y1, z1)) of the position P1 relative to a reference point 478. The reference point 478 can be arbitrarily selected, such as the center of the venue 470, or a corner of the venue 470. A Cartesian coordinate system can be used, in which the reference point 478 is at the origin (having coordinates (0, 0, 0)) of the coordinate system, the x-axis, y-axis and z-axis all being mutually orthogonal. Other coordinate systems, such as polar coordinate systems, spherical coordinate systems, geographic coordinate systems, and the like, can also be used. The locator 452 may store the coordinates (x1, y1, z1) of the position P1 and the associated channel response signal CR1 in a database.

In an exemplary embodiment, a terminal device 454 may be placed at a second position P2 within the venue 470 and may send a probe signal to the locator 452 through multiple propagation paths, such as 474a, 474b. The locator 452 may receive the multipath signal and determine the channel response CR2 associated with the position P2. The reference position measurement system may determine the coordinates (x2, y2, z2) of the position P2 relative to the reference point 478. The locator 452 may store the coordinates (x2, y2, z2) of the position P2 and the associated channel response CR2 in a database.

In an exemplary embodiment, a terminal device 454 may be moved to a third position P3 within the venue 470 and may send a probe signal to the locator 452 through multiple propagation paths, such as 476a, 476b. The locator 452 may receive the multipath signal and determine the channel response CR3 associated with the position P3. A reference position measurement system may determine the coordinates (x3, y3, z3) of the position P3 relative to the reference point 478. The locator 452 may store the coordinates (x3, y3, z3) of the position P3 and the associated channel response CR3 in a database.

In exemplary embodiments, a terminal device 454 may be placed at various positions in a venue so that a base station 452 can determine the channel responses associated with the positions. For example, the positions can be selected from an array of grid points, which can be spaced apart by a distance, such as 1000 wavelengths, 100 wavelengths, 10 wavelengths, one wavelength, one-half of the wavelength, or one-tenth of the wavelength of the carrier signal of the probe signal. The grid points may be spaced by, e.g., 0.1 mm, 0.5 mm, 1 mm, 1 cm, 10 cm, 1 m, 10 m, 100 m, or any amount between, e.g., 0.1 mm and 100 m. The grid points may be spaced more densely at places where higher precision is required, and spaced more sparsely at places where lower precision is acceptable. In some implementations, the position resolution may be finer than 0.1 mm or may be coarser than 100 m. For example, outdoor positioning systems, or position identification within large structures may have some applications that require resolutions of only a few hundred meters. Precision applications such as identifying surgical materials in a patient or identifying and probing silicon wafers may require resolutions on the order of a few nanometers. The technologies and techniques described in this disclosure can be adapted to meet the requirements for systems requiring from nanometer precision to multi-meter precision.

The grid points may span a three-dimensional space in the venue 470 so that the coordinates along x, y, and z axes can be determined. If the positioning system is mainly to determine the position of devices (e.g., cell phones) held by users walking in the venue 470, the grid points can be spaced more densely for a range of heights corresponding to the normal usage of the devices, e.g., from 1 foot to 6 feet above the floor. Thus, for example, if the venue is a convention center with a 20-foot high ceiling, it may not be necessary to measure the channel impulse responses associated with positions higher than 6 feet above the floor.

In some embodiments, the placement of the devices during the measurement phase may be performed by human beings, by robots, by translation stages, by positioning systems and/or under computer control. For example, structures that allow devices to be placed at grid points 5 cm apart may be assembled in a venue. A human being or a machine may then move the devices to various positions on the structure so that measurements can be taken. For example, the structures may be designed to have a small impact on the channel responses. In some embodiments, robots, including known robots such as autonomous robotic vacuum cleaners, may carry devices used for measurements and may maneuver in a space so that measurements can be taken at various positions. The robot may move under its own control or may be remote controlled or computer controlled. The robot may be equipped with a pole that may hold devices at different distances from the floor so that 3-dimensional mapping of the venue may be achieved. Any of the techniques described above may be combined with other techniques or used individually.

In some implementations, if the positioning system is used to determine the positions of autonomous vehicles in a factory, and the terminal devices can be mounted on the vehicles, the grid points can be spaced more densely for a range of heights corresponding to the heights of the terminal devices mounted on the vehicles. The grid points can be spaced more densely for a range of x and y coordinates in the plane of motion corresponding to locations that the vehicles are designed to travel to.

In some implementations, if the positioning system is used to determine the positions of aerial vehicles (either manned or unmanned aerial vehicles (e.g., drones)) in a warehouse, and the terminal devices are mounted on the aerial vehicles, the grid points may extend over the entire range of heights corresponding to the possible flying heights of the aerial vehicles. The grid points can be spaced more densely for a range of x, y and z coordinates corresponding to locations in which the aerial vehicles are designed to travel.

In some implementations, a mapping between locations in a venue and corresponding channel responses may be established by computation, and mapping may then be used to determine the locations of the terminal devices within the venue. For example, a three-dimensional rendering of a venue may be stored or downloaded to a memory unit associated with the locator. If such data files are not available a priori, then they may be constructed by components at the locator. For example, a three dimensional (3D) model of a venue may be constructed using photos, images, videos, ranging techniques such as laser ranging, optical coherence tomography and the like, echo location, and/or other imaging techniques as well as computer vision and graphical techniques, and then importing the 3D model into a 3D electromagnetic (EM) simulator to generate a database of location-specific estimated channel responses in the environment. The 3D electromagnetic simulator may be a commercially available simulation suite such as COMSOL, ANSYS, MATLAB, NEC, AN-SOP, EMPro, XF-tdt, Wireless Insite, XGtd, Empire XPU, and the like. The 3D electromagnetic simulator may be custom developed to run on a locator, a base station, an access point and the like. The parameters such as reflection coefficients of different objects in the venue used by the 3D cm simulator to accurately predict the multiple channel paths between a transmitter and receiver in a venue can be trained and/or calibrated by measuring channel responses at a few locations and comparing the measured and predicted responses. In some embodiments, parameters such as reflection coefficients of different objects in a venue may be preloaded and may have multiple values to account for environmental factors such as temperature, humidity, smog, and the like.

The information about a mapping between coordinates and channel responses can be stored in a table, such as Table 1 below.

TABLE 1

| Coordinates (inches) | Channel Responses |
|---|---|
| (0, 0, 0) | CR1 |
| (0.5, 0, 0) | CR2 |
| (1, 0, 0) | CR3 |
| ... | ... |
| (0, 0.5, 0) | CRn |
| ... | ... |

After the mapping between coordinates and channel responses is established, the mapping can be used to determine the position of the terminal device within the venue 470. For example, the terminal device 454 can be placed at an unknown position in the venue 470, the terminal device 454 can send a probe signal that is received by the locator 452, and the locator 452 can determine the channel response CRx based on the received probe signal. The locator 452 can then compare the channel response CRx with the pre-stored channel responses in the table to identify a closest match. In this example, one can assume that the pre-stored channel response CR3 most closely matches the channel response CRx. The locator 452 can determine that the terminal device 454 is at the coordinates (1, 0, 0) associated with the pre-stored channel response CR3.

In some embodiments, the locator may determine a value that represents how well a channel response CRx matches one, some or all of the pre-stored channel responses. If the closest matching pre-stored channel response is not a close enough match to the channel response CRx, then the locator may determine that the terminal device is not in the venue or is not positioned at a location in the database. The locator may make such a determination by requiring that a value that determines how well two channel responses match be above a certain value such as a threshold value. A locator may also make a determination that some channel responses are not worth keeping or not worth using because the value resulting from comparison with other channel responses is below a certain value such as a threshold value. In some embodiments, the threshold values may be user settable parameters and/or they may be values that result from calculations, the outputs of sets of instructions, feedback loops, other signals in the system and/or the venue and the like.

The efficacy of using location-specific signatures to determine position can rely on how well channel stationarity is maintained Channel stationarity requires the channel response to be stationary between when the comparison signatures with known locations are generated and when the channel estimate for a device sending a probe signal to a locator is determined. In exemplary embodiments, the mapping between locations in a venue and corresponding channel responses may be updated, re-measured, re-computed, altered, processed, and the like, to maintain system performance when channel stationarity is not maintained.

Note that Table 1 above shows channel responses stored for different positional coordinates. As described above, the database may also associate channel responses with terminal device types, environmental parameters, the presence of certain people and/or objects in an area, measurement and/or calculation parameters such as probe signal bandwidth, carrier frequency, pattern, polarization, and the like. In some implementations, a positioning system may be able to determine and report that a person holding a particular type of mobile telephone (e.g., an iPhone®) is at position 1, a child holding a particular type of tablet computer (e.g., an iPad®) is at position 2, and a person holding a different type of mobile telephone (e.g., a Samsung Galaxy S6®) is at position 3, for example. The previous example is not meant to be limiting in any way. The number of devices and positions that may be identified may not be limited or may be limited by the storage size of the database and/or computational power of the components being used to do the data processing. In some embodiments, the probe signal sent by different devices may comprise some sort of identification information such as a digital ID that may be able to be separately processed or derived from the estimated channel response. For example, if the ID is stored in a database such as exemplified in Table 1, a location system may also be able to determine and report the particular person and/or device is at a certain location within a venue.

In some embodiments, positioning systems may be used to track movement of devices, people, vehicles, objects, structures and the like. For example, as a person walks through a mall, their position may be determined by the probe signals their device(s) send to a locator. As those positions change, the locator may keep track of the positions the person has been and may be able to store information related to the person's path through a mall. In some implementations (e.g., in a guidance application), a locator could determine that a user's path has taken them by a desired location, such as a shop or a set of restrooms, and then the locator may signal the user to turn around or change their path because they have passed their desired destination.

Figure 3:
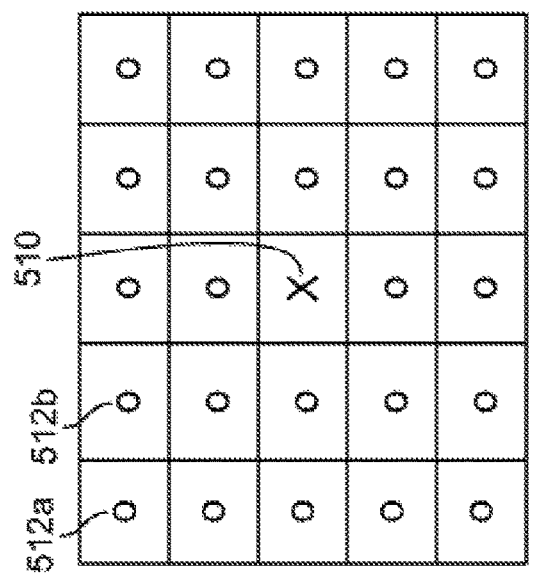
FIG. 3 shows a representation of locations related to an exemplary mapping training phase, according to some embodiments of the present disclosure.

The following describes an exemplary training phase for building a database that has information on the mapping between position coordinates and channel responses. Referring to FIG. 3, in some implementations, for each intended location 510, the system may obtain a series of channel responses at a set of locations (e.g., 512*a*, 512*b*) nearby the intended location 510 at different times. Specifically, for each intended location i, the system may collect the channel impulse response information $$\tilde{h}_i = \{h_{i,1}(t=t_0), h_{i,2}(t=t_0), \ldots, h_{i,K}(t=t_0), h_{i,1}(t=t_1), h_{i,2}(t=t_1), \ldots, h_{i,K}(t=t_1), \ldots, h_{i,1}(t=t_M), h_{i,2}(t=t_M), \ldots, h_{i,K}(t=t_M)\}$$

where $h_{i,j}(t=t_1)$ represents the estimated channel response information at neighbor j at time $t_l$ and $h_{i,i}(t=t_l)$ represents the estimated channel response information at the intended location i at time $t_l$. The database D of channel impulse responses at various locations can be established as:

$$D = \{\tilde{h}_i, \forall i\} \tag{Equ. 3}$$

Time-Reversal Classifier

Figure 4:
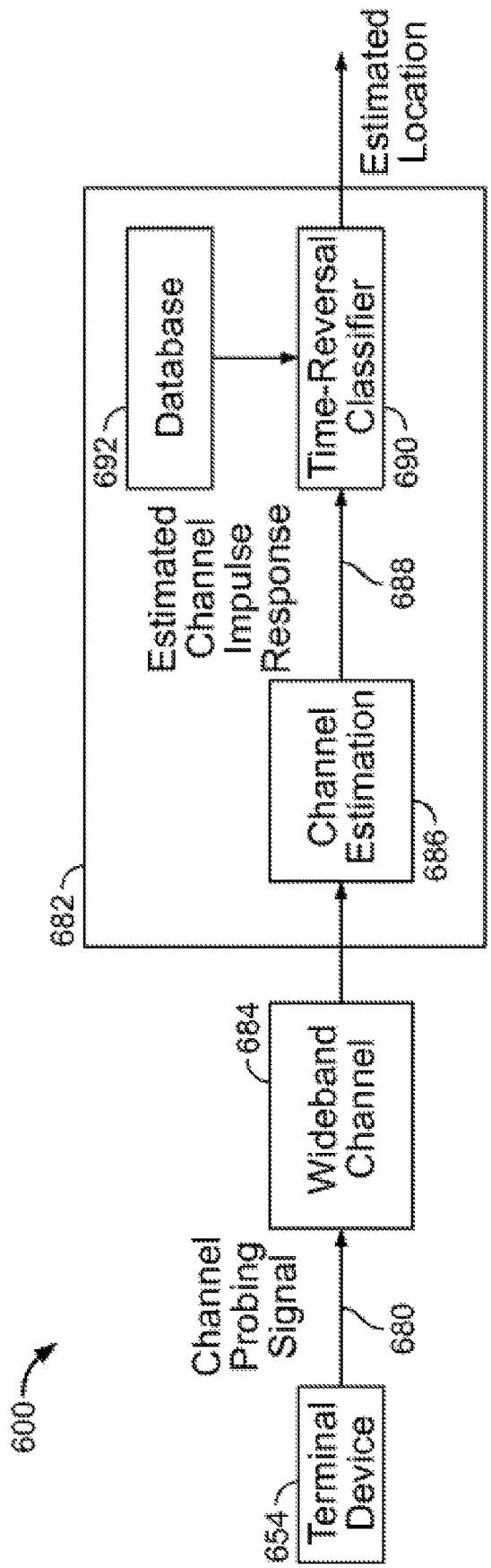
FIG. 4 shows an implementation of a time-reversal indoor positioning system, according to some embodiments of the present disclosure.

The following describes an exemplary time-reversal classifier 690 as shown in FIG. 4. FIG. 4 shows an implementation of a time-reversal indoor positioning system (TRIPS) 600. In this example, a terminal device 654 periodically transmits channel probing signals 680 to a base station or an access point (AP) or a locator 682 through a channel 684. The access point 682 may estimate the channel response (CR) by using a channel estimation component 686. The estimated channel response 688 may be passed through a time-reversal classifier 690 to determine if there is a match to the location information stored in a database 692 to determine the location of the terminal device 654.

After obtaining the estimated channel impulse response information, the user (i.e., the terminal device 654) may be localized by matching the estimated channel response information with the information stored in the database 692 using classification techniques. Because the dimension of the information for each location in the database 692 is high, classification based on the raw channel response information may take a long time. Therefore, it can be useful to pre-process the channel impulse response information to obtain important features to facilitate the classification.

As described above, because the waveforms received at the locator 682 undergo different reflecting paths and delays for terminal devices 654 at different locations, the channel response can be viewed as a unique location-specific signature. In some implementations, an advantageous way to compare estimated channel responses from a device whose position is unknown with reference channel responses associated with known positions, is to time-reverse one of the channel responses and then convolves it with the other channel response. When convolving a time-reverse channel impulse response with a reference channel impulse response in the database 692, or when convolving a channel impulse response with a time-reverse reference channel impulse response, the convolution associated with the channel impulse response at the intended location will produce a large peak signal that can be used to indicate that the two channel responses are closely matched. Convolving the time-reverse version of one of the channel impulse responses, or a version of the channel impulse response related to a time-reverse version, with the comparison channel response, yields a mathematical function that has a large and tightly distributed peak when the responses are very similar to each other. The peak may become larger and more tightly distributed when the compared channel responses are more closely matched. In time-reversal imaging and communication systems, the peak that results from convolving a time reverse version of a channel impulse response with the channel itself is known as the spatial focusing effect. In exemplary embodiments, a positioning system 600 may use a time-reversal based dimension reduction approach to extract the effective feature for localization. Using time-reversed channel responses in calculations may be referred to as virtual focusing. The following describes an example of such a time-reversal based dimension reduction approach.

For ease of explanation, the collection of channel responses in Equation 2 can be simplified as $$\tilde{h}_j = \{h_i(t=t_0), h_i(t=t_1), \ldots, h_i(t=t_M)\}, \tag{Equ. 4}$$

where $h_i(t=t_l)$ stands for the estimated channel impulse response information of location $p_i$ at time $t_l$. In Equation 4, the channel impulse response information at neighboring positions are not considered.

A time-reversal resonating strength, $\eta(h_1, h_2)$, between two channel impulse responses $h_1=[h_1[0], h_1[1], \ldots h_1[L-1]]$ and $h_2=[h_2[0], h_2[1], \ldots h_2[L-1]]$ can be defined as:

$$\eta(h_1, h_2) = \frac{\max_i |(h_1 * g_2)[i]|}{\sqrt{\sum_{i=0}^{L-1} h_1[j]^2} \sqrt{\sum_{i=0}^{L-1} g_2[j]^2}}, \tag{Equ. 5}$$

where $g_2=[g_2[0], g_2[1], \ldots g_2[L-1]]$ is defined as the time reversed and conjugated version of $h_2$ as follows $$g_2[k] = h^*_2[L-1-k], k=0,1,\ldots,L-1. \tag{Equ. 6}$$

Equation 5 shows that the time-reversal resonating strength is the maximal amplitude of the entries of the cross-correlation between two complex channel impulse responses, which is different from the conventional correlation coefficient between two complex channel impulse responses where there is no max operation and the index [i] in Equation 5 is replaced with index [L−1]. One of the reasons for using the time-reversal instead of the conventional correlation coefficient is to increase the robustness for the tolerance of channel estimation error. Some channel estimation schemes may not be able to perfectly estimate the channel response. Instead, a few taps may be added or dropped during the channel estimation process. In such a case, the conventional correlation coefficient may not reflect the true similarity between two channel impulse responses, while the time-reversal resonating strength described above may be able to capture the real similarity by using the max operation and thus may increase the robustness of the results. In some embodiments, determining the conventional correlation coefficient may result in precise enough identification of similar channel responses and may be used in positioning systems as described herein. In some embodiments, the time-reversal techniques described and demonstrated below may be preferable.

The following describes an exemplary process for determining the position of a terminal device. Let h be the channel impulse response that is estimated for the terminal device with unknown location. To match h with the locations in a database of reference channel responses, the system may first extract a feature using the time-reversal resonating strength for each location. Specifically, for each location $p_i$, the system may compute the maximal timereversal resonating strength, $\eta_i$, as follows $$\eta_i = \max_{h_i(t=t_j) \in \tilde{h}_i} \eta(h, h_i(t=t_j)). \tag{Equ. 7}$$

By computing $\eta_i$ for all possible locations, i.e., $\tilde{h}_i \in D$, the system can obtain $\eta_1, \eta_2, \ldots \eta_N$. Then, the estimated location, $p_i$, can be the one that can give the maximal $\eta_i$, i.e., $\hat{i}$ can be derived as follows:

$$\hat{i} = \operatorname*{argmax}_{i} \eta_i. \quad \text{(Equ. 8)}$$

In an exemplary embodiment, after the locator determines the location of the device, the locator may send the location coordinates of the device, as well as other information such as the type of device, to the device and/or another locator and/or a computer and/or a server in the cloud and/or any type of computing device. In some embodiments, information from the device along with its location information may be sent to other systems such as advertising systems, tracking systems, payment systems, notification systems, monitoring systems and the like. Other systems may also send information to the device. For example, the device may receive "on-sale" information for stores in its vicinity and/or for items stored on a wish-list in the phone or based on bank account information on the phone. For example, stores selling expensive merchandise may send advertising information to users who have a history of purchasing higher cost items or who have considerable amounts of money in their bank accounts.

The following describes another example of time-reversal based dimension reduction approach, in which the collection of channel response information in Equation 2 is used. In Equation 2, the channel impulse response information at neighboring locations can be considered. Suppose the estimated channel impulse response is h and the corresponding time-reverse signature is g, then for each location i in the database, the system can extract the feature $$F_i = \{f_{i,1}(t=t_0), f_{i,2}(t=t_0), \ldots, f_{i,K}(t=t_0), f_{i,1}(t=t_1), f_{i,2}(t=t_1), \ldots, f_{i,K}(t=t_1), \ldots, f_{i,1}(t=t_M), f_{i,2}(t=t_M), \ldots, f_{i,K}(t=t_M)\}$$

where $f_{i,j}(t=t_l)$ is defined as follows $$f_{i,j}(t=t_l) = \max_n (g * h_{i,j}(t=t_l))[n] \quad \text{(Equ. 10)}$$

After obtaining the feature for each possible location in the database 692, the next step is to estimate the location of the terminal device 654. One straightforward approach is to match the location using the channel response that can provide the maximal feature value, i.e., $$i^* = \max_{i} \max_{\text{all features in } F_i} F_i \quad \text{(Equ. 11)}$$

Other classification algorithms, such as support vector machine (SVM), can also be used. Specifically, for every location i, the system may first use the classification algorithms such as support vector machine to train a classifier $C_i$ by utilizing the collected channel information in the database $h_i$. Then, by applying the classifier $C_i$ to each estimated channel impulse response h, a confidence score $s_i$ can be obtained. The estimated location can be the one with the highest confidence score $s_i$.

In some embodiments, with a single locator working in the 5.4 GHz band under the non-line-of-sight condition, the time-reversal positioning system can achieve centimeter localization accuracy with a low error rate. The accuracy may be improved by, e.g., increasing the resolution of the database (i.e., reducing the distance between measurement points when establishing the channel impulse response database).

In some implementations, as a result of the time-reversal technique, the matching algorithm in the time-reversal positioning system can be simplified so that it computes the time-reversal resonating strength between the time reverse of the estimated channel impulse response and the time reverse of the previously stored channel impulse responses in the database (in some implementations, the time reverse versions of previously measured channel impulse responses are stored in the database). In some implementations, the infrastructure cost of the time-reversal positioning system can be low. The localization performance can also be further improved by using multiple access points and/or multiple devices. In some implementations, the time-reversal positioning system can be used with bands other than the 5.4 GHz band. For example, the time-reversal positioning system can be applied to the ultra-wideband (UWB) band with a larger bandwidth, which may result in higher localization accuracy.

In some embodiments, a time-reversal positioning system may operate continuously, intermittently, periodically, and may operate automatically, under computer control and/or manually. In some embodiments, a time-reversal positioning system may include the capabilities collect and record channel responses, reference channel responses, time-reversed channel responses, reference time-reversed channel responses, time-reversal resonating strengths, and/or focusing gains over periods of time. In some embodiments, time-reversal positioning systems may be able to generate reports, plots, data files and the like that may indicate the detectable activities in an area over a period of time. In some embodiments, a detectable activity may be an activity that results in a change of a channel response, a time-reversed channel response and/or a time-reversal resonating strength and/or focusing gain that is larger than some threshold and/or trigger and/or confidence level. In some embodiments, a time-reversal positioning system may be able to communicate with a user, a processor, a computer, a router, an access point, a server, an alarm center, a remote processor, and the like to report detectable activities within an area. In some embodiments, triggers and/or thresholds may be set that may be used in feedback systems and/or that may be used to initiate communication between a time-reversal system and another system or service such as a monitoring system or service, an alarm system or service, a communication system or service and the like.

In some embodiments, a time-reversal system may have access to remote resources such as computers, processors, servers, routers, storage units, and the like, arranged as part of a network. In some cases, such resources may be referred to as being in "the cloud". Note that networks such as the Internet, carrier networks, internet service provider networks, local area networks (LANs), metro area networks (MANs), wide area networks (WANs), storage area networks (SANs), backhaul networks, cellular networks, satellite networks and the like, may be referred to as "the cloud". Further, certain processes may be referred to as taking place in the cloud and devices may be described as accessing the cloud. In these types of descriptions, the cloud should be understood to be a type of network comprising networking and communication equipment and wireless and/or wired links. In some embodiments, multiple time-reversal systems may communicate and/or send and receive data over wired and/or wireless networks to remote storage and processing resources.

Channel Probing Using Conventional Wireless Signals

As described above, the location of objects in a space can be accurately determined using a wideband wireless signal to probe the wireless channel and a wideband receiver to receive the multipath waveforms and process them. An exemplary system using wideband signals with bandwidths of approximately 125 MHz is disclosed. That system achieves location resolutions of approximately 5 cm. Even wider band signals and receivers, for example with bandwidths of approximately 250 MHz, 500 MHz, 1 GHz, 2 GHz, 5 GHz, 10 GHz, for example, may yield even more precise location resolutions. These wideband signals may have wider bandwidths than those typically utilized in conventional radio-frequency based wireless systems, such as those based on Wi-Fi, ZigBee, Bluetooth, and/or cellular signals.

In some embodiments, relatively narrowband conventional radio signals such as a 10 MHz or a 20 MHz or a 40 MHz radio signal may be used to yield location accuracies of approximately 1 m×1 mx 1 m. In some applications, this relatively coarse location resolution may be acceptable. However, in other applications, it may be desirable to use conventional wireless signals and equipment alone or in combination with new equipment disclosed in this document to obtain more precise location accuracy. In some applications, a relatively coarse location resolution technique may be used in combination with a finer location resolution technique. Multiple lower-bandwidth conventional radio signals can be used to probe a wireless channel and to produce multiple lower-bandwidth channel estimates that may be processed in exemplary ways such that a composite channel response and/or the combination of channel responses may be determined, and classified in such a way as to yield higher location precision than any of the lower bandwidth conventional radio signals would yield on their own. Such techniques are described in greater detail below.

In exemplary embodiments, multiple wireless channel responses may be estimated and collected using a single transmit antenna and a single receive antenna (single input single output or SISO) and using different frequency bands (e g channel tuning, channel hopping) in the system to generate the multiple channel response estimates. In other exemplary embodiments, multiple wireless channel response estimates may be collected using multiple antennas at either the transmitter or receiver (single input, multiple output or SIMO, or multiple input, single output, or MISO) or at both the transmitter and receiver (multiple input, multiple output or MIMO), with the multiple antennas using the same frequency bands or multiple frequency bands to generate the multiple channel response estimates. In some embodiments, single antennas operating both as transmit and receive antennas may be used to collect the multiple probe signals and determine the multiple channel response estimates.

Exemplary embodiments are described where a composite channel response may be processed in a manner as described previously in this disclosure. In some embodiments, a composite channel response may be determined from any two or more channel responses. In some embodiments, the localization accuracy may improve as the number of channel responses in the composite channel response increases. In some embodiments, the localization accuracy may improve as the bandwidth of any of the channel responses in the composite channel response increases. In some embodiments, the localization accuracy may be tuned by adding or subtracting or changing the multiple channel responses included in the composite channel response.

In the following descriptions, performance capabilities and exemplary embodiments based on existing WiFi systems and technologies that conform to the IEEE 802.11 wireless communication standard are highlighted. However, it should be understood that the present teaching is not limited to WiFi and/or 802.11 implementations. The apparatuses, methods and techniques described herein may be applied to any wireless transmission system, including the wideband systems described above. Exemplary embodiments based on WiFi technologies may be particularly interesting today, because WiFi is currently widely deployed and so these inventive techniques and technologies may be adopted using commercial off-the-shelf equipment. However, WiFi channel bandwidths may increase over time, and that future versions or higher bandwidth versions of the exemplary embodiments may still take advantage of the performance gains described herein. Also, alternate wireless transmission systems such as those based on Bluetooth signaling, ZigBee signaling, cellular signaling, 3G signaling, 4G signaling, LTE signaling and like may also benefit from the apparatuses, methods and techniques described herein.

Figure 5A:
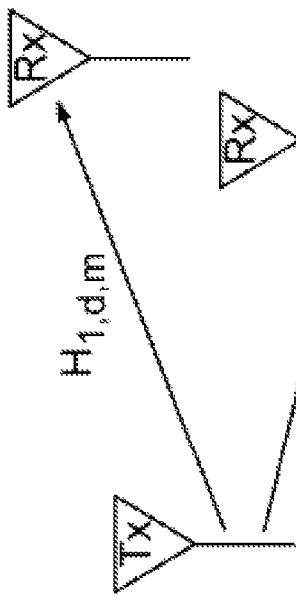
FIGS. 5A-5D show exemplary wireless communication links between one or more transmit antennas and one or more wireless receiver antennas, according to some embodiments of the present disclosure.
Figure 5B:
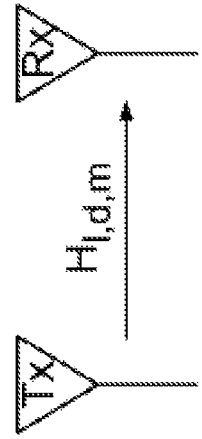
Figure 5C:
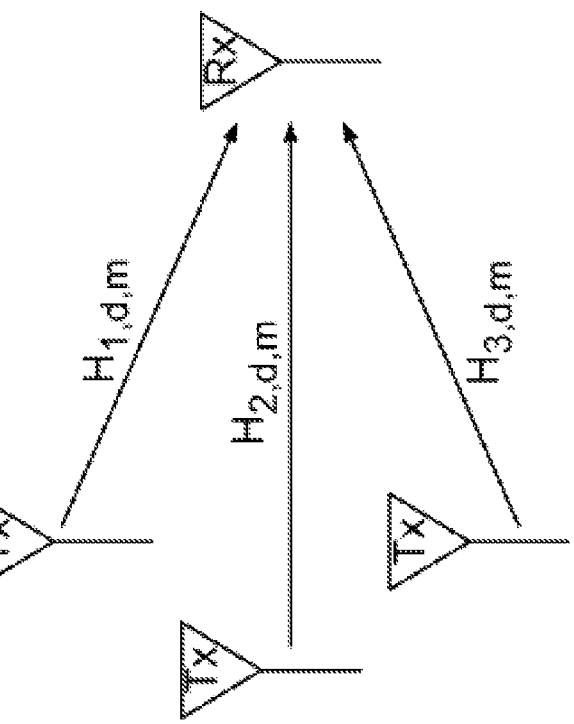
Figure 5D:
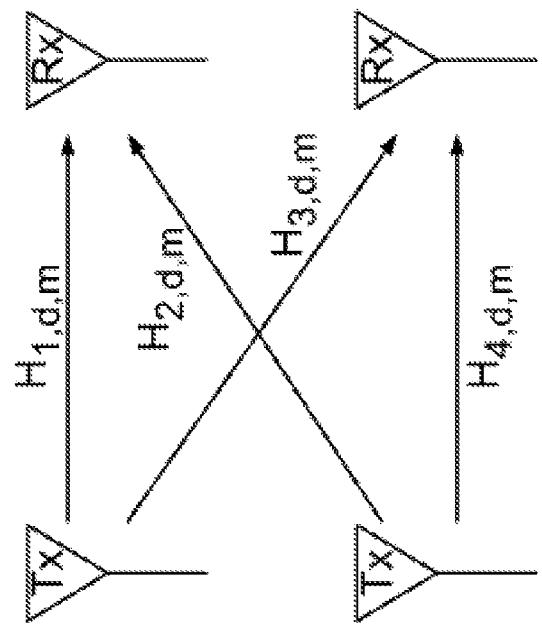

FIGS. 5A-5D show four exemplary wireless communication links between one or more wireless transmit antennas and one or more wireless receiver antennas. For example, FIG. 5A shows an exemplary link between one transmit antenna and one receive antenna, FIG. 5B shows exemplary links between one transmit antenna and two receive antennas, FIG. 5C shows exemplary links between three transmit antennas and one receive antenna, and FIG. 5D shows exemplary links between two transmit antennas and two receive antennas. Typical wireless networking components are able to both transmit and receive wireless signals, and may comprise one or more transmit antennas and one or more receive antennas and the links may also be bi-direction links. In exemplary embodiments, the implementations shown in FIGS. 5A-5D may be achieved using a single wireless device comprising a number of transmit and/or receive antennas that are used concurrently, in parallel, intermittently, in a synchronized fashion and/or independently. In some embodiments, a single antenna may be used to both transmit and receive signals, and the transmit and receive signals may be separated in electronic circuits to perform transmit signal processing or receive signal processing.

In an exemplary embodiment, a first wireless device may send wireless signals to a second wireless device. The bandwidth of the wireless signals may be approximately F MHz. F MHz may represent the 3-dB (FWHM) bandwidth of the signals, the 1/e bandwidth of the signals, or any other characterization of the bandwidth of the signals. The second wireless device may receive a wireless signal from the first wireless device and may be able to determine certain characteristics about the channel between itself and the first wireless device. For example, the second wireless device may receive and monitor the received signal strength (RSS) of the signal from the first wireless device. The received signal strength may give some indication of the distance between the first and second device as the signal may be attenuated and/or dispersed as it travels over the wireless channel. The received signal strength may also give some indication of objects that may be positioned between the first and second wireless device that may attenuate and scatter the wireless signal.

In an exemplary embodiment, the wireless signal between a first wireless device and a second wireless device may be configured to interoperate with devices that follow some version of the IEEE 802.11 protocol. Wireless receivers that interoperate with some version of the IEEE 802.11 protocol may receive 802.11 packets of information wirelessly and may process those packets to determine the RSS. The RSS determined by processing an 802.11 data packet is sometimes referred to as the RSS indicator or RSSI. ZigBee® systems also monitor RSSI, and many other wireless or radio systems and protocols monitor the received signal strength in one form or another. Some location systems use the RSSI between two wireless devices to characterize the distance between the two devices. However, sub-meter accuracy has not been demonstrated using RSSI techniques alone.

As described above, centimeter resolution accuracy of the relative position between at least two wireless devices may be achieved using the channel response information determined by wideband signaling. Experimental results were presented above for a wideband system using wireless signals with an approximate bandwidth, F, of 125 MHz. The wideband signal may be received by a wideband receiver and processed using high-speed ADCs and DACs, such as 500 MHz ADC/DAC devices. In some embodiments, it may be preferable to utilize narrower band channel response information that can be received and processed using standards-based communication equipment to determine relative positions between two or more wireless devices.

In some embodiments, high precision location determination using wireless signatures can be achieved if the wireless signals from closely spaced devices can be reliably distinguished. In wideband systems, a large number of multipaths of an RF (or microwave frequency) signal may be captured and processed. As the number of captured multipaths increases, either because the environment includes more scatterers or because the wideband signal is extended to even wider bandwidths, e.g. >125 MHz, 250 MHz, 500 MHz, 1 GHz, 5 GHz, >5 GHz, or anything in between, the location resolution may increase.

In some examples, in a given environment there may be a finite number of multipaths that may contribute to a channel response between two wireless devices such that the effect produced by increasing the signal bandwidth becomes less pronounced when the bandwidth increases beyond a certain point. Increasing the number of scatterers may improve the resolution and/or accuracy of the positioning system, but the improvement may also become less pronounced when the number of scatterers increases beyond a certain point. When a user deploys a positioning system in a new environment, the user may calibrate the positioning system to select a signal bandwidth and a scatterer configuration that results in a desired positioning resolution.

In exemplary embodiments, the number of multipaths that may contribute to a channel response between two wireless devices may be increased by capturing multiple relatively narrow bandwidth wireless signals with different center frequencies, different channel bandwidths, different frequency bands and/or using multiple displaced antennas and combing the multiple lower bandwidth channel responses into a higher resolution composite channel response and/or processing a group of related channel responses. In some embodiments, two or more channel responses may be combined to yield a composite channel response. In some embodiments, two or more channel responses may contribute to a location specific signature and may be processed using matching and/or classification algorithms described throughout this disclosure. Combining multiple lower bandwidth channel responses effectively increases the number of multipaths used to determine the location specific signature and increases the richness of channel information, potentially resulting in a higher positioning resolution.

In some examples, a positioning accuracy of the positioning system is based at least in part on the center frequencies of the probe signals. For example, probe signals that have center frequencies around 2.4 GHz are able to achieve a 5.5 cm positioning accuracy. In some examples, when probe signals have center frequencies around 2.4 GHz, it is preferable to use a probe signal that has a bandwidth that is more than 50 MHz or several probe signals that span a collective bandwidth that is more than 50 MHz in order to achieve 5.5 cm positioning accuracy. For example, for probe signals that comply with IEEE 802.11 standard, if each signal has a bandwidth of 22 MHz, it is preferable to use three or more probe signals that span a collective bandwidth that is more than 50 MHz. Techniques for using multiple probe signals having narrower bandwidths to achieve a wider collective bandwidth are described below.

In some embodiments, the positioning system uses a collective bandwidth B that is greater than 50 MHz. The collective bandwidth can be achieved in several ways. For example, in some implementations, a transmitter sends a single probe signal to a receiver, and the probe signal has a bandwidth B greater than 50 MHz. For example, the transmitter may have a filter that filters the output signals, the receiver may have a filter that filters the input signals, in which each of filters has a bandwidth equal to B.

In some implementations, a transmitter sends, using a single antenna, two or more wireless probe signals to a receiver that has a single antenna, in which the two or more wireless signals have different center frequencies, each of the two or more wireless signals has a bandwidth less than 50 MHz, and the two or more wireless signals have a collective bandwidth greater than 50 MHz. The collective bandwidth refers to the overall bandwidth spanned by the two or more wireless signals. For example, a first signal s1 may have a center frequency f1 and a bandwidth B1, and a second signal s2 may have a center frequency f2 and a bandwidth B2. The first signal s1 may occupy a first frequency band f1−B1/2 to f1+B1/2, and the second signal s2 may occupy a second frequency band f2−B2/2 to f2+B2/2. Assuming that f1<f2, if f1+B1/2<f2−B2/2, such that the two frequency bands do not overlap, then the first and second signals s1 and s2 span a collective bandwidth of B1+B2. If f1+B1/2>f2−B2/2, such that the two frequency bands overlap, then the first and second signals s1 and s2 span a frequency range from f1−B1/2 to f2+B2/2 with a collective bandwidth of f2−f1+B1/2+B2/2.

Similarly, if a single transmitter antenna sends three or more signals to a single receiver antenna, and the three or more signals have different center frequencies, the collective bandwidth spanned by the three or more signals is the bandwidth (if every frequency band overlaps the adjacent frequency band(s)) or the sum of bandwidths (if at least one frequency band does not overlap any other frequency band) covered by the frequency bands of the three or more signals. For example, suppose a transmitter that complies with 802.11b/g/n protocol sends signals s1, s2, and s3 using a single transmitter antenna, and a receiver receives the signals s1, s2, and s3 using a single receiver antenna. Assume the first signal s1 occupies a frequency band 2412±11 MHz, the second signal s2 occupies a frequency band 2422±11 MHz, and the third signal s3 occupies a third frequency band 2447±11 MHz. The three signals s1, s2, and s3 span a collective frequency range of 2401 MHz to 2433 MHz and 2436 MHz to 2458 MHz, and thus span a collective bandwidth of 54 MHz. Suppose a first channel response is derived from the received signal s1, a second channel response is derived from the received signal s2, and a third channel response is derived from the received signal s3. As described in more detail below, a composite channel response determined by the first, second, and third channel responses spans the collective bandwidth 54 MHz. For example, a composite channel response can be determined using Equation 12 below.

A positioning system can determine information about one or more macroscopic objects in the environment (e.g., information about location or orientation of one or more of the objects) from a composite channel response derived from multiple narrow-band signals (e.g., signals each having a bandwidth less than 50 MHz), in which the composite channel response spans a collective bandwidth that is more than 50 MHz.

In some implementations, a transmitter sends, using two or more antennas, two or more wireless signals to a receiver that has one antenna, each signal being sent from a different antenna. The two or more wireless signals can have the same or different center frequencies, each of the two or more wireless signals has a bandwidth less than 50 MHz, and the two or more wireless signals have a collective bandwidth greater than 50 MHz. In this example in which multiple transmitter antennas are used, the collective bandwidth refers to the sum of the bandwidths spanned by the two or more signals transmitted by the multiple transmitter antennas. For example, the first antenna may transmit a first signal s11 that has a center frequency f1 and a bandwidth B1, and the second antenna may transmit a second signal s21 that has a center frequency f1 and a bandwidth B1. The first and second signals s11 and s21 span a collective bandwidth of 2×B1, even though the signals s11 and s21 occupy the same frequency band. As another example, the first antenna may transmit a first signal s11 that has a center frequency f1 and a bandwidth B1, and the second antenna may transmit a second signal s21 that has a center frequency f2 and a bandwidth B2. In this case, the first and second signals s11 and s21 span a collective bandwidth of B1+B2, regardless of whether the frequency bands occupied by the signals s11 and s21 overlap. A composite channel response can be derived from the channel responses determined from the first and second signals s11 and s21, in which the composite channel response spans the collective bandwidth of B1+B2.

In some implementations, a transmitter broadcasts, using a single antenna, a single wireless signal in multiple directions, in which the broadcast signal is received by two or more antennas. The transmit signal can have a bandwidth less than 50 MHz, and the two or more signals received at the two or more antennas can have a collective bandwidth greater than 50 MHz. In this example in which multiple receiver antennas are used, the collective bandwidth refers to the sum of the bandwidths spanned by the two or more signals received by the multiple receiver antennas. For example, the transmitter may transmit a signal that has a center frequency f1 and a bandwidth B1. Assume there are two receiver antennas. A first signal s11 received at the first receiver antenna and a second signal s12 received at the second receiver antenna span a collective bandwidth of 2×B1 even though the signals s11 and s12 occupy the same frequency band. The signals s11 and s12 travel from the transmitter antenna to the receiver antennas through different sets of multipaths. A composite channel response can be derived from the channel responses that are determined from the first and second received signals s11 and s12, in which the composite channel response spans the collective bandwidth of 2×B1.

In some implementations, a transmitter broadcasts, using a single antenna, two or more wireless probe signals that are received by two or more antennas of a receiver. Each wireless signal can have a bandwidth less than 50 MHz, and the four or more signals received at the two or more receiver antennas (each receive antenna receives two or more signals from the transmitter) can have a collective bandwidth greater than 50 MHz. For example, assume the transmitter broadcasts signals s1 and s2, and there are two receiver antennas. The portion of the signal s1 received at the first receiver antenna is represented as signal $s1_{11}$, and the portion of signal s1 received at the second receiver antenna is represented as signal $s1_{12}$. The portion of the signal s2 received at the first receiver antenna is represented as signal $s2_{11}$, and the portion of signal s2 received at the second receiver antenna is represented as signal $s2_{12}$. Assume that the signal s1 has a center frequency f1 and a bandwidth B1, the signal s2 has a center frequency f2 and a bandwidth B2, and f1<f2.

If s1 and s2 occupy frequency bands that do not overlap, the signals $s1_{11}$ and $s2_{11}$ span a collective bandwidth of B1+B2. The signals $s1_{12}$ and $s2_{12}$ also span a collective bandwidth of B1+B2. The four signals $s1_{11}$, $s2_{11}$, $s1_{12}$, and $s2_{12}$ span a collective bandwidth of 2×(B1+B2).

If s1 and s2 occupy frequency bands that overlap, the signals $s1_{11}$ and $s2_{11}$ span a collective bandwidth of f2−f1+B1/2+B2/2. The signals $s1_{12}$ and $s2_{12}$ also span a collective bandwidth of f2−f1+B1/2+B2/2. The four signals $s1_{11}$, $s2_{11}$, $s1_{12}$, and $s2_{12}$ span a collective bandwidth of 2×(f2−f1+B1/2+B2/2).

In general, when a transmitter sends n1 (n1>1) probe signals using a single transmit antenna, and the probe signals are received by n2 (n2>1) receiver antennas, the collective bandwidth is determined by calculating the collective bandwidth Bi spanned by the n1 signals received at the i-th receiver antenna, in which i ranges from 1 to n2, then calculating the sum of those collective bandwidths:

$$\text{Total collective bandwidth } B = \Sigma_{i=1}^{n2} Bi.$$

In some implementations, a transmitter broadcasts, using two or more antennas, probe signals that are received by two or more receiver antennas, in which each transmitter antenna sends one signal that has a bandwidth less than 50 MHz, and the four or more signals received at the two or more receiver antennas (each receive antenna receives two or more signals from the two or more transmitter antennas) can have a collective bandwidth greater than 50 MHz. For example, assume the portion of the signal sent from the first transmitter antenna received at the first receiver antenna is represented as signal s11, the portion of the signal sent from the first transmitter antenna received at the second receiver antenna is represented as signal s12, the portion of the signal sent from the second transmitter antenna received at the first receiver antenna is represented as signal s21, and the portion of the signal sent from the second transmitter antenna received at the second receiver antenna is represented as signal s22. Assume that the signals s11 and s12 have a center frequency f1 and a bandwidth B1, the signals s21 and s22 have a center frequency f2 and a bandwidth B2, and f1<f2. Regardless of whether the frequency bands occupied by s11 and s21 overlap, the signals s11, s12, s21, and s22 span a collective bandwidth of 2×(B1+B2).

In general, when there are n1 (n1>1) transmitter antennas that each sends a probe signal, and the probe signals are received by n2 (n2>1) receiver antennas, the collective bandwidth of the signals received at the n2 antennas is determined by calculating the collective bandwidth Bi spanned by the n1 signals received at the i-th receiver antenna, in which i ranges from 1 to n2, then calculating the sum of those collective bandwidths:

Total collective bandwidth $B = n2 \times \Sigma_{i=1}^{n1} Bi.$ in which Bi is the bandwidth of the signal sent from the i-th transmitter antenna.

In some implementations, a transmitter broadcasts, using two or more antennas, probe signals that are received by two or more receiver antennas, in which each transmitter antenna sends two or more signals that each has a bandwidth less than 50 MHz, and the eight or more signals received at the two or more receiver antennas (each receiver antenna receives two or more signals from each of the two or more transmitter antennas) can have a collective bandwidth greater than 50 MHz. For example, assume there are two transmitter antennas and two receiver antennas, the first transmitter antenna sends two signals s11 and s12, the second transmitter antenna sends two signals s21 and s22. The portion of the signal s11 received at the first receiver antenna is represented as signal $s11_{11}$, the portion of the signal s11 received at the second receiver antenna is represented as signal $s11_{12}$, the portion of the signal s12 received at the first receiver antenna is represented as signal $s12_{11}$, the portion of the signal s12 received at the second receiver antenna is represented as signal $s12_{12}$, the portion of the signal s21 received at the first receiver antenna is represented as signal $s21_{21}$, and the portion of the signal s21 received at the second receiver antenna is represented as signal $s21_{22}$, the portion of the signal s22 received at the first receiver antenna is represented as signal $s22_{21}$, and the portion of the signal s22 received at the second receiver antenna is represented as signal $s22_{22}$.

Assume that the signals s11, s12, s21, and s22 have center frequencies f11, f12, f21, f22, respectively, and bandwidths B11, B12, B21, and B22, respectively. Assume that f11<f12 and f21<f22. If the signals s11 and s12 (sent from the first transmitter antenna) occupy frequency bands that do not overlap, the signals $s11_{11}$ and $s12_{11}$ received at the first receiver antenna span a collective bandwidth B11+B12, and the signals $s11_{12}$ and $s12_{12}$ received at the second receiver antenna span a collective bandwidth B11+B12. If the signals s11 and s12 (sent from the first transmitter antenna) occupy frequency bands that overlap, the signals $s11_{11}$ and $s12_{11}$ received at the first receiver antenna span a collective bandwidth f12−f11+B11/2+B12/2, and the signals $s11_{12}$ and $s12_{12}$ received at the second receiver antenna span a collective bandwidth f12−f11+B11/2+B12/2. If the signals s21 and s22 (sent from the second transmitter antenna) occupy frequency bands that do not overlap, the signals $s21_{21}$ and $s22_{21}$ received at the first receiver antenna span a collective bandwidth B21+B22, and the signals $s21_{22}$ and $s22_{22}$ received at the second receiver antenna span a collective bandwidth B21+B22. If the signals s21 and s22 (sent from the second transmitter antenna) occupy frequency bands that overlap, the signals $s21_{21}$ and $s22_{21}$ received at the second receiver antenna span a collective bandwidth f22−f21+B21/2+B22/2, and the signals $s21_{22}$ and $s22_{22}$ received at the second receiver antenna span a collective bandwidth f22−f21+B22/2+B21/2. The eight signals $s11_{11}$, $s12_{11}$, $s11_{12}$, $s12_{12}$, $s21_{21}$, $s22_{21}$, $s21_{22}$, and $s22_{22}$ received at the two receiver antennas span a collective bandwidth that is the sum of the collective bandwidth of $s11_{11}$ and $s12_{11}$, the collective bandwidth of $s11_{12}$ and $s12_{12}$, the collective bandwidth of $s21_{21}$ and $s22_{21}$, and the collective bandwidth of $s21_{22}$ and $s22_{22}$.

In general, when there are n1 (n1>1) transmitter antennas that each sends one or more probe signals, and the one or more probe signals are received by n2 (n2>1) receiver antennas, the collective bandwidth of the signals received at the n2 antennas is determined by calculating, for each pair of transmitter antenna and receiver antenna, the bandwidth or collective bandwidth of the signal or signals sent from the transmitter antenna to the receiver antenna, then calculate the sum of all the previously calculated bandwidth(s) and collective bandwidth(s).

For example, referring to FIG. 73, suppose there are two transmitter antennas and two receiver antennas, the first transmitter antenna sends a first signal having a center frequency 2412 MHz and a bandwidth 22 MHz, and a second signal having a center frequency 2437 MHz and a bandwidth 22 MHz. The second transmitter antenna sends a first signal having a center frequency 2412 MHz and a bandwidth 22 MHz, a second signal having a center frequency 2427 MHz and a bandwidth 22 MHz, and a third signal having a center frequency 2442 MHz and a bandwidth 22 MHz. For the signals transmitted from the first transmitter antenna and received by the first receiver antenna, the collective bandwidth is 44 MHz (the two signals occupy frequency bands that do not overlap). For the signals transmitted from the first transmitter antenna and received by the second receiver antenna, the collective bandwidth is also 44 MHz. For the signals transmitted from the second transmitter antenna and received by the first receiver antenna, the collective bandwidth is 52 MHz (the three signals occupy frequency bands that overlap). For the signals transmitted from the second transmitter antenna and received by the second receiver antenna, the collective bandwidth is also 52 MHz. The total collective bandwidth is 44+44+52+52=192 MHz.

The positioning system includes a processor that is configured to compare information (e.g., channel response or composite channel response) derived from the received one or more wireless signals to information (e.g., channel response or composite channel response) in a database. The processor can be configured to determine, based on the comparison, information about a position of at least one of the wireless transmitter(s) and/or the wireless receiver(s) (e.g., using similar techniques as those described above). The processor is also configured to generate an output based on the determined information. The information derived from the received one or more wireless signals that is compared to the information in the database spans the collective bandwidth B. In other words, the entirety of the collective bandwidth B is utilized to express the derived information.

Time-Reversal Classification of Composite Channel Responses

One way to represent the composite channel response is as a vector comprising multiple independent channel responses. In exemplary embodiments, a wireless channel between two antennas i and j may be represented by the channel response $H_{ij}$. The channel response function notation may include either or both indices as a subscript. For example, if a single access point is receiving signals from multiple devices, i, the channel response may be indicated as $H_i$ in the frequency domain. If multiple access points, j, are receiving signals from multiple devices, i, the channel response may be indicated as $H_{ij}$ in the frequency domain. In some embodiments where a single antenna is both transmitting a probe signal and receiving a probe signal waveform, the indices i and j may represent time slots, frequencies, polarizations and the like. Note that the time domain representation of the channel response, $h_{ij}$, and the frequency domain representation of the channel response, $H_{ij}$, are related by the Fourier Transform. Time-reversal classification techniques may be described in either the time domain or the frequency domain and equations described using time domain descriptions can be converted to frequency domain versions by Fourier Transforming the variables and functions in the equations and vice versa.

In some embodiments, a first wireless device may send a first wireless signal to a second wireless device with a center frequency of $f_1$ GHz. In some embodiments, the first wireless signal may be a channel probe signal, a pulse signal, a frame signal, a PN sequence, a preamble signal, and the like. In some embodiments, the bandwidth of the first wireless signal may be approximately 10 MHz, 20 MHz, 40 MHz, 60 MHz, 125 MHz, 250 MHz, 500 MHz, 1 GHz and the like. In some embodiments, the bandwidth of the first wireless signal may be between 1 MHz and 10 GHz. In some embodiments, the first wireless device may send a second wireless signal to the second device with a center frequency of $f_2$ GHz. In some embodiments, the wireless signal may be a channel probe signal, a pulse signal, a frame signal, a PN sequence, a preamble signal, and the like. In some embodiments, the bandwidth of the second wireless signal may be approximately 10 MHz, 20 MHz, 40 MHz, 60 MHz, 125 MHz, 250 MHz, 500 MHz, 1 GHz and the like. In some embodiments, the bandwidth of the second wireless signal may be between 1 MHz and 10 GHz. In some embodiments, the frequency spectrum of the first wireless signal and the second wireless signal may include overlapping frequencies. In some embodiments, there may be no overlapping frequencies between the two wireless signals. In some embodiments, the frequency spectra of the different wireless signals may be separated by so-called guard-bands or guard-band frequencies. The channel response for the channel between the first wireless device and the second wireless device at probe frequency $f_1$ may be represented as $H_{ij}(f_1)$. The channel response for the channel between the first wireless device and the second wireless device at probe frequency $f_2$ may be represented as $H_{ij}(f_2)$. In some embodiments, more than two probe frequency signals may be used to probe the channel. The more than two probe frequency signals may have some overlapping frequencies or they may have no overlapping frequencies.

In some embodiments, a first wireless device may use channel tuning and/or frequency hopping to tune to different wireless signal carrier frequencies to probe a wireless channel. In some embodiments, a wireless device may tune to different channels within a specified frequency band to probe the wireless channel. For example, if the first and second wireless devices are communicating using an 802.11 WiFi protocol, a wireless device may first tune to one channel within the WiFi signaling bandwidth and then to another channel within the WiFi band. The frequency tuning may be from one channel to the next in a sequential fashion, but it may also hop from one channel to another in a random fashion anywhere within the WiFi band. In some embodiments, the different channels may have different channel bandwidths.

A composite channel response comprising channel responses determined using different center frequency probe signals may be represented as $$H_{composite}=\{H_{ij}(f_1)H_{ij}(f_2)H_{ij}(f_3) \ldots H_{ij}(f_N)\}. \quad \text{(Equ. 12)}$$

In exemplary embodiments, a wireless channel between two antennas may be represented by the channel response $H_{ij}$. In some embodiments a first antenna, i, may send a first wireless signal to a second antenna, j. The second wireless antenna may be part of a device that may be able to estimate the channel response $H_{ij}$. In some embodiments, the second wireless device may transmit the received waveform from the first wireless antenna to a remote device (e.g. processor, computer, server, access point, router, base station, network resource) and the remote device may be used to estimate the channel response. The first wireless antenna, i, may send a second wireless signal to a third wireless antenna, r, and the third wireless antenna may be part of a device that may be able to estimate the channel response $H_{ir}$. In some embodiments, the third wireless device may transmit the received waveform from the first wireless antenna to a remote device (e.g. processor, computer, server, access point, router, base station, network resource) and the remote device may be used to estimate the channel response.

In some embodiments, the second and third antennas may be part of what may be considered a single device such as a wireless access point, router, base station, computer, base station, locator, mobile device and the like. The first wireless signal and the second wireless signal may be different portions of the same launched wireless signal. That is, the first wireless signal and the second wireless signal may be portions of the same signals (e.g., which are received at different locations). In some embodiments, the first and second wireless signals may be signals generated using different protocols, different bandwidths, different channel frequencies. For example, a first wireless signal may be a wideband probe signal comprising a pseudorandom bit sequence and a second wireless signal may be a 10 MHz wide 802.11 WiFi signal. In some embodiments, a first wireless signal may be in the 2.4 GHz region of the spectrum and the second wireless signal may be in the 5.8 GHz region of the spectrum. In some embodiments, the first and second wireless signals may be generated using the same protocols, bandwidths and channel frequencies, but they may originate from different antennas that are at different positions. In some embodiments, a first wireless signal and a second wireless signal may be portions of the same wireless signal (e.g., which are received at different locations). In some embodiments, a first wireless signal may be a WiFi signal and a second wireless signal may be a ZigBee® signal. In some embodiments, one wireless signal may be a cellular signal, such as are transmitted in nanocells, picocells and the like. In some embodiments, one wireless signal may be a 3G signal, a 4G signal, an LTE signal, and the like.

In some embodiments, wireless devices with multiple antennas may be used to estimate channel responses between two or more of their multiple antennas and another wireless device. In some embodiments, composite channel responses may comprise multiple channel responses determined for different antennas in a multi-antenna device.

$$H_{composite}=\{H_{ij}H_{ir}H_{iq} \ldots H_{tc}\} \quad \text{(Equ. 13)}$$

In some embodiments, composite channel responses may comprise combinations of channel responses determined using different center frequency signals, different bandwidth signals, different protocol signals and/or channel estimates from multiple antennas in either or both a first wireless device and a second wireless devices.

$$H_{composite} = \left\{ H_{ij}\left(f_1 - \frac{F_1}{2}, f_1 + \frac{F_1}{2}\right) \right\} \quad \text{(Equ. 14)}$$

-continued
$$H_{ir}\left(f_2 - \frac{F_2}{2}, f_2 + \frac{F_2}{2}\right) \ldots H_{iz}\left(f_N - \frac{F_N}{2}, f_N + \frac{F_N}{2}\right)\}.$$

where f represents the center frequency and F represents the bandwidth.

As described above, a time-reversal resonating strength, $\eta(H_{comp1}, H_{comp2})$, between two channel impulse responses can be defined as:

$$\eta(H_{comp1}, H_{comp2}) = \frac{\max_\theta \sum_i H_{comp1}[i] H^*_{comp2}[i] e^{ji\theta}}{\sqrt{\sum_{i=0}^{L-1} |H_{comp1}[i]|^2} \sqrt{\sum_{i=0}^{L-1} |H_{comp2}[i]|^2}}$$ (Equ. 15)

where $H^*_{comp2}$ is defined as the conjugated version of $H_{comp2}$, and $\Theta$ is a parameter that indicates the phase that is searched.

Equation 15 shows the frequency domain representation of the time-reversal resonating strength. As described above, a time-reversal classification scheme may be more robust to channel estimation errors, but as described in other sections of this disclosure, there may be a number of ways to determine how well two channel responses match each other. For example, positioning systems may use correlation techniques, integration and subtraction techniques, SVM techniques and the like to determine how well certain channel responses and/or combinations of channel responses match each other. In some embodiments, determining the conventional correlation coefficient may result in precise enough identification of similar channel responses and may be used in positioning systems as described herein. In some embodiments, the time-reversal techniques may be preferable. In some embodiments, machine learning based classification techniques may be used to determine how well certain channel responses and/or combinations of channel responses match each other. In some embodiments, more than one classification scheme may be used to analyze measured and/or stored and/or generated data sets.

The following describes an exemplary process for determining the position of a terminal device. Let $H_{comp}$ be the composite channel impulse response that is estimated for the terminal device with unknown location. To match $H_{comp}$ with the locations in a database of reference channel responses, the system may first extract a feature using the time-reversal resonating strength for each location. Specifically, for each location $p_i$, the system may compute the maximal time-reversal resonating strength, $\eta_i$, using Equation 15.

By computing $\eta_i$ for all possible locations, the system can obtain $\eta_1, \eta_2, \ldots \eta_N$. Then, the estimated location, $p_i$, can be the one that can give the maximal $\eta_i$, i.e., i can be derived as follows:

$$\hat{i} = \operatorname*{argmax}_i \eta_i.$$ (Equ. 16)

In an exemplary embodiment, after a locator determines the location of the device, the locator may send the location coordinates of the device, as well as other information such as the type of device, to the device and/or another locator and/or a computer and/or a server in the cloud and/or any type of computing device. In some embodiments, information from the device along with its location information may be sent to other systems such as advertising systems, tracking systems, payment systems, notification systems, monitoring systems and the like. Other systems may also send information to the device. For example, the device may receive "on-sale" information for stores in its vicinity and/or for items stored on a wish-list in the phone or based on bank account information on the phone. For example, a store selling expensive merchandise may send advertising information to users who have a history of purchasing higher cost items or who have considerable amounts of money in their bank accounts.

Channel Response Processing

In some embodiments, a channel may be probed multiple times using a similar probe signal and multiple channel response estimates, one for each of the probe signals, may be determined. In some embodiments, the multiple channel response estimates may be compared using any of the matching and/or classification schemes described throughout this disclosure. In some scenarios, it may be expected that a channel probed multiple times with a similar probe signal should be characterized by very similar channel estimates. In some cases, one or more channel estimates determined from a set of similar probe signals probing a similar channel may be different enough from the other channel estimates that they are deemed to be outliers or poor estimates of the channel and they may be deleted and/or discarded from further processing steps. Outlier channel estimates may be the result of receiving noisy signals, interference caused by other radio signals in the environment, problems with circuits, feedback loops, synchronization schemes and the like. In some embodiments, multiple channel responses estimated from multiple similar probe signals probing a similar channel may be compared to each other to determine a resonating strength and/or focusing gain and the resonating strength and/or focusing gain may be compared to a threshold value Channel responses associated with resonating strengths and/or focusing gains below the threshold may be deleted or discarded from a stored or useful set of estimated channel responses. In some embodiments, deleting or discarding channel responses that are determined to be deficient in some manner may be referred to as trimming.

In some embodiments, the resonating strength and/or focusing gain threshold may be a variable and may be user settable or may be set by a computer algorithm or by the output signal levels of analog and/or digital circuits. In some embodiments, the threshold may be adjusted to change the resolution of a positioning system or to change the computation time required for determining locations.

In some embodiments, it may be preferable to probe a channel more than once. In some embodiments, it may be preferable to probe a channel twice, three times, 30 times, 50 times or more than 50 times. In some embodiments, a channel may be probed any number of times, including, but not limited to, between 1 and 200 times. In some embodiments, channel responses may be determined for at least some of the received probe waveforms. In some embodiments the channel may be probed multiple times over a short period of time or over a longer period of time. In some embodiments, a channel may be re-probed occasionally, periodically, in response to a trigger, a timer, a counter, an algorithm, a sensed change and the like. In some embodiments, when a channel is re-probed, it may be probed with a single probe signal or with multiple probe signals. In some embodiments, the multiple probe signals may be replicas of each other or they may be different from each other. For example, different probe signals may be pseudo-random sequences with different lengths and/or that have been generated using different seeds. In some embodiments, probe signals may be Golay sequences of different lengths. In some embodiments, the number of bits in a data sequence that is used to probe a wireless channel may be tuned to achieve a certain signal-to-noise ratio and/or quality-of-signal of the received probe waveform.

In some embodiments, multiple channel response estimates for the same channel may be averaged and/or combined into a single averaged or combined channel estimate. In some embodiments, any number of channel estimates may be combined. For example, one can test systems that combine and average 2 channel responses, 10 to 30 channel responses, 50 channel responses and 100 channel responses. In some embodiments the number of channels that may be combined and/or averaged may be variable and may be determined by a user, by a computer algorithm and/or by the output signals from circuits in the wireless system.

In some embodiments, channel responses may be processed locally, e.g., within a wireless device that may include the wireless antenna or antennas. In some embodiments, the received signal waveforms and/or estimated channel responses may be processed remotely, e.g., in a remote computer, server, access point, router and the like. In some embodiments, received signal waveforms and/or estimated channel responses may be sent to "the cloud" for processing, storage and the like. Resources in the cloud may include, but are not limited to, servers, computers, hard drives, switches, routers, storage units, databases, transmitters, receivers and the like.

In some embodiments where a channel is being probed multiple times, it may be important to remove effects associated with the detection and processing of the received probe waveform so that variations in estimated channel responses can be associated primarily with variations in the channel itself. For example, some WiFi receivers may expose a complex vector that represents the channel attenuation and phase shift of each subcarrier signal within the WiFi channel band. Sometimes referred to as the channel frequency response, $H_{ij}(f)$, (CFR) or as the channel state information (CSI), this response may vary for subsequent probe channel measurements even if the channel itself has not substantially changed. One reason may be that the channel frequency offset (CFO) and/or sampling frequency offsets (SFO) used to measure the channel frequency response may vary from measurement to measurement and/or detection event to detection event. In such scenarios, sequential estimates of the channel response may vary even if the channel has not varied. In such scenarios, it may be more difficult to determine an averaged channel response and/or to determine which channel responses may be outliers that should be trimmed from a channel response set, collection, and/or database. In some embodiments, received probe waveforms and/or estimated channel frequency responses (or CSIs) may be processed to remove shot-to-shot channel estimate errors due to carrier frequency offsets and sampling frequency offsets. In some embodiments, reference phases may be used to align channel estimates derived from multiple channel probe signals. In some embodiments, a reference phase is a phase chosen from one of the channel estimate that serves as the reference for other channel estimates. In some embodiments, the multiple channel probe signals may be replicas of each other or they may vary in frequency, bandwidth, wireless path, and the like. In some embodiments, composite channel responses may comprise multiple channel responses that have been estimated using a reference phase (e.g., a timing offset).

High Precision Location Determination Using Composite Channel Responses

Figure 6A:
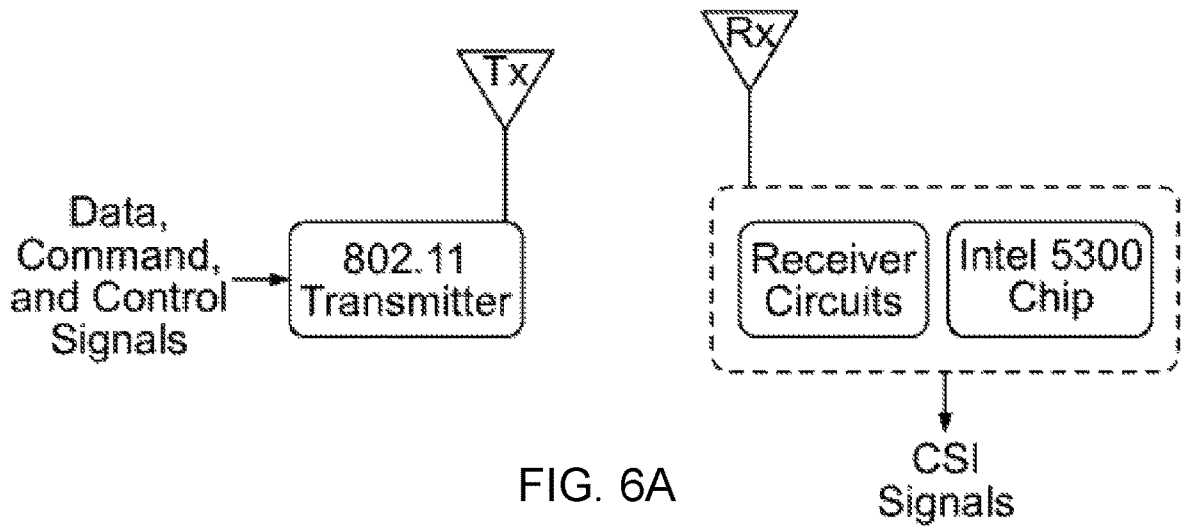
FIG. 6A shows a block diagram of an exemplary WiFi system capable of determining device location, according to some embodiments of the present disclosure.

FIG. 6A shows a block diagram of an exemplary WiFi system capable of determining device location (e.g., with approximately 5 cm accuracy). The system described in the block diagram can be implemented using commercial-off-the-shelf WiFi equipment Channel measurements can be performed using this equipment, and composite channel responses can be used to determine the position of a transmitting device. The resolution with which the location may be determined may be defined at least in part according to the number of lower-bandwidth channel estimates that are included in the composite channel response, as described above.

Figure 6B:
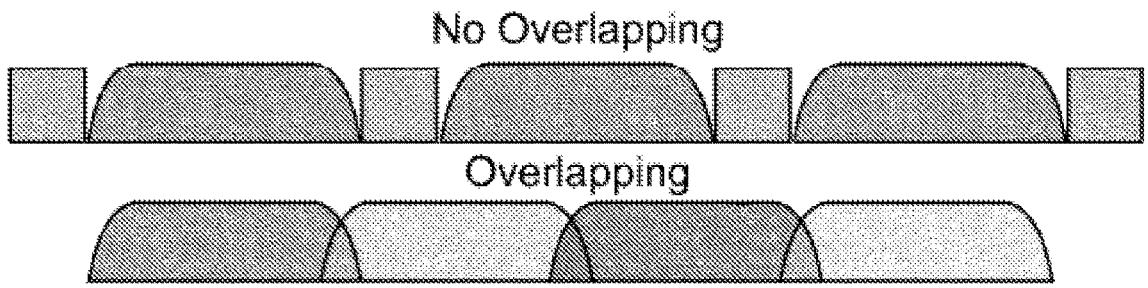
FIG. 6B shows an exemplary non-overlapping channel tuning scheme and an exemplary overlapping channel tuning scheme, according to some embodiments of the present disclosure.

In a laboratory demonstration described below, the center frequency of the transmitter can be tuned to different 10 MHz channels within the standard 802.11 WiFi band. FIG. 6B shows examples of two channel tuning schemes—an exemplary non-overlapping scheme 1802 and an exemplary overlapping scheme 1804. In the non-overlapping scheme 1802, the frequency bands of the WiFi signal have substantially no overlapping frequencies and may be described as being separated by frequency guard-bands. In this example, the non-overlapping scheme 1802 includes 101 non-overlapping channels in which the spacing between the center frequencies of the channels is 10 MHz. A first channel has a center frequency of 4.9 GHz, and a last channel has a center frequency of 5.9 GHz. In the overlapping scheme 1804, adjacent frequency bands of the WiFi signal may include some of the same frequency components. In this example, the overlapping scheme 1804 includes 124 overlapping channels in which the spacing between the center frequencies of the channels is 8.28125 MHz. A first channel has a center frequency of 4.8909375 GHz, and a last channel has a center frequency of 5.9090625 GHz. In the preliminary experimental results described below, data are collected using both overlapping and non-overlapping frequency channels.

In an exemplary embodiment, a circuit may be used to capture the CSI for the wireless channel between a receiver and a transmitter. The CSI may be used to estimate the wireless channel response for each of the subcarriers in a wireless signal. The CSI may be a complex vector, comprising both amplitude and phase information related to the wireless channel. In some embodiments, only the channel amplitude information may be determined and/or exported and/or processed. In some embodiments, only the channel phase information may be determined and/or exported and/or processed. In preferred embodiments, both the channel amplitude and phase information may be determined and/or exported and/or processed as part of a positioning system application. In some embodiments, CSI signals may be processed in a processor such as a microprocessor and/or a DSP, a computer, an FPGA, an ASIC, and the like, and may be processed locally, on resources integrated with, or in close proximity to, the chip or system that generates the CSI signals, and/or the CSI signals may be processed remotely at a distance computing device that may be configured for performing signal processing, and/or the CSI signals may be processed using at least some cloud resources.

In some embodiments, the CSI may be determined by a standardized mechanism, such as exists for the 802.11 signaling protocol. In some embodiments, the CSI may be determined by monitoring and recording parameters in the radio receiver and/or by monitoring monitor and control signals passed between a receiver and a transmitter. In the laboratory demonstration, the circuit used to capture the CSI included a USRP (National Instruments' Universal Software Radio Peripheral platform) and/or an Intel 5300 chip.

In some embodiments, certain portions of a wireless protocol packet structure may be used to estimate channel state information and/or the channel frequency response. In an exemplary 802.11 network, long preambles that follow short preambles may be used to determine the CSI. Exemplary 802.11 communication systems may utilize orthogonal frequency division multiplexing or OFDM. Each OFDM channel may include multiple sub-carriers. An OFDM channel may include more than 20 subcarriers, more than 30 subcarriers, more than 40 subcarriers, 48 subcarriers, 56 subcarriers, 64 subcarriers, or 114 subcarriers, etc. In some embodiments, some of the subcarriers in an OFDM signal may be null subcarriers or may be pilot subcarriers. In some embodiments, only some of the subcarriers in an OFDM symbol may be data subcarriers.

In some embodiments, a circuit may provide CSI for some or all of the subcarriers. For example, in some exemplary embodiments, the Intel 5300 chip and/or USRP may export the CSI for 30 subcarriers in the OFDM channel. In some embodiments, further processing of the CSI may be performed to mitigate variations in the CSI owing to imperfect timing and/or frequency synchronization. In some embodiments, the CSI from one sub-band may be arranged as a vector and may be referred to as an intra-band fingerprint. In some embodiments, the CSI from one sub-band may be the average of multiple CSI determinations and some determinations may be trimmed or discarded. In some embodiments, a sub-band CSI for a given channel may be measured and/or determined once, twice, ten times, 30 times, 50 times, 100 times and the like. In some embodiments, some or all of the sub-band CSI information may be used to form an intra-band fingerprint.

The example provided above, where the CSI is reported for 30 subcarriers, is merely an example and is not meant to be limiting in any way. The CSI information from any number of subcarriers may be utilized in the positioning systems described herein. Also, the number of channel measurements that may be performed, or the number of WiFi packets that are exchanged in order to determine CSI and intra-band fingerprints, are exemplary and are not meant to be limiting in any way. For example, a positioning system that also tracks movement may constantly send probe signals that can be used to determine estimated channel responses and device positions. In such systems, probe signals may be sent thousands of times or millions of times per second and may continue to be sent as long as the positioning and/or tracking system is being used. The description of a channel probe signal being sent 30 times or 100 times may refer to the number of times a probe signal is sent before another type of wireless signal is sent by the system. For example, in some systems, there may be a channel probing phase and a data transmission phase. The channel probing phase may be as described in this disclosure and the data transmission phase may correspond to data being sent (e.g., such as location information, sales information, payment information, alerts, communication information, and the like). In some implementations, there may be little or no data that needs to be transmitted by a system, and a channel probing phase may go on indefinitely. In such implementations, the number of probe signals that may be sent and the number of received probe waveforms that may be detected, processed, stored, and the like may be huge.

In some embodiments, multiple different center frequency, frequency bandwidth, and/or antenna intra-band fingerprints may be combined and/or concatenated into a composite or inter-band fingerprint. In some embodiments, the inter-band finger print may form a composite channel response. This composite channel response may be used to determine the location of an antenna and/or wireless device in a positioning system. In some embodiments, the location accuracy of a positioning system using a composite channel response may be higher than the accuracy achieved using a single intra-band fingerprint.

In an exemplary embodiment, two long preambles in an 802.11 frame can be used to determine the CSI for a wireless channel between the two devices. For example, one of the wireless devices may be a wireless router/access point and may support a wireless hotspot (e.g., at a home, or at a business). The wireless router/access point may be a standard device that has not been specifically modified and/or arranged to work with the systems and methods described herein. In other words, the systems and methods described herein can take advantage of such existing wireless devices and their methodologies to determine positional information. In this exemplary embodiment, when the second wireless device (e.g., a computer, a smart phone, a tablet, etc.) is in range of the router/access point, the second wireless device may receive WiFi signals from the router/access point and may process the long preambles included in the WiFi signals to determine a location/environment specific signature between itself and the router/access point. In some implementations, the second wireless device may include software and/or firmware for enabling the second wireless device to operate with the system. In some implementations, the second wireless device is not joined to the hotspot. Rather, the second wireless device may be a passive device that can receive the standard preamble information from the router/access point. In this way, the second wireless device may be referred to as a "sniffer." In some embodiments, the two long preambles are sent in one frame, e.g., for each OFDM channel. In some embodiments, the OFDM channels can have bandwidths of, e.g., 20 MHz or 40 MHz.

As described above, the system can determine CSI and associate the CSI with various locations. For example, in one instance, the second wireless device can store CSI and associate it with a particular location (e.g., "the chair in the front-right corner of Coffee Shop on 123 Main Street"). When the second device is subsequently in the particular location, it may provide an indication (e.g., an alert). In some implementations, when the second wireless device has access to the internet (e.g., by joining the WiFi network, the second wireless device may upload acquired location/environment information. The location/environment information may be uploaded to a resource (e.g., a cloud-based resource) such as one or more servers, hard drives, storage units, and/or databases that are configured to store such location information.

In some implementations, the first device (e.g., the routers/access points) may have already been mapped to a particular location. Such mapping may be relatively coarse. For example, the SSIDs or other network identifier of the router/access point may be associated with a particular location (e.g., a longitude and a latitude), and such coarse locational information can be used to assist in determining a more-precise location of the second wireless device. For example, such location information can be uploaded to the resource (e.g., a database in the cloud), and the information can be used to associate CSI/location specific signatures with known coarse locations of routers/access points. In some implementations, the router/access point is associated with more-detailed location information. For example, the router/access point may be associated with a 2D or 3D floor plan, and such information can be provided to the second device when the second device is in range of the router/access point. In some examples, a display of the second wireless device may present a floor plan based on such information. The second wireless device may be configured to receive an input from a user indicative of the current position (e.g., tapping a spot on the displayed floor plan), thereby causing CSI to be collected and correlated with that particular position. In some implementations, the information related to the floorplan may be stored locally on the second device and/or may be stored in a cloud-based database. In some implementations, a third wireless device that comes within range of the router/access point may have access to the floorplan information. If the database contains one or more signatures associated with the particular router/access point, the system may collect a location signature from the third wireless device, compare the signature to existing signatures stored in the database, and provide an indication to a user if there is a match. For example, if the third wireless device's location signature matches a stored signature that is associated with a particular position on a stored floor plan, a display of the third wireless device may present the floor plan along with an indication of the particular position.

In some embodiments, a variety of individual channel responses may be included in a composite channel response. By way of example, but not limitation, individual channel responses determined from different OFDM channels, center frequencies, bandwidths, and antennas may be included, and various combinations of such channel responses may be included. In embodiments, an access point or base station may include multiple closely spaced antennas, and each of these antennas may receive OFDM channel packets and determine CSIs for their channel to the transmitter. In the WiFi communication bands around 2.4 GHz and 5.8 GHz, the receiver antennas may only need to be separated by a relatively short distance (e.g., by a few centimeters) to yield independent CSIs from a single transmit antenna. In some embodiments, the number of antennas preferably deployed in an access point or base station may be determined by the number of individual channel responses that may be preferably included in a composite channel response. In some embodiments, the number of antennas in an access point or base station may be increased to meet the number of individual channel responses that may be preferably included in a composite channel response. In some embodiments, the transmitter may also have multiple antennas and WiFi packets transmitted from each transmit antenna to each receive antenna may be used to determine individual channel estimates that may be included in composite channel estimates.

Figure 7:
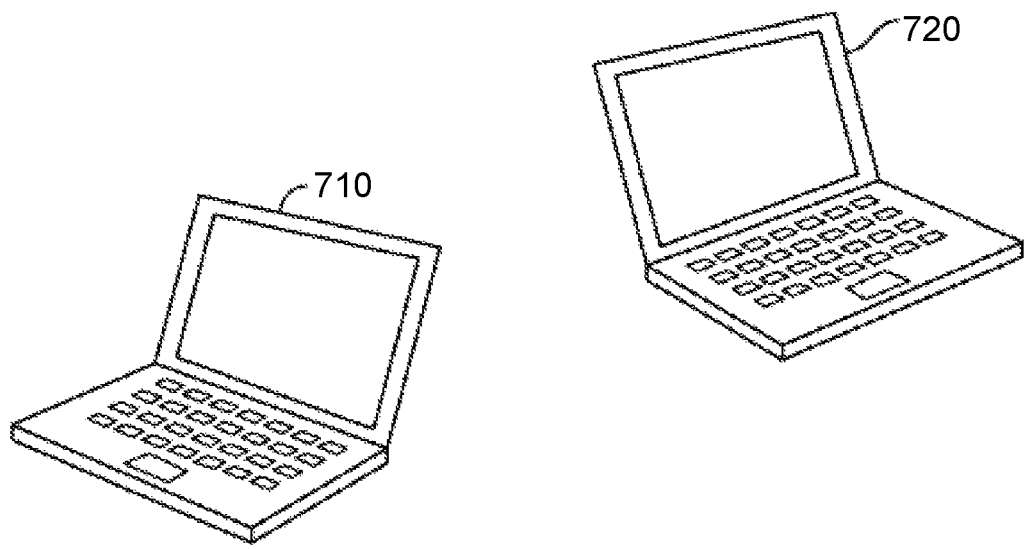
FIG. 7 shows an exemplary positioning system that includes two general purpose computers, according to some embodiments of the present disclosure.

FIG. 7 shows another exemplary embodiment of the positioning system that includes two general purpose personal computers (PCs) 710, 720. Each computer 710, 720 includes one or more WiFi antennas. Each WiFi antenna can include zero or more transmitter (TX) antenna and zero or more receiver (RX) antenna. Each computer 710, 720, also includes a wireless adapter card (e.g., an Intel 5300 wireless adapter card) that is configured to determine channel state information for each TX and/or RX antenna pairing and for each WiFi packet sent between the two computers 710, 720. The example described here is for a system that was demonstrated in a laboratory and is not meant to be limiting. That is, not just PCs, but any device may comprise TX and/or RX antennas, and may comprise one, two or more than two antennas. Any wireless adapter card that can be used to determine the channel state information using any wireless protocol can be used to implement the devices, systems, techniques and methods described herein.

The first computer 710 may send WiFi communication packets and/or data to the second computer 720. In some embodiments, the sending device may be referred to as a WiFi transmitter. The wireless adapter card (e.g., the Intel 5300 wireless adapter card) is configured to support multiple input, multiple output (MIMO) functionality. Using the MIMO capability of the wireless adapter card, the computers 710, 720 can use a variety of configurations to estimate channel state information.

Figure 8:
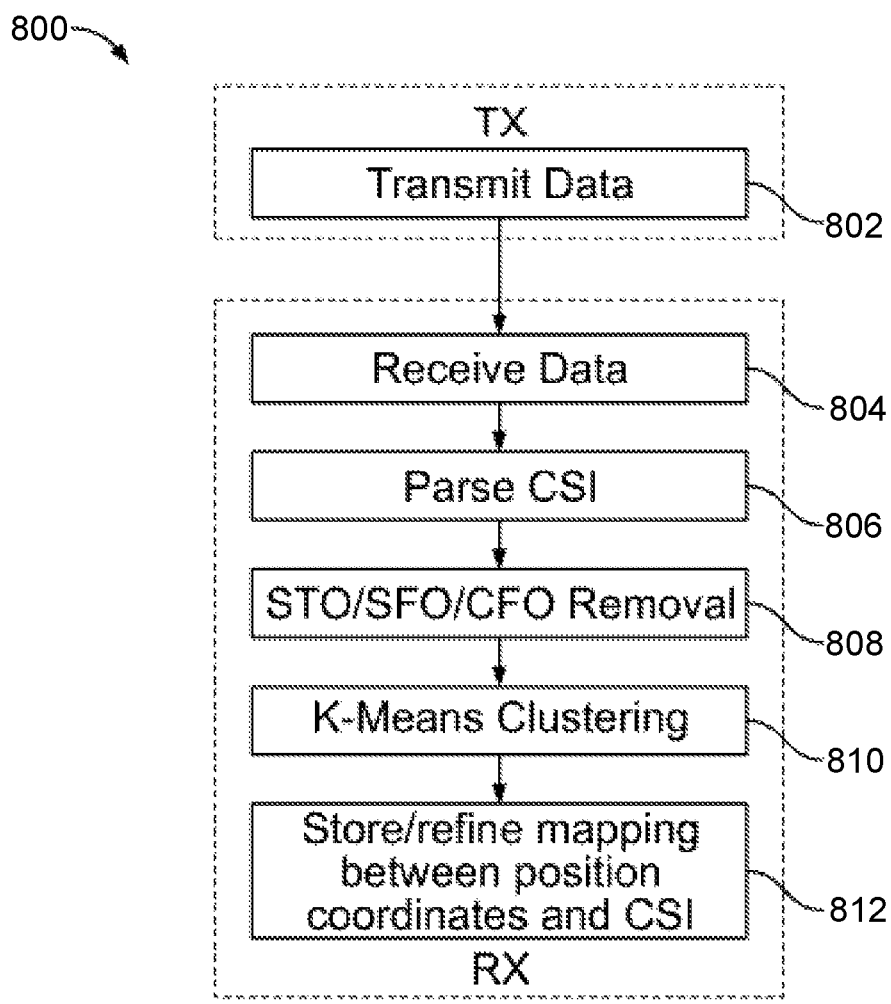
FIG. 8 shows a flow diagram that illustrates a training phase methodology, according to some embodiments of the present disclosure.

As described briefly above, the computers 710, 720 may undergo a training phase (e.g., for building a database that has information on the mapping between positional coordinates and channel state information). FIG. 8 shows a flow diagram 800 illustrating a training phase methodology that is performed for each TX/RX antenna pair. For example, if the first computer 710 has two TX antennas and the second computer 720 has two RX antennas, the training phase is performed by using the first TX antenna to transmit first data and using the two RX antennas to receive the first data, then using the second TX antenna to transmit second data and using the two RX antennas to receive the second data. Each TX antenna transmits data (block 802) that pass through a wireless multipath channel and are received by each RX antenna (block 804). The transmissions can expose information that represents channel attenuation and phase shifts for each transmission, which is sometimes referred to as channel state information (CSI). The CSI of the transmissions is then parsed (block 806).

In some implementations, the attenuations of the various CSIs may be substantially correlated, but the phase shifts of the CSIs may be significantly different from each other. In some implementations, the differences in the phase shifts across different CSIs may be due to synchronization issues between the TXs and the RXs, such as symbol timing offset (STO), residual sampling frequency offset (SFO), and residual carrier frequency offset (CFO). Such synchronization issues may degrade the correlation performance between the various CSIs (e.g., even if the CSIs are captured at the same locations). To minimize the synchronization issues, at least a portion of the STO and/or the SFO and/or the CFO is removed (block 808). In some implementations, the STO and/or SFO and/or CFO is removed by performing a linear fitting on an unwrapped phase of the CSIs.

Following the STO/SFO/CFO removal (block 808), K-means clustering is performed on the CSIs (block 810). In some implementations, the phases of the CSIs can be classified into several groups. CSIs that are classified in the same group may be highly correlated with each other, while CSIs that are classified into different groups may be minimally correlated with each other. To fully describe the CSIs without losing any information, a K-means clustering algorithm can be applied to the CSIs. The K-means clustering algorithm is an unsupervised algorithm that can be used to classify data in any dimension. The algorithm starts by randomly identifying K centroids and measuring the distance between the remaining data and the centroids. This process can be performed iteratively, and the process may arrive at a specific clustering such that the distance inside one cluster is small, and the distance between two clusters is large. The parameter K may be finely tuned to achieve optimality in clustering as well as robustness against environmental change. Information related to mappings between position coordinates (e.g., the positional coordinates of the first computer 710 and/or the second computer 720) and the CSI is then stored and/or refined in a database (block 812). In some implementations, the centroids can be kept as representative CSIs, and other CSIs may be discarded (e.g., to reduce the amount of information stored in the database).

Figure 9:
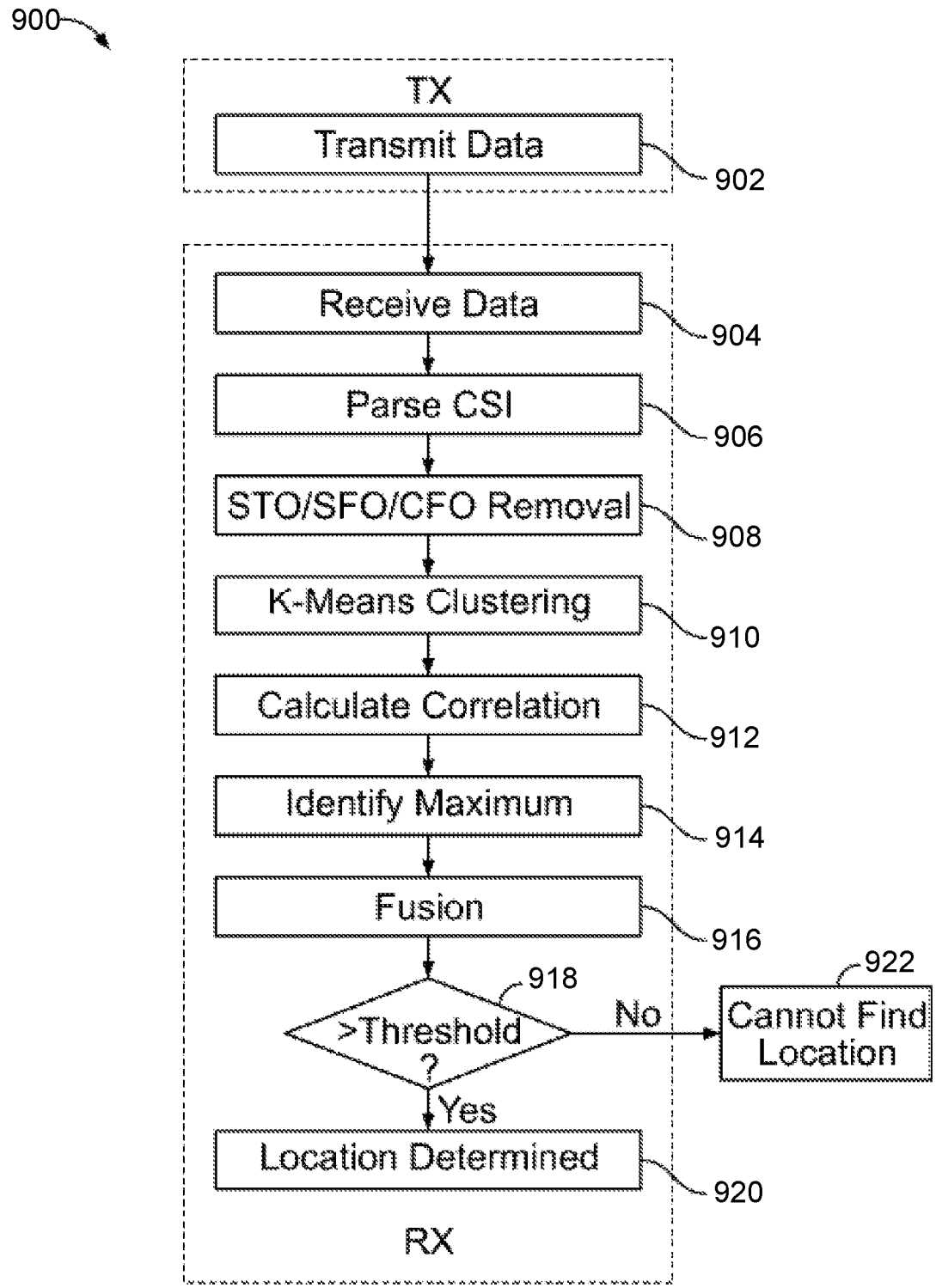
FIG. 9 shows a flow diagram that illustrates a localization phase methodology, according to some embodiments of the present disclosure.

Following the training phase, the computers 710, 720 may undergo a localization phase (e.g., for determining a location of the first computer 710 and/or the second computer 720). FIG. 9 shows a flow diagram 900 illustrating a localization phase methodology that is performed for each TX/RX antenna pair. Each TX antenna transmits data (block 902) that passes through a wireless multipath channel and is received by each RX antenna (block 904). The transmission can expose information that represents channel attenuation and phase shifts for each transmission (e.g., CSI). The CSI of the transmissions is then parsed (block 906), at least a portions of the STO/SFO/CFO of the CSIs is removed (block 908), and K-means clustering is performed on the CSIs (block 910) (e.g., in a similar fashion as described above with reference to FIG. 8).

Following the K-means clustering (block 910), each CSI from the localization phase is correlated with the CSIs from the training phase (block 912) (e.g., which are stored in the database). The maximum value among the correlations between the various CSIs is identified (block 914). Correlating each localization phase CSI with each training phase CSI in an interactive fashion results in the formation of a confusion matrix. As mentioned above, the steps associated with blocks 902-914 are performed for each TX/RX antenna pair of the computers 710, 720, and a confusion matrix is formulated for each pair. For each transmitter antenna, the "transmit data" 902 step is performed once and the steps 904 to 920 are performed with respect to each receiver antenna that receives the transmitted data. The confusion matrices are fused (e.g., averaged) to form one fused confusion matrix (block 916). The highest correlation in the fused confusion matrix indicates the estimated current position of one or both of the computers 710, 720.

In some implementations, the correlations are represented by values that indicate the degree of correlation. The value may be a focusing gain or a resonating strength, as described in detail above. A threshold may be set such that the highest correlation in the fused confusion matrix needs to be greater than the threshold in order to accurately indicate the estimated position. If the value of the highest correlation in the fused confusion matrix satisfies the threshold (block 918), accurate location information can be determined, and the localization phase is complete (block 920). If the value of the highest correlation in the fused confusion matrix does not satisfy the threshold (block 918), the positioning system generates an output indicating that accurate location information cannot be determined (block 922).

Stored and/or Generated Channel Responses

In some embodiments, a database of reference channel responses and/or reference time-reversed channel responses may be established. An exemplary database may include reference channel responses for a venue in multiple configurations. For example, a database may include channel responses for the venue with and without people, with doors/windows/objects oriented in certain positions and/or poses, and the like. In exemplary embodiments, a database may include venue information such as floorplans, 3-dimensional "floorplans" (3D floorplans), location of the venue within a larger venue, street address, GPS coordinates, and location information derived from other indoor positioning systems such as those based on received signal strength measurements/predictions, time-of-flight measurements/predictions, angle-of-arrival measurements/predictions, differential time-of-flight and/or angle-of-arrival measurements/predictions, electro-magnetic field measurements/predictions, stray signature measurements/predictions, position-dependent signature measurements/predictions, motion sensors, pressure sensors, Bluetooth sensors, Near-Field Communication (NFC) sensors, thermal sensors, light sensors, RF sensors, and the like.

In some embodiments, a database may include reference channel responses for multiple venues. For example, indoor position information may be obtained by devices at various locations, and the devices may send measured and/or predicted reference channel responses along with the indoor position information to a database and the database (or, e.g., multiple coordinated databases) may store this information. In some embodiments, a database may receive and store information when venues are calibrated and/or pre-calibrated. Such calibration or pre-calibration may be performed when locators are installed and may be performed using any and all of the calibration techniques discussed above.

In some embodiments, a database may receive information when floorplans and/or 3-D floorplans of a venue are available and calculations are performed to estimate reference channel responses in the venue. In some embodiments, a database of reference channel responses and/or reference time-reversed channel responses may be stored at one or more locations in a network and may be accessible to multiple users and/or indoor positioning systems located throughout the world. In some embodiments, a database may store reference channel responses that have been processed in anticipation of being used in a classification and/or data pattern matching scheme. For example, classification schemes can include similarity or matching or correlation of waveforms, virtual time reversal processing techniques, pattern recognition and/or matching techniques, linear and/or nonlinear support vector machines and/or support vector networks techniques, machine learning techniques, data mining techniques, statistical classification techniques, tagging techniques, and/or kernel tricks and the like.

In some embodiments, indoor positioning systems may transmit received waveforms and/or channel responses and/or time-reversed channel responses and/or time-reversal resonating strengths and/or classification techniques and/or data and/or results to an information repository over wired and/or wireless network resources. In some embodiments, the information repository may include databases that can be accessed by at least two locators.

Both real time-reversal communication and positioning systems may differ from "idealized" systems in a number of ways. For example, in some embodiments, the number of multipath signals that can be captured at a device may be a subset of the total number of multipaths generated by the environment. In some embodiments, a first device may detect, digitize (or sample) and process a portion of a transmitted signal that travels directly along a line-of-sight between a first device and a second device. In some embodiments, a first device may detect, digitize (or sample) and process one or more multipath signals that arrive at the device within a time delay of the direct, line-of-sight signal. Such a time delay may be referred to as a time delay window or a channel length. In some embodiments, the time delay window may be variable and may be controlled by hardware and/or software in a device. In some embodiments, a first device may detect, sample and process one or more multipath signals with particular amplitudes. In some embodiments, the particular amplitude may be an amplitude above a threshold amplitude and the threshold amplitude may be fixed or may be variable. In some embodiments, the particular amplitude may be controlled by hardware and/or software in a device. In exemplary systems, different devices my collect different numbers of multipath signals and may have different settings for the time delay window or channel length and/or the amplitude threshold.

In some embodiments, analog-to-digital converters (ADCs) and digital-to-analog converters (DACs) may be used in interfaces between analog and digital circuitry. In some embodiments, the ADCs and/or DACs may utilize up to two (2) bits of resolution, up to four (4) bits of resolution, up to six (6) bits of resolution, up to eight (8) bits of resolution, up to ten (10) bits of resolution, up to twelve (12) bits of resolution or more bits of resolution. In some embodiments, the ADCs and/or DACs may adaptively adjust the number of bits of resolution that are being used to digitize a signal. In exemplary embodiments, an ADC or DAC in a device may utilize 4 bits of resolution under normal operating conditions but may increase the number of bits of resolution to improve the temporal and/or spatial focusing effect of the system. In some exemplary embodiments, an ADC or DAC in a device may utilize 8 bits of resolution under normal operating conditions but may decrease the number of bits of resolution to reduce the power utilization of the device. The number of bits of resolution of either or both of ADCs and DACs may be an adjustable parameter in a wireless transmitter and/or receiver. The number of bits of resolution of either or both of ADCs and DACs may be adjusted by a feedback loop and/or under software control. The number of bits of resolution may be a user settable parameter and may be accessed and/or set using a user interface and/or and application running on a device of a wireless positioning and/or communication system. In some embodiments, the number of bits of resolution may be based on one or more characteristics of a particular environment of the wireless positioning and/or communication system.

In some embodiments, wide bandwidth systems may benefit from analog-to-digital converters (ADCs) and digital-to-analog converters (DACs) with relatively high sampling rates. For example, a wireless positioning and/or communication system with a 125 MHz receiver bandwidth might use ADCs and DACs with sampling rates higher than 250 MHz. In some implementations, a wideband indoor positioning system may use customized radio transmitters and receivers and ADCs and DACs with quoted sampling rates of 500 MHz. In some implementations, broader band operation of systems may use ADCs and DACs with GHz sampling rates.

In exemplary embodiments, devices may have single input antennas or receivers and/or single output antennas or transmitters. In some embodiments, devices may have multiple input antennas or receivers and/or multiple output antennas or transmitters. In this disclosure, it should be understood that first and second devices may include single or multiple input and/or output antennas and/or single or multiple receivers and/or transmitters. In some implementations, different antennas, transmitters, receivers, and/or transceivers may be designed to operate at similar carrier frequencies or in similar regions of the electromagnetic spectrum, or they may be designed to operate at different carrier frequencies or in different regions of the electromagnetic spectrum. Antennas, transmitters, receivers, and/or transceivers may have different bandwidths and may comprise different hardware components, circuits, processors, software, firmware and the like.

In some embodiments (e.g., with multiple antennas, transmitters, receivers, and/or transceivers), the multiple antennas, transmitters, receivers, and/or transceivers may operate completely independently of each other or they may operate in conjunction with each other. In some embodiments, a subset of antennas, transmitters, receivers, and/or transceivers in a device may operate independently of others or in conjunction with others. In some embodiments, the multiple antennas, transmitters, receivers, and/or transceivers may share one or more hardware components and/or software code. In some embodiments, the multiple antennas, transmitters, receivers, and/or transceivers may operate simultaneously, independently or in a synchronized manner. For example, one or more of the antennas, transmitter, receivers, and/or transceivers may utilize frequency hopping techniques, and the frequency hopping may be coordinated amongst the various antennas, transmitters, receivers, and/or transceivers.

In this disclosure, the use of the term device and/or terminal device may mean a device with single or multiple transmitters and/or with single or multiple receivers and/or with single or multiple antennas. The term receiver may mean a single receiver or multiple receivers and/or a single antenna or multiple antennas. The term transmitter may mean a single transmitter or multiple transmitters and/or a single antenna or multiple antennas. The term transceiver may mean a single transceiver or multiple transceivers and/or a single antenna or multiple antennas. In some examples, a device may be any of a transmitter, a receiver, and a transceiver (a combination of a transmitter and a receiver).

In some embodiments, it is envisioned that wireless networks using the disclosed technology may comprise at least one device, and such networks may comprise two devices, three devices, or more. In some embodiments, devices may be identified as transmitters or receivers, but it should be understood that the devices could also be transceivers, radios, software radios, handsets, mobile devices, computers, routers, modems, and the like. Devices may be fully bi-directional or they may be configured to have more functionality as transmitters or as receivers or to support different data rates, protocols, power levels and the like in the transmit and receive modes. Multiple access points may communicate back and forth with each other, and multiple terminal devices may communicate back and forth with each other. In some embodiments, an access point may be a fixed module that allows wireless devices to be connected to a network (e.g., a wired network, another wireless network, etc.). Access points may support a wide variety of networking protocols and/or transmission protocols and may include or may be connected to additional computing engines and/or devices to achieve enhanced performance. Access points may be routers, modems, transmitters, repeaters, and the like, and may be the signal source to support hot spots, local area networks, cells, microcells, nanocells, picocells, femtocells, and the like. Access points may support multiple wireless transmission standards, formats and protocols including, but not limited to time-reversal protocols, WiFi, 802.11xx, Bluetooth, Bluetooth LE, Zigbee, Near Field Communications (NFC), infrared communications, orthogonal frequency division multiple access (OFDMA), code division multiple access (CDMA), and the like.

In some implementations, probe signals may be wirelessly transmitted using either omnidirectional or directional antennas, and the probe signal can produce a multipath channel response signal at a locator and/or receiver. In some implementations, placing reflectors around an antenna to purposely reflect or scatter a signal in many directions or in a preferred direction may increase the number of propagation paths and may improve signal quality in the wireless systems described herein.

Figure 10:
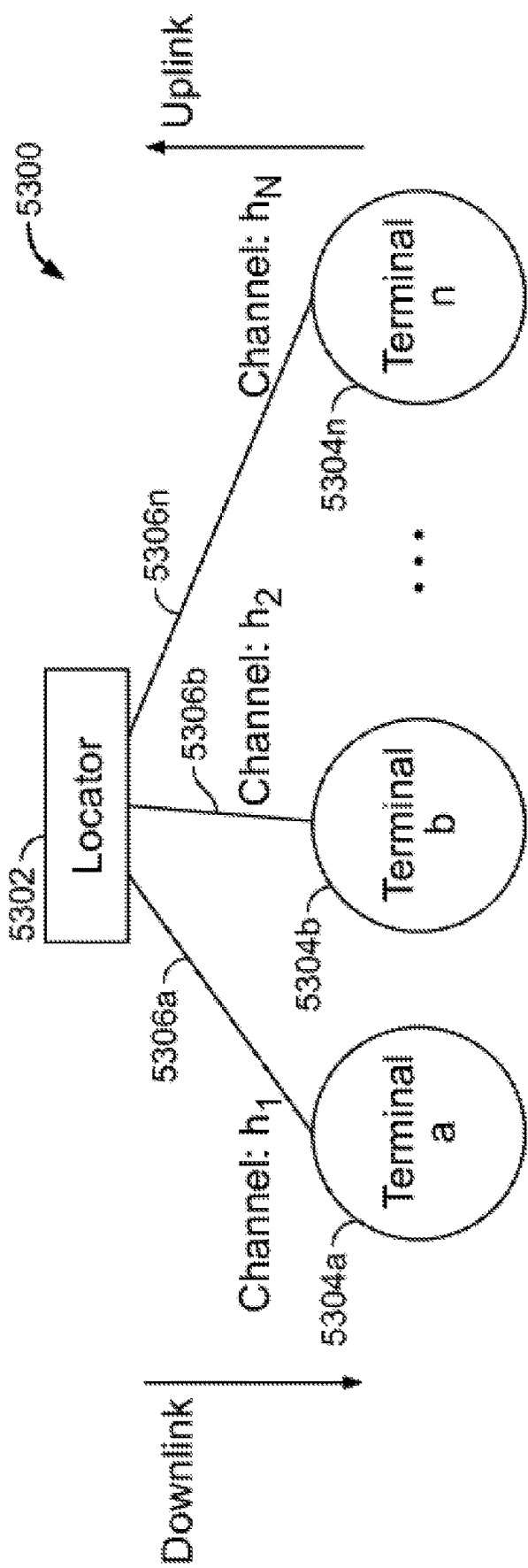
FIG. 10 shows an exemplary multi-user positioning system that includes a locator and multiple terminal devices, according to some embodiments of the present disclosure.

In some implementations, multiple devices can communicate simultaneously with a locator or access point or base station. In exemplary embodiments, a single locator may be used to determine the position of more than one device. For example, FIG. 10 shows an exemplary multi-user positioning system 5300 that includes a locator 5302 and multiple terminal devices (e.g., 5302a, 5302b, 5302n, collectively 5304). Each of the terminal devices 5304 is associated with a multipath wireless channel (e.g., 5306a, 5306b, 5306n, collectively 5306) between itself and the locator 5302. Each multipath wireless channel 5306 represents two or more multiple signal propagation paths between the corresponding terminal device 5304 and the locator 5302. In some implementations, all the devices (including the locator 5302 and the terminal devices 5304) can operate at the same frequency band, and the system 5300 can operate in multipath environments. For the downlink to the terminal devices 5304, the locator 5302 can send multiple messages (either independent or non-independent) simultaneously to multiple selected terminals 5304. In some examples, the locator 5302 can transmit data to the terminal devices 5304a, 5304b, 5304n, and can also determine the positions of the terminal devices 5304a, 5304b, and 5304n.

In some implementations, the terminal device 5304 can be a movable device, such as a mobile phone, a camera, a laptop computer, a tablet computer, a wearable computing device, a pair of eyeglasses, a helmet, a pair of goggles, a car, a personal transportation device, a robot, a robotic arm, an unmanned aerial vehicle, a radio, an audio player, a health monitor, a speaker, a pair of headphones, an appliance, a security system, a piece of art, an object, a piece of luggage, a weapon, an identification device, an object tracker, a name tag, a clothing tag, a merchandise tag, a packaging box, a card, a credit card, a pen, a stylus, a watch, a bracelet, a necklace, a thing on the Internet of Things (IoT), a cart, a thermostat, a monitoring device, a sensor, a computer peripheral, and the like. In some implementations, the terminal device 5304 can be a module that is attached to a device, e.g., such as one or more of the movable devices described above. For example, the terminal device 5304 can be a dongle attached to a movable electronic device.

When a terminal device (e.g., one of the terminal devices 5304) experiences a change in orientation (e.g., such that the antenna points to different directions), the multiple paths propagated by the probe signals may be different. Thus, even if the terminal device 5304 is at the same or a very similar location, a change in orientation of the terminal device 5304 may cause the locator 5302 to calculate different channel impulse responses based on the received probe waveforms. If the terminal device 5304 is intended to be held at multiple orientations (e.g., users may hold mobile phones at various orientations), then during the training phase, the terminal device 5304 may be held at various orientations, and the locator 5302 may determine channel impulse responses that correspond to the various orientations. The coordinates of each position may map to a set of channel impulse responses corresponding to different orientations of the terminal device at the position.

Different models of terminal devices may have different types of antennas that may have different antenna patterns and/or signal lobes. In some implementations, the positioning system 5300 may be designed to support multiple types of terminal devices (e.g., several models of mobile phones and tablet computers from several manufacturers). In some implementations, during the training phase, various types of terminal devices may be placed at each position so that the locator 5302 can determine the channel impulse response for each type of terminal device. In this way, for each position in a venue, a database (e.g., a database that stores location information, such as database 692 in FIG. 4) can include information on the channel impulse responses associated with the various types of terminal devices.

In some implementations, when using a terminal device 5304 to perform position determination, the terminal device 5304 may perform a handshaking process with the locator 5302 to allow the locator 5302 to obtain channel information and timing information. The terminal device 5304 may also send information about the particular type (e.g., make and model) of the terminal device 5304 to the locator 5302. During the matching process, the locator 5302 may compare the measured channel impulse response with pre-stored channel impulse responses associated with the particular type of terminal device to find a match.

In some implementations, one or more persons may occupy a venue in which the positioning system 5300 is used. Due to movements of the people, the channel impulse response associated with a particular position may vary over time. Thus, during the training phase, for each position, the channel impulse responses may be measured at various time periods of the day to account for such differences, and the multiple channel impulse responses may be stored in the database.

In some implementations, the locator 5302 can be part of a mobile or stationary device. For example, the locator 5302 can be implemented as part of a sensor module, a controller, a mobile phone, a laptop computer, a desktop computer, a modem, a router, an access point, a base station, or an electronic appliance that communicates wirelessly with multiple other devices.

In some implementations, the locator 5302 and terminal devices 5304 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims. For example, the devices that communicate with the locator or base station can be different from those shown in the figures and exemplary embodiments. Also, the time-reversal positioning system 600 can operate at a radio frequency in a range between 0.1 GHz to 100 GHz. That is, when the terminal device 654 sends the probe signal, the carrier frequency of the probe signal can be in a range between 0.1 GHz to 100 GHz. For example, the bandwidth of the probe signal can be equal to or greater than 20 MHz.

The time-reversal positioning systems described herein (e.g., the time-reversal positioning system 600 of FIG. 4) can be used in combination with other positioning systems, such as those based on Wi-Fi, Bluetooth, and/or cellular signals. For example, a mobile phone may determine a coarse position within a venue based on Wi-Fi and/or Bluetooth and/or cellular signals with an accuracy of several meters and then use the time-reversal positioning system to determine a fine position with an accuracy of a few centimeters or millimeters. When a coarse position is available, a time-reversal classifier (e.g., the time-reversal classifier 690) can access a database (e.g., the database 692) and retrieve pre-stored information associated with the coarse position and positions in the vicinity of the coarse position, thereby significantly reducing the number of convolution operations that need to be performed.

In some implementations, the terminal devices described herein (e.g., the terminal device 654) may be used such that the height of the terminal device is more likely to be within certain ranges. By using known information about the likely position of the terminal device in the z-direction, it may be possible to reduce the amount of computation required at the locator (e.g., the locator 682) in order to provide a location estimate to the terminal device. For example, in order to determine the position of a terminal device within a room with 10 cm accuracy, a database can be established that includes channel impulse responses for all possible locations where the terminal device may be located. The locations can be represented by grid points spaced 10 cm apart. Assuming that the terminal device can be held by the user at a height from slightly above ground to 6 feet above ground, the database can have about 18 or more data points in the z-direction for each (x, y) coordinate in the room. If the terminal device is typically held within a certain range of heights, the time-reversal classifier can first compare the received channel impulse response with pre-stored channel impulse responses that correspond to grid points in the vicinity of the likely range of heights. This initial comparison may reduce the amount of time needed to determine the location of the terminal device.

For example, suppose the terminal device is a smart watch, and the user accesses an indoor positioning application to determine his or her location in a shopping mall. The watch may include multi-axis accelerometers and other motion sensors that allow the operating system of the watch to determine whether the user is standing or sitting or lying down. When the user is standing and raises the hand to view the screen on the watch, the watch may be typically held within a certain range of heights. Different users may hold the watch at different heights, but for a given user, the watch may be typically held within a certain range of heights in order for the user to be able to view the watch screen comfortably. The watch may store information about such a height range, either from past measurements performed by the indoor positioning application, or from a different application. The indoor positioning application may have a configuration menu that allows the user to input values representing the customary range of heights for various activities, such as standing and sitting.

When the watch sends the probe signal to the locator, the watch can also send information regarding a likely range of heights. For example, the watch may send information to the locator indicating that the watch is likely at a height within a range of, e.g., 110 cm to 130 cm. The locator may then compare the received channel impulse response signal with pre-stored channel impulse response signals in the database that correspond to the height range of 110 cm to 130 cm. If a strong correlation is found between the received channel impulse response signal and a pre-stored channel impulse response signal associated with a height within the height range of 110 cm to 130 cm, the locator may send the coordinates associated with the pre-stored channel impulse response signal to the watch as a preliminary location estimation. The locator may continue to compare the received channel impulse response signal with pre-stored channel impulse response signals in the database that correspond to the height range outside of 110 cm to 130 cm to confirm the accuracy of the preliminary location estimation.

In this way, instead of searching the database for locations that have a relatively large variation of heights (e.g., heights from 10 cm to 180 cm, which correspond to 18 grid points in the z direction in this example), the locator may be able to provide preliminary location information to the watch by searching for locations varying in height from 110 cm to 130 cm (e.g., which correspond to 3 grid points in the z direction), potentially reducing the response time by half or more, resulting in a better user experience.

In some implementations, multiple locators can be used. Each locator can determine the coordinates of the position of the terminal device. The multiple locators can send the coordinates to the terminal device, and the terminal device can determine the final coordinates of the position based on the coordinates provided by the multiple locators (e.g., by averaging the coordinates).

In some implementations, during the training phase, a robot can carry the terminal device to each of the multiple positions, and the probe signal may be transmitted to the base station from each position. In some examples, the terminal device can be part of the robot, the robot can move to each of the multiple positions, and the probe signal can be transmitted from the robot to the base station from each position.

In some implementations, during the training phase, an unmanned aerial vehicle can carry the terminal device to each of the multiple positions, and the probe signal may be transmitted to the base station from each position. In some examples, the terminal device can be part of the unmanned aerial vehicle, the unmanned aerial vehicle can move to each of the multiple positions, and the probe signal can be transmitted from the unmanned aerial vehicle to the base station from each position.

In some implementations, during the training phase, an automatic guided vehicle can carry the terminal device to each of the multiple positions, and the probe signal may be transmitted to the base station from each position. In some examples, the terminal device can be part of the automatic guided vehicle, the automatic guided vehicle can move to each of the multiple positions, and the probe signal can be transmitted from the automatic guided vehicle to the base station from each position.

In some implementations, a terminal device can determine its position based on pre-stored channel responses downloaded from a server. In some implementations, the pre-stored channel responses can be downloaded from the locator. In some examples, the terminal device may download the entire database D of channel responses of, e.g., a shopping mall, convention center, or airport terminal from a server to facilitate navigation within the indoor venue. In some examples, the terminal device may download a portion of the database D covering locations in the vicinity of the terminal device (e.g., to reduce the download file size). The terminal device can determine a coarse position based on, e.g., Wi-Fi, Bluetooth, or cellular signals, and send data about the coarse position to the server. The terminal device may then download, from the server, information about channel responses associated with positions at or near the coarse position. The terminal device can receive a channel probing signal from a beacon and estimate a channel response based on the received channel probing waveform. The terminal device can determine a time-reversed signal based on the estimated channel response, and determine a fine position of the terminal device based on the time-reversed signal and the downloaded channel responses. One of the advantages of such an approach is that only the terminal device knows its own precise location, while the server may only know that the terminal device is within the geographical region covered by the downloaded database. This may be useful in preserving privacy of the user.

In some implementations, the locator may broadcast a combined signal that is a combination of multiple downlink signals, in which each downlink signal has coordinate data associated with a particular position, and the downlink signal has a waveform configured to focus at the particular position. The locator may perform a handshake process with a terminal device to provide channel response information and timing information useful for the terminal device to determine the timing of the broadcast of the combined signal. The handshaking process may occur periodically so that up-to-date information is maintained. The terminal device may determine its location based on the coordinate data broadcast by the locator. The locator may broadcast coordinate data to a subset of locations in a room at a time, and broadcast coordinate data to different subsets of locations in the room at different times, such that coordinate data are broadcast to every intended location in the room over a period of time. One of the advantages of such an approach is that the locator may not need to determine the location of the terminal device, and only the terminal device may know its own precise location. This may be useful in preserving privacy of the user.

In some examples, each subset of locations may cover a small region in the room, in which different locations within the subset may be close to each other. Each subsequent broadcast from the locator may cover a different region in the room. Similar to scanning a spotlight across different regions of the floor of a room, the locator may broadcast the coordinates to various locations within a small region at a time, and scan the region across the three-dimensional room such that after a period of time, the coordinate data have been broadcast to all grid points in the room. For example, in a 10 m by 10 m by 3 m room with 10 cm spacing between grid points, the base station may broadcast coordinate data to 10×10×10=1000 locations in a 90 cm by 90 cm region at a time, in which the distance between adjacent targeted locations is 10 cm. Subsequently, the locator may broadcast coordinate data to an adjacent 90 cm by 90 cm region, and so forth. In this example, broadcasting coordinate data to all 100×100×30 grid points may require about 10×10×3=300 broadcasts.

In some examples, each subset of locations may cover a large region in the room, in which different locations within the subset are spaced farther apart from each other (e.g., as compared to the previous example). Each subsequent broadcast from the base station may also cover a large region that is shifted slightly in a certain direction (e.g., in the x-, y-, or z-direction). The locator may broadcast the coordinates to various locations within a large region at a time and shift the region slightly in each subsequent broadcast such that the coordinate data are broadcast to all grid points in the room. For example, in a 10 m by 10 m by 3 m room, with 10 cm spacing between grid points, the base station may broadcast coordinate data to 10×10×3=300 locations in a 9 m by 9 m by 2 m region at a time, in which the distance between adjacent targeted locations in the 9 m by 9 m by 2 m region is about 1 m. Subsequently, the locator may broadcast coordinate data to another 9 m by 9 m by 2 m region, shifted from the previous region by 10 cm, and so forth, first shifting in the x-direction, then shifting in the y-direction, then shifting in the z-direction. After about 10×10×10=1000 broadcasts, the coordinate data have been broadcast to all 100×100×30 grid points in the room.

In some implementations, he locator may be used in connection with motion sensors in the venue such that the locator starts to broadcast the coordinate data upon detection of movement in the room (e.g., people moving in the room). There may be several motion sensors in the venue, each covering a portion of the venue, and when one or more particular motion sensors are activated, the locator broadcasts coordinate data only to the regions associated with the activated motion sensors. Such techniques may prevent unnecessary broadcasts by the locator.

In some implementations, during the training phase, the terminal device does not necessarily have to be placed at grid points of an array. For example, the terminal device can be placed at random positions, and the database can store the coordinates of those positions and their associated channel responses. The information in the database can be sorted according to the coordinates to facilitate faster retrieval.

Additional examples of positioning systems based on time-reversal technology are described in the article "A Time-Reversal Paradigm for Indoor Positioning System," which is part of U.S. patent application 62/025,795. The article also provides experimental results of a positioning system based on time-reversal technology. The positioning technology discussed in this document can be implemented in devices used in various time-reversal communication systems, such as those described in the articles "Time-Reversal Massive MIMO: Utilizing Multipaths as Virtual Antennas," "Time-Reversal with Limited Signature Precision: Tradeoff Between Complexity and Performance," and "Joint Waveform Design and Interference Pre-Cancellation for Time-Reversal Systems," which are also included in U.S. patent application 62/025,795. The positioning technology discussed in this document can also be implemented in devices used in various time-reversal communication systems described in U.S. patent application Ser. No. 13/706,342, titled "Waveform Design for Time-Reversal Systems," filed on Dec. 5, 2012, U.S. patent application Ser. No. 13/969,271, titled "Time-Reversal Wireless Systems Having Asymmetric Architecture," filed on Aug. 16, 2013, PCT patent application PCT/US2014/051148, titled "Time-Reversal Wireless Systems Having Asymmetric Architecture," filed on Aug. 14, 2014, U.S. patent application Ser. No. 13/969,320, titled "Multiuser Time-Reversal Division Multiple Access Uplink System With Parallel Interference Cancellation," filed on Aug. 16, 2013, U.S. patent application Ser. No. 14/262,153, titled "Quadrature Amplitude Modulation For Time Reversal Systems," filed on Apr. 25, 2014, U.S. patent application Ser. No. 14/202,651, titled "Time-Reversal Wireless Paradigm For Internet of Things," filed on Mar. 10, 2014. The entire disclosures of the above applications are incorporated herein by reference.

Event Recognition Systems

As mentioned above, in addition to determining the position of an object, the positioning schemes described herein may be used to determine changes in an environment, to recognize gestures, and to monitor a venue for events that may be tracked, stored and/or used to trigger other actions, calculations, communications, alarms, and the like.

An exemplary change in an environment may be the opening or closing of a door. In some embodiments, multiple channel responses (e.g., estimated channel responses) may be measured under different environmental conditions. For example, a device that includes a transmitter and a receiver may be positioned in a venue. A first channel response for the venue may be determined when a door in the vicinity is open. For example, while the door is open, the transmitter may emit a wireless signal that propagates through a wireless channel and arrives at the receiver (e.g., as a multipath wireless signal). The received wireless signal may be processed to yield the first channel response. A second channel response for the venue may also be determined when the door in the vicinity is closed. For example, while the door is closed, the transmitter may emit a wireless signal that propagates through a wireless channel and arrives at the receiver (e.g., as a multipath wireless signal). The received wireless signal may be processed to yield the second channel response. At some later point in time, a third channel response may be determined using the same technique to determine whether the door is open or closed. The third channel response can be compared to the first and second channel responses (and, e.g., one or more other previously obtained channel responses) to determine whether the third channel response is sufficiently similar to one of the other channel responses. For example, if the third channel response is sufficiently similar to the first channel response, it may be determined that the door is open. In contrast, if the third channel response is sufficiently similar to the second channel response, it may be determined that the door is closed. If the third channel response is sufficiently similar to some other channel response, it may be determined that an environmental condition associated with the other channel response was present when the third channel response was obtained. In some embodiments, an object may be considered to be in the vicinity if a change in that object's position, orientation, pose, presence, state, and the like changes a channel response associated with the venue or vicinity.

In some embodiments, there may be more than one door in the vicinity, and the system may be calibrated to determine other positions for any of the various doors. For example, the database of channel responses may include entries associated with a door being opened halfway and/or for a door forming an angle of 10 degrees, 20 degrees, 30 degrees, and the like with the door frame. In addition to doors, the database may include channels responses for windows being up or down or partially open, shades being up or down or positioned somewhere in between, drawers being opened or closed or positioned somewhere in between. In some embodiments, the doors that are monitored may be room doors, closet doors, cabinet doors, garage doors, and the like.

In some embodiments, an object (e.g., a macroscopic object) in an arrangement of objects can be monitored by such positioning systems. For example, a movement within and/or removal of objects from a venue may be detected by the positioning system. In some embodiments, such objects may comprise a pinger and/or a device capable of sending a channel probe signal to a locator. Changes in the channel response may be detected when the object is moved. In some embodiments, a device remote from the object may be capable of sending a channel probe signal. Changes in a channel response between the object (which, e.g., includes a pinger) and the device may be detected, and the change in the channel response may be associated with the movement of an object. In some embodiments, a channel response database may include previously measured channel responses of the venue with and without certain objects and/or combinations of objects. A particular change in the channel response may indicate a certain object has been moved or removed, or that a certain combination of objects may be moved or removed.

In some embodiments, venues such as museums, homes, offices, public buildings and the like, may use positioning systems to monitor the position and/or presence of pieces of art and/or other valuable items within the venue. Stores and or warehouses may use a positioning system to monitor the positions of inventory. The position and/or movement of a person within a space may be monitored to keep the person safe, to determine if a person has left a certain area, and the like. In some embodiments, a positioning system may include additional capabilities to send alerts and/or to activate alarms when certain movements of objects and/or people are determined. In this way, such positioning systems can be useful for security applications.

In some embodiments, a positioning system may be part of a security system. For example, upon determining that a door has been opened, a positioning system may initiate an action such as sounding an alarm, sending a communication to a user, sending a communication to a security company, sending a communication to a law enforcement agency, and the like. In some embodiments, the positioning system may comprise alarms and or communication equipment for initiating such actions.

In some implementations, the degree of similarity between channel responses (e.g., estimated channel responses) can be determined using the time-reversal resonating strength techniques described above. For example, just as a high resonating strength between a newly determined estimated channel response and an estimated channel response stored in a database may be used to determine the location of a device, changes in the resonating strength between two estimated channel responses may be used to determine that something has changed in the environment. For example, referring to the three channel responses of the door example above, if the time-reversal resonating strength of the first channel response and the third channel response is higher than that of the second channel response and the third channel response, the system may determine that the door is open.

Changes in the environment are sometimes referred to as events. A time-reversal positioning system can be used to detect such events. Examples of events that can be detected include, but are not limited to, detecting that a door and/or window has opened or closed, a person has entered a room, a person is carrying something metal into a room, a person with a gun has just walked through the airport lobby, window shades are up, window shades are down, a car has left the garage, a retail item has left a store, a piece of inventory has been moved from its normal position in the warehouse, and the like. A positioning system (e.g., an event recognition system) may indicate the movement of objects and may be able to identify the objects themselves. For example, the system may be configured to determine whether a person is carrying a cell phone or a firearm.

Gesture Recognition Systems

In addition to event recognition, positioning systems may also be able to recognize gestures. Gestures that can be detected may include, e.g., a person raising a hand, swiping his or her arms, kicking a foot, and bending over. In some embodiments, gesture recognition may include recognizing that a person has fallen or has not moved in a certain amount of time. In some implementations, such gesture recognition may be incorporated into a home surveillance system. In some embodiments, such systems may be used in hospitals, rehabilitation, skilled nursing environments, and assisted living environments. In some embodiments, such systems may be installed to monitor elderly people and/or people with limited mobility or special needs who desire to live independently, but who may be fragile or at risk. In some embodiments, emergency response personal may be contacted and/or notified by the recognition system or by an alert system coupled to the recognition system if a person falls or does not move for a certain period of time. Such gesture recognition systems may be applied to gaming systems, indoor surveillance systems, and the like. For the reasons described throughout this disclosure pertaining to multipath propagation, such gesture recognition systems do not necessarily require a line of sight with users in order to recognize gestures that are being made. For example, a person may lift an arm in one room and a locator in another room may associate this gesture with the user's desire to increase the volume on a stereo system (which, e.g., may be in yet another room).

Figure 11:
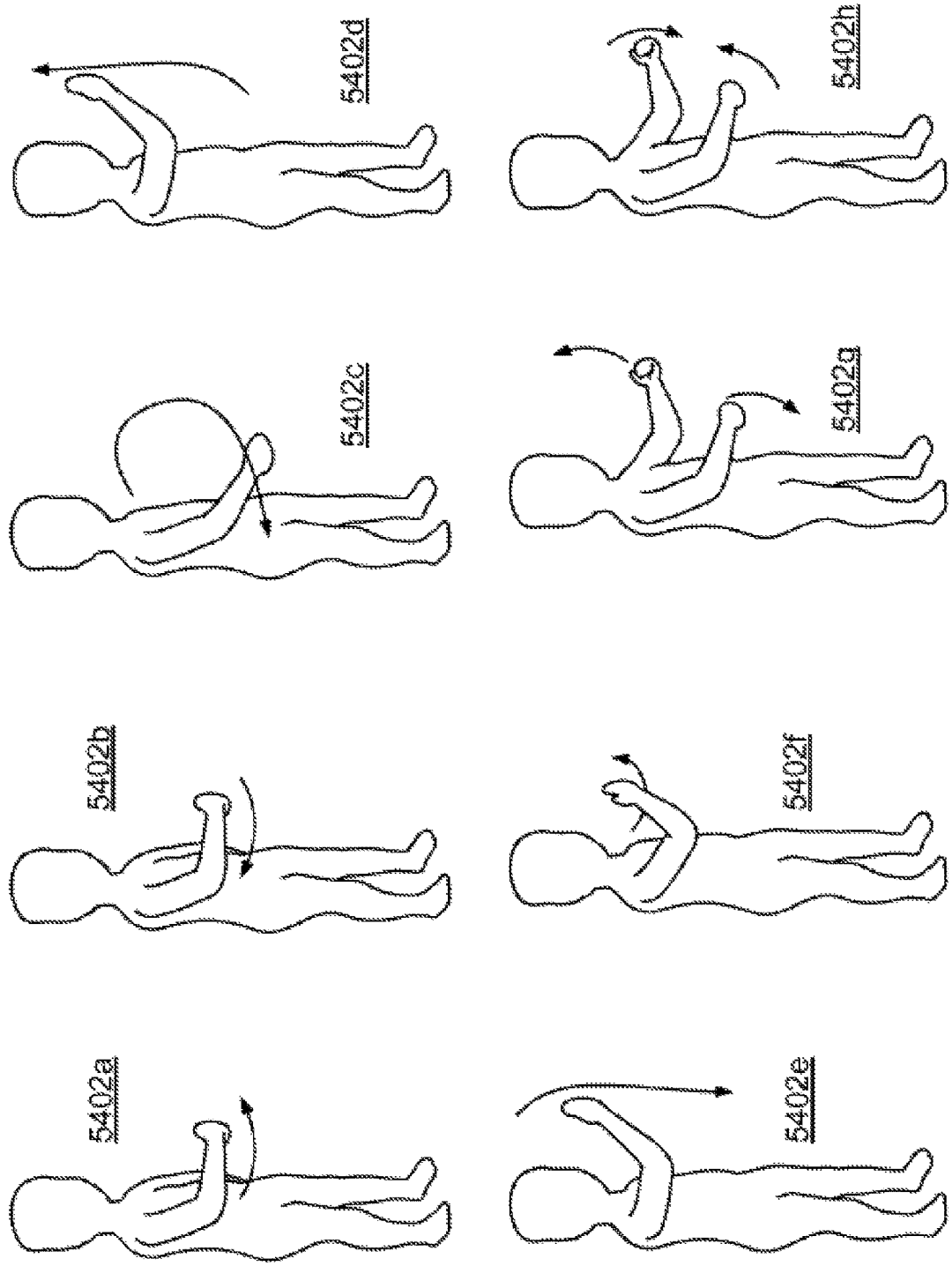
FIG. 11 shows example gestures that may be recognized by a positioning system, according to some embodiments of the present disclosure.

FIG. 11 shows example gestures 5402*a-h* that may be recognized using a positioning system (e.g., a gesture recognition system). Using the systems described herein, changes in the estimated channel response between a terminal device and a locator can be detected. Such changes can include the gestures depicted in FIG. 11. By way of example only, the gesture 5402*a* may cause a screen presented by a display (e.g., a display of a device that is in communication with the positioning system) to swipe to the left. The gesture 5402*b* may cause the screen to swipe to the right. The gesture 5402*c* may cause the screen to rotate clockwise. The gesture 5402*d* may cause the screen to swipe up. The gesture 5402*e* may cause the screen to swipe down. The gesture 5402*f* may cause the screen to rotate counter-clockwise. The gesture 5402*g* may cause the screen to zoom out. The gesture 5402*h* may cause the screen to zoom in. The positioning system can be configured to recognize a number of additional gestures. These additional gestures (as well as the gestures depicted in FIG. 11) can be used to indicate a variety of actions for a variety of devices.

Apart from detecting gestures, in some embodiments, the positioning system can be configured to monitor and/or detect one or more characteristics of a living being (e.g., a person). Some characteristics of a person may result in a unique channel response (e.g., a unique signature). For example, when a person enters a venue that is monitored by a positioning system, the system may detect that something in the venue has changed. By processing received waveforms and/or estimated channel responses and/or estimated time-reversed channel responses, the system may be able to identify not only that a living being has entered the room, but also a characteristic of the living being. For example, the system may be able to identify the particular living being in the room (e.g., whether the living being is a person, a cat, or a dog). In some implementations, the system may be able to identify a particular person based on physical characteristics of the person (e.g., including the person's physical geometry). In some embodiments, reference channel responses may be determined that differentiate children from adults, dogs from cats, monkeys from humans, and the like. In some embodiments, reference channel responses may be used to identify individual living beings, including individual human beings.

In an exemplary demonstration, the positioning system described above can be used to identify people. In this demonstration, a terminal device and a locator are positioned approximately three meters (3 m) apart from each other in a conference room. The system is calibrated by positioning different people between the locator and the terminal device and recording the channel response for each person. Additional channel responses are collected for individuals facing the locator and then turned 180 degrees to face the terminal device. In addition, channel responses are collected for each person positioned sideways (e.g., turned±90 degrees from the "facing the locator" position). The channel response for each person in each of these positions was stored in a database. At a later time, when any of the various individuals stood between the locator and the terminal device, the locator was able to measure the received probe waveform from the terminal device, estimate a channel response, and calculate a time-reversal resonating strength between the newly measured channel response and the stored channel responses. If the resonating strength exceeded a threshold, the individual and his/her position relative to the locator associated with the stored channel response that yielded the highest time-reversal resonating strength were identified. In some embodiments, the system can accurately identify each individual and determine whether the individual is facing the locator, the terminal device, or is rotated by 90 degrees. In some embodiments, the system can distinguish between a person rotated by +90 degrees and −90 degrees relative to the locator or terminal device.

The event recognition systems and the gesture recognition systems described above are examples of positioning systems, and they can utilize the various techniques described herein with respect to positioning systems. For example, in some embodiments, the event recognition system and/or the gesture recognition system can utilize a collective bandwidth B that is greater than 50 MHz. The system can include one or more wireless transmitters that are each at different spatial locations and that are each configured to transmit one or more wireless signals, and one or more wireless receivers that are each at different spatial locations and that are each configured to receive at least one of the one or more wireless signals transmitted from each wireless transmitter. Each of the transmitted wireless signals has a bandwidth and a center frequency. In this example, each of the transmitted wireless signals has a different center frequency. The collective bandwidth B can be defined as follows:

$$B = \sum_{m=1}^{M} \sum_{n=1}^{N_m} \sum_{k=1}^{K} b_{mnk} \quad \text{(Equ. 17)}$$

where the number of the one or more transmitters is M, the number of the one or more wireless signals for the m-th transmitter is $N_m$, the number of the one or more wireless receivers is K, and the bandwidth of the n-th wireless signal from the m-th transmitter that is received by the k-th wireless receiver is $b_{mnk}$. In implementations in which the same transmitter sends multiple wireless signals to the same wireless receiver, the multiple wireless signals may occupy non-overlapping frequency bands.

The positioning system also includes an electronic processor that is coupled to at least the one or more wireless receivers. The processor is configured to compare information derived from the received one or more wireless signals to information (e.g., location information) in a database, determine information about the arrangement of macroscopic objects based on the comparison, and generate an output based on the determined information. In some implementations, the output is a signal that causes another device (e.g., an alarm, a communication device, etc.) to perform an action (e.g., emit an alert, initiate a communication, etc.).

As described in detail above, the information derived from the received one or more wireless signals that is compared to the information in the database spans the collective bandwidth B. In other words, the entirety of the collective bandwidth B is utilized to express the derived information. A variety of techniques can be used that give the system the collective bandwidth B of greater than 50 MHz, including using multiple relatively narrow wireless signals, wireless signals with various center frequencies, wireless signals with various channel bandwidths, wireless signals in various frequency bands, wireless signals transmitted from and/or received from various locations, among others. Irrespective of the particular technique that is utilized by the system to have a collective bandwidth B of greater than 50 MHz, the information derived from the received one or more wireless signals spans the collective bandwidth B. That is, the derived information is derived from one or more received wireless signals that have bandwidths that aggregate to the collective bandwidth B that is greater than 50 MHz.

Handshaking Methods

The following describes two examples of handshaking methods for the channel probing phase. The first method uses pulse position modulation, whereas the second method calculates the correlation of a pseudorandom sequence. Other handshaking methods can also be used in order to obtain channel information.

Least Square (LS) Based Channel Probing Handshaking

The following describes a least square (LS) based handshaking method for the channel probing phase. In this method, the receiver sends the handshaking signal to the transmitter. The transmitter synchronizes with the received signal and estimates the channel response based on the received signal.

Figure 12:
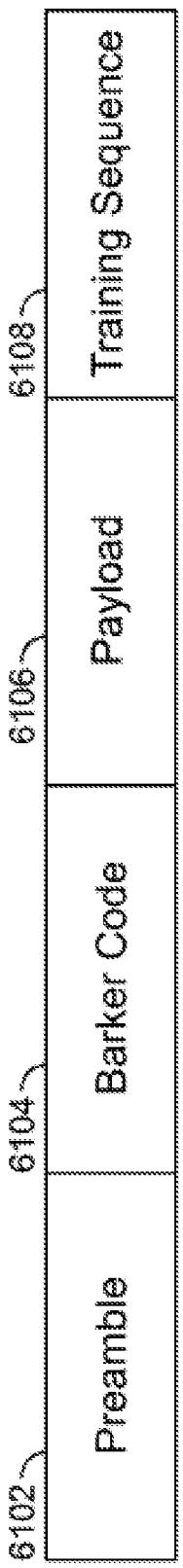
FIG. 12 shows an example of a channel probing signal, according to some embodiments of the present disclosure.

Referring to FIG. 12, in some implementations, a frame of a channel probing signal 6100 transmitted by the receiver includes four consecutive parts: a preamble 6102, a barker code 6104, a payload 6106, and a training sequence 6108. The length of each frame is fixed in this method and known by both the transmitter and the receiver. In some examples, the receiver may send two or more frames of channel probing signals to the transmitter during the channel probing phase to allow the transmitter to obtain more accurate channel and timing information. In some implementations, the accuracy of timing can be improved by increasing the length of the preamble 6102 and Barker code 6104, and the accuracy of channel information can be improved by increasing the length of the training sequence 6108.

Figure 13:
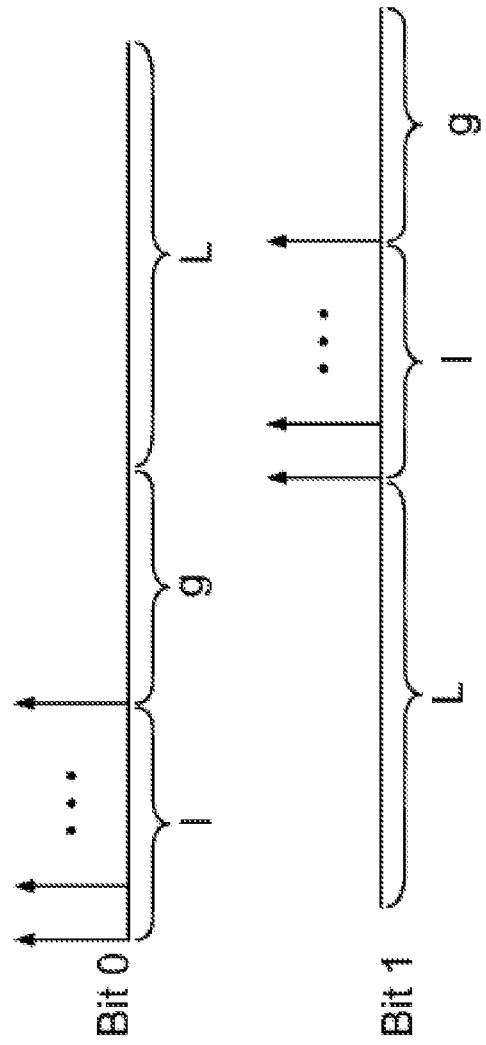
FIG. 13 shows an example of a representation of a technique for modulating at least a portion of the channel probe signal of FIG. 12, according to some embodiments of the present disclosure.

In some implementations, the preamble 6102 is modulated using pulse position modulation (PPM). The pulse position modulation symbols '0' and '1' are shown in FIG. 13. The preamble 6102 includes consecutive pulse position modulation symbol '0's in which L is the length of the multipath channel that is defined by $L = \tau_s / \delta_t$ where $\tau_s$ is the delay spread and $\delta_t$ is the sampling period of the system. In practice, even though the channel length is not exactly known, the transmitter can estimate the channel length based on the typical delay spread of the environment and the sampling rate of the system. In this method, the performance will not be affected if the estimated channel length is longer than the actual channel length. Therefore, the transmitter can overestimate the channel length and set L to be greater than the actual channel length without generating an error.

The barker code 6104 transmitted by the receiver is a code known by both the transmitter and the receiver. The length of the barker code 6104 is $L_b$.

The payload 6106 transmitted by the receiver can be encoded information that is modulated using pulse position modulation. The information may contain the index of the training sequence 6108. The length of the payload 6106 is $L_p$.

Figure 14:
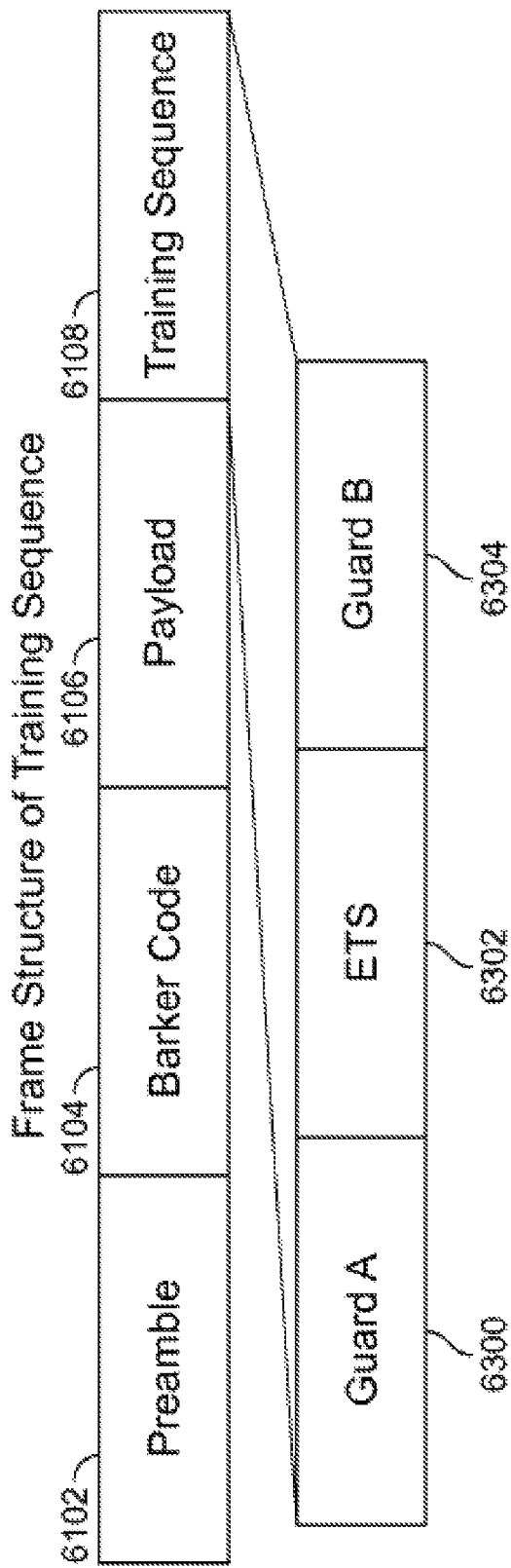
FIG. 14 shows an example of portions of a training sequence of the channel probing signal of FIG. 12, according to some embodiments of the present disclosure.

Referring to FIG. 14, the training sequence 6108 has three consecutive parts, including a guard interval A 6300, an effective training sequence (ETS) 6302, and a guard interval B 6304. In some examples, the guard interval A 6300 is a sequence of '0' bits having a length La, the effective training sequence 6302 is a sequence of '0' and '1' bits having a length Le, and the guard interval B 6304 is a sequence of '0' bits having a length $L_B$ in which $L_B >= L$.

The channel probing signal transmitted from the receiver passes through the multipath channel and reaches the transmitter. The received signal is a convolution of the channel probing signal and the channel response, contaminated by noise. The transmitter will use the received signal to estimate the channel response.

Referring to FIG. 15, upon receiving the channel probing signal, the transmitter determines a synchronization index using sliding window energy detection on the preamble 6102 of the channel probing signal. A graph 6410 shows an example signal received at the transmitter. The sliding window energy detection method uses a moving window 6412 having a window size $L_w = l_p + L$, in which $l_p$ is the length of a PPM symbol. One can define $E_i$ as the average energy accumulated by the window starting from the i-th, $(i+L_w)$-th, $(i+2L_w)$-th, ..., and $(i+(\gamma-1) L_w)$-th sample, in which y is the number of averaging windows, $i \in \{0, 1, 2, ..., L_w-1\}$. The synchronization index $i_s$ is the index i that maximizes the $E_i$, which can be written as follows: $i_s = \mathrm{argmax}_i E_i$. Here, the index i corresponds to the i-th sample in the received signal. After the synchronization index $i_s$ is determined, the other indices are determined using the synchronization index is as reference.

Figures 16, 17:
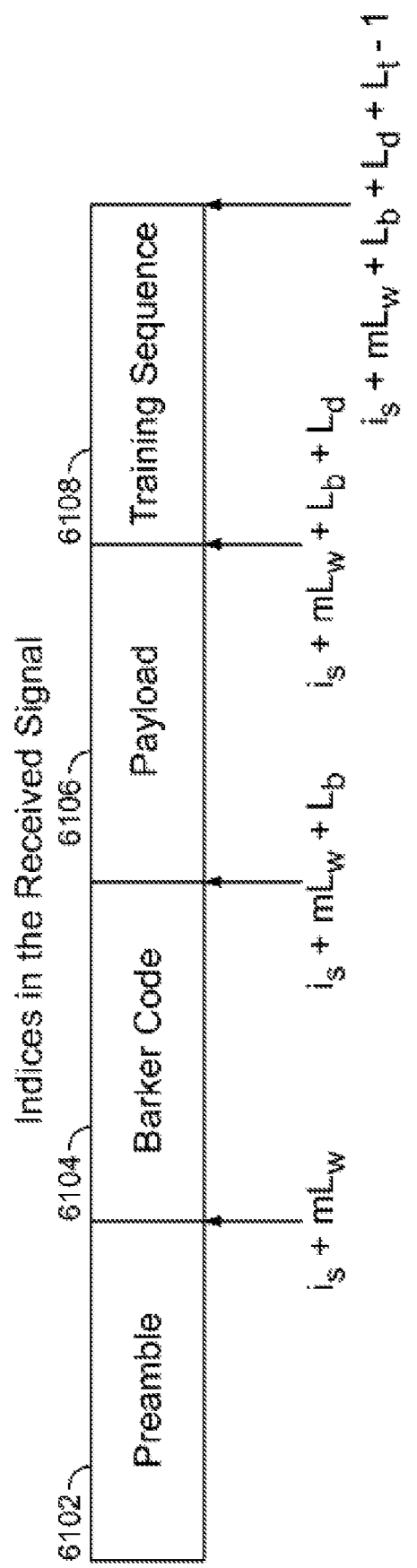
FIG. 16 shows an example of a representation of a technique for confirming a synchronization index, according to some embodiments of the present disclosure.
FIG. 17 shows a representation of a Toeplitz matrix, according to some embodiments of the present disclosure.

Referring to FIG. 16, after obtaining the synchronization index is, the transmitter starts to detect the barker code 6104 to confirm the synchronization. The transmitter demodulates a portion of the received signal from the index $i_s + mL_w$ to the index $i_s + mL_w + L_b - 1$, and compares the demodulated signal portion with a pre-stored barker code sequence, in which $L_b$ is the length of the barker code 6104, $m \in \{0, 1, ... N\}$ with N being a search range set by the user. In some examples, N is set to be greater than the number of pulse position modulation symbols in the preamble. Once the demodulated signal matches the pre-stored barker code, the transmitter is assured that the receiver is in the channel probing phase, and the payload and the training sequence will follow the barker code in the received signal. Moreover, the transmitter knows that the matching index $i_s + mL_w$ is the position in the received signal where the barker code 6104 begins, and the index $i_s + mL_w + L_b - 1$ is the position where the barker code 6104 ends. This information enables the transmitter to obtain information for estimating the channel response.

Because the payload 6106 follows the barker code 6104, the transmitter assumes that the payload 6106 begins at the index $i_s + mL_w + L_b$. Because the payload has a fixed length $L_d$, the transmitter demodulates the portion of the received channel probing signal from index $i_s + mL_w + L_b$ to index $i_s + mL_w + L_b + L_d - 1$, and decodes the demodulated portion to obtain the index q of the training sequence. Here, the index q does not refer to the q-th sample in the received signal. Rather, there is a set of two or more training sequences that is known to both the receiver and the transmitter, and the receiver can choose from any training sequence in the set. The index q indicates which one in the set of training sequences is selected by the receiver.

The transmitter assumes that the training sequence starts at index $i_s + mL_w + L_b + L_d$ of the received signal, and will use the portion of the received signal from index $i_s + mL_w + L_b + L_d$ to index $i_s + mL_w + L_b + L_d + L_t - 1$ to estimate the channel response, in which $L_t = L_e + L$. Let u denote the fraction of the received signal from index $i_s + mL_w + L_b + L_d$ to index $i_s + mL_w + L_b + L_d + L_t - 1$. The transmitter converts u to the estimated channel response using a conversion matrix $C_q$ that corresponds to the index q obtained from the payload. This conversion can be written as:

$$\widehat{CR} = C_q u \qquad \text{(Equ. 18)}$$

where $\widehat{CR}$ is the estimated channel response.

The conversion matrix $C_q$ can be constructed by the training sequence $s_q$ used by the receiver as follows:

$$C_q = (T'T)^{-1} T' \qquad \text{(Equ. 19)}$$

where T is the Toeplitz matrix generated by $s_q$, which is the effective training sequence used by the receiver. The first column of the matrix T is $s_{qe} = [s_q; 0]$, in which 0 is the vector composed of L zeros. Referring to FIG. 17, the first row of the Toeplitz matrix T 6600 is composed of all zeros except for the first element taken from $s_{qe}$. The matrix T 6600 has dimensions $c_m \times c_n$ in which $c_m = L_e + L$ and $c_n = L_a + \tau + L$. The parameter $\tau$ is a compensation factor that needs to be greater than the maximum of synchronization mismatch in the previous step, i.e., the difference between the index in the received signal where the training sequence starts and index $i_s + mL_w + L_b + L_d$, which is the beginning of the training sequence 6108 detected by the transmitter.

Figure 18:
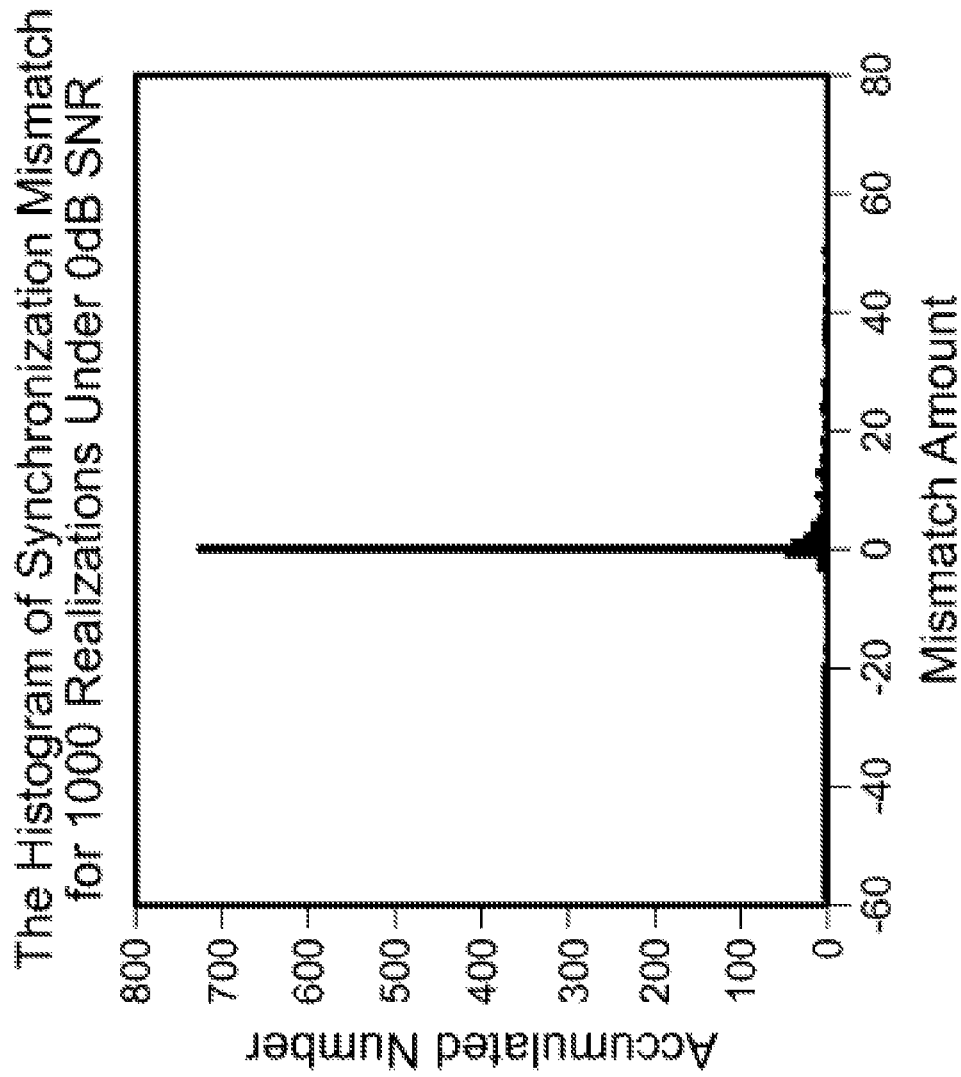
FIG. 18 shows an example of a synchronization mismatch histogram, according to some embodiments of the present disclosure.
Figure 19:
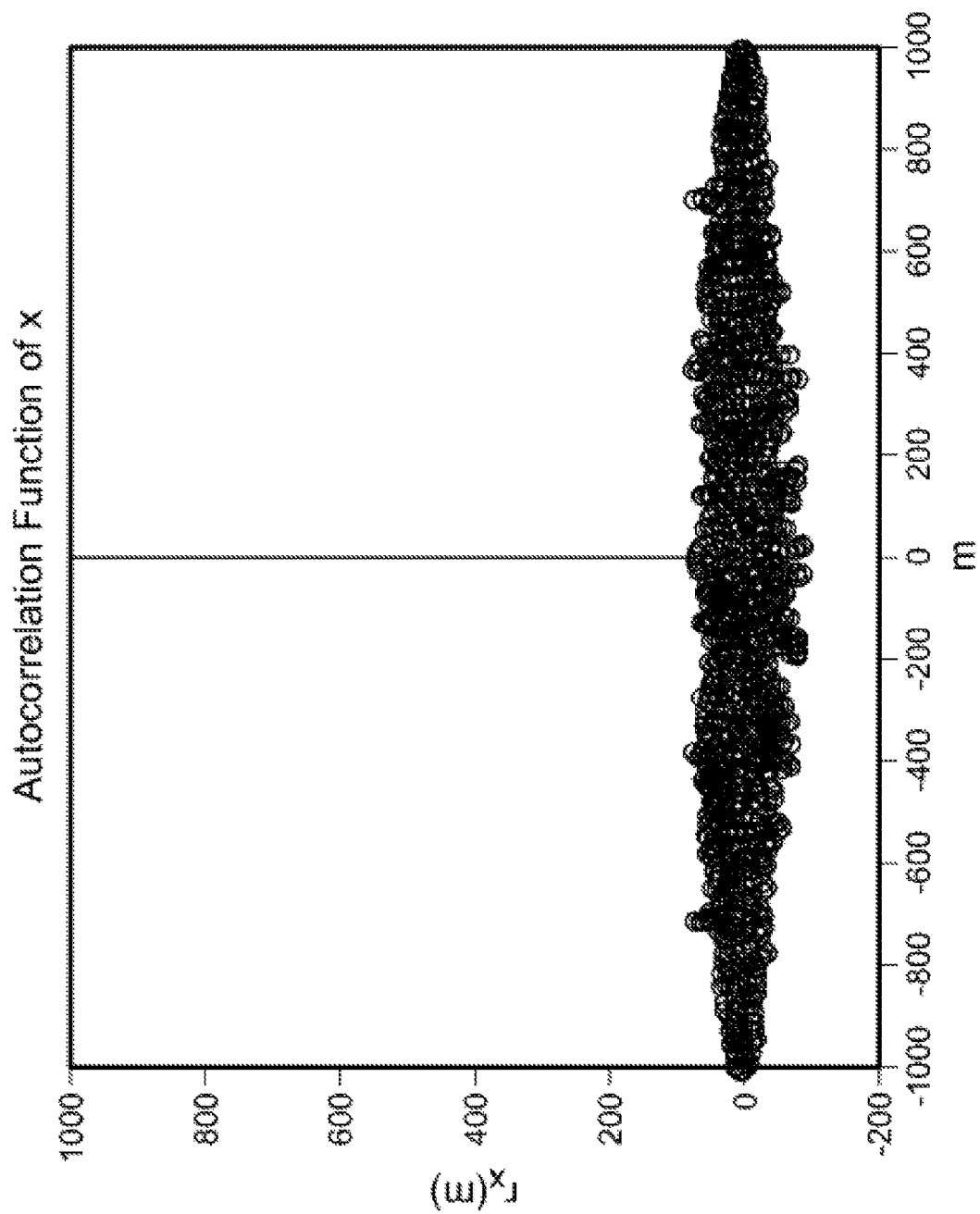
FIG. 19 shows an example of an autocorrelation function of a pseudo random code, according to some embodiments of the present disclosure.
Figure 20:
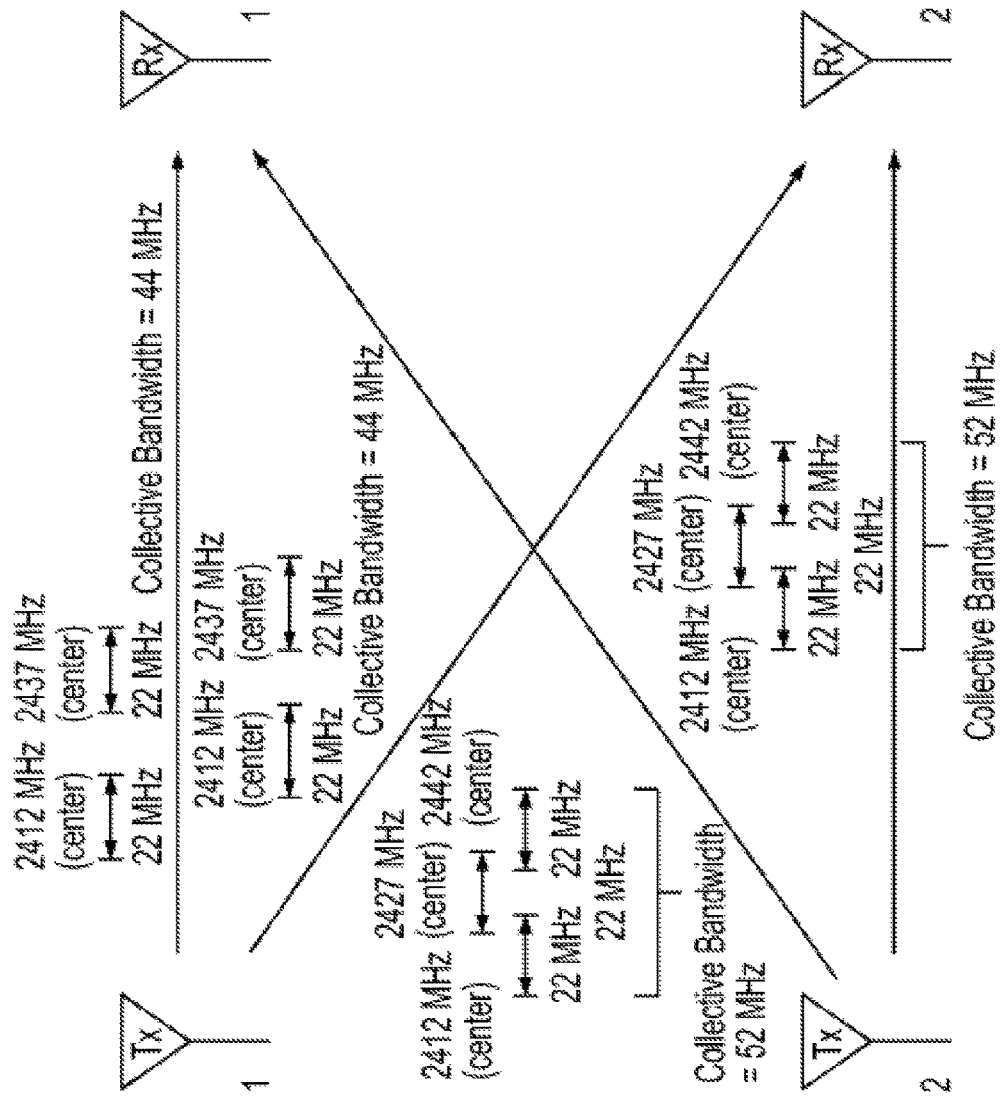
FIG. 20 is a diagram showing exemplary transmission of signals from two transmitter antennas to two receiver antennas, according to some embodiments of the present disclosure.

FIG. 18 shows an example synchronization mismatch histogram for 1000 realizations with SNR=0 dB and channel length L=200. The mismatch amount is small compared with the channel length and can be bounded by some specific value. Since larger $\tau$ takes up more system resource, the value of $\tau$ can be chosen as small as possible that can still bound the synchronization error.

It can be seen from $\widehat{CR} = C_q u$ and the dimension of the conversion matrix $C_q$ that the estimated channel response has a size larger than L, which is the size of the actual channel response. The reason why a longer channel response is estimated is that, due to the synchronization error, the estimated channel response is a shifted version of the real channel response. Estimating a longer channel response ensures that the effective channel response will be included in the estimation such that no significant tap is lost, which is important to the time reversal system that uses the multi-path channel as a matched filter to focus transmitted waveforms at the receiving device.

When the effective training sequence is specifically chosen, the channel response can be estimated more easily without using the conversion matrix $C_q$. For example, if the effective training sequence is a train of impulses separated by D in which $D >= L$, then the channel response can be simply estimated by averaging the windows of size D in the received signal. Let $v_i$ denote the fraction of the received signal from index $i_s + mL_w + L_b + L_d + iD$ to index $i_s + mL_w + L_b + L_d + iD + D - 1$, then the estimated channel response can be written as $$\widehat{CR} = \sum_0^K \frac{v_i}{K+1} \qquad \text{(Equ. 20)}$$

where $K = (L_e + L)/D$ is the number of windows. In some examples, if $L_e + L$ is large enough, K is large enough to provide sufficient accuracy for the estimated channel response $\widehat{CR}$.

Correlation Based Channel Probing Handshaking

The following describes a correlation based handshaking method for the channel probing phase. In this method, a single sequence is used for the purpose of both time synchronization and channel response estimation.

The receiver transmits a pseudo random (PN) sequence x to the transmitter through the multipath channel. The sequence x can be, e.g., a train of discrete random variables having probability mass function (pmf) shown in the equation below:

$$X(i) = \begin{cases} 1 & \text{with probality } 0.5 \\ -1 & \text{with probality } 0.5 \end{cases}, i = 1, 2, \dots N \quad \text{(Equ. 21)}$$

The autocorrelation function of the pseudo random sequence x is defined in the following equation:

$$r_x(m) = \sum_{i=0}^{N-1} x(i) \times (i+m) \quad \text{(Equ. 22)}$$

One important feature of a pseudo random code used here is that the autocorrelation function of a long pseudo random code tends to be a delta function. For example, referring to FIG. 19, considering the autocorrelation function of a pseudo random code having a length of 1000, the autocorrelation function has a very high value at m=0 while being significantly suppressed at other places.

In the following description, several notations are used. L: the length of channel response; N: the length of pseudo random code; and a: the parameter related to the threshold for channel probing.

The received signal y is the convolution result of the pseudo random code x and channel h, as shown in the following equation $$y(n) = \sum_{i=0}^{L} h(i) \times (n-i). \quad \text{(Equ. 23)}$$

The cross correlation function $r_{yx}(m)$ defined in the equation below is equivalent to the convolution of autocorrelation of the pseudo random code x and the channel h.

$$r_{yx}(n) = \sum_{i=0}^{N} x(i) y(i+n) = \sum_{i=0}^{L} h(i) r_x(n-i) \quad \text{(Equ. 24)}$$

The following describes an algorithm for synchronization by correlation. The transmitter computes the cross correlation $r_{yx}(m)$, and finds its maximum amplitude $$corr_{max} = \max |r_{yx}(m)| \quad \text{(Equ. 25)}$$

Based on $corr_{max}$, the transmitter finds the index is of the received signal y as follows $$i_s = 1; \quad \text{(Equ. 26)}$$

WHILE $|r_{yx}(i_s)| < \alpha \times corr_{max}$ $$i_s \Leftarrow i_s + 1$$

The parameter α can be selected by experiments, and range from 0 to 1. For example, according to an ultra-wide band channel model used in the simulation, the parameter α is chosen to be around 0.2. After obtaining the index $i_s$, the estimated channel response $\hat{h}$ can be determined by truncating the cross correlation function $r_{yx}(m)$ as follows:

$$\hat{h} = r_{yx}(i_s: i_s + L - 1) \quad \text{(Equ. 27)}$$

K-Means Clustering

As described above with respect to FIG. 8, K-means clustering is performed on the CSIs. For each link in the system (e.g., a MIMO system), an ensemble of CSIs can be obtained. In this example, the collection of CSIs on link i can be denoted as $H_i$ which is a matrix with dimension $N_i \times 30$. For the $N_i$ realizations, a set of representative CSIs can be identified that have a smaller cardinality $U_i$ such that $U_i << N_i$, in order to reduce the burden of post processing as well as storage into the database.

A K-means clustering algorithm can be used to identify the representative CSIs. The K-means clustering algorithm is an unsupervised machine learning algorithm that classifies the $N_i$ rows of $H_i$ into K clusters such that: i) the distance between any two CSIs in the same cluster is small, and ii) the distance between any two CSIs in two different clusters is large. The distance metric may be Euclidean distance, and the Euclidean distance, correlation, and cosine functions may be used to measure the similarity between two CSIs.

The K-means clustering algorithm starts with K randomly chosen vectors (e.g., rows) in the matrix $H_i$. The remaining $N_i - K$ CSIs can be labeled according to their distances to the K centroids. A new centroid can then be computed for each of the K clusters. The process can repeat iteratively until the labels remain unchanged between two iterations or the number of iterations exceeds a predefined value.

Using K-means clustering, each specific location on each link can be associated with a set of representative CSIs. If the ensemble of CSIs is directly averaged (e.g., which is equivalent to using K=1 in K-means clustering), the CSIs may be combined in a destructive way, which can significantly undermine the accuracy of CSI measurements.

Based on the results of performing K-means clustering on CSI ensembles of the link between a transmitting antenna and a receiving antenna using various numbers of clusters: K=1, K=5, and K=10, CSIs belonging to different clusters are labeled using different markers. In some implementations, higher K values lead to more robust classification on the unknown data set with a higher diversity.

Based on centroids of the K-means clustering on the same link, the centroids are the averages of the CSIs that are in the same clusters. Averaging the CSIs to obtain centroid information can alleviate the effect of noise inherent in the CSIs. The centroids can be recorded into the database as representative features for specific locations on the particular link.

K-means clustering can be performed for each of the M links. Assuming that the same K value is used for each link, and denoting the representative CFRs (e.g., as the centroids of the K clusters) belonging to link i as $G_i$ which is a K×30 matrix, the correlation between the matrix $G_i$ in the mapping phase and the $G_i'$ in the localization phase can be calculated using the following equation:

$$C(i) = \text{Corr}[G_i, G_i'] = \max(D_i G_i)(D_i' G_i')^H \quad \text{(Equ. 28)}$$

where H represents Hermitian transpose, and $D_i$ represents a diagonal matrix with diagonal entries given as:

$$[D_i]_{n,n} = \sqrt{\frac{1}{\sum_k |g_{i,k}|^2}} \quad \text{(Equ. 29)}$$

and $g_{i,k}$ represents the element on the $i^{th}$ row and $j^{th}$ column of the matrix $G_i$.

The computations are repeated for all the M links, and the fused correlation between the CSIs acquired in the mapping phase and that in the localization phase is calculated as:

$$C_{fusion} = \frac{1}{M} \sum C(i) \quad \text{(Equ. 30)}$$

$C_{fusion}$ can be calculated for all locations in the mapping phase. The location with the largest $C_{fusion}$ indicates the estimated location of the device, given that the largest $C_{fusion}$ is larger than the threshold value.

In some embodiments, to perform a wireless sensing task, a motion statistics (MS) or motion information (MI) may be computed in a sliding time window based on all the CI (e.g. CSI/CIR/CFR) in the sliding time window. The task may be to monitor a motion of an object in a venue based on the MS/MI. The MS/MI may be a STI or characteristics of the object or the motion of the object. Sometimes some CI may be abnormal (e.g. due to interference, noise) causing abnormal behavior of MS/MI and disturbing/disrupting the wireless sensing task. Such abnormal CI (and abnormal MS/MI) may be considered outliers. In some embodiments, a scheme is disclosed to detect/suppress/remove/exclude the outliers or effects of the outliers in the sliding time window. The system may classify the sliding time window into either "normal", "moderately abnormal" and "severely abnormal".

In some embodiments, for a "normal" sliding time window (or trustworthy/regular time window, e.g. with no abnormal/outlier CI), the MS/MI may be computed in a normal way and the task may be performed based on the MS/MI. For a "severely abnormal" sliding time window (or severely untrustworthy/irregular time window, e.g. with lots of abnormal/outlier CI), the MS/MI of the current window may not be computed and the task may be performed in an alternative way without the MS/MI of the current time window (e.g. with a replacement MS/MI computed from neighboring MS/MI). For a "moderately abnormal" sliding time window (or moderately untrustworthy/irregular time window, e.g. with acceptable amount of good/normal/trustworthy CI in certain arrangement (e.g. at least $N_t$ consecutive ones) at certain location (e.g. at beginning/end/middle) in the sliding time window), an alternate MS/MI (e.g. simplified/reduced/alternative MS/MI) may be computed based on some good/normal/trustworthy CI in the sliding time window such that the task may be performed based on the alternate MS/MI (which may replace the MS/MI). The alternate MS/MI may be the MS/MI computed without the abnormal CI (i.e. with the abnormal CI removed or excluded). Not all the good/normal/trustworthy CI may be included in the computation of alternate MS/MI.

In some embodiments, a test score (TS) may be computed. For a current sliding time window with N time stamps, a characteristic value may be computed. The system may compute at least one test score (TS) each based on M temporal adjacent CI in the sliding time window of a TSCI, wherein M may be 2, 3, or more. Some or all of the M temporal adjacent CI may be consecutive. Each TS may be a scalar. Each TS may be associated with a respective time. The test score may comprise/may be any of, or a measure or score of any of: similarity, dis-similarity, difference, distance, norm, discrimination, ratio, fraction, variance, variation, divergence, spread, deviation, TRRS, correlation, covariance, autocorrelation, cross-correlation, inner product, etc. In some embodiments, each TSCI is associated with a "link", which is a pairing of a Tx antenna of a Type1 device and a Rx antenna of a Type2 device. There may be one or more links for a pair of Type1/Type2 devices, with more than one associated TSCI.

In some embodiments, a component-wise test score (CTS) may be computed. Each CI may have L components (e.g. L subcarriers for CI=CFR, L tabs for CI=CIR). A CTS may be computed for each component. The CTS may be a scalar. Each CTS may be associated with a respective time. All CTS(t) for any time t may be computed based on M temporal adjacent CI (e.g. similar/identical to those used for TS) in the sliding time window of a test, where M may be 2, 3, or more. The M temporal adjacent CI used for computing all of the L CTS(t) at same time t may be same/different for all components. The CTS may comprise/may be any of, or a measure or score of any of: similarity, dissimilarity, difference, distance, norm, discrimination, ratio, fraction, variance, variation, divergence, spread, deviation, component-wise-TRRS, correlation, covariance, autocorrelation, cross-correlation, inner-product, etc. In some embodiments, TS(t) may be an aggregate (e.g. sum, mean, weighted mean, median, mode, maximum, minimum, percentile) of the L CTS(t), or an aggregate of a weighted quantity of each CTS(t), or an aggregate of a function (e.g. magnitude, phase, magnitude square) of each CTS(t).

In some embodiments, some components/associated CTS may be "selected" (e.g. K largest (magnitude) CTS; or CTS magnitude>threshold; or selected based on a function of respective CTS in relation to the function of the other CTS), and TS(t) may be an aggregate of only the selected CTS/quantity (e.g. function, magnitude, phase, magnitude square) of selected CTS. If TS is a weighted quantity (e.g. weighted sum, weighted mean, weighted product) of CTS, the CTS of selected components may have larger weight than CTS of non-selected components. A weight may be computed for each component (e.g. based on CTS of the component in relation to CTS of the other components). The TS may be a weighted quantity of CTS with each CTS weighted by the respective weight.

In some embodiments, a link-wise test score (LTS) may be computed based on the CI in the sliding time window of a TSCI. For example, the LTS may be a first aggregate of more than one TS. The LTS may also be an "overall" test score based on all CI of the TSCI in the sliding time window (i.e. M=N). For the link, the sliding time window may be classified as "normal", "moderately abnormal" or "severely abnormal" based on the LTS or the more than one TS associated with the TSCI. A link-wise MS/MI (or an alternate linkwise MS/MI) may/may not be computed based on the CI in the sliding time window of the TSCI. Any aggregate may comprise any of: average/mean, weighted average/mean, trimmed mean, sum, weighted sum, product, weighted product, arithmetic mean, geometric mean, harmonic mean, median, weighted median, mode, histogram, statistics, autocorrelation function, spectrum, spectrogram, variance, variation, divergence, spread, range, deviation, minimum, maximum, percentile, characteristic value, etc.

In some embodiments, a device-pair-wise test score (TTS) may be computed for the sliding time window based on more than one TSCI associated with a pair of Type1 device and Type2 device (each TSCI associated with a "link" associated with a TX antenna of Type1 device and a RX antenna of Type2 device). For example, the TTS may be a second aggregate of more than one associated LTS, each LTS associated with a respective link. The TTS may also be an "overall" test score based on all CI in all of the more than one TSCI in the sliding time window. For the Type1-Type2 device pair, the sliding time window may be classified as "normal" or "severely abnormal" based on the TTS, the more than one LTS or the more than one TS (each TS associated with a respective link). A device-pair-wise MS/MI (or alternate device-pair-wise) may/may not be computed based on the CI in the sliding time window of the TSCI.

In some examples, outlier detection/suppression/removal/ is performed for a TSCI. The Test Score (TS) associated with a time t, TS(t), may be a difference score such as CIdifference (CID) between two or more temporally adjacent CI may be computed. In the time window with N CI in each TSCI, the system may compute N−1 CID, with each CID associated with time t being CID1(t)=CI(t)−CI(t−1). For each CID, a feature of CID or f(CID(t)) (CID-feature or CIDF, with the feature f(.) being/comprising magnitude/magnitude square/norm/absolute value/power or a monotonic function of it) may be computed.

In some embodiments, CID may be CID2(t)=f(CI(t))−f(CI(t−1)). In such case, CIDF may be CIDF2(t)=f2(CID2(t)), where f and f2 may be different. In some embodiments, CID may be CID3(t)=CI(t)−CI(t−k), for some k=1, −1, 2, −2, 3, −3, .... In some embodiments, CID may also be CID=(CID1+CID3)/2=CI(t)−(CI(t−1)+CI(t−k))/2. For k=−1, CID=CI(t)−(CI(t−1)+CI(t+1))/2. For k=2, CID=CI(t)−(CI(t−1)+CI(t−2))/2. In some embodiments, CID may also be a linear combination of CID3 each with a respective k, or a linear combination of any CID1, CID2, CID3. For example, CID may be CID=(CID1+CID1+CID3)/3=CI(t)−(2*CI(t−1)+CI(t−k))/3. In some embodiments, CID may also be CI(t) minus a weighted average of some neighboring CI, such as CID=CI(t)−(CI(t−1)+CI(t−2)+CI(t−3))/3, or even CID=CI(t)−(4*CI(t−1)+2*CI(t−2)+CI(t−3))/7.

In some embodiments, the TS may be any CID or any CIDF or any combination. Large TS may suggest/indicate abrupt change, abnormality, or a high probability/likelihood of abnormality. The LTS may be an aggregate (e.g. arithmetic/geometric/harmonic/trimmed/weighted mean or sum, median/mode/max/percentile/min, variance/variation/divergence/spread/deviation, etc.) of the N−1 CID. Arithmetic mean, geometric mean, median or mode may reflect a "typical" behavior. Max or min or percentile (e.g. 95% or 5%) may reflect worst/best case behavior. Variance/variation/divergence may reflect fluctuation behavior.

To perform CI-level abnormality classification, for a CI at a time t, it may be classified/computed/determined as "abnormal"/outlier/atypical/uncommon/unusual/unrepresentative/erroneous/anomalous/strange/irregular/deviant/deviating/divergent/eccentric/exceptional/singular/perverse/perverted/corrupted) if the associated TS(t) satisfies a first condition (e.g. greater than or smaller than a threshold). Otherwise, it may be classified as "normal". In some embodiments, the TS(t) may be a score/measure of local dis-similarity, difference (e.g. CID/CIDF), distance, discrimination, ratio, fraction, variance, variation, divergence, spread, or deviation in a window around time t and the first condition may be that TS(t) is greater than a threshold. The TS(t) may be a score/measure of local similarity, TRRS, correlation, covariance, autocorrelation, cross-correlation, or inner product in a window around time t, and the first condition may be that TS(t) is less than a threshold. For an "abnormal" CI, an "abnormality score"/AS (e.g. a real number between 0 and 1, or between −1 and +1) may be computed (e.g. based on TS, or all/selected associated CTS; based on a number of neighboring/temporally neighboring TS or associated CTS). For a run of consecutive abnormal CI, a run-wise abnormality score/RAS may be computed as an aggregate (sum, weighted sum, product, weighted product, mean, weighted mean/median/mode, (weighted) arithmetic/geometric/harmonic mean) of the AS of each abnormal CI in the run.

To perform link-level abnormality classification, for a sliding time window of CI of a link, e.g. kA{th} link (or link k), the sliding time window may be determined/classified/computed as "abnormal" (e.g. "moderately abnormal" or "severely abnormal") if a second condition is satisfied (e.g. LTS(k) being greater or smaller than a threshold, or a maximum/minimum/majority/minority/percentage/sufficient amount/minimum amount/maximum amount of TS(t) in the sliding time window of link k being greater or smaller than another threshold or satisfying the first condition, or a distribution characteristic of abnormal CI in link k satisfying a certain condition). Otherwise, the sliding time window of link k may be classified as "normal". If it is "abnormal", it may be further classified as "moderately abnormal" or "severely abnormal" (or more abnormal levels based on AS) if some additional condition (e.g. T1<AS<T2 for some T1, T2) is satisfied. There may be more than one class or sub-class of "moderately abnormal".

In some embodiments, the sliding time window of link k may be classified as "moderately abnormal" if a percentage/an amount of normal CI in the time window (or in an initial portion of the time window, or in an ending portion of the time window) exceeds a threshold, or if an initial (e.g. beginning) run of normal CI has a run-length exceeding a threshold, or an ending (e.g. trailing) run of normal CI has a run-length exceeding a threshold, or some other condition. Otherwise, it may be "severely abnormal". Any threshold may depend on abnormality score/AS/run-wise AS/RAS. Any threshold may be predefined or computed adaptively based on associated AS/RAS. In some embodiments, the sliding time window of link k may be classified as "abnormal" if maximum of TS(t) in the sliding time window of link k is larger than a threshold.

In some embodiments, runs of consecutive "normal" CI and their respective "run-length" may be determined/computed/identified. For example, an isolated normal CI is a run of one and has a run-length of 1. Two consecutive normal CI is a run of two and has a run-length of 2, so on and so forth. The sliding time window of link k may be further classified as "moderately abnormal" if run-length of any run of normal CI satisfies a condition (e.g. greater than ½, or ⅓, or ¼ of length of sliding time window). Otherwise, it may be further classified as "severely abnormal".

In some embodiments, runs of consecutive "normal CI" may further include (consecutive/connecting) "abnormal" CI with AS less than a threshold. In some embodiments, runs of consecutive abnormal CI with AS less than a threshold may be re-classified as "normal CI" if their respective run-length is greater than another threshold. Alternatively, runs of consecutive abnormal CI with all AS less than a T1 and a percentage of AS less than a T2<T1 may be re-classified as "normal CI" if their respective run-length is greater than a T3. In some embodiments, amount of TS(t) larger than a first threshold may be computed. The sliding time window of link k may be further classified as "moderately abnormal" if a percentage of TS(t) being larger than the first threshold (e.g. a percentage of the max of TS(t) in sliding time window of link k) is less than a second threshold, or alternatively, if a percentile (e.g. 90-percentile) of TS(t) in the sliding time window of link k is less than some threshold.

In some embodiments, any threshold may be predefined or computed adaptively based on associated abnormality score/AS/run-wise AS/RAS. In some embodiments, MS/MI may be computed differently in accordance with "normal", "abnormal", "moderately abnormal" and/or "severely abnormal" classification. In some embodiments, a second condition is satisfied (e.g. LTS(k) being greater or smaller than a threshold, or a majority/minority/percentage/sufficient amount/minimum amount/maximum amount of TS(t) in the sliding time window of link k being greater or smaller than another threshold or satisfying the first condition, or a distribution characteristic of abnormal CI in link k satisfying a certain condition). In some embodiments, The LTS(k) may be a score/measure of window-wide aggregate, max, min, percentile (e.g. 95% or 5%), dis-similarity, difference, distance, discrimination, ratio, fraction, variance, variation, divergence, spread, or deviation of TS(t) in the sliding time window in link k.

To perform device-pair-level abnormality classification, for a pair of Type1 device and Type2 device (i.e. a device pair) comprising M antenna pairings (Type1 device with M1 antennas and Type2 device with M2 antennas such that M=M1*M2) and thus M links and M associated TSCI, the sliding time window of the device-pair may be determined/classified/computed as "abnormal" if a third condition is satisfied (e.g. TTS being greater or smaller than a threshold, or a majority/minority/percentage/sufficient amount/minimum amount/maximum amount of LTS being greater/less than another threshold or satisfying the second condition, or a majority/minority/percentage/sufficient amount/minimum amount/maximum amount of TS in the sliding time window being greater/smaller than yet another threshold or satisfying the first condition, or a distribution characteristic of abnormal links satisfying a certain condition, or a distribution characteristic of abnormal CI satisfying another condition). Otherwise, the sliding time window of the device-pair may be classified as "normal".

In some embodiments, if current time window is "normal", MS/MI may be computed for current sliding time window based on all the CI in link k (or two or more links) in the time window. This may be the normal way of computing MS/MI. If current time window is "abnormal", especially if "severely abnormal", MS/MI may/may not be computed based on CI in current time window. If already computed, the MS/MI may be discarded (or may not be used). An alternative/replacement/substitute/another/auxiliary/fallback/standby/alternate/fill-in/stand-in/proxy MS/MI may be used. The alternative MS/MI may be a predicted/estimated/substitute MS/MI value computed based on some neighboring MS/MI (e.g. temporally neighboring, contemporaneous or past or future; or spatially neighboring such as other TSCI of the same TX/RX device pair, or a TSCI of a "neighboring" TX/RX device pair). The alternative MS/MI may be an aggregate such as mean/median/mode/weighted mean/trimmed mean, or zero/first/second/higher order predictor/estimator, or another aggregate of multiple neighboring MS/MI. If current time window is "moderately abnormal", a reduced/partial/simplified/limited/slanted/biased/partisan/skewed/colored/one-sided MS/MI may be computed based on some (or all) remaining/available "normal" CI in the current time window. For example, the reduced MS/MI may be computed based on one or more long/longest run(s) of normal CI (each with long enough run-length, e.g. run-length>T1), or a run of beginning or trailing normal CI (with sufficient run-length, e.g. run-length>T2) in the time window.

In some embodiments, if there are two or more runs of normal CI with sufficient length in the current time window, multiple tentative reduced MS/MI may be computed each based on a respective run of normal CI and the reduced MS/MI may be computed as an aggregate of the multiple tentative reduced MS/MI. A beginning or trailing run of normal CI of current time window may be combined with a connected run of normal CI of a temporally adjacent time window in order to compute the reduced MS/MI. In particular, a beginning (or trailing) run of normal CI may be combined with trailing (or beginning) run of normal CI in the previous (or next) adjacent time window and the reduced MS/MI may be computed based on the combined run of normal CI.

In some embodiments, the MS/MI may be computed as the reduced MS/MI. Alternatively, the MS/MI may be computed as an aggregate (e.g. weighted average) of the reduced MS/MI, and one or more neighboring MS/MI (e.g. if longest run-length is less than T1 but greater than T3). Any threshold may be pre-determined or adjusted or adaptively adjusted.

Figure 21:
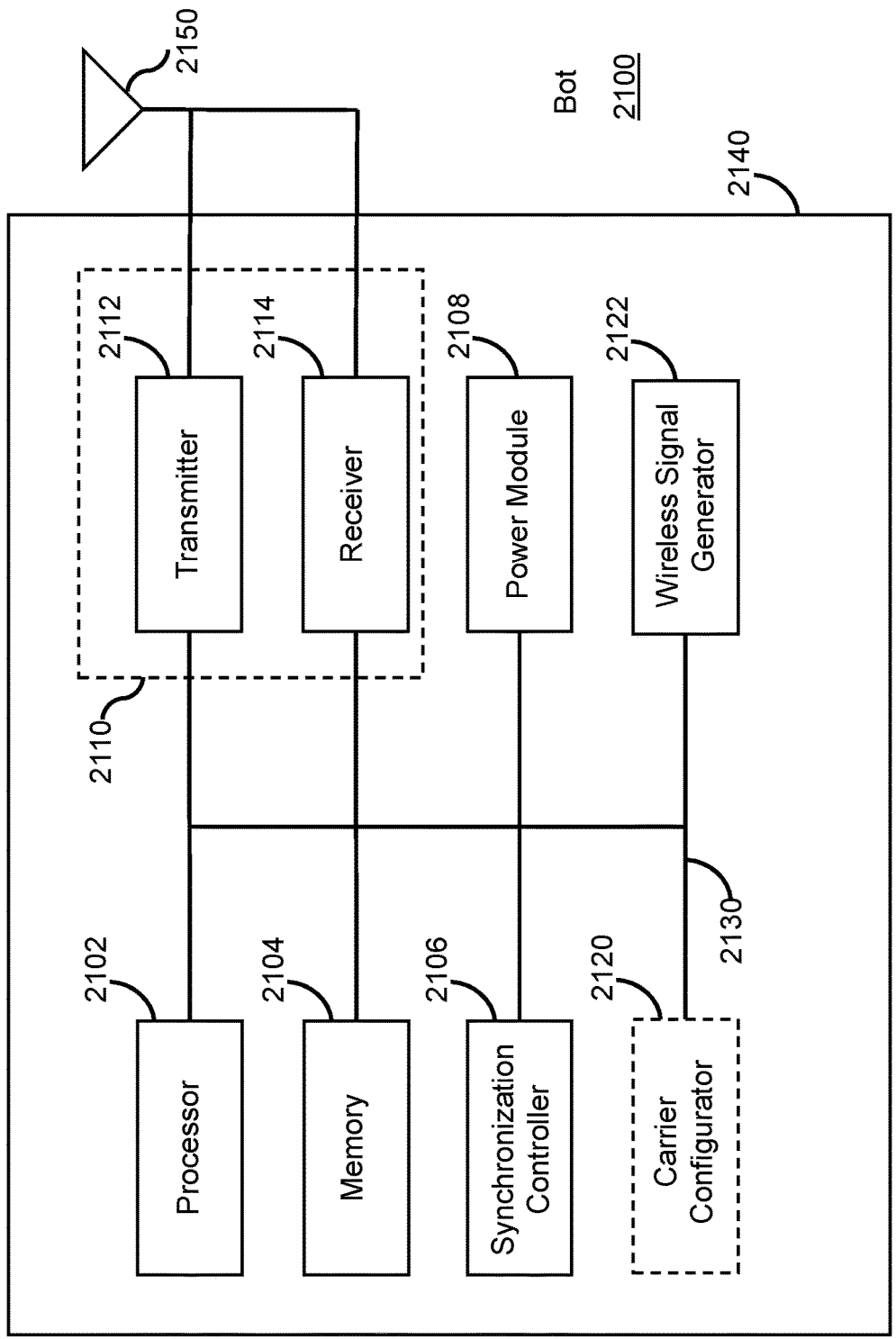
FIG. 21 illustrates an exemplary block diagram of a first wireless device of a system for wireless sensing or monitoring, according to some embodiments of the present disclosure.

FIG. 21 illustrates an exemplary block diagram of a first wireless device, e.g. a Bot 2100, of a wireless sensing or monitoring system, according to one embodiment of the present teaching. The Bot 2100 is an example of a device that can be configured to implement the various methods described herein. As shown in FIG. 21, the Bot 2100 includes a housing 2140 containing a processor 2102, a memory 2104, a transceiver 2110 comprising a transmitter 2112 and receiver 2114, a synchronization controller 2106, a power module 2108, an optional carrier configurator 2120 and a wireless signal generator 2122.

In this embodiment, the processor 2102 controls the general operation of the Bot 2100 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 2104, which can include both read-only memory (ROM) and random access memory (RAM), can provide instructions and data to the processor 2102. A portion of the memory 2104 can also include non-volatile random access memory (NVRAM). The processor 2102 typically performs logical and arithmetic operations based on program instructions stored within the memory 2104. The instructions (a.k.a., software) stored in the memory 2104 can be executed by the processor 2102 to perform the methods described herein. The processor 2102 and the memory 2104 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 2110, which includes the transmitter 2112 and receiver 2114, allows the Bot 2100 to transmit and receive data to and from a remote device (e.g., an Origin or another Bot). An antenna 2150 is typically attached to the housing 2140 and electrically coupled to the transceiver 2110. In various embodiments, the Bot 2100 includes (not shown) multiple transmitters, multiple receivers, and multiple transceivers. In one embodiment, the antenna 2150 is replaced with a multi-antenna array 2150 that can form a plurality of beams each of which points in a distinct direction. The transmitter 2112 can be configured to wirelessly transmit signals having different types or functions, such signals being generated by the processor 2102. Similarly, the receiver 2114 is configured to receive wireless signals having different types or functions, and the processor 2102 is configured to process signals of a plurality of different types.

The Bot 2100 in this example may serve as a Bot or Type1 device (e.g. transceiver A 108) in FIGS. 1-20 for detecting and monitoring object motion in a venue. For example, the wireless signal generator 2122 may generate and transmit, via the transmitter 2112, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 2122 may be based on a request for motion detection from another device, e.g. an Origin, or based on a system pre-configuration. That is, the Bot 2100 may or may not know that the wireless signal transmitted will be used to detect motion.

The synchronization controller 2106 in this example may be configured to control the operations of the Bot 2100 to be synchronized or un-synchronized with another device, e.g. an Origin or another Bot. In one embodiment, the synchronization controller 2106 may control the Bot 2100 to be synchronized with an Origin that receives the wireless signal transmitted by the Bot 2100. In another embodiment, the synchronization controller 2106 may control the Bot 2100 to transmit the wireless signal asynchronously with other Bots. In another embodiment, each of the Bot 2100 and other Bots may transmit the wireless signals individually and asynchronously.

The carrier configurator 2120 is an optional component in Bot 2100 to configure transmission resources, e.g. time and carrier, for transmitting the wireless signal generated by the wireless signal generator 2122. In one embodiment, each CI of the time series of CI has one or more components each corresponding to a carrier or sub-carrier of the transmission of the wireless signal. The detection of the motion may be based on motion detections on any one or any combination of the components.

The power module 2108 can include a power source such as one or more batteries, and a power regulator, to provide regulated power to each of the above-described modules in FIG. 21. In some embodiments, if the Bot 2100 is coupled to a dedicated external power source (e.g., a wall electrical outlet), the power module 2108 can include a transformer and a power regulator.

The various modules discussed above are coupled together by a bus system 2130. The bus system 2130 can include a data bus and, for example, a power bus, a control signal bus, and/or a status signal bus in addition to the data bus. It is understood that the modules of the Bot 2100 can be operatively coupled to one another using any suitable techniques and mediums.

Although a number of separate modules or components are illustrated in FIG. 21, persons of ordinary skill in the art will understand that one or more of the modules can be combined or commonly implemented. For example, the processor 2102 can implement not only the functionality described above with respect to the processor 2102, but also implement the functionality described above with respect to the wireless signal generator 2122. Conversely, each of the modules illustrated in FIG. 21 can be implemented using a plurality of separate components or elements.

Figure 22:
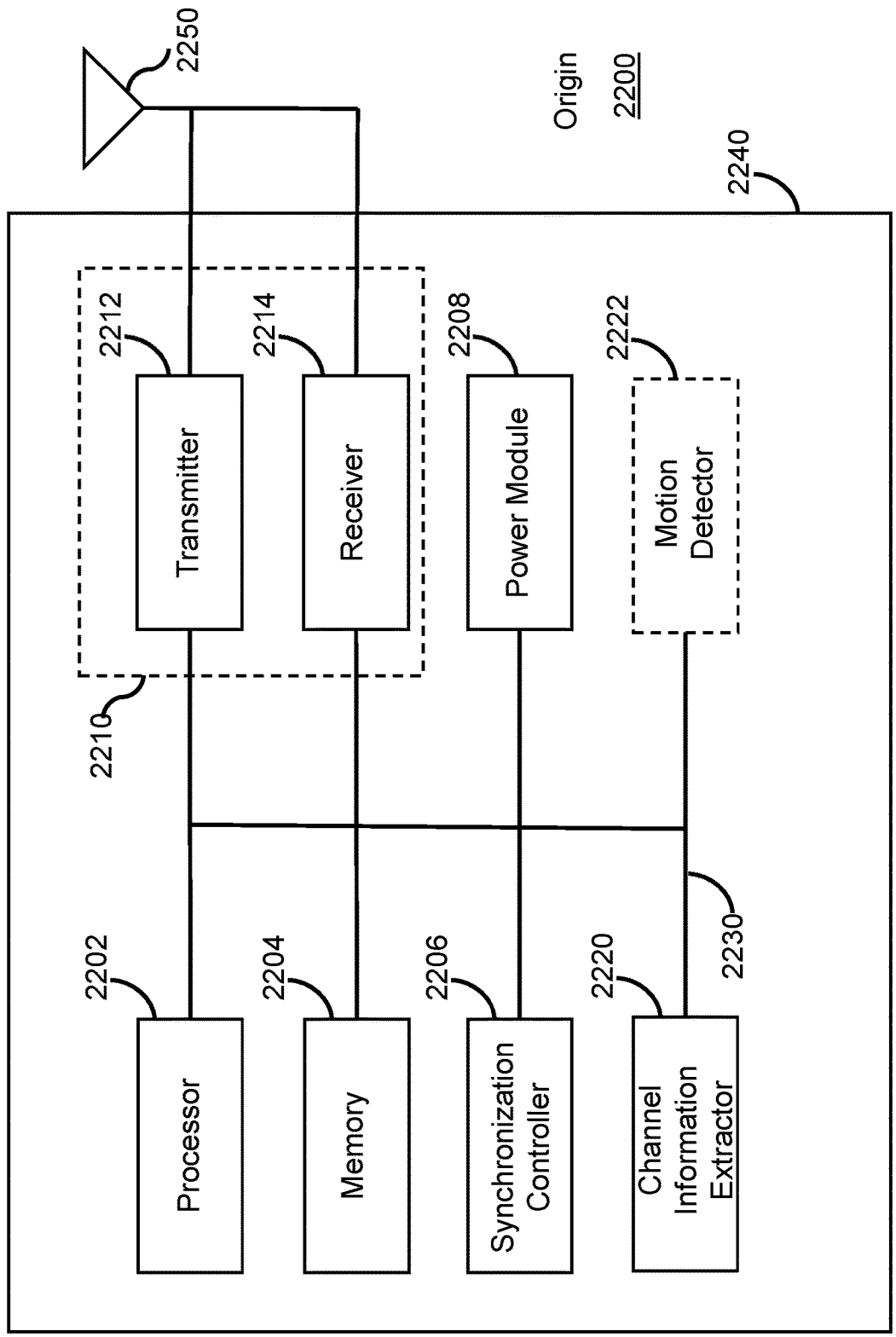
FIG. 22 illustrates an exemplary block diagram of a second wireless device of a system for wireless sensing or monitoring, according to some embodiments of the present disclosure.

FIG. 22 illustrates an exemplary block diagram of a second wireless device, e.g. an Origin 2200, of a wireless sensing or monitoring system, according to one embodiment of the present teaching. The Origin 2200 is an example of a device that can be configured to implement the various methods described herein. The Origin 2200 in this example may serve as an Origin or Type2 device (e.g. transceiver B 106) in FIGS. 1-20 for detecting and monitoring object motion in a venue. As shown in FIG. 22, the Origin 2200 includes a housing 2240 containing a processor 2202, a memory 2204, a transceiver 2210 comprising a transmitter 2212 and a receiver 2214, a power module 2208, a synchronization controller 2206, a channel information extractor 2220, and an optional motion detector $22_{22}$.

In this embodiment, the processor 2202, the memory 2204, the transceiver 2210 and the power module 2208 work similarly to the processor 2102, the memory 2104, the transceiver 2110 and the power module 2108 in the Bot 2100. An antenna 2250 or a multi-antenna array 2250 is typically attached to the housing 2240 and electrically coupled to the transceiver 2210.

The Origin 2200 may be a second wireless device that has a different type from that of the first wireless device (e.g. the Bot 2100). In particular, the channel information extractor 2220 in the Origin 2200 is configured for receiving the wireless signal through the wireless multipath channel impacted by the motion of the object in the venue, and obtaining a time series of channel information (CI) of the wireless multipath channel based on the wireless signal. The channel information extractor 2220 may send the extracted CI to the optional motion detector 2222 or to a motion detector outside the Origin 2200 for detecting object motion in the venue.

The motion detector 2222 is an optional component in the Origin 2200. In one embodiment, it $i_s$ within the Origin 2200 as shown in FIG. 22. In another embodiment, it is outside the Origin 2200 and in another device, which may be a Bot, another Origin, a cloud server, a fog server, a local server, and an edge server. The optional motion detector 2222 may be configured for detecting the motion of the object in the venue based on motion information related to the motion of the object. The motion information associated with the first and second wireless devices is computed based on the time series of CI by the motion detector 2222 or another motion detector outside the Origin 2200.

The synchronization controller 2206 in this example may be configured to control the operations of the Origin 2200 to be synchronized or un-synchronized with another device, e.g. a Bot, another Origin, or an independent motion detector. In one embodiment, the synchronization controller 2206 may control the Origin 2200 to be synchronized with a Bot that transmits a wireless signal. In another embodiment, the synchronization controller 2206 may control the Origin 2200 to receive the wireless signal asynchronously with other Origins. In another embodiment, each of the Origin 2200 and other Origins may receive the wireless signals individually and asynchronously. In one embodiment, the optional motion detector 2222 or a motion detector outside the Origin 2200 is configured for asynchronously computing respective heterogeneous motion information related to the motion of the object based on the respective time series of CI.

The various modules discussed above are coupled together by a bus system 2230. The bus system 2230 can include a data bus and, for example, a power bus, a control signal bus, and/or a status signal bus in addition to the data bus. It is understood that the modules of the Origin 2200 can be operatively coupled to one another using any suitable techniques and mediums.

Although a number of separate modules or components are illustrated in FIG. 22, persons of ordinary skill in the art will understand that one or more of the modules can be combined or commonly implemented. For example, the processor 2202 can implement not only the functionality described above with respect to the processor 2202, but also implement the functionality described above with respect to the channel information extractor 2220. Conversely, each of the modules illustrated in FIG. 22 can be implemented using a plurality of separate components or elements.

In one embodiment, in addition to the Bot 2100 and the Origin 2200, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 2222 or a motion detector outside the Origin 2200 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 23:
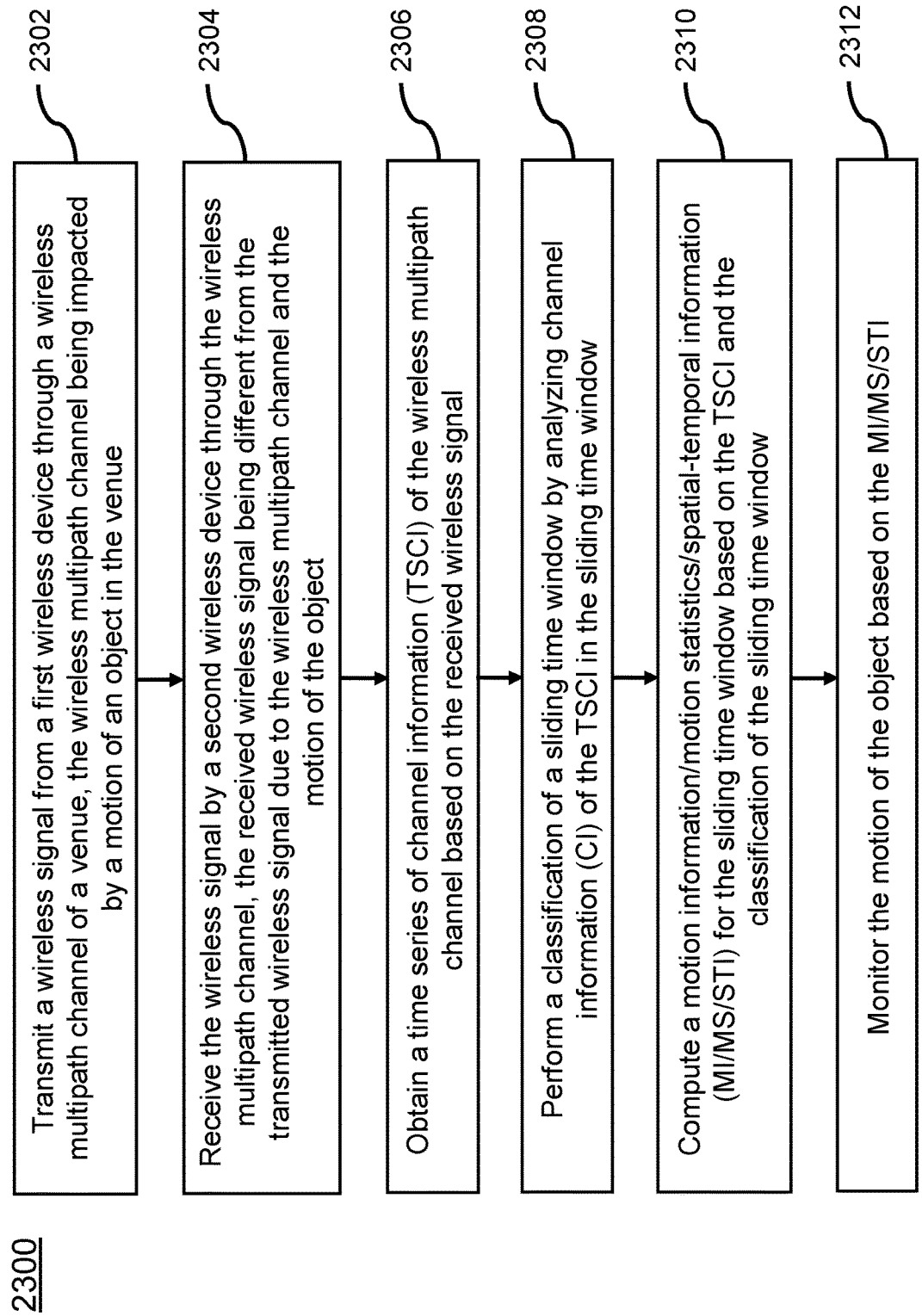
FIG. 23 illustrates a flow chart of an exemplary method for an accurate wireless monitoring, according to some embodiments of the present disclosure.

FIG. 23 illustrates a flow chart of an exemplary method 2300 for an accurate wireless monitoring, according to some embodiments of the present disclosure. In various embodiments, the method 2300 can be performed by the systems disclosed above. At operation 2302, a wireless signal $i_s$ transmitted from a first wireless device through a wireless multipath channel of a venue, the wireless multipath channel being impacted by a motion of an object in the venue. At operation 2304, the wireless signal is received by a second wireless device through the wireless multipath channel, the received wireless signal being different from the transmitted wireless signal due to the wireless multipath channel and the motion of the object. At operation 2306, a time series of channel information (TSCI) of the wireless multipath channel is obtained based on the received wireless signal. At operation 2308, a classification of a sliding time window is performed by analyzing channel information (CI) of the TSCI in the sliding time window. At operation 2310, a motion information (MI) for the sliding time window $i_s$ computed based on the TSCI and the classification of the sliding time window. At operation 2312, the motion of the object is monitored based on the MI.

Figure 24:
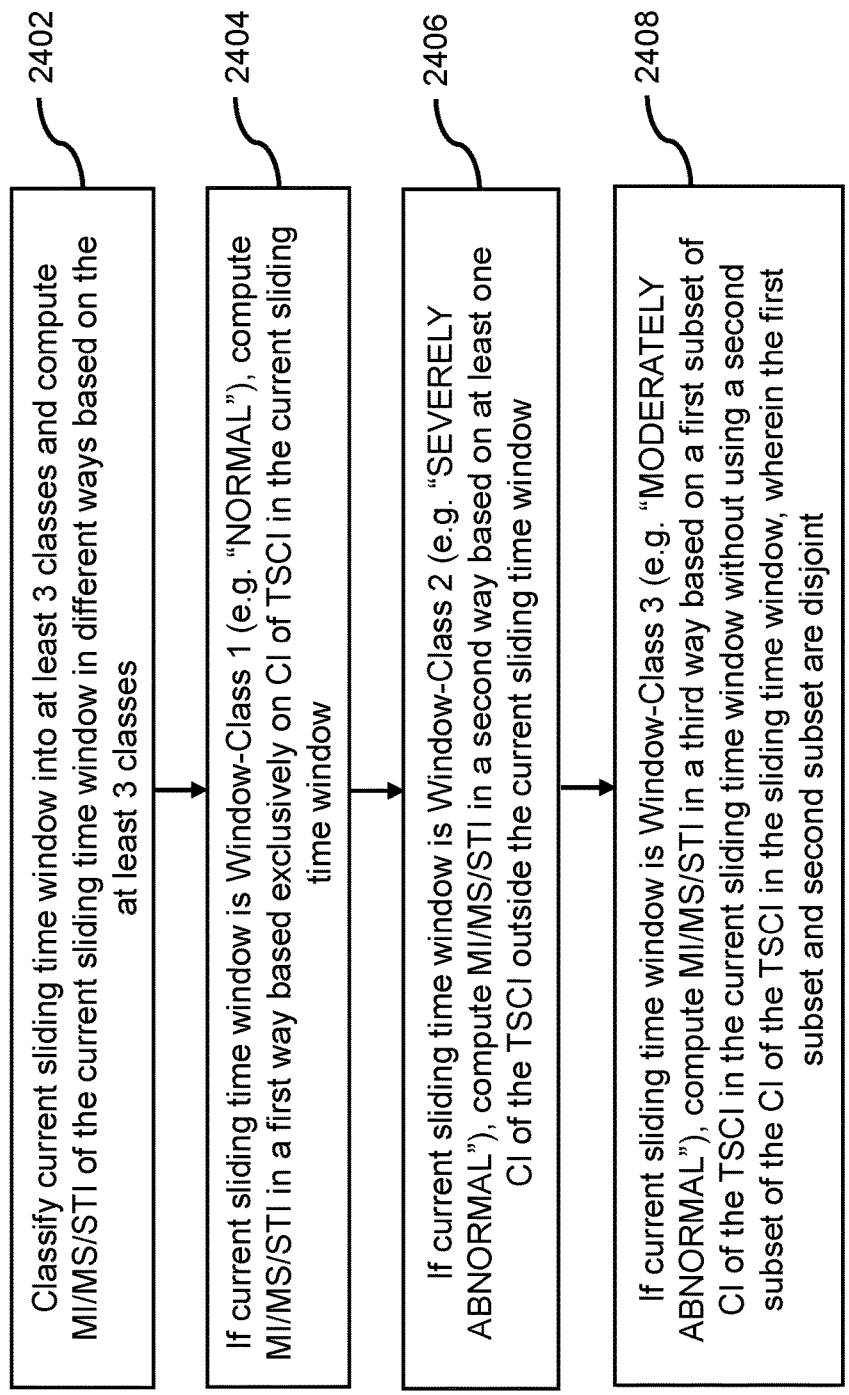
FIGS. 24-28 are flow charts showing detailed operations for an accurate wireless monitoring, according to some embodiments of the present disclosure.

FIG. 24 illustrates a flow chart of an exemplary method 2400 for performing a classification of a sliding time window, according to some embodiments of the present disclosure. In various embodiments, the method 2400 can be performed by a system as disclosed above. At operation 2402, the system can classify current sliding time window into at least 3 classes and compute MI/MS/STI of the current sliding time window in different ways based on the at least 3 classes. At operation 2404, if current sliding time window is Window-Class 1 (e.g. "NORMAL"), the system can compute MUMS/STI in a first way based exclusively on CI of TSCI in the current sliding time window. At operation 2406, if current sliding time window is Window-Class 2 (e.g. "SEVERELY ABNORMAL"), the system compute MI/MS/STI in a second way based on at least one CI of the TSCI outside the current sliding time window. At operation 2408, if current sliding time window is Window-Class 3 (e.g. "MODERATELY ABNORMAL"), the system can compute MI/MS/STI in a third way based on a first subset of CI of the TSCI in the current sliding time window without using a second subset of the CI of the TSCI in the sliding time window, wherein the first subset and second subset are disjoint.

Figure 25:
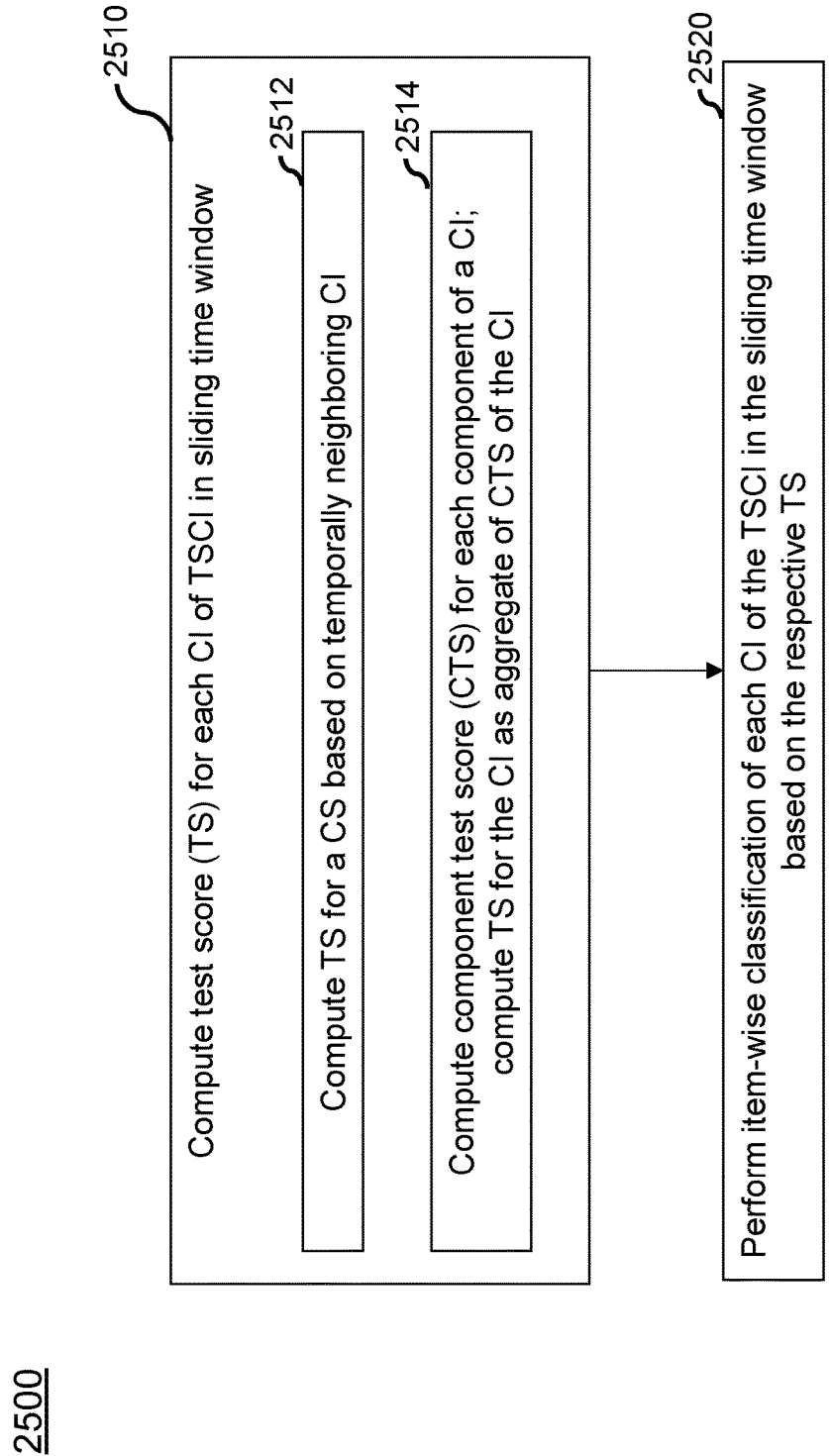

FIG. 25 illustrates a flow chart of an exemplary method 2500 for computing test score (TS) and performing item-wise classification of each CI, according to some embodiments of the present disclosure. In various embodiments, the method 2500 can be performed by a system as disclosed above. At operation 2510, the system can compute test score (TS) for each CI of TSCI in sliding time window, based on one of sub-operations 2512, 2514. At sub-operation 2512, the system can compute TS for a CS based on temporally neighboring CI. At sub-operation 2514, the system can compute component test score (CTS) for each component of a CI; and then compute TS for the CI as aggregate of CTS of the CI. In some embodiments, TS comprises at least one of: test quantity, similarity/dis-similarity/matching/mismatch score, distance score, TRRS, correlation/covariance/autocorrelation/cross-correlation, inner product, norm, aggregate, difference, absolute/square difference, variance/variation/variability, deviation/standard deviation, spread, dispersion, divergence, skewness, range, kurtosis, interquartile range, Gini coefficient, entropy, mean, median, mode, maximum, minimum, percentile, quartile, max-to-min ratio, variance-to-mean ratio, regularity, irregularity, statistics, histogram, probability, impulsiveness, suddenness, occurrence, recurrence, change, a difference of CI(t) and a linear combination of CI(t+k) for k=+−1/2/3/ . . . , a difference of F(CI(t)) and a linear combination of F(CI(t+k)), an inner product of CI(t) and a linear combination of CI(t+k) for k=+−1/2/3/ . . . , an inner product of F(CI(t)) and a linear combination of F(CI(t+k)), a dis-similarity score of CI(t) and a linear combination of CI(t+k) for k=+−1/2/3/ . . . , or a dis-similarity of F(CI(t)) and a linear combination of F(CI(t+k)). At operation 2520, the system can perform item-wise classification of each CI of the TSCI in the sliding time window based on the respective TS.

Figure 26:
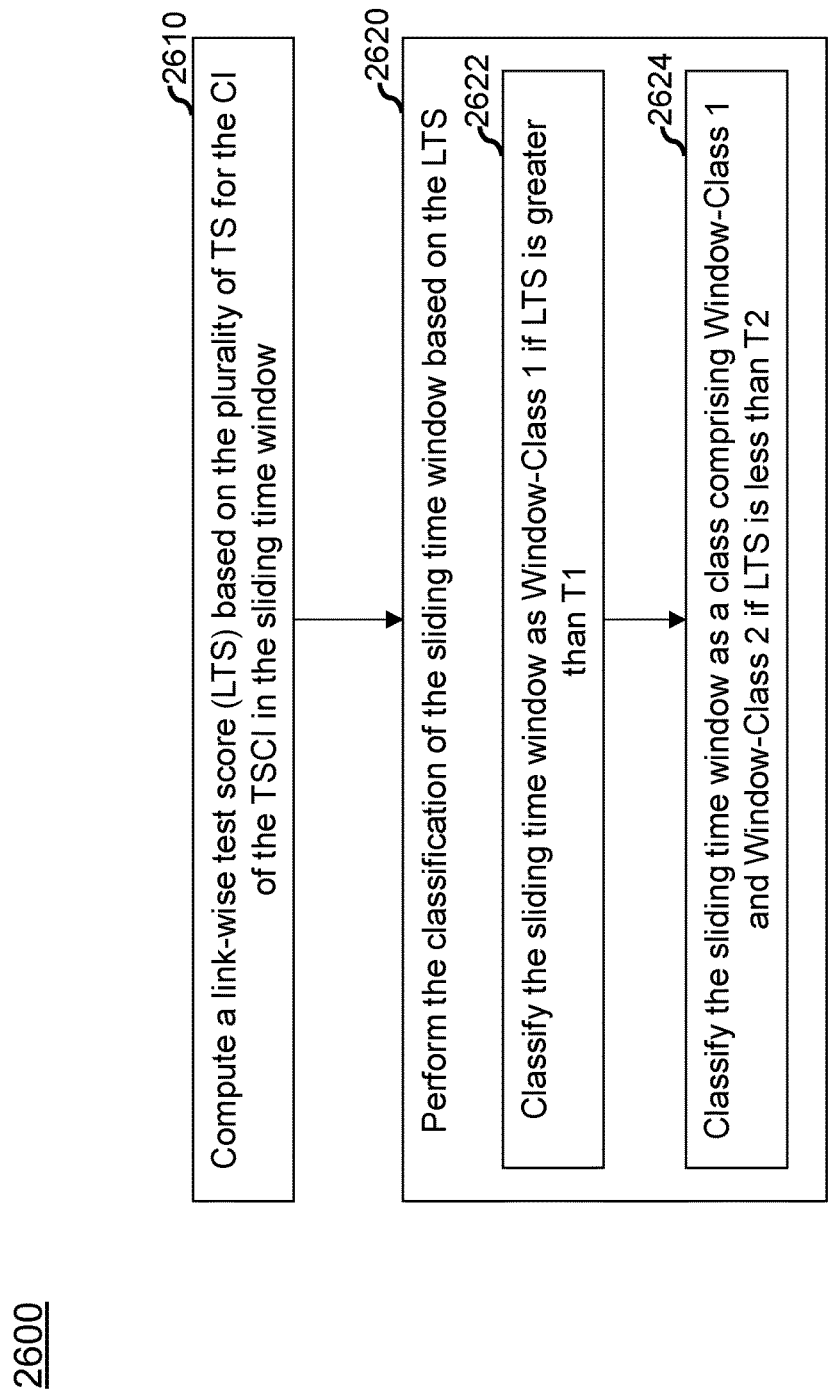

FIG. 26 illustrates a flow chart of an exemplary method 2600 for performing a classification of a sliding time window, according to some embodiments of the present disclosure. In various embodiments, the method 2600 can be performed by a system as disclosed above. At operation 2610, the system can compute a link-wise test score (LTS) based on the plurality of TS for the CI of the TSCI in the sliding time window. In some embodiments, LTS is an aggregate of the plurality of TS, wherein the aggregate may comprise at least one of: sum, weighted sum, average, weighted average, geometric mean, weighted geometric mean, harmonic mean, weighted harmonic mean, arithmetic mean, weighted mean, trimmed mean, median, weighted median, mode, histogram, statistics, percentile, maximum, minimum, variance, variation, divergence, spread, range, deviation, or characteristic value. At operation 2620, the system can perform the classification of the sliding time window based on the LTS, which comprises sub-operations 2622, 2624. At sub-operation 2622, the system can classify the sliding time window as Window-Class 1 if LTS is greater than T1. At sub-operation 2624, the system can classify the sliding time window as a class comprising Window-Class 1 and Window-Class 2 if LTS is less than T2.

Figure 27:
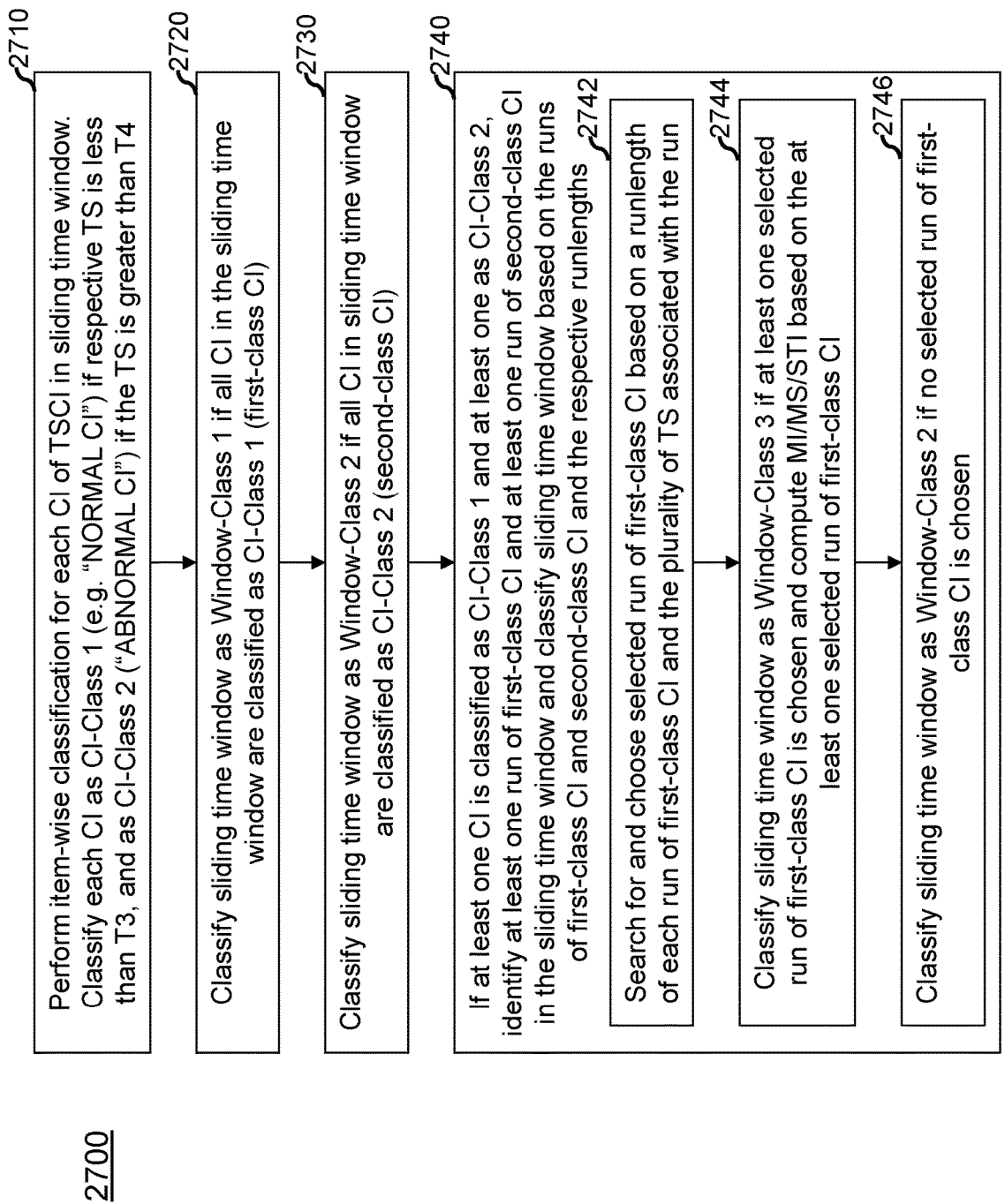

FIG. 27 illustrates a flow chart of an exemplary method 2700 for performing a classification of a sliding time window, according to some embodiments of the present disclosure. In various embodiments, the method 2700 can be performed by a system as disclosed above. At operation 2710, the system can perform item-wise classification for each CI of TSCI in sliding time window. Classify each CI as CI-Class 1 (e.g. "NORMAL CI") if respective TS is less than T3, and as CI-Class 2 ("ABNORMAL CI") if the TS is greater than T4. At operation 2720, the system can classify sliding time window as Window-Class 1 if all CI in the sliding time window are classified as CI-Class 1 (first-class CI). At operation 2730, the system can classify sliding time window as Window-Class 2 if all CI in sliding time window are classified as CI-Class 2 (second-class CI). At operation 2740, if at least one CI is classified as CI-Class 1 and at least one as CI-Class 2, the system may identify at least one run of first-class CI and at least one run of second-class CI in the sliding time window and classify sliding time window based on the runs of first-class CI and second-class CI and the respective runlengths, which comprises sub-operations 2742, 2744, 2746. At sub-operation 2742, the system may search for and choose selected run of first-class CI based on a runlength of each run of first-class CI and the plurality of TS associated with the run. In some embodiments, N1 runs of first-class CI with longest runlengths among all runs are chosen. For example, N1=1, such that the run of first-class CI with longest runlength among all runs are chosen. In some embodiments, any run of first-class CI with runlength greater than T5 is chosen. In some embodiments, a beginning run of first-class CI with runlength greater than T6 is chosen. In some embodiments, a beginning run of first-class CI with runlength greater than T6 is chosen. In some embodiments, a count of selected run of first-class CI is less than or equal to N1. In some embodiments, a run of first-class CI is chosen provided all associated TS satisfy a condition. In some embodiments, a run of first-class CI is chosen provided all associated TS is less than a threshold. At sub-operation 2744, the system can classify sliding time window as Window-Class 3 if at least one selected run of first-class CI is chosen and compute MUMS/STI based on the at least one selected run of first-class CI. At sub-operation 2746, the system can classify sliding time window as Window-Class 2 if no selected run of first-class CI is chosen.

Figure 28:
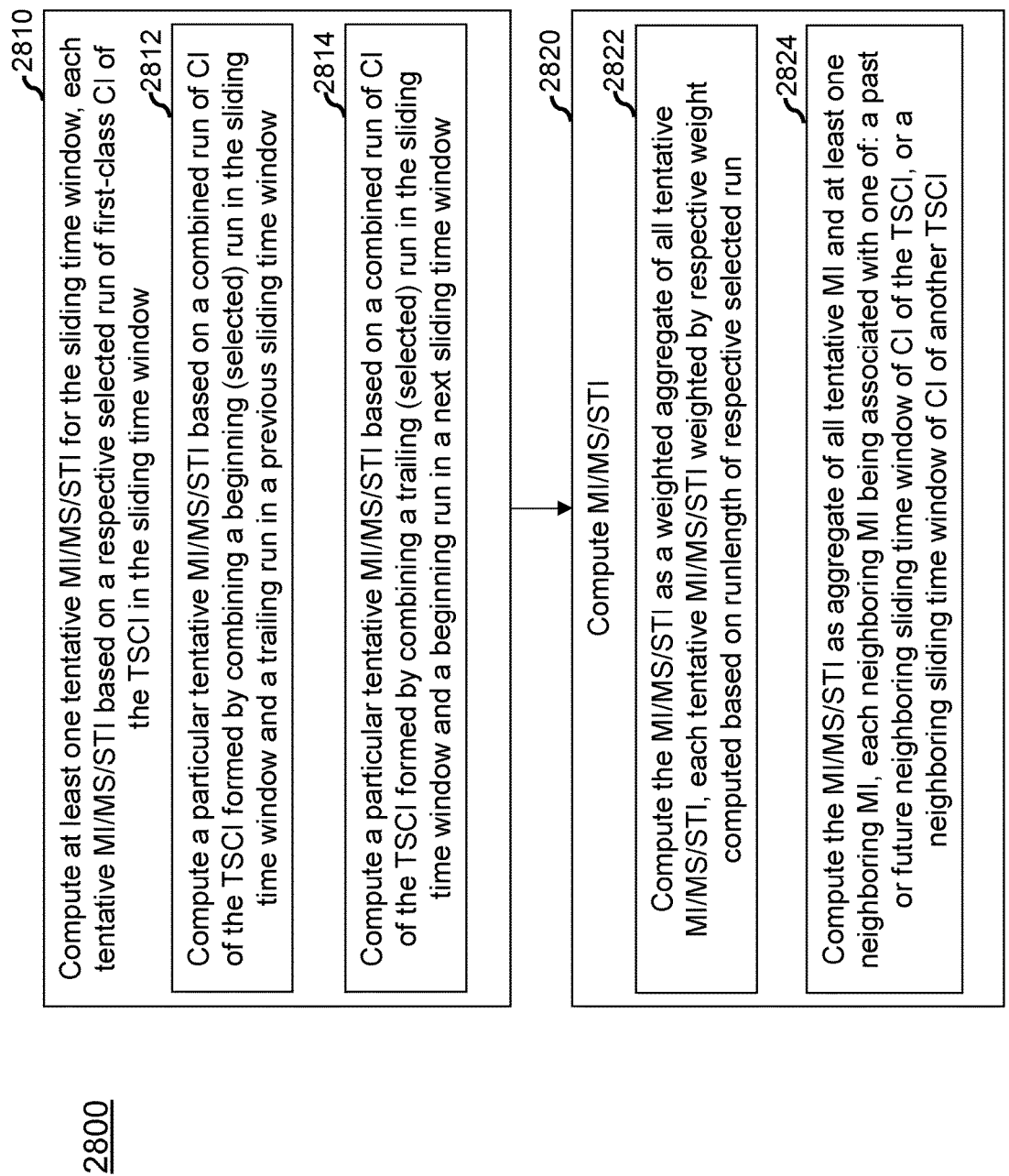

FIG. 28 illustrates a flow chart of an exemplary method 2800 for computing MUMS/STI, according to some embodiments of the present disclosure. In various embodiments, the method 2800 can be performed by a system as disclosed above. At operation 2810, the system can compute at least one tentative MI/MS/STI for the sliding time window, each tentative MUMS/STI based on a respective selected run of first-class CI of the TSCI in the sliding time window, which may comprises sub-operations 2812, 2814. At sub-operation 2812, the system may compute a particular tentative MUMS/STI based on a combined run of CI of the TSCI formed by combining a beginning (selected) run in the sliding time window and a trailing run in a previous sliding time window. At sub-operation 2814, the system may compute a particular tentative MUMS/STI based on a combined run of CI of the TSCI formed by combining a trailing (selected) run in the sliding time window and a beginning run in a next sliding time window. At operation 2820, the system can compute MUMS/STI, by at least one of the sub-operations 2822, 2824. At sub-operation 2822, the system may compute the MI/MS/STI as a weighted aggregate of all tentative MUMS/STI, each tentative MI/MS/STI weighted by respective weight computed based on runlength of respective selected run. At sub-operation 2824, the system may compute the MI/MS/STI as aggregate of all tentative MI and at least one neighboring MI, each neighboring MI being associated with one of: a past or future neighboring sliding time window of CI of the TSCI, or a neighboring sliding time window of CI of another TSCI.

Figure 29:
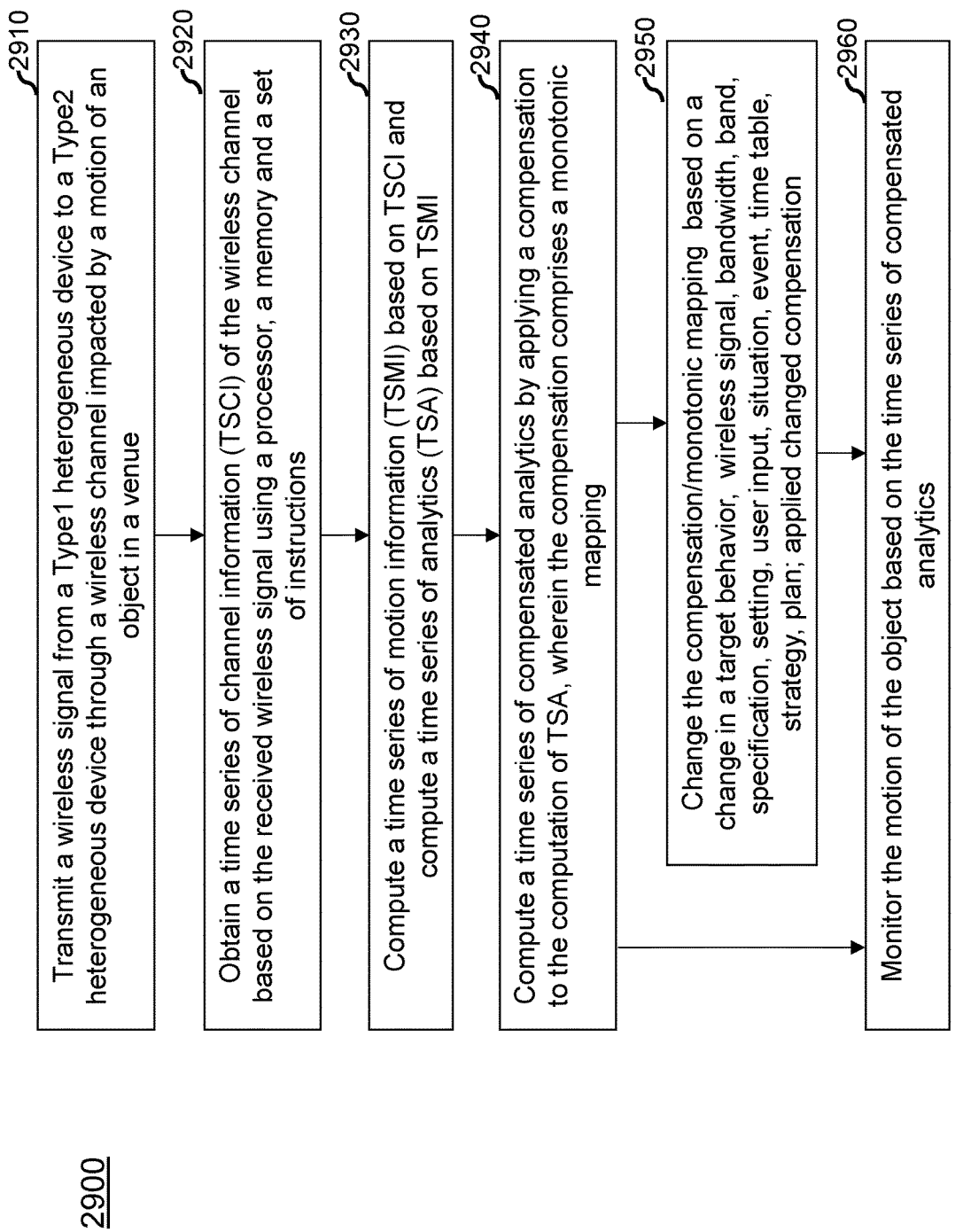
FIGS. 29-37 are flow charts showing detailed operations for a compensated wireless monitoring, according to some embodiments of the present disclosure.

FIG. 29 illustrates a flow chart of an exemplary method 2900 for performing a compensated wireless monitoring, according to some embodiments of the present disclosure. In various embodiments, the method 2900 can be performed by one or more systems as disclosed above. At operation 2910, a wireless signal is transmitted from a Type1 heterogeneous device to a Type2 heterogeneous device through a wireless channel impacted by a motion of an object in a venue. At operation 2920, a time series of channel information (TSCI) of the wireless channel is obtained based on the received wireless signal using a processor, a memory and a set of instructions. At operation 2930, the system can compute a time series of motion information (TSMI) based on TSCI and compute a time series of analytics (TSA) based on TSMI. At operation 2940, the system may compute a time series of compensated analytics by applying a compensation to the computation of TSA, wherein the compensation comprises a monotonic mapping. In one embodiment, the system may change the compensation/monotonic mapping based on a change in a target behavior, wireless signal, bandwidth, band, specification, setting, user input, situation, event, time table, strategy, plan; applied changed compensation, at operation 2950, and then monitor at operation 2960 the motion of the object based on the time series of compensated analytics. In another embodiment, the system may directly monitor the motion of the object based on the time series of compensated analytics at operation 2960, after performing operation 2940.

Figure 30:
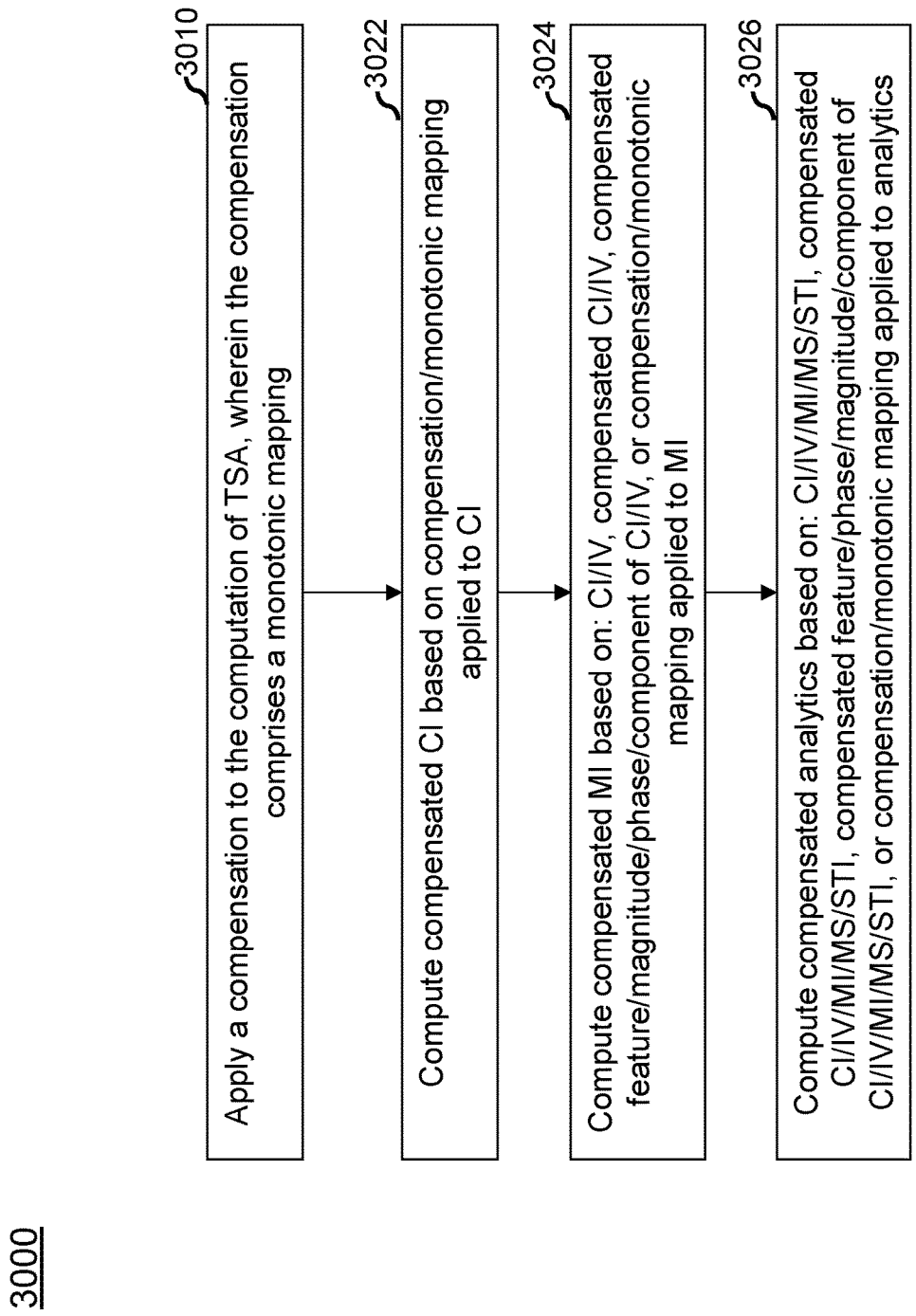

FIG. 30 illustrates a flow chart of an exemplary method 3000 for computing a time series of compensated analytics, according to some embodiments of the present disclosure. In various embodiments, the method 3000 can be performed by a system as disclosed above. At operation 3010, the system can apply a compensation to the computation of TSA, wherein the compensation comprises a monotonic mapping. In some embodiments, the monotonic mapping comprises at least one of: convex/concave/univariate/bivariate/multivariate mapping, linear/nonlinear/affine/piecewise-linear mapping, monotonic non-decreasing/non-increasing/increasing/decreasing mapping, quadratic/cubic/polynomial/exponential/logarithmic mapping, fitted/non-parametric/parametric/regression/spline mapping, function/inverse function/function of function, mapping of mapping/composite mapping, time-varying/time-invariant mapping. In some embodiments, the compensation/monotonic mapping may comprise at least one compensation tailor-made for: (1) a pair of generic Type1 device and Type2 device, (2) the Type1 device, (3) the Type2 device or (4) the pair of the Type1 device and the Type2 device. In some embodiments, the compensation/monotonic mapping may be applied to at least one of: CI/IV/MUMS/STI/analytics, feature/magnitude/phase/component of CI/IV/MI/MS/STI/analytics, TSCI/TSMI/TSA. At operation 3022, the system can compute compensated CI based on compensation/monotonic mapping applied to CI. At operation 3024, the system may compute compensated MI based on: CI/IV, compensated CI/IV, compensated feature/magnitude/phase/component of CI/IV, or compensation/monotonic mapping applied to MI. At operation 3026, the system may compute compensated analytics based on: CI/IV/MI/MS/STI, compensated CI/IV/MI/MS/STI, compensated feature/phase/magnitude/component of CI/IV/MI/MS/STI, or compensation/monotonic mapping applied to analytics.

Figure 31:
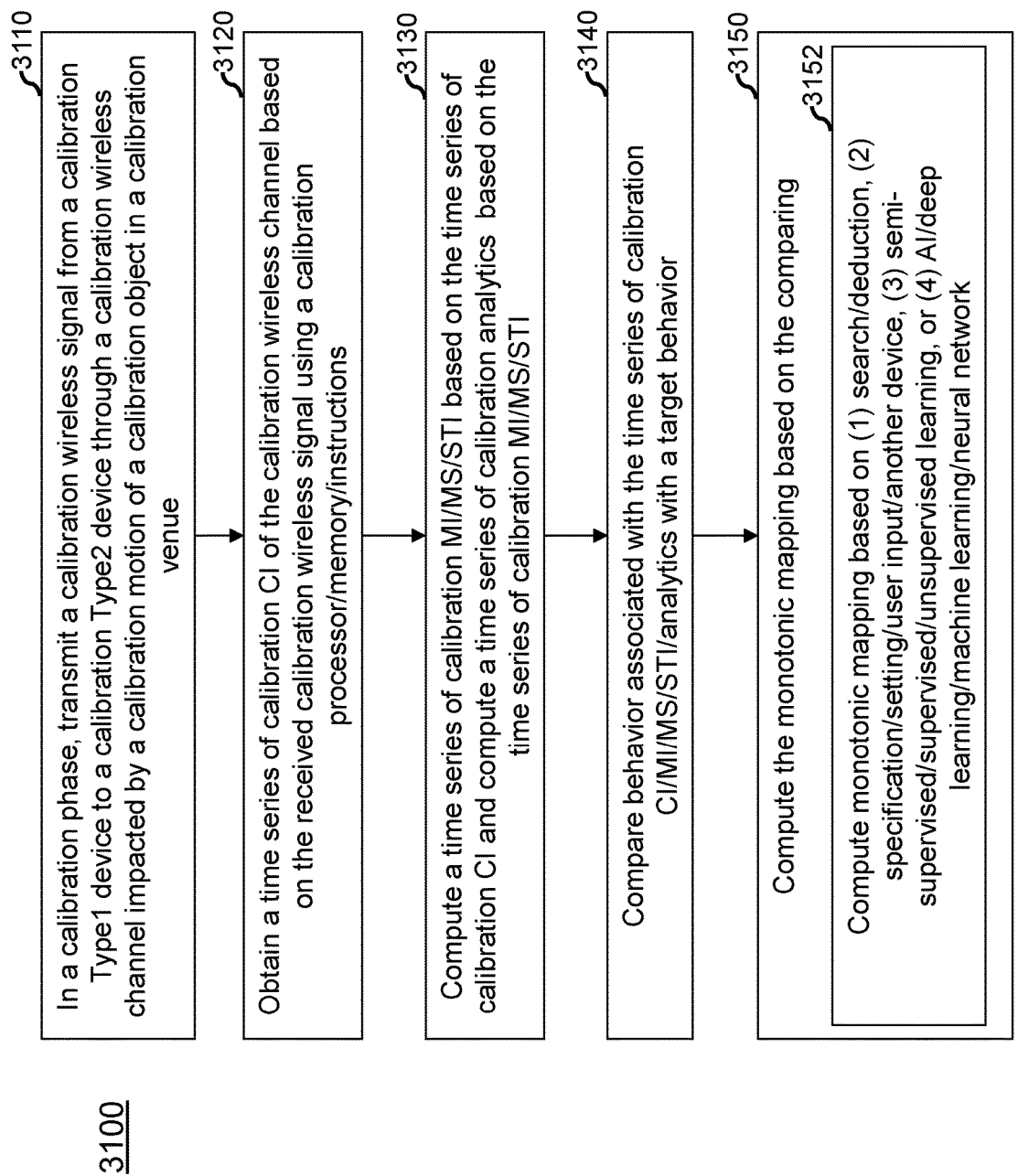

FIG. 31 illustrates a flow chart of an exemplary method 3100 for computing a monotonic mapping, according to some embodiments of the present disclosure. In various embodiments, the method 3100 can be performed by a system as disclosed above. At operation 3110, in a calibration phase, a calibration wireless signal is transmitted from a calibration Type1 device to a calibration Type2 device through a calibration wireless channel impacted by a calibration motion of a calibration object in a calibration venue. At operation 3120, a time series of calibration CI of the calibration wireless channel is obtained based on the received calibration wireless signal using a calibration processor/memory/instructions. At operation 3130, the system can compute a time series of calibration MI/MS/STI based on the time series of calibration CI, and compute a time series of calibration analytics based on the time series of calibration MI/MS/STI. At operation 3140, the system may compute behavior associated with the time series of calibration CI/MI/MS/STI/analytics with a target behavior. In some embodiments, the behavior comprises: feature/magnitude/phase/component behavior, statistical/time/frequency/projection/transform behavior, uni-/bi-/multi-variate/conditional/cumulative/restricted distribution/histogram, behavior of CI/IV/MI/MS/STI/analytics or associated observables, behavior restricted to time period, statistics, mean, median, percentile, max, min, range, variance, dispersion, variability, kurtosis, information, entropy, moment, correlation, covariance, ACF, etc. At operation 3150, the system may compute the monotonic mapping based on the comparing, which may comprise a sub-operation 3152, where the system may compute the monotonic mapping based on (1) search/deduction, (2) specification/setting/user input/another device, (3) semi-supervised/supervised/unsupervised learning, or (4) AI/deep learning/machine learning/neural network.

Figure 32:
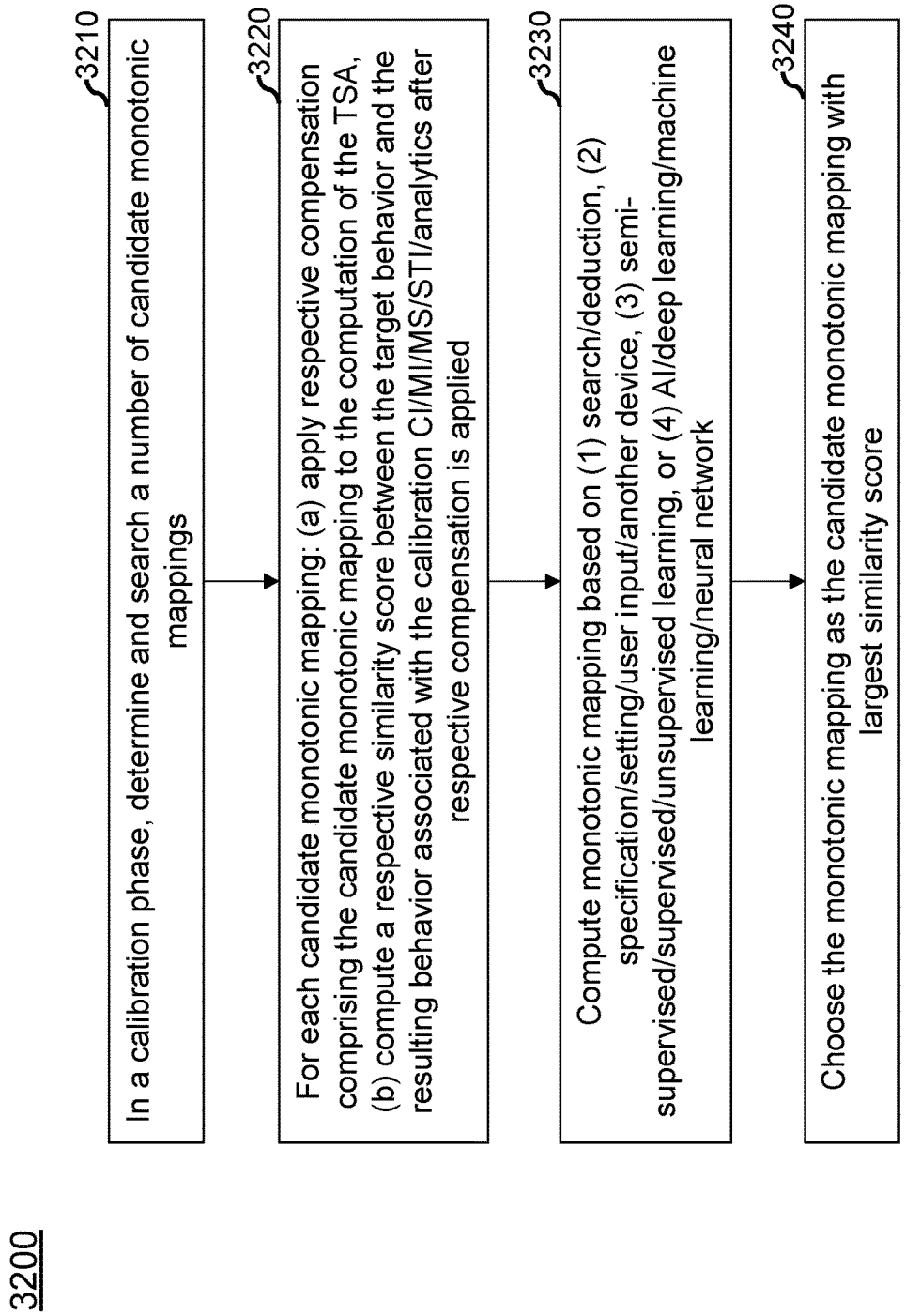

FIG. 32 illustrates a flow chart of an exemplary method 3200 for determining a monotonic mapping, according to some embodiments of the present disclosure. In various embodiments, the method 3200 can be performed by a system as disclosed above. At operation 3210, in a calibration phase, the system can determine and search a number of candidate monotonic mappings. At operation 3220, for each candidate monotonic mapping, the system can: (a) apply respective compensation comprising the candidate monotonic mapping to the computation of the TSA, (b) compute a respective similarity score between the target behavior and the resulting behavior associated with the calibration CI/MI/MS/STI/analytics after respective compensation is applied. At operation 3230, the system can compute monotonic mapping based on (1) search/deduction, (2) specification/setting/user input/another device, (3) semi-supervised/supervised/unsupervised learning, or (4) AI/deep learning/machine learning/neural network. At operation 3240, the system may choose the monotonic mapping as the candidate monotonic mapping with largest similarity score.

Figure 33:
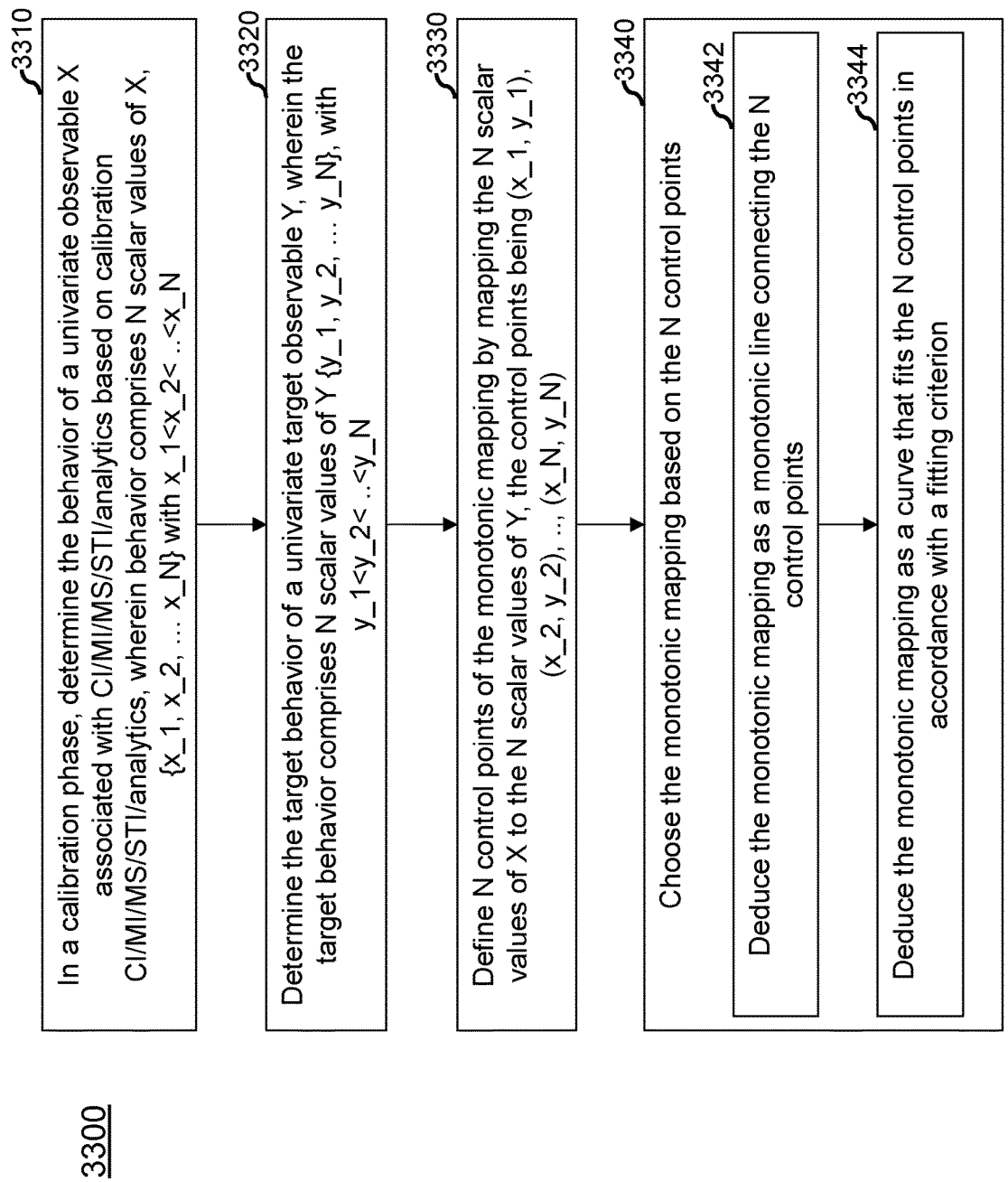

FIG. 33 illustrates a flow chart of an exemplary method 3300 for choosing a monotonic mapping, according to some embodiments of the present disclosure. In various embodiments, the method 3300 can be performed by a system as disclosed above. At operation 3310, in a calibration phase, the system can determine the behavior of a univariate observable X associated with CI/MI/MS/STI/analytics based on calibration CI/MUMS/STU analytics, wherein behavior comprises N scalar values of X, $\{x\_1, x\_2, \ldots x\_N\}$ with $x\_1 < x\_2 < \ldots < x\_N$. At operation 3320, the system can determine the target behavior of a univariate target observable Y, wherein the target behavior comprises N scalar values of Y $\{y\_1, y\_2, \ldots y\_N\}$, with $y\_1 < y\_2 < \ldots < y\_N$. At operation 3330, the system may define N control points of the monotonic mapping by mapping the N scalar values of X to the N scalar values of Y, the control points being $(x\_1, y\_1), (x\_2, y\_2), \ldots, (x\_N, y\_N)$. At operation 3340, the system may choose the monotonic mapping based on the N control points, which may comprise sub-operations 3342, 3344. At sub-operation 3342, the system may deduce the monotonic mapping as a monotonic line connecting the N control points. In some embodiments, the monotonic line comprises: linear/affine/quadratic/cubic/polynomial/exponential/logarithmic/convex/concave/spline map, piecewise linear/quadratic/cubic/polynomial map, or monotonic increase/non-decreasing map. At sub-operation 3344, the system may deduce the monotonic mapping as a curve that fits the N control points in accordance with a fitting criterion, e.g. using: linear/robust/orthogonal/Deming/major axis/segmented/polynomial regression of N control points.

Figure 34:
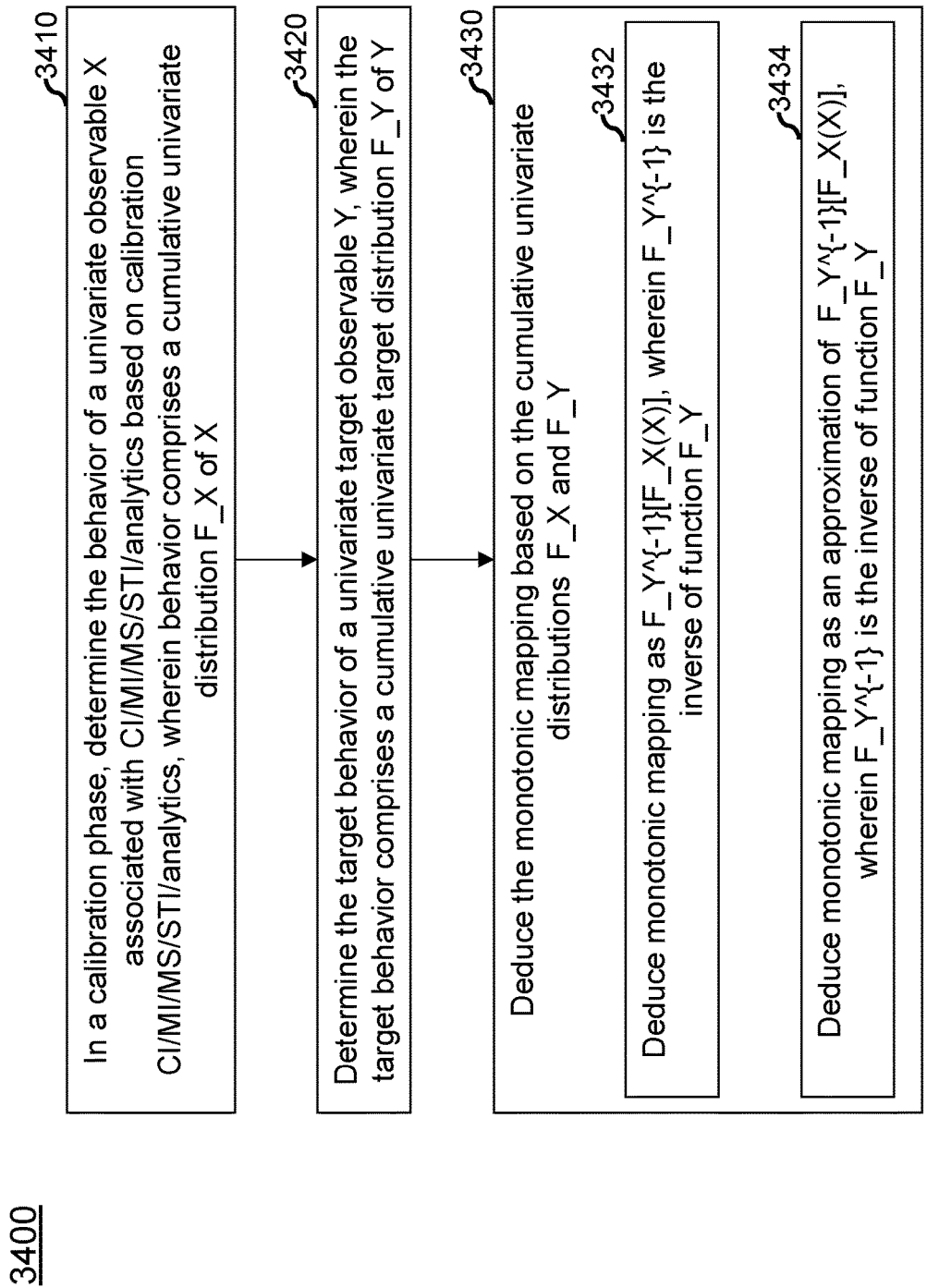

FIG. 34 illustrates a flow chart of an exemplary method 3400 for deducing a monotonic mapping, according to some embodiments of the present disclosure. In various embodiments, the method 3400 can be performed by a system as disclosed above. At operation 3410, in a calibration phase, the system can determine the behavior of a univariate observable X associated with CI/MI/MS/STI/analytics based on calibration CI/MI/MS/STI/analytics, wherein behavior comprises a cumulative univariate distribution F_X of X. At operation 3420, the system can determine the target behavior of a univariate target observable Y, wherein the target behavior comprises a cumulative univariate target distribution F_Y of Y. At operation 3430, the system may deduce the monotonic mapping based on the cumulative univariate distributions F_X and F_Y, e.g. based on performing one of sub-operations 3432, 3434. At sub-operation 3432, the system may deduce monotonic mapping as $F\_Y^{\{-1\}}[F\_X(X)]$, wherein $F\_Y^{\{-1\}}$ is the inverse of function FY. At sub-operation 3434, the system may deduce monotonic mapping as an approximation of $F\_Y^{\{-1\}}[F\_X(X)]$, wherein $F\_Y^{\{-1\}}$ is the inverse of function FY. In some embodiments, the approximation comprises: linear/affine/quadratic/cubic/polynomial/exponential/logarithmic/convex/concave/spline map, piecewise linear/quadratic/cubic/polynomial map, or monotonic increase/non-decreasing map.

Figure 35:
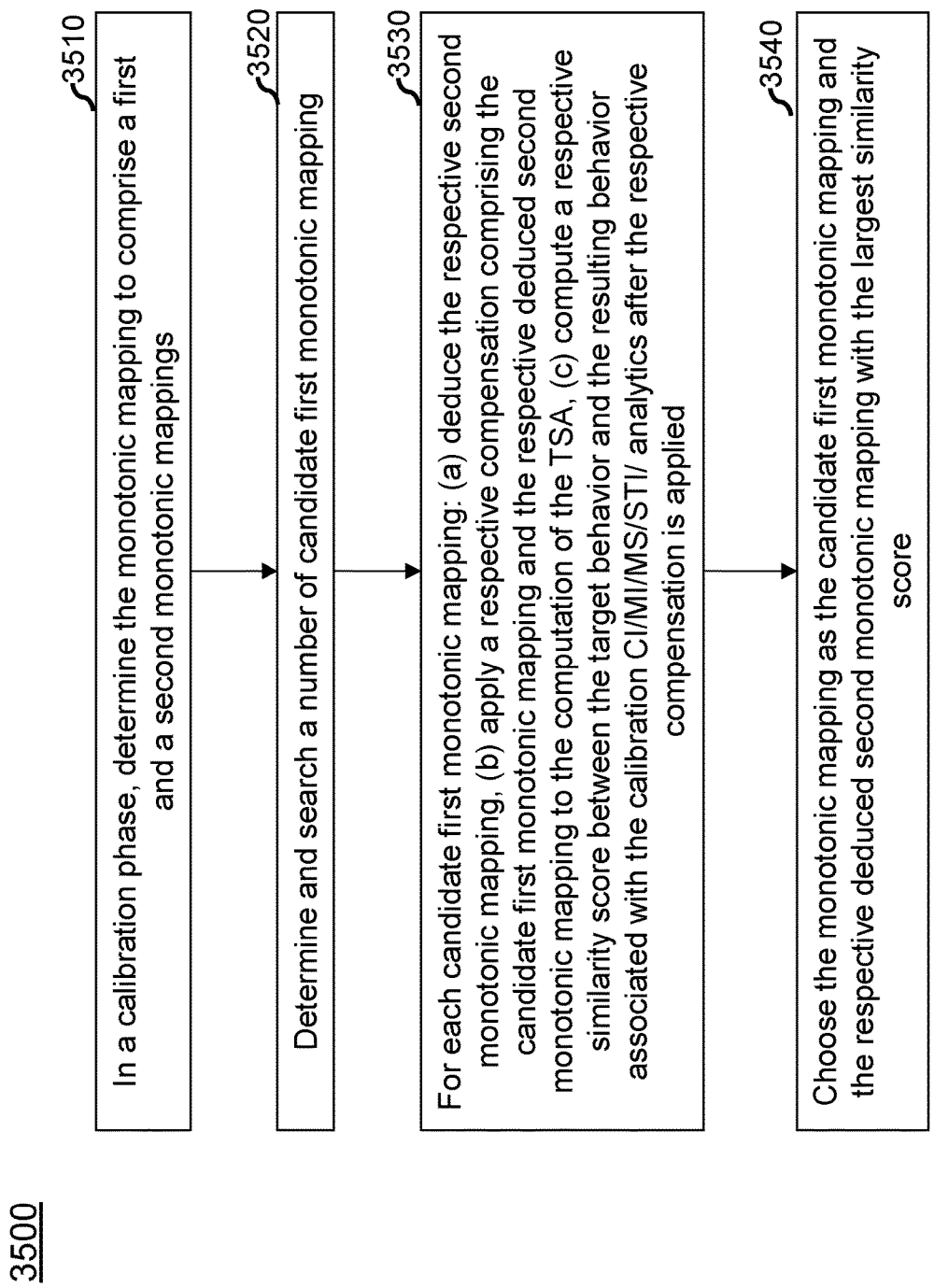

FIG. 35 illustrates a flow chart of an exemplary method 3500 for choosing a monotonic mapping, according to some embodiments of the present disclosure. In various embodiments, the method 3500 can be performed by a system as disclosed above. At operation 3510, in a calibration phase, the system can determine the monotonic mapping to comprise a first and a second monotonic mappings. At operation 3520, the system can determine and search a number of candidate first monotonic mapping. At operation 3530, for each candidate first monotonic mapping, the system may: (a) deduce the respective second monotonic mapping, (b) apply a respective compensation comprising the candidate first monotonic mapping and the respective deduced second monotonic mapping to the computation of the TSA, and (c)

compute a respective similarity score between the target behavior and the resulting behavior associated with the calibration CI/MI/MS/STU analytics after the respective compensation is applied. At operation 3540, the system may choose the monotonic mapping as the candidate first monotonic mapping and the respective deduced second monotonic mapping with the largest similarity score.

Figure 36:
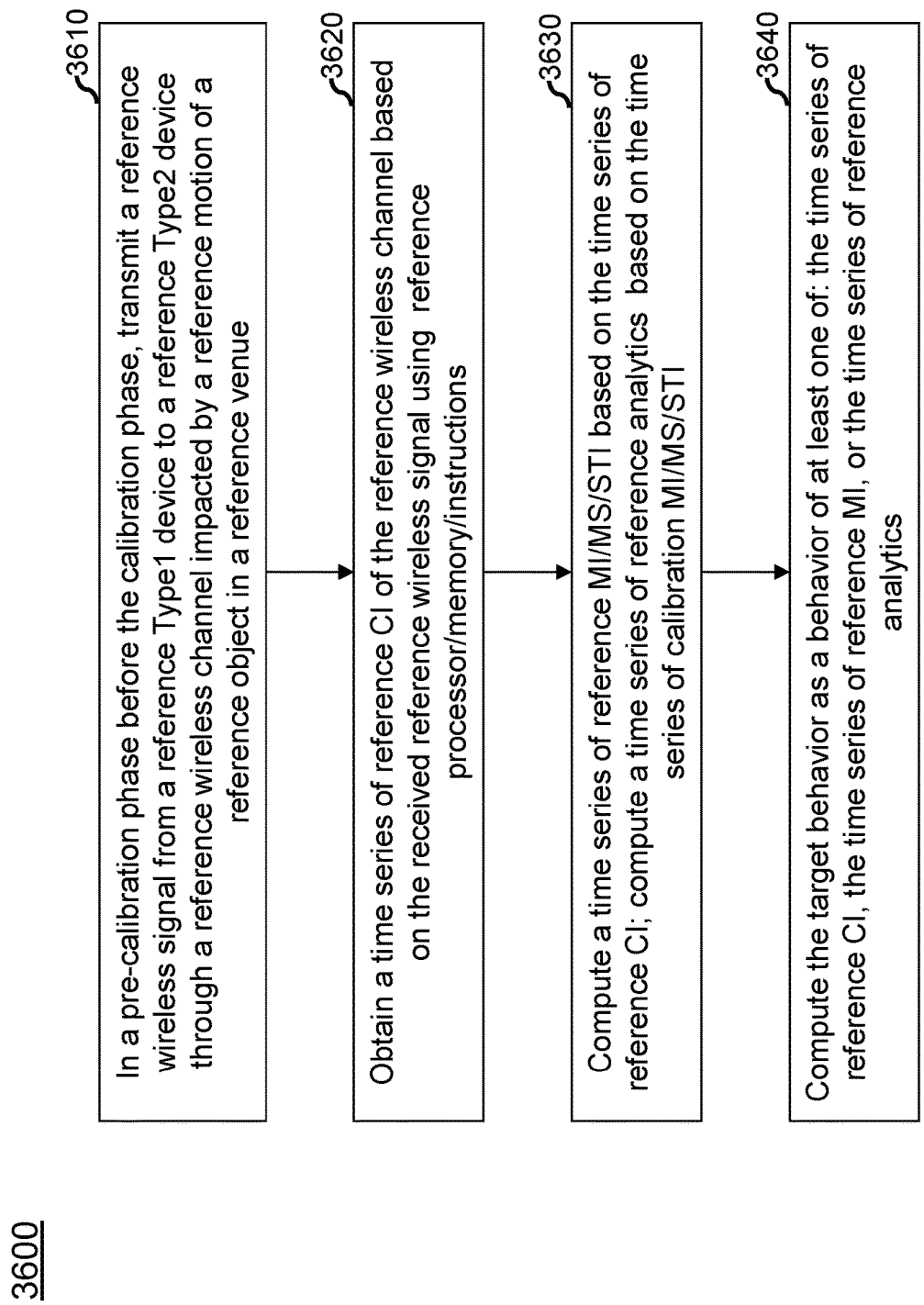

FIG. 36 illustrates a flow chart of an exemplary method 3600 for computing the target behavior, according to some embodiments of the present disclosure. In various embodiments, the method 3600 can be performed by a system as disclosed above. At operation 3610, in a pre-calibration phase before the calibration phase, a reference wireless signal is transmitted from a reference Type1 device to a reference Type2 device through a reference wireless channel impacted by a reference motion of a reference object in a reference venue. At operation 3620, a time series of reference CI of the reference wireless channel is obtained based on the received reference wireless signal using reference processor/memory/instructions. At operation 3630, the system can compute a time series of reference MUMS/STI based on the time series of reference CI; compute a time series of reference analytics based on the time series of calibration MI/MS/STI. At operation 3640, the system may compute the target behavior as a behavior of at least one of: the time series of reference CI, the time series of reference MI, or the time series of reference analytics.

Figure 37:
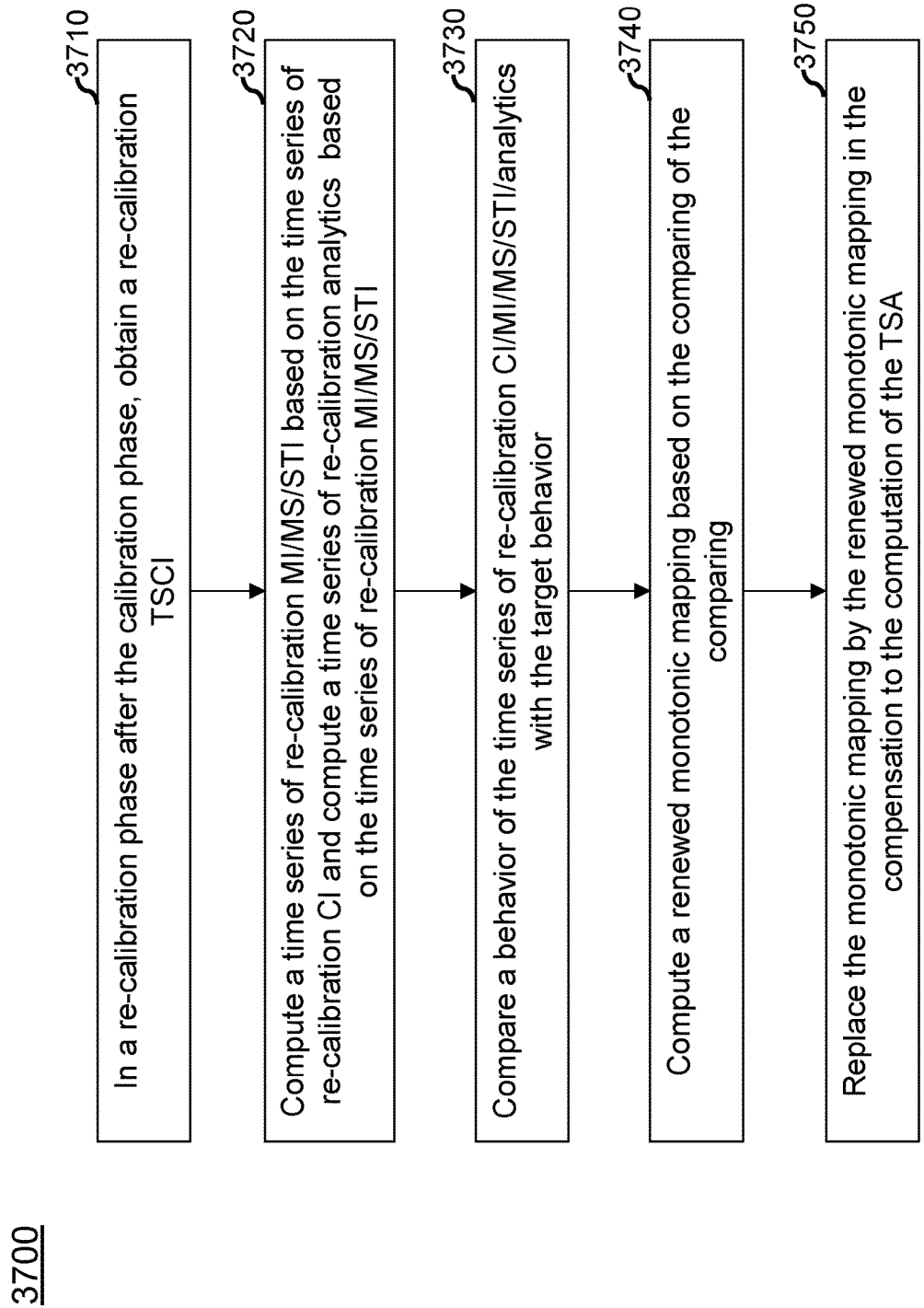

FIG. 37 illustrates a flow chart of an exemplary method 3700 for updating a monotonic mapping, according to some embodiments of the present disclosure. In various embodiments, the method 3700 can be performed by a system as disclosed above. At operation 3710, in a re-calibration phase after the calibration phase, the system can obtain a re-calibration TSCI. At operation 3720, the system can compute a time series of re-calibration MUMS/STI based on the time series of re-calibration CI, and compute a time series of re-calibration analytics based on the time series of re-calibration MUMS/STI. At operation 3730, the system can compare a behavior of the time series of re-calibration CI/MI/MS/STI/analytics with the target behavior. At operation 3740, the system may compute a renewed monotonic mapping based on the comparing of the comparing. At operation 3750, the system may replace the monotonic mapping by the renewed monotonic mapping in the compensation to the computation of the TSA.

The order of the operations in any one of FIGS. 23-37 may be changed according to various embodiments of the present teaching.

While a motion statistics (MS) or motion information (MI) may be computed in a sliding time window to perform wireless sensing and monitoring, one goal of the present teaching is to provide an accurate wireless monitoring by detecting, suppressing, removing and/or excluding outliers or effects of the outliers in a sliding time window. In some embodiments, a sliding time window may be classified to be "normal", "moderately abnormal" or "severely abnormal". Depending on the classification, the MS/MI for the sliding time window may be computed differently. When "normal", the MS/MI may be computed in a normal way. When "severely abnormal", the MS/MI may be computed, not based on CI in the sliding time window, but based on neighboring CI or MS/MI. When "moderately abnormal", the MS/MI may be computed based on the good/reliable (or "normal") CI in the sliding time window. Bad/unreliable (or "abnormal", or "severely abnormal") CI in the sliding time window will not be used to compute the MS/MI.

The following numbered clauses provide examples for an accurate wireless monitoring.

Clause 1. A method/device/system/software of a wireless monitoring system, comprising: transmitting a wireless signal from a Type1 heterogeneous wireless device of the wireless sensing system through a wireless multipath channel of a venue, wherein the wireless multipath channel is impacted by a motion of an object in the venue; receiving the wireless signal by a Type2 heterogeneous wireless device of the system through the wireless multipath channel, wherein the received wireless signal differs from the transmitted wireless signal due to the wireless multipath channel of the venue and the periodic vital sign motion of the object; obtaining a time series of channel information (CI) of the wireless multipath channel based on the received wireless signal using a processor, a memory and a set of instructions; performing a classification of a sliding time window by analyzing the CI of the TSCI in the sliding time window; computing a motion information (MI) for the sliding time window based on the TSCI and the classification of the sliding time window; monitoring the motion based on the MI.

In some embodiments, some characteristic steps used to compute the MS/MI in the wireless sensing, whether "normal", "abnormal", "moderately abnormal", or "severely abnormal".

Clause 2. The method/device/system/software of the wireless monitoring system of clause 1, comprising: computing the MI based on a similarity score of two temporally adjacent CI of the TSCI.

Clause 3. The method/device/system/software of the wireless monitoring system of clause 1, comprising: computing the MI based on an autocorrelation function (ACF) of the TSCI.

Clause 4. The method/device/system/software of the wireless monitoring system of clause 3, comprising: computing the MI based on a characteristic point of the ACF.

In some embodiments, each sliding time window may be classified as one of: "moderately abnormal", "severely abnormal" or "normal" sliding-window-classes. In some embodiments, first sliding-window-class="normal" In some embodiments, second sliding-window-class="severely abnormal" In some embodiments, third sliding-window-class="moderately abnormal" In some embodiments, Third sliding-window-class="moderately abnormal": In some embodiments, When the (current) sliding time window is classified as a "moderately abnormal" sliding-window class (third class), In some embodiments, Each CI in the current sliding time window may be classified as one of: "abnormal" or "normal" CI-classes. CI-level test score (TS) may be computed for each CI based on some CI in a respective temporal neighborhood of the CI. Each CI may be classified based on the respective TS (e.g. "normal" if TS<threshold T1).

In some embodiments, the second subset in clause 5 may be the collection of all the abnormal CI. The first subset may be the collection of all the normal CI (which may comprise one or more runs of normal CI, each run comprising a run-length of consecutive normal CI, with run-length>=1). The first subset may also be a subset of the collection of normal CI (e.g. only the normal CI in the longest run or the selected runs, or only the beginning run of normal CI, or only the trailing run of normal CI).

In some embodiments, a reduced MI may be computed based on the first subset (e.g. only the longest run of normal CI, or only the beginning run, or only the trailing run, or the selected runs). Alternatively, there may be multiple disjoint runs of normal CI. Some runs may be "satisfactory" (e.g. with sufficient run-length, or with all TS<T2<T1). Some runs may be not satisfactory. Multiple tentative reduced MI may be computed, each based on a respective disjoint run of (satisfactory) normal CI. A reduced MI may be computed as an aggregate of the multiple tentative reduced MI. The aggregate may be a weighted quantity (e.g. weighted sum, weighted average, weighted product, weighted median, etc.). The weight for each tentative reduced MI may be adaptively computed based on the run-length of the run of normal CI used to compute the tentative reduced MI. In some embodiments, the (current) MS/MI of the (current) sliding time window may be computed as the reduced MS/MI. Alternatively the current MS/MI may be computed as an aggregate (e.g. weighted average) of the reduced MS/MI and some neighboring MS/MI (e.g. past MI, future MI). Any MS/MI (e.g. current MI, past MI, future MI, reduced MI, tentative reduced MI) may be normalized (e.g. by the amount of CI used to compute the MS/MI). In some embodiments, each MS/MI may be computed based on any of: feature (e.g. magnitude, magnitude square, phase), decomposition of CI into multiple CI-components (CIC), decomposition of TSCI into multiple time series of CIC (TSCIC), similarity score (e.g. TRRS) between two temporally adjacent CI/CIC, ACF of CI/CIC, frequency transform/eigen-decomposition of CI/CIC, characteristic point/value (e.g. local max/local min/zero-crossing) of ACF/transform/decomposition, component processing, etc.

In some embodiments, second sliding-window class="severely abnormal": when the (current) sliding time window is severely abnormal, the MS/MI may not be computed using the sliding time window. Instead, the MS/MI may be replaced by (i.e. computed as) some neighboring MS/MI (e.g. past MI, immediate past MI, future MI, next MI, or MI computed based on another TSCI) or an aggregate of them. In some embodiments, Any past MI may be associated with a respective past sliding time window and may be computed based on some past CI in the respective past sliding time window outside the current sliding time window. Similarly any future MI may be associated with a respective future sliding time window and may be computed based on some future CI in the respective future sliding time window outside the current sliding time window. In some embodiments, first sliding-window-class="normal": In some embodiments, When everything is normal, the MI of each sliding time window may be computed based exclusively on the CI of TSCI in the sliding time window, without using any CI of TSCI outside the sliding time window.

Clause 5. The method/device/system/software of the wireless monitoring system of clause 1, comprising: when the sliding time window is classified as a first sliding-window-class: computing the MI in a first way based exclusively on the CI of the TSCI in the sliding time window; when the sliding time window is classified as a second sliding-window-class: computing the MI in a second way based on at least one CI of the TSCI outside the sliding time window; and when the sliding time window is classified as a third sliding-window-class: excluding a second subset of the CI of the TSCI in the sliding time window in the computation of the MI, and computing the MI in a third way based on a first subset of the CI of the TSCI in the sliding time window without using the second subset, wherein the first subset and the second subset are disjoint.

In some embodiments, to classify the sliding time window, each of the plurality of CI in the sliding time window may be classified, based on corresponding test score (TS). In some embodiments, for second (item-wise) classification, each CI may be classified into "normal" or "abnormal" CI-class.

Clause 6. The method/device/system/software of the wireless monitoring system of clause 5, comprising: computing a test score (TS) for each CI of the TSCI in the sliding time window; performing an item-wise classification of each CI of the TSCI in the sliding time window based on the respective TS.

Clause 6b. The method/device/system/software of the wireless monitoring system of clause 6, comprising: wherein each CI has N1 components; computing a component-wise test score (CTS) for each component of each CI of the TSCI in the sliding time window; computing the TS of each CI as an aggregate of the N1 CTS associated with the CI.

Clause 6c. The method/device/system/software of the wireless monitoring system of clause 6b, comprising: computing the CTS for a component of a CI based on the respective components of a number of respective temporally neighboring CI.

Clause 6d. The method/device/system/software of the wireless monitoring system of clause 6b, comprising: computing the TS of each CI as an aggregate of a selected subset of the N1 CTS associated with the CI, wherein the selected subset is selected based on a criterion.

In some embodiments, TS at time t, i.e. TS(t), may be a function of temporally neighboring CI(t−i), where i=0,+−1, +−2, +−3, . . . etc. In some embodiments, TS(t) may be TS(t)=CI(t)−pastCI(t), or TS(t)=mag[CI(t)−pastCI(t)]^a, where mag=magnitude, wherein pastCI(t) may be CI(t−1), or [CI(t−1)+CI(t−2)]/2, or [2*CI(t−1)+CI(t−2)]/3, or [CI(t−1)+CI(t−2)+CI(t−3)]/3, or [2*CI(t−1)+CI(t−2)+CI(t−3)]/4, or [3*CI(t−1)+2*CI(t−2)+CI(t−3)]/6, etc. In some embodiments, TS(t) may also be TS(t)=CI(t)−futureCI(t), or TS(t)=mag[CI(t)−futureCI(t)]^b, where mag=magnitude, wherein futureCI(t) may be CI(t+1), or [CI(t+1)+CI(t+2)]/2, or [2*CI(t+1)+CI(t+2)]/3, or [CI(t+1)+CI(t+2)+CI(t+3)]/3, or [2*CI(t+1)+CI(t+2)+CI(t+3)]/4, or [3*CI(t+1)+2*CI(t+2)+CI(t+3)]/6, etc. In some embodiments, TS(t) may also be TS(t)=CI(t)−d*pastCI(t)−(1−d)*future(t), where 0<d<1.

Clause 7. The method/device/system/software of the wireless monitoring system of clause 6, comprising: computing the TS for the CI based on a number of respective temporally neighboring CI, wherein the TS comprises at least one of: a test quantity, a similarity score, a dissimilarity score, a matching score, a mismatch score, a distance score, a TRRS, a correlation, a covariance, an autocorrelation, a cross-correlation, an inner product, a norm, an aggregate, a difference, an absolute difference, a square difference, a variance, a variation, a deviation, a standard deviation, a spread, a dispersion, a variability, a divergence, a skewness, a kurtosis, a range, an inter-quartile range, a coefficient, a Gini coefficient, an entropy, a maximum, a minimum, a mean, a median, a mode, a percentile, a quartile, a variance-to-mean ratio, a max-to-min ratio, a regularity, an irregularity, a statistics, a histogram, a probability, an impulsiveness, a suddenness, an occurrence, a recurrence, or a change.

In some embodiments, TS may comprise a difference (i.e. subtraction, or vector subtraction). In some embodiments, For a vector X (N-tuple), F(X) may be a vector of same size (also N-tuple) such that i^{th} component of F(X) is a function of the i^{th} component of X. The function may comprise any of: magnitude, magnitude square, phase, another function of magnitude, another function of phase.

Clause 8. The method/device/system/software of the wireless monitoring system of clause 6, comprising: wherein the TS comprises at least one of, or a magnitude of at least one of: CI(t)−CI(t−1), CI(t)−CI(t+1), CI(t)−[CI(t−1)+CI(t+1)]/2, CI(t)−CI(t−2), CI(t)−CI(t+2), CI(t)−[CI(t−2)+CI(t+2)]/2, CI(t)−CI(t−k), CI(t)−CI(t+1), CI(t)−[CI(t−k)+CI(t+1)]/2, CI(t)−[a_1*CI(t−1)+a_2*CI(t−2)+ . . . +a_k*CI(t−k)]/ (a_1+a_2+ . . . +a_k), CI(t)−[b_1*CI(t+1)+b_2*CI(t+2)+ . . . +b_1*CI(t+1)]/(b_1+b_2+ . . . +b_1), CI(t)−[a_1*CI(t−1)+a_2*CI(t−2)+ . . . +a_k*CI(t−k)+b_1*CI(t+1)+b_2*CI(t+2)+ . . . +b_1*CI(t+1)]/(a_1+a_2+ . . . +a_k+b_1+b_2+ . . . +b_1), F(CI(t))−F(CI(t−1)), F(CI(t))−F(CI(t+1)), F(CI(t))−[F(CI(t−1))+F(CI(t+1))]/2, F(CI(t))−F(CI(t−2)), F(CI(t))−F(CI(t+2)), F(CI(t))[F(CI(t−2))+F(CI(t+2))]/2, F(CI(t))−F(CI(t−k)), F(CI(t))−F(CI(t+1)), F(CI(t))−[F(CI(t−k))+F(CI(t+1))]/2, F(CI(t))−[a_1*F(CI(t−1))+a_2*F(CI(t−2))+ . . . +a_k*F(CI(t−k))]/(a_1+a_2+ . . . +a_k), F(CI(t))−[b_1*F(CI(t+1))+b_2*F(CI(t+2))+ . . . +b_1*F(CI(t+1))]/ (b_1+b_2+ . . . +b_1), or F(CI(t))−[a_1*F(CI(t−1))+a_2*F(CI(t−2))+ . . . +a_k*F(CI(t− . . . k))+b_1*F(CI(t+1))+b_2*F(CI(t+2))+ . . . +b_1*F(CI(t+1))]/a_1+a_2+ . . . +a_k+b_1+b_2+ . . . +b_1); wherein, for any vector X, F(X) is a vector of same size of X such that the i^{th} component of F(X) is a function of the i^{th} component of X; wherein each of a_1, a_2, . . . , a_k, b_1, b_2, . . . , and bi is a scalar; wherein CI(t) is a CI at time t.

In some embodiments, TS may comprise a vector dissimilarity/similarity, inner product, outer product.

Clause 9. The method/device/system/software of the wireless monitoring system of clause 6, comprising: wherein the TS comprises at least one of: CI(t)×CI(t−1), CI(t)×CI(t+1), CI(t)×[CI(t−1)+CI(t+1)]/2, CI(t)×CI(t−2), CI(t)×CI(t+2), CI(t)×[CI(t−2)+CI(t+2)]/2, CI(t)×CI(t−k), CI(t)×CI(t+i), CI(t)×[CI(t−k)+CI(t+1)=]/2, CI(t)×[a_1*CI(t−1)+a_2*CI(t−2)+ . . . +a_k*CI(t−k)]/(a_1+a_2+ . . . +a_k), CI(t)×[b_1*CI(t+1)+b_2*CI(t+2)+ . . . +b_1*CI(t+1)]/(b_1+b_2+ . . . +b_1), CI(t)×[a_1*CI(t−1)+a_2*CI(t−2)++a_k*CI(t−k)+b_1*CI(t+1)+b_2*CI(t+2)+ . . . +b_1*CI(t+1))]/a_1+a_2+ . . . +a_k+b_1+b_2+ . . . +b_1), F(CI(t))×F(CI(t−1)), F(CI(t))×F(CI(t+1)), F(CI(t))×[F(CI(t−1))+F(CI(t+1))]/2, F(CI(t))×F(CI(t−2)), F(CI(t))×F(CI(t+2)), F(CI(t))×[F(CI(t−2))+F(CI(t+2))]/2, F(CI(t))×F(CI(t−k)), F(CI(t))×F(CI(t+1)), F(CI(t))×[F(CI(t−k))+F(CI(t+1))=]/2, F(CI(t))×[a_1*F(CI(t−1))+a_2*F(CI(t−2))+ . . . +a_k*F(CI(t−k))]/(a_1+a_2+ . . . +a_k), F(CI(t))×[b_1*F(CI(t+1))+b_2*F(CI(t+2))++b_1*F(CI(t+1))]/(b_1+b_2+ . . . +b_1), F(CI(t))×[a_1*F(CI(t−1))+a_2*F(CI(t−2))+ . . . +a_k*F(CI(t−k))+b_1*F(CI(t+1))+b_2*F(CI(t+2))+ . . . +b_1*F(CI(t+1))]/ a_1+a_2+ . . . +a_k+b_1+b_2+ . . . +b_1); D[CI(t), CI(t−1)], D[CI(t), CI(t+1)], D[CI(t), [CI(t−1)+CI(t+1)]/2], D[CI(t), CI(t−2)], D[CI(t), CI(t+2)], D[CI(t), [CI(t−2)+CI(t+2)]/2], D[CI(t), CI(t−k)], D[CI(t), CI(t+1)], D[CI(t), [CI(t−k)+CI(t+1)]/2], D[CI(t), [a_1*CI(t−1)+a_2*CI(t−2)+ . . . +a_k*CI(t−k)]/(a_1+a_2+ . . . +a_k)], D[CI(t), [b_1*CI(t+1)+b_2*CI(t+2)+ . . . +b_1*CI(t+1)]/(b_1+b_2+ . . . +bi)], D[CI(t), [a_1*CI(t−1)+a_2*CI(t−2)+ . . . +a_k*CI(t−k)+b_1*CI(t+1)+b_2*CI(t+2)+ . . . +b_1*CI(t+1)]/a_1+a_2+ . . . +a_k+b_1+b_2+ . . . +bin D[F(CI(t)), F(CI(t−1))], D[F(CI(t)), F(CI(t+1))], D[F(CI(t)), [F(CI(t−1))+F(CI(t+1))]/2], D[F(CI(t)), F(CI(t−2))], D[F(CI(t)), F(CI(t+2))], D[F(CI(t)), [F(CI(t−2))+F(CI(t+2))]/2], D[F(CI(t)), F(CI(t−k))], D[F(CI(t)), F(CI(t+1))], D[F(CI(t)), [F(CI(t−k))+F(CI(t+1))]/2], D[F(CI(t)), [a_1*F(CI(t−1))+a_2*F(CI(t−2))++a_k*F(CI(t−k))]/ (a_1+a_2+ . . . +a_k)], D[F(CI(t)), [b_1*F(CI(t+1))+b_2*F(CI(t+2))++b_1*F(CI(t+1))]/(b_1+b_2+ . . . +b_1)], or D[F(CI(t)), [a_1*F(CI(t−1))+a_2*F(CI(t−2))+ . . . +a_k*F(CI(t−k))+b_1*F(CI(t+1))+b_2*F(CI(t+2))+ . . . +b_1*F(CI(t+1))]/a_1+a_2+ . . . +a_k+b_1+b_2+ . . . +b_1]; wherein, for any vector A, F(A) is a vector of same size of A such that the i^{th} component of F(A) is a function of the i^{th} component of A; wherein each of a_1, a_2, a_k, b_1, b_2, . . . , and bi is a scalar; wherein A×B is an inner product of a vector A and a vector B; wherein D[A, B] is a dissimilarity score between a vector A and a vector B; wherein CI(t) is a CI at time t.

In some embodiments, linkwise TS (LTS) for the sliding time window may be computed based on the all TS in the sliding time window. Classification of sliding time window may be based on LTS.

Clause 10. The method/device/system/software of the wireless monitoring system of clause 6, comprising: computing a link-wise test score (LTS) based on the plurality of TS for the CI of TSCI in the sliding time window; performing the classification of the sliding time window based on the LTS.

In some embodiments, LTS may be aggregate (e.g. average, weighted average, median, max, min, percentile) of all TS in the sliding time window.

Clause 11. The method/device/system/software of the wireless monitoring system of clause 10, comprising: computing the LTS as an aggregate of the plurality of TS, wherein the aggregate comprises at least one of: a sum, a weighted sum, an average, a weighted average, a geometric mean, a weighted geometric mean, a harmonic mean, a weighted harmonic mean, an arithmetic mean, a weighted mean, a trimmed mean, a median, a weighted median, a mode, a histogram, a statistics, a percentile, a maximum, a minimum, a variance, a variation, a divergence, a spread, a range, a deviation, or a characteristic value.

In some embodiments, sliding time window may be classified as "normal" (first sliding-window-class) when LTS is greater (or smaller) than a threshold. E.g. "normal" when TS=dissimilarity score and LTS=max TS (or 95% percentile) and LTS>threshold; or "normal" when TS=similarity score and LTS=min TS (or 5% percentile), and LTS<threshold.

Clause 12. The method/device/system/software of the wireless monitoring system of clause 10, comprising: classifying the sliding time window as the first sliding-window-class when the LTS is greater than a first threshold; classifying the sliding time window as a class comprising the second sliding-window-class and the third sliding window-class when the LTS is less than a second threshold.

In some embodiments, LTS may be computed directly based on CI in sliding time window (without computing TS).

Clause 13. The method/device/system/software of the wireless monitoring system of clause 1, comprising: computing a link-wise test score (LTS) based on the CI of TSCI in the sliding time window, wherein the LTS comprises at least one of: a test quantity, a similarity score, a dissimilarity score, a matching score, a mismatch score, a distance score, a TRRS, a correlation, a covariance, an autocorrelation, a cross-correlation, an inner product, a norm, an aggregate, a difference, an absolute difference, a square difference, a variance, a variation, a deviation, a standard deviation, a spread, a dispersion, a variability, a divergence, a skewness, a kurtosis, a range, an inter-quartile range, a coefficient, a Gini coefficient, an entropy, a maximum, a minimum, a mean, a median, a mode, a percentile, a quartile, a variance-to-mean ratio, a max-to-min ratio, a regularity, an irregularity, a statistics, a histogram, a probability, an impulsiveness, a suddenness, an occurrence, a recurrence, or a change; performing the classification of the sliding time window based on the LTS.

In some embodiments, to classify each CI into multiple CI-classes, there may be a "normal" CI-class and/or an "abnormal" CI-class. There may be a "moderately abnormal" CI-class, a "severely abnormal" CI-class, and/or a "mildly abnormal" CI-class. In some embodiments, the first CI-class="normal", second CI-class="abnormal". In some embodiments, a CI may be classified as "abnormal" (or "severely abnormal") if TS>T4, and as "normal" if TS<T3<=T4. T4 may be equal to T3. If T3<T4, CI may be classified as "moderately abnormal" if T3<TS<T4. Alternatively, CI may be classified as "mildly abnormal" if T3<TS<T5, and "moderately abnormal" if T5<TS<T4. In some embodiments, second subset may comprise all "abnormal" CI. Second subset may be excluded from computation of MI. In some embodiments, first subset may comprise all "normal" CI (or all selected runs of normal CI). First subset, or a portion/subset of first subset, may be included in the computation of MI. In some embodiments, the first subset or the second subset may comprise "moderately abnormal" CI or "mildly abnormal" CI. In particular, first subset may comprise some/all "moderately abnormal" CI or "mildly abnormal" CI. In some embodiments, one or more reduced MI (or a tentative reduced MI) may be computed based on the first subset. Basically, "normal" CI may be more trustworthy than "mildly abnormal" CI, which in turn may be more trustworthy than "moderately abnormal" CI. A first reduced MI computed based purely on "normal" CI may be more "trustworthy" than a second reduced MI computed based on a combination of "normal" CI and "moderately abnormal" CI (or "mildly abnormal" CI). A third reduced MI computed based on (N−N1) "normal" CI and N1 "moderately abnormal" CI may be more "trustworthy" than a fourth reduced MI computed based on (N−N2) "normal" CI and N2 "moderately abnormal" CI, with N2>N1. In some embodiments, if MI comprises a weighted quantity (e.g. weighted average or weighted sum or weighted geometric mean, etc.) of the multiple reduced MI, a more trustworthy reduced MI (e.g. the first reduced MI, or the third reduced MI) may have a larger weight than a less trustworthy reduced MI (e.g. the second reduced MI or the fourth reduced MI). The weight for a reduced MI in the weighted quantity may depend on a count of "normal" CI, a count of "mildly abnormal" CI and a count of "moderately abnormal" CI used in the computation of the reduced MI. In some embodiments, if MI comprises a weighted quantity of a reduced MI and some "neighboring MI" from "neighboring sliding time windows" and/or "neighboring TSCI". The weight for the reduced MI in the weighted quantity may depend on a count of "normal" CI, a count of "mildly abnormal" CI and a count of "moderately abnormal" CI used in the computation of the reduced MI.

Clause 14. The method/device/system/software of the wireless monitoring system of clause 6, comprising: in the second (item-wise) classification, classifying each CI as a first CI-class when the respective TS is less than a third threshold, and as a second CI-class when the respective TS is greater than a fourth threshold.

In some embodiments, the first CI-class="normal", second CI-class="abnormal". In some embodiments, not all "normal" CI may be used in the computation of MI. First subset may comprise only some (e.g. all, or not all) of the "normal" CI. E.g. MI may be computed based a longest run of "normal" CI. In other words, the second, third, fourth . . . longest runs of "normal" CI may/may not be used in the computation of MI. In some embodiments, first subset may comprise all of the "normal" CI. In some embodiments, first sliding-window-class="normal." In some embodiments, second sliding-window-class="severely abnormal." In some embodiments, third sliding-window-class="moderately abnormal." In some embodiments, If all (or a great majority) CI are "normal" (first CI-class), the sliding time window may be classified as "normal" (first sliding-window-class). In some embodiments, if all (or a great majority) CI are "abnormal" (second CI-class), the sliding time window may be classified as "severely abnormal" (second sliding-window-class). In some embodiments, great majority may be 80% or 90% or 95% or 99% or 99.9% or another percentage.

Clause 15. The method/device/system/software of the wireless monitoring system of clause 14, comprising: classifying the sliding time window as the first sliding-window-class when all CI of the TSCI in the sliding time window are first-class CI; classifying the sliding time window as the second sliding-window-class when all CI of the TSCI in the sliding time window are classified as second CI-class; wherein any first-class CI is a CI being classified as first CI-class, wherein any second-class CI is a CI being classified as second CI-class.

In some embodiments, if there is at least one first-class CI (i.e. not all CI are second-class) and at least one second-class CI (i.e. not all CI are first-class), there will be at least one run of first-class CI and at least one run of second-class CI, each run with a run-length of consecutive CI of the same-class. In some embodiments, the classification of the sliding time window may be based on the run-length and the plurality of TS associated with each run (especially the runs of first-class CI).

Clause 16. The method/device/system/software of the wireless monitoring system of clause 15, comprising: wherein there are at least one first-class CI and at least one second-class CI of the TSCI in the sliding time window; identifying at least one run of first-class CI and at least one run of second-class CI in the sliding time window, each run comprising a respective run-length of consecutive CI of a respective same class in the sliding time window, wherein any run-length is one of: a number, a quantity or a count, greater than zero; classifying the sliding time window based on the runs of first-class CI and second-class CI and the respective run-lengths.

In some embodiments, some "selected" run(s) of "normal" CI may be chosen (or selected or identified). The "selected" run(s) must satisfy certain criteria/requirements/conditions. If at least one selected run can be found (and used to compute reduced MS/MI), the sliding time window may be classified as "moderately abnormal" (third class). Otherwise, the sliding time window may be classified as "severely abnormal" (second class).

Clause 17. The method/device/system/software of the wireless monitoring system of clause 16, comprising: classifying the sliding time window as the third sliding-window-class when at least one selected run of first-class CI is chosen; classifying the sliding time window as the second sliding-window-class when no selected run of first-class CI is chosen.

In some embodiments, some "selected" run(s) of "normal" CI (first-class CI) may be chosen (or selected or identified).

Clause 18. The method/device/system/software of the wireless monitoring system of clause 17, comprising: choosing at least one selected run of first-class CI based on the run-length of each run of first-class CI and the plurality of TS associated with the run; computing the MI based on the at least one selected run of first-class CI.

In some embodiments, one "selected" run may be the run with longest run-length in the sliding time window.

Clause 19. The method/device/system/software of the wireless monitoring system of clause 18, comprising:

wherein a particular selected run is the run of first-class CI with longest run-length among all runs of first-class CI in the sliding time window.

In some embodiments, the at least one selected run may be those with longest run-length in the sliding time window.

Clause 20. The method/device/system/software of the wireless monitoring system of clause 19, comprising: wherein the at least one selected run is the at least one run of first-class CI with longest run-lengths among all runs of first-class CI in the sliding time window.

In some embodiments, one "selected" run may be the beginning run with sufficient run-length. A run with very short run-length may not be sufficient to compute MI with good accuracy. In some embodiments, run-length requirement of beginning run or trailing run may be less stringent than the other runs. In other words, the run-length threshold (e.g. in clause 21 or clause 22) for beginning run or trailing run may be smaller (i.e. less stringent) than the run-length threshold for the other runs (e.g. in clause 23).

Clause 21. The method/device/system/software of the wireless monitoring system of clause 18, comprising: wherein a particular selected run is chosen as a beginning run of consecutive first-class CI comprising the very first CI in the sliding time window when the respective run-length of the beginning run is greater than a respective threshold.

In some embodiments, one "selected" run may be the trailing run with sufficient run-length.

Clause 22. The method/device/system/software of the wireless monitoring system of clause 18, comprising: wherein a particular selected run is chosen as a trailing run of consecutive first-class CI comprising the very last CI in the sliding time window when the respective run-length of the trailing run is greater than a respective threshold.

In some embodiments, all "selected" run (except the beginning run or trailing run) may have sufficient run-length.

Clause 23. The method/device/system/software of the wireless monitoring system of clause 18, comprising: wherein any selected run that is not a beginning run or a trailing run is chosen when the respective run-length of the run is greater than a respective threshold.

In some embodiments, the amount of selected run may be upper-bounded by a predetermined number.

Clause 24. The method/device/system/software of the wireless monitoring system of clause 18, comprising: wherein the at least one selected run is chosen such that a count of the at least one selected run is less than or equal to a predetermined number.

In some embodiments, the amount of selected run may be a predetermined number.

Clause 25. The method/device/system/software of the wireless monitoring system of clause 24, comprising: wherein the at least one selected run is chosen such that a count of the at least one selected run is a predetermined number.

In some embodiments, a selected run may have all associated TS satisfy a condition.

Clause 26. The method/device/system/software of the wireless monitoring system of clause 18, comprising: wherein the at least one selected run is chosen such that, for each selected run, all the associated TS satisfy a condition.

In some embodiments, a selected run may have associated TS less than a threshold.

Clause 27. The method/device/system/software of the wireless monitoring system of clause 18, comprising: wherein the at least one selected run is chosen such that, for each selected run, all the associated TS is less than a threshold.

In some embodiments, there may be more than one selected runs. A tentative reduced MS/MI may be computed based on each selected run. The MS/MI (or reduced MS/MI) may be computed as an aggregate of more than one tentative reduced MS/MI.

Clause 28. The method/device/system/software of the wireless monitoring system of clause 18, comprising: computing at least one tentative MI for the sliding time window, each tentative MI based on a respective selected run of first-class CI of the TSCI in the sliding time window; computing the MI as an aggregate of the at least one tentative MI.

In some embodiments, beginning run of (current) sliding time window may be combined with trailing run of CI of previous sliding time window to form a combined run of CI. In some embodiments, a tentative reduced MS/MI may be computed based on the combined run of CI.

Clause 29. The method/device/system/software of the wireless monitoring system of clause 28 comprising: computing a particular tentative MI based on a selected run which is a beginning run of CI of the TSCI in the sliding time window; combining the beginning run of CI with a trailing run of CI of the TSCI in a previous sliding time window to form a combined run of CI of the TSCI; computing the particular tentative MI based on the combined run of CI.

In some embodiments, trailing run of (current) sliding time window may be combined with beginning run of CI of next sliding time window to form a combined run of CI. In some embodiments, a tentative reduced MS/MI may be computed based on the combined run of CI.

Clause 30. The method/device/system/software of the wireless monitoring system of clause 28, comprising: computing a particular tentative MI based on a selected run which is a trailing run of CI of the TSCI in the sliding time window; combining the trailing run of CI with a beginning run of CI of the TSCI in a next sliding time window to form a combined run of CI of the TSCI; computing the particular tentative MI based on the combined run of CI.

In some embodiments, the MS/MI (or reduced MS/MI) may be a weighted aggregate (e.g. weighted sum/average/mean/median/product) of more than one tentative reduced MS/MI. In some embodiments, the weight of each tentative reduced MS/MI may be computed adaptively based on the run-length of the respective selected run of first-class CI used to compute the tentative reduced MS/MI. The weight of each tentative reduced MS/MI may also be computed adaptively based on the plurality of TS associated with the respective selected run.

Clause 31. The method/device/system/software of the wireless monitoring system of clause 28, comprising: for each tentative MI computed based on a respective selected run, computing a respective computed weight based on the run-length of the respective selected run, computing the MI as a weighted aggregate of the at least one tentative MI, each tentative MI weighted by the respective computed weight.

In some embodiments, the MS/MI (or reduced MS/MI) may be a weighted aggregate (e.g. weighted sum/average/mean/median/product) of one or more tentative reduced MS/MI and at least one neighboring MS/MI. Each neighboring MI may be associated with a past neighboring sliding time window, a future neighboring sliding time window, or a neighboring (past, current or future) time window of CI of another TSCI, which may be obtained based on another wireless signal communicated between the Type1 device and the Type2 device. For example, the another wireless signal may be the wireless signal in clause 1.

Clause 32. The method/device/system/software of the wireless monitoring system of clause 28, comprising: computing the MI as an aggregate of the at least one tentative MI and at least one neighboring MI, wherein each neighboring MI is associated with one of: a past neighboring sliding time window of CI of the TSCI, a future neighboring sliding time window of CI of the TSCI, or a neighboring sliding time window of CI of another TSCI.

In some embodiments, when sliding time window is classified as "moderately abnormal" (third sliding-window-class), MS/MI may be computed using the first subset of CI of TSCI in the sliding time window without using the second subset. First subset may comprise all "normal" (first-class) CI of the TSCI in the sliding time window. Second subset may comprise all "abnormal" (second-class) CI of the TSCI in the sliding time window.

Clause 33. The method/device/system/software of the wireless monitoring system of clause 14, comprising: when the sliding time window is classified as the third sliding-window-class: constructing the first subset by including all first-class CI of the TSCI in the sliding time window, and constructing the second subset by including all second-class CI of the TSCI in the sliding time window.

In some embodiments, first subset may comprise only the at least one selected run of "normal" (first-class) CI of the TSCI in the sliding time window. In some embodiments, second subset may comprise all "abnormal" (second-class) CI of the TSCI in the sliding time window.

Clause 34. The method/device/system/software of the wireless monitoring system of clause 18, comprising: when the sliding time window is classified as the third sliding-window-class: constructing the first subset by including all of the at least one selected run of first-class CI of the TSCI in the sliding time window, and constructing the second subset by including all second-class CI of the TSCI in the sliding time window.

In some embodiments, second sliding-window class="severely abnormal" In some embodiments, The MI may not be computed based on the CI of the TSCI in the (current) sliding time window, because the CI are too abnormal/unreliable (i.e. severely abnormal). In some embodiments, a replacement MI may be computed based on an aggregate of a number of neighboring MI. Each neighboring MI may be associated with a past/future/neighboring sliding time window that is classified as "normal".

Clause 35. The method/device/system/software of the wireless monitoring system of clause 17, comprising: when the sliding time window is classified as the second sliding-window-class: computing the MI as an aggregate of at least one neighboring MI, wherein each neighboring MI is associated with one of: a past neighboring sliding time window of CI of the TSCI, a future neighboring sliding time window of CI of the TSCI, or a neighboring sliding time window of CI of another TSCI, wherein a neighboring MI is compute based on at least one CI of the TSCI outside the sliding time window.

In some embodiments, a degree of similarity between current channel information (CI) and a previous CI may be computed for wireless sensing. CI may comprise any of channel response (CR), channel impulse response (CIR), channel frequency response (CFR), channel state information (CSI), received signal strength (RSS), or RSS indicator (RSSI).

The following numbered clauses provide examples for wireless sensing and positioning.

Clause A1. A wireless sensing system comprising: a receiver configured to receive a wireless signal transmitted from a transmitter through a wireless channel, and one or more data processors configured to: determine a channel information (CI) based on the received wireless signal, wherein the CI comprises at least one of: channel response, channel impulse response (CIR), channel frequency response (CFR), channel state information (CSI), received signal strength (RSS), or RSS indicator (RSSI), comparing the CI with a previous CI obtained based on a previously received wireless signal, compute a degree of similarity between the CI and the previous CI, wherein the degree of similarity comprise at least one of: a time-reversal resonating strength (TRRS), a pattern recognition, a matching, a distance, a Euclidean distance, a correlation, an autocorrelation function, or a cosine function, and compute at least one of the following items based on the degree of similarity: a location of a target, an arrangement of the target, a configuration of the target, a distance from a wireless access point device, a distance between the transmitter and the receiver, an identification of the target, a motion of the target, a proximity of the target, a position of the target, an orientation of the target, a pose of the target, a presence of the target, a state of the target, an information of an arrangement of the target, a change, an indication of a change, a detection of the target, a characteristics of the target, a gesture, a fall of the target to the ground, a navigation, a guidance, a targeted advertising, a state in a venue, or a condition of the venue, wherein the target is one of: the receiver, the transmitter, an object, a person or an event.

In some embodiments, there are more than one wireless signals. More than one CI may be obtained. Composite CI may be computed based on the more than one CI.

Clause A2. The system of Clause A1, further comprising: at least one receiver each configured to receive a respective wireless signal transmitted from a respective transmitter through a respective wireless channel, and the one or more data processors configured to: determine at least one CI based on the at least one received wireless signal, comparing one of the at least one CI with a respective previous CI obtained based on a respective previously received wireless signal, compute the degree of similarity between the CI and the respective previous CI, determine a composite CI based on the at least one wireless signal and the at least one CI, comparing the composite CI with a previous composite CI, wherein the previous composite CI is determined based on at least one previously received wireless signal and at least one previous CI, wherein the at least one previous CI is determined based on the at least one previously received wireless signal, compute a second degree of similarity between the composite CI and the previous composite CI, wherein the second degree of similarity is computed based on at least one of: the TRRS between two CI, a second TRRS between two composite CI, the pattern recognition based on CI, a second pattern recognition based on composite CI, the matching based on CI, a second matching based on composite CI, the distance, a second distance based on composite CI, the Euclidean distance, a second Euclidean distance based on composite CI, the correlation based on CI, a second correlation based on composite CI, the autocorrelation function based on CI, a second autocorrelation function based on composite CI, a cosine function based on CI, or a second cosine function based on composite CI, and compute the at least one of the computed items based on at least one of: the degree of similarity or the second degree of similarity.

In some embodiments, wireless signal may comprise more than one probe signals. A sequence of CI may be obtained.

Clause A3. The system of Clause A1, wherein: wherein the wireless signal comprises a sequence of probe signals transmitted periodically; wherein a sequence of CI is determined based on the received wireless signal, one CI for each probe signal.

In some embodiments, if the current CI is an outlier, it may be discarded.

Clause A4. The system of Clause A1, wherein the one or more data processors is further configured to: compare the CI with a plurality of other previous CI; determine the CI to be an outlier CI when a degree of similarity of the CI and the plurality of other previous CI is less than a threshold; and discard the outlier CI.

In some embodiments, discarded outlier CI may be replaced by another CI (a good CI).

Clause A5. The system of Clause A1, wherein the one or more data processors is further configured to: replace the CI by another CI obtained based on another received wireless signal transmitted from a respective transmitter to a respective receiver, compute the degree of similarity based on the another CI instead of the CI, the degree of similarity being between the another CI and the previous CI.

In some embodiments, if a particular CI is an outlier, it may be discarded.

Clause A6. The system of Clause A2, wherein the one or more data processors is further configured to: compare a particular CI of the at least one CI with a plurality of other previous CI; determine the particular CI to be an outlier CI when a degree of similarity of the particular CI and the plurality of other previous CI is less than a threshold; and discard the particular CI.

In some embodiments, discarded outlier CI may be replaced by another CI (a good CI).

Clause A7. The system of Clause A6, wherein the one or more data processors is further configured to: replace the particular CI by another CI obtained based on another received wireless signal transmitted from a respective transmitter to a respective receiver, compute the composite CI based on the another CI instead of the particular CI.

In some embodiments, if the current CI is innovative/new compared with some reference CI, it may be used to replace one of the reference CI.

Clause A8. The system of Clause A1, wherein the one or more data processors is further configured to: compare the CI with a plurality of reference CI in a database; determine the CI to be new when a degree of similarity of the CI and the plurality of reference CI is less than a threshold; and update the database by replacing a particular reference CI in the database by the CI.

In some embodiments, if current CI is "similar" to past CI, the channel/venue may be considered stationary/static.

Clause A9. The system of Clause A1, wherein the one or more data processors is further configured to: compare the CI with a plurality of other previous CI; determine the wireless channel is stationary when a degree of similarity of the CI and the plurality of other previous CI is greater than a threshold; compute the at least one of the computed items based on the stationarity of the wireless channel.

In some embodiments, the transmitter and receiver and CI may need to be qualified (for some task). In some embodiments, if current CI is "similar" to reference CI, the transmitter/receiver/CI may be considered good enough/qualified.

Clause A10. The system of Clause A1, wherein the one or more data processors is further configured to: determine the CI determined based on the received wireless signal communicated between the transmitter and the receiver is accurate enough when a degree of similarity of the CI and the plurality of other previous CI is greater than a threshold.

In some embodiments, CI may have multiple components (e.g. due to subcarrier).

Clause A11. The system of Clause A2: wherein each respective wireless signal comprises a respective amount of subcarriers, a respective frequency band, a respective bandwidth; wherein each CI comprises more than one CI-components, each CI-component associated with a subcarrier.

In some embodiments, transmitter, receiver, wireless signal and CI may be standard/protocol compliant.

Clause A12. The system of Clause A2: wherein each respective wireless signal is communicated between the respective transmitter and the respective receiver in compliance with a wireless signaling protocol or standard; wherein the wireless signaling protocol or standard comprises at least one of the following wireless signaling protocols or standards: IEEE 802.11, IEEE 802.11xx, IEEE 802.15, IEEE 802.15.3, IEEE 802.15.4, WiFi, 3G/LTE/4G/5G/6G/7G/8G, Bluetooth, BLE, Zigbee, UWB, NFC, a wireless data transmission standard or protocol, a wireless data communication standard or protocol, a wireless network standard or protocol, a cellular network standard or protocol, a wireless local area network (WLAN) standard, OFDM, OFDMA, or CDMA.

In some embodiments, wireless signal may comprise standard/protocol compliant frames/packets.

Clause A13. The system of Clause A12: wherein each wireless signal comprises one or more frames having a format that complies with the wireless signaling standard or protocol.

In some embodiments, CI may be obtained based on standardized mechanism.

Clause A14. The system of Clause A12: wherein the CI is determined based on a standardized mechanism according to the wireless signaling standard or protocol.

In some embodiments, CI may be obtained based on preamble in standard compliant frame.

Clause A15. The system of Clause A13: wherein the CI is determined based on a long preamble of one of the frames.

In some embodiments, CI may be obtained based on standard/protocol-compliant signaling (control signals, parameters being negotiated).

Clause A16. The system of Clause A14: wherein the CI is determined based on parameters and control signals passed between the transmitter and the receiver, in accordance with the wireless signaling standard or protocol.

Clause A17. The system of Clause A1, wherein the one or more data processors is further configured to: the CI is determined based on at least one of: a discretization, a derivation, an "accurate-enough" determination and a desired accuracy of system performance.

In some embodiments, CI may be obtained based on preamble in wireless signal.

Clause A18. The system of Clause A103: wherein the CI is determined from a received wireless signal based on a preamble of the wireless signal.

Clause A19. The system of Clause A103: wherein the CI is processed to mitigate variations in the CI owing to at least one of: imperfect transmission by the respective transmitter, imperfect reception by the respective receiver, imperfect timing, imperfect frequency synchronization, channel frequency offset (CFO), or sampling frequency offset (SFO).

In some embodiments, CSI is reported locally.

Clause A20. The system of Clause A103: wherein a CI determined based on a respective received wireless signal is obtained and processed locally in a device receiving the respective received wireless signal.

In some embodiments, CI may be processed remotely by another device.

Clause A21. The system of Clause A103: wherein a CI determined based on a respective received wireless signal is processed remotely in another device different from a device receiving the respective received wireless signal.

In some embodiments, CSI is reported to another device (sensing initiator in 802.11bf).

Clause A22. The system of Clause A21: wherein the CI is reported (or transmitted) from the device to the another device.

Clause A23. The system of Clause A1, wherein one or more data processors is further configured to: detect a change based on the comparing and the degree of similarity.

In some embodiments, transmitter and receiver may be in same device.

Clause A24. The system of Clause A1 further comprises: a same device comprising one of the transmitter and one of the receiver.

In some embodiments, user is allowed to enter sensing related info.

Clause A25. The system of Clause A1, wherein one or more data processors is further configured to: enable a user to provide a user-provided information, computing the at least one of the computed items based on the user-provided information and the degree of similarity.

Clause A26. The system of Clause A25, wherein: the user-provided information comprises at least one of: a first identifier associated with the transmitter, a second identifier associated with the receiver, a service set identifier (SSID) associated with a wireless network access point in the venue.

Clause A27. The system of Clause A1, wherein the one or more data processors is further configured to: determine an identifier of the transmitter or the receiver.

Clause A28. The system of Clause A25: wherein the user-provided information comprise an identifier of a location or arrangement.

In some embodiments, there are multiple transmitters with same receiver (many-to-one), same transmitter with multiple receivers (one-to-many), multiple transmitters with multiple receivers (many-to-many).

Clause A29. The system of Clause A1, wherein one or more data processors is further configured to: wherein at least one of the following is true: the at least one transmitter is a same transmitter, the at least one receiver is a same receiver, or the at least one wireless channel is a same wireless channel associated with a same wireless network.

In some embodiments, for multicast, broadcast, unicast, tracker bot may be carried by and moves with each mobile object.

Clause A30. The system of Clause A29, wherein one or more data processors is further configured to: wherein the at least one transmitter is a same transmitter which transmits the at least one wireless signal in a uni-cast, multi-cast or broadcast manner; wherein each of at least one receiver is a respective terminal device to be carried by a respective user for locating the location of the respective user.

In some embodiments, there are many Tx and one Rx.

Clause A31. The system of Clause A29, wherein one or more data processors is further configured to: wherein the at least one receiver is a same receiver; wherein each of the at least one transmitter is a respective terminal device to be carried by a respective user for locating the location of the respective user.

Clause A32. The system of Clause A1, wherein one or more data processors is configured with at least one of a software or a firmware of the system.

In some embodiments, degree of confidence may be computed (e.g. for qualifying the Tx/Rx/CI/system).

Clause A33. The system of Clause A1, wherein one or more data processors is further configured to: compute a degree of confidence associated with the at least one of the computed items.

In some embodiments, degree of confidence may be computed in the form of an "accuracy" (e.g. for a sensing task).

Clause A34. The system of Clause A1, wherein one or more data processors is further configured to: compute an accuracy based on the CI.

In some embodiments, magnitude of CI may be used to compute similarity.

Clause A35. The system of Clause A1, wherein one or more data processors is further configured to: wherein the degree of similarity is computed based on an amplitude of the CI.

In some embodiments, phase of CI may be used to compute similarity.

Clause A36. The system of Clause A1, wherein one or more data processors is further configured to: wherein the degree of similarity is computed based on a phase of the CI.

In some embodiments, amount of CI may be determined to be combined to form composite CI.

Clause A37. The system of Clause A2, wherein one or more data processors is further configured to: determine a number of individual CI to be included in the composite channel response to achieve a desired accuracy.

In some embodiments, a "preferred" (e.g. default) amount of CI is to be combined to form composite CI.

Clause A38. The system of Clause A2: wherein a number of individual CI are preferable to be included in the composite channel response.

Clause A38b. The system of Clause A2: wherein a number of individual CI associated with respective transmitters and respective receivers are preferred.

Clause A38c. The system of Clause A38b: wherein the number of individual CI and the respective transmitters are preferred.

Clause A38d. The system of Clause A38b: wherein the number of individual CI and the respective receivers are preferred.

In some embodiments, each CI is associated with a Tx antenna and a Rx antenna.

Clause A39. The system of Clause A1: wherein each CI is determined for a pairing of a transmit antenna of the transmitter and a receive antenna of the receiver.

In some embodiments, feature value (e.g. magnitude, phase, spatial temporal info(STI), motion info(MI)) may be computed based on CI.

Clause A40. The system of Clause A1, wherein the one or more data processors are further configured to: determine a feature value based on a mathematical function performed on the CI and the previous CI; compute the at least one of the computed items based on the feature value.

In some embodiments, dimension reduction of CI may be performed before feature value is computed.

Clause A41. The system of Clause A40, wherein the one or more data processors are further configured to: determine the feature value of the CI based on a dimension reduction of the CI.

In some embodiments, feature value may be computed based on the similarity score.

Clause A42. The system of Clause A40, wherein the one or more data processors are further configured to: determine the feature value based on the degree of similarity between the CI and the previous CI.

In some embodiments, there may be multiple feature values. They may be normalized.

Clause A43. The system of Clause A1, wherein the one or more data processors are further configured to: determine a set of feature values based on a mathematical function performed on the CI and a set of previous CI; normalize the set of feature values; perform the at least one computation based on the set of normalized feature values.

In some embodiments, Tx and Rx are housed in respective devices.

Clause A44. The system of Clause A1, wherein: the transmitter is housed in a first device; the receiver is housed in a second device.

In some embodiments, Tx (e.g. sensing transmitter) may be AP, or non-AP.

Clause A45. The system of Clause A1, wherein: the transmitter is one of: a wireless network router, a wireless network access point (AP), a wireless terminal device, or a wireless non-AP terminal device.

In some embodiments, Rx (e.g. sensing receiver) may be AP, or non-AP.

Clause A46. The system of Clause A1, wherein: the receiver is one of: a wireless network router, a wireless network access point (AP), a wireless terminal device, or a wireless non-AP terminal device.

In some embodiments, Rx (e.g. sensing receiver) may not be associated (e.g. in 802.11bf).

Clause A47. The system of Clause A1, wherein: the receiver is not associated with the network router and the wireless network access point.

In some embodiments, CSI may be sent to the cloud.

Clause A48. The system of Clause A1, wherein the one or more data processors are further configured to: provide the CI to another device.

In some embodiments, computation is non-local (e.g. CSI reported from sensing receiver to sensing initiator in 802.11bf, and sensing computation is NOT done in sensing receiver).

Clause A49. The system of Clause A48, wherein: the receiver is part of a first device; one of the one or more data processors is part of a second device; the CI is reported from the first device (or the receiver) to the second device (or the one or more data processors).

In some embodiments, CSI is reported in a report frame in 802.11bf.

Clause A50. The system of Clause A49, wherein: the CI is reported in a report generated by the system.

In some embodiments, CSI is reported in a report frame in 802.11bf, with an initialization (sensing measurement initiation phase in 802.11bf).

Clause A51. The system of Clause A1, wherein: the system or a service associated with the system is initiated.

In some embodiments, probe signal transmission is based on a trigger signal (NDP transmission triggered by trigger frame (TF) or NDP announcement frame (NDPA) in trigger-based (TB) sensing in 802.11bf).

Clause A52. The system of Clause A51, wherein: the transmission of the wireless signal from the transmitter to the receiver of the system is initiated based on a trigger signal.

Clause A53. The system of Clause A1 in which a data processor of a user device of a user $i_s$ configured to provide a user interface (UI) to present to the user a second information about the at least one of the computed items.

Clause A54. The system of Clause A53 in which the user interface is configured to display a map and enable the user to indicate a location associated with the CI on the map.

Clause A55. The system of Clause A1 in which the one or more data processors are configured to determine a first identifier of the target or the object, associate the CI with the first identifier, and store the first identifier along with the CI.

Clause A56. The system of Clause A1 in which the one or more data processors are configured to obtain a prediction, and compute the at least one of the computed items based on the CI and the prediction.

Clause A57. The system of Clause A56 in which the one or more data processors are configured to compare the CI with the prediction and compute the at least one of the computed items based on the comparison.

Clause A58. The system of Clause A57 wherein the prediction comprises a predicted CI.

Clause A59. The system of Clause A57 wherein the prediction comprises a coarse position data received by the one or more data processors.

Clause A60. The system of Clause A57 wherein the prediction comprises a coarse location data computed by the one or more data processors based on a mapping, wherein the receiver is previously mapped to a particular location based on the mapping, wherein a more-precious location of the transmitter is computed based on the mapping.

Clause A61. The system of Clause A60 in which the one or more data processors are configured to: determine the coarse position based on at least one of Wi-Fi, Bluetooth, or cellular signals, and use a time-reversal positioning system to determine a fine position of the transmitter based on the coarse position.

Clause A62. The system of Clause A1, comprising: a storage device storing a three-dimensional rendering of a venue, and a 3D electromagnetic simulator configured to generate the multiple channel paths based on data derived from the three-dimensional rendering of the venue.

Clause A63. The system of Clause A1, comprising: a storage device storing a three dimensional model of a venue that is constructed using at least one of photos, images, videos, ranging techniques such as laser ranging, optical coherence tomography, or echo location, wherein the 3D electromagnetic simulator is configured to generate a database of location-specific estimated CIs in the venue using the three dimensional model.

Clause A64. A system comprising: a receiver configured to receive a wireless signal transmitted from a transmitter through a wireless channel, and one or more data processors configured to: determine a channel information (CI) based on the received wireless signal, wherein the CI comprises at least one of: channel response, channel impulse response (CIR), channel frequency response (CFR), channel state information (CSI), received signal strength (RSS), or RSS indicator (RSSI), execute a 3D electromagnetic simulator to perform a 3D electromagnetic simulation to predict multiple channel paths between the transmitter and the receiver, determine a predicted CI based on predicted multiple channel paths between the transmitter and the receiver, at least one of (i) train the 3D electromagnetic simulator based on a comparison of the CI and the predicted CI to generate a trained 3D electromagnetic simulator, or (ii) calibrate the 3D electromagnetic simulator based on a comparison of the CI and the predicted CI to generate a calibrated 3D electromagnetic simulator, use the trained or calibrated 3D electromagnetic simulator to generate a database of location-specific estimated CIs in a venue, and establish a mapping between locations in the venue and corresponding CIs.

Clause A65. The system of Clause A64, comprising: a storage device storing a three-dimensional rendering of a venue, and the 3D electromagnetic simulator configured to predict the multiple channel paths based on data derived from the three-dimensional rendering of the venue.

Clause A66. The system of Clause A64, comprising: a storage device storing a three dimensional model of a venue that is constructed using at least one of photos, images, videos, ranging techniques such as laser ranging, optical coherence tomography, or echo location, wherein the 3D electromagnetic simulator is configured to generate the database of location-specific estimated CIs in the venue using the three dimensional model.

Clause A67. The system of Clause A64, comprising: a storage device storing parameters comprising reflection coefficients of different objects in a venue, wherein the parameters have multiple values to account for one or more environmental factors comprising at least one of temperature, humidity, or smog, and wherein the 3D electromagnetic simulator is configured to predict the multiple channel paths based on data derived from the parameters.

Clause A68. The system of Clause A64 in which the one or more data processors are configured to use the database of location-specific estimated CIs in a venue and the mapping to determine a position of a terminal device within the venue.

Clause A69. The system of Clause A64 in which the one or more data processors are configured to: receive a probe signal from a terminal device, determine a CI based on the received probe signal, and compare the CI with location-specific estimated CIs in the database to identify a closest match.

A motion of an object in a venue may be monitored based on a TSCI obtained based on a wireless signal transmitted from a Type1 device to a Type2 device. A motion statistics (MS)/motion information (MI)/spatial-temporal-information (STI) may be computed based on the TSCI. An analytics may be computed based on the MS/MI/STI. Often there may be many possible different choices of Type1 device(s). And there may be many possible different choices of Type2 devices.

Different choices of Type1 device (or Type2 device or both) may cause device-dependent behavior (e.g. shifting/mapping/distortion/systematic variation which may be linear/affine/nonlinear/monotonic/time-invariant/time varying/device-dependent/stochastic) of CI/TSCI/MS/MI/STI/analytics (e.g. large motion may cause a first MS/MI/STI to be around 0.9 and a second MS to be around 0.75; or NIL/no motion may cause the first MS/MI/STI to be around 0.1 and the second MS to be around 0.3). The device-dependent nature of the behavior is undesirable. In some embodiments, a device-dependent compensation is disclosed to "undo" or compensate the device-dependent behavior to make it independent, being similar to some reference/desirable/standard behavior. The undesirable behavior/mapping may resemble/comprise/be modeled as any of: shifting, linear/affine/piecewise-linear/nonlinear mapping, monotonic mapping, monotonic increasing (or non-decreasing) mapping, monotonic decreasing (or non-increasing) mapping, etc.

For example, choices of Type1 or Type2 device may comprise: smart speaker, thermostat, TV, sound bar, DVD player, streaming device, lamp, bulb, plug, door bell, camera, router, etc. Choices of Type1 or Type2 device may also comprise items (e.g. speaker) from different brands/models/packaging/parts/components (e.g. Amazon Echo, Echo Dot, Echo Dot generation 1, Echo Dot gen2, Echo Dot gen3, Echo Show, Google Nest, Nest Mini, Nest Hub, or other brands). Even for a particular model of a particular brand (e.g. Echo Dot), different devices may still be different (e.g. due to variation/defects/wear-and-tear/degradation/depreciation in/of circuit components/parts/amplifiers/antennas/chips/wirings/fabrication/assembling/manufacturing/firmware/software). In particular, there may be different antenna count and/or antenna type (e.g. with different gain, type, size, directional characteristics, radiation pattern). All these may cause undesirable behavior of CI/TSCI/MS/MI/STI/analytics. Undesirable behavior may also arise due to different bands (e.g. 2.4 GHz, 5 GHz, 6 GHz) or different bandwidth (e.g. 20/40/80/160/320/640/1280 MHz) used for wireless signal. Undesirable behavior may arise from different amount of antennas (e.g. Echo may have 3 antennas while Echo Dot may have 2 antennas) or different choice of antennas (e.g. dipole, micro-strip, slot antenna, waveguide, spiral antenna, omni-directional antenna, directional antenna, etc.). Undesirable behavior may arise from different placement of devices/device antennas, different transmission power of wireless signal, different amplifier setting, different digital/analog gain, or different placement of objects, or environment elements such as mechanical/electrical/electromagnetic interference.

In some embodiments, compensation may be applied to compensate for undesirable behavior. In some embodiments, the MS/MI/STI/analytics may be compensated based on a compensation to get/give/obtain compensated MS/MI/STI/analytics. One or more separate/respective compensation(s) may be applied. After the compensation, all compensated MS/MI/STI/analytics for any choice of Type1/Type2 devices may have similar "target behavior"—taking on similar values in response to same motion of object regardless of the choices of Type1/Type2 devices. The similar target behavior may be a user-preferred/pre-defined/user-defined/user-designed/user-specified behavior (e.g. MS/MI/STI being around 0.8 for large motion and being around 0.2 for NIL/no motion), or a "reference" (or "representative" or "generic") behavior associated with a reference/representative/generic Type1/Type2 device.

In some embodiments, the user-defined/designed/specified/preferred behavior may be programmable/adjustable. It may be specified by user in a setting of the system. It may be specified once and remained unchanged. Or, it may be changed over time. In particular, it may change adaptively based on a strategy/time table/user-intervention/user-real-time-adjustment, or in reaction to events/situations, perhaps as specified in a setting of the system.

In some embodiments, each Type1 device (or Type2 device) may be tested/calibrated/trained in a controlled manner (e.g. in a testing/controlled environment, with a testing setting and procedure, for a testing task) in order to compute/obtain/train a respective compensation, or a respective sequence of compensation. Any compensation may be a pre-processing/processing/post-processing to be applied in/before/after the computation of the MS/MI/STI/analytics. For CI-compensation, a compensation may be applied to a CI, a feature of the CI, a group/sliding window of CI, a TSCI, a number of TSCI, a number of TSCI associated with a particular antenna of Type1 device, a number of TSCI associated with a particular antenna of Type2 device. For intermediate value compensation, a compensation may be applied to intermediate value (or a number of them), which may be computed based on CI/CI feature/sliding window of CI/TSCI, compensated CI/CI feature/sliding window of CI/TSCI, MS/MI/STI and/or compensated MS/MI/STI. For MS/MI/STI compensation, a compensation may be applied to the MS/MI/STI/analytics (or a number of them), which may be computed based on CI/CI feature/sliding window of CI/TSCI, compensated CI/CI feature/sliding window of CI/TSCI, intermediate values, and/or compensated intermediate values. For analytic compensation, a compensation may be applied to the analytic, which may be computed based on TSCI, compensated CI/CI feature/sliding window of CI/TSCI, MS/MI/STI, compensated MS/MI/STI, intermediate values, compensated intermediate values. In some embodiments, the respective sequence of compensation may comprise any of the above compensation. Compensation may be adaptive, time-varying or time invariant. Compensation may be different for different frequency band (e.g. 2.4 GHz, 5 GHz, 6 GHz, 24 GHz, 60 GHz, 77 GHz) or bandwidth (e.g. 20 MHz, 40 MHz, 80 MHz, 160 MHz, 320 MHz, 640 MHz, 1280 MHz) of the wireless signal.

In some embodiments, the compensation may comprise a mapping: univariate/bivariate/multivariate mapping, mapping of real/imaginary component, mapping of magnitude/phase, mapping of feature, monotonic mapping, piecewise monotonic mapping, monotonic increasing/decreasing mapping, monotonic non-decreasing/non-increasing mapping, piecewise linear mapping, linear mapping, DC adjustment, affine mapping, composite mapping, mapping of mapping. The mapping may be time-varying (e.g. adaptively modified) or time-invariant. The mapping may be spatially varying or spatially independent. The mapping may/may not be varying with respect to frequency band/bandwidth. The mappings may be the same or different for different sensing tasks (e.g. motion detection, breathing detection/estimation, fall-down detection, presence detection, gait/gesture detection/estimation, etc.).

In some embodiments, in a calibration/tuning/customization/factory-testing/pre-shipping-testing/training phase of a pair of Type1 device and Type2 device for a wireless sensing task, a compensation may be computed for the pair of Type1 device and Type2 device for the wireless sensing task. (In some embodiment, the Type1 device may be a reference/typical/representative Type1 device and the Type2 device may need to be calibrated/tuned/customized/tested/trained such that the computed compensation is for the Type2 device for the wireless sensing task. In another embodiment, the Type2 device may be a reference/typical/representative Type2 device and the Type1 device is to be calibrated/tuned/customized/tested/trained such that the computed compensation is for the Type1 device for the wireless sensing task.) In some embodiments, in the calibration/tuning/customization/testing/training phase, a time series of training/calibration wireless signals (e.g. training sounding signal) may be transmitted from a calibration Type1 device (e.g. the Type1 device or a reference/representative Type1 device) to a calibration Type2 device (e.g. the Type2 device or a reference/representative Type2 device) through a training/calibration wireless multipath channel of a training/calibration venue, wherein the training/calibration wireless multipath channel is impacted by a training/calibration motion of a training/calibration object for a training/calibration period of time. The training/calibration wireless signal may span some or all possible bands of the wireless (sounding) signal. Training/calibration TSCI may be obtained/extracted from the received time series of training/calibration wireless signals. Training/calibration MI/MS/STI for the wireless sensing task may be computed based on the training/calibration TSCI.

In some embodiments, the compensation may be computed based on a behavior of the training CI/TSCI/MI/MS/STI/analytics/intermediate values. The behavior may comprise any of: statistical behavior, temporal/frequency/transform/projection domain behavior, CI/TSCI/MS/MI/STI/analytics domain behavior, magnitude/phase/component behavior, histogram, univariate/bivariate/multivariate histogram, restricted histogram, conditional histogram, histogram between two time stamps, histogram restricted to be between the two time/frequency/transform/projection domain stamps (i.e. a range in time/frequency/transform/projection domain), histogram between a local maximum and a local minimum, histogram between a local maximum and a local minimum conditioned on a range (e.g. magnitude range or time range or frequency range) between the local max and local min exceeding a threshold, histogram between a local maximum and a local minimum after a filtering/processing (e.g. lowpass/bandpass/highpass/median filtering), statistics, conditional statistics, trimmed statistics, first/second/higher order statistics, mean, weighted mean, arithmetic mean, trimmed mean, geometric mean, harmonic mean, median, mode, maximum, minimum, zero crossing, percentile, range, variance, magnitude, phase, etc. The statistical behavior may be compared with a target behavior (e.g. target statistical behavior, target temporal/frequency/transform/projection domain behavior, target CI/TSCI/MS/MI/STI/analytics behavior). The target behavior may be associated with a target MS. The target behavior may be the behavior of the target MS. The target behavior may be a user-preferred/pre-defined/user-defined/user-designed/user-specified/user-selected/user-chosen behavior (e.g. specified/provided/designed/defined/inputted/selected/chosen by user using some user-interface of a user device). The target behavior may be learned (e.g. in a "pre-calibration"/reference behavior generation/learning procedure/phase) from one (or more) "reference" Type1 device and/or one (or more) "reference" Type2 device performing one (or more) reference sensing task (e.g. the sensing task) by transmitting one (or more) time series of reference wireless (sounding) signals from the Type1 device through one (or more) reference wireless channel in one (or more) reference venue to the Type2 device, the reference wireless channel being impacted by a reference motion of a reference object. One or more "reference" TSCI may be obtained/extracted from the received time series of reference wireless sounding signals. Reference MS/MI/STI may be computed based on the reference TSCI. Reference analytics may be computed based on the reference MS/MI/STI. The resulting behavior (or aggregate/average/characteristic/clustered behavior) may be used as the target behavior. In some embodiments, the time series of wireless sounding signal may use a 40 MHz band. The time series of reference wireless sounding signal may cover/scan/use some or all possible 40 MHz bands.

In some embodiments, a compensation may be a mapping that may be deduced, or obtained by searching. For deduced mapping, a compensation may be a mapping that may be deduced from the comparison of the behavior and the target behavior such that, when the mapping is applied, the behavior (the "compensated behavior") matches/approaches/resembles the target behavior. In some embodiments, the behavior (and the target behavior) may be a univariate histogram (e.g. marginal distribution or cumulative distribution) of a magnitude of a MS. The mapping may map a MS value to a compensated MS value such that the behavior (univariate histogram) of the compensated MS value matches (or approximate, or resemble) the target behavior (a target univariate histogram).

In some embodiments, a number of "control points" may be determined for the univariate histogram of MS and for the target univariate histogram. The control points may comprise any of: mean (the mean value of MS, or the mean value of the target MS), mode, median (median value of MS), percentile point (percentile value of MS), 0% point, 1% point, 5% point, 10% point, 20% point, 30% point, 40% point, 50% point, 60% point, 70% point, 80% point, 90% point, 95% point, 99% point, 100% point, other percentile point. Each pair of corresponding control points of the MS histogram and the target histogram may together form/become an ordered pair (x, y) or a point on an x-y plot (or a function, y=f(x)), where x is the MS value and y is the target MS value. For example, (10% point of MS, 10% point of target MS) is an ordered pair that constitutes a "control point" in the x-y plot. Straight lines (or polynomial lines or piecewise spline) may be used to connect the control points such that a monotonic non-decreasing (or monotonic increasing) mapping y=f(x) is obtained. The compensation may be the mapping y=f(x) obtained by connecting the control points using some kind of monotonic line (e.g. straight line, quadratic function, cubic function, polynomial function, exponential function, logarithmic function, convex function, concave function, etc.). In this way, the control points are in/on the mapping function y=f(x). In some embodiments, line fitting (e.g. least square, linear regression, robust linear regression, orthogonal regression, Deming regression, major axis regression, segmented regression, polynomial regression, regression dilution) may be applied to obtain/compute the mapping for the compensation. The line fitting may be applied piecewise. The resulting mapping may be monotonic increasing or non-increasing. In this way, there may be one or more control points that are not in/on the mapping.

In some embodiments, there may be two control points 0% point and 100% point such that all MS values between the 0% MS point and the 100% MS point may be mapped to 0% target MS point and 100% target MS point. The line may be a straight line, or quadrate, or cubic, or polynomial, other monotonic line or a regression line. Or, 1% point and 99% point such that essentially all MS values are mapped to target MS values. Outside the range of 1% point and 99% point, mapping may be an identical function (i.e. y=f(x)=x). In some embodiments, there may be three control points which may be {0% point, 50% point (median) and 100% point}, or {1% point, 50% point, 99% point}, or {0% point, 40% point, 100% point} or {1% point, 30% point, 99% point}, etc. In some embodiments, there may be four control points which may be {0% point, 30% point, 70% point, 100% point}, or {1% point, 20% point, 50% point, 99% point}, etc.

In some embodiments, classification (or quantization) may be applied to MS based on the univariate histogram of the MS to classify (or quantize) the MS into N classes (e.g. two classes: "MOTION" and "NO MOTION"). Clustering/training may be performed on the MS, or the histogram of MS to compute N−1 threshold $T\_1, T\_2, \ldots, T\_\{N-1\}$ such that any MS<$T\_1$ (MS in region 1) may be classified/quantized as Class 1, $T\_1$<MS<$T\_2$ (MS in region 2) may be Class 2, ..., $T\_\{N-1\}$<MS (MS in region N) may be Class N. And N−1 "control points" may be obtained based the N−1 threshold and the corresponding percentile value. Two more control points may/may not be added: 0% point and 100%-point. Using the method above, the compensation may be the mapping y=f(x) obtained by connecting/fitting/regressing the control points using some kind of monotonic line.

In some embodiments, a centroid value may be computed for each decision/quantization region (i.e. MS<$T\_1$ being region 1, $T\_1$<MS<$T\_2$ being region 2, ..., $T\_\{N-1\}$<MS being region N). And N "control points" may be obtained based on the N centroid values. Two more control points may/may not be added: 0% point and 100%-point. Using the method above, the compensation may be the mapping y=f(x) obtained by connecting/fitting/regressing the control points using some kind of monotonic line.

In some embodiments, cumulative distribution F1 of MS may be obtained. Cumulative distribution F2 of target MS may also be obtained. The compensation may be the mapping $y=f(x)=F2^{-1}[F1(x)]$ which is the function F1 followed by $F2^{-1}$ which is the inverse function of F2. In some embodiments, the function $F2^{-1}[F1(x)]$ may be implemented using a table look-up. But it may be complicated and may require consider computation. Thus an alternative embodiment is to approximate the function $F2^{-1}[F1(x)]$ by a simpler function, such as a linear function, affine function, piecewise linear function, polynomial, piecewise polynomial, spline, regression function, etc. The simpler function may be used as the mapping for compensation.

In some embodiments, the behavior may be bivariate or multivariate histograms/distributions. Similar to the above, control points may be determined for the bivariate/multivariate distributions. Three or four or more control points may be connected by a plane, a hyperplane, a surface or a manifold. The compensation (or the mapping) may be a collection of the plane/hyperplane/curve/manifolds.

In some embodiments, for multivariate distribution (say, N-variate), let MS vector be an N-tuple $X=[x\_1, x\_2, \ldots, x\_N]$, target MS vector be an N-tuple $T=[T\_1, T\_2, \ldots, T\_N]$ and the mapped/compensated MS vector be $Y=[y\_1, y\_2, \ldots, y\_N]$. The cumulative distribution functions F1 of MS (i.e. MS vector X) and cumulative function F2 of target multivariate distribution (i.e. of target MS vector T) may be obtained, and the compensation may be the mapping $Y=f(X)=F2^{-1}[F1(X)]$, or an approximation of the mapping using planes, hyperplanes, surfaces, or manifolds. In some embodiments, for N=2 (bivariate distribution), $[y\_1, y\_2]=f(x\_1, x\_2)=F2^{-1}[F1(x\_1, x\_2)]$. The $y\_1$ may be obtained by $y\_1=f1(x\_1)=F2'^{-1}[F1'(x\_1)]$, where F1' is univariate cumulative distribution of $x\_1$ and F2' is univariate cumulative distribution of $T\_1$. And $y\_2=f2(x2)=F2''^{-1}[F1''(x\_2)]$, where F1'' is univariate cumulative distribution of $x\_2$ and F2'' is univariate cumulative distribution of $T\_2$. In other words, the $X\_$ and $X\_2$ may be treated/processed independently to give $Y\_1$ and Y2. In some embodiments, $y\_1$ may be computed as $y\_1=f1(x\_1)=F2'^{-1}[F1'(x\_1)]$, and then $y\_2$ is computed/obtained by $y\_2=f3(x\_1, x\_2)=F2'''^{-1}[F1(x\_1, x\_2)]$, wherein F2''' is univariate cumulative distribution of $T\_2$ given $T\_1=y\_1=f1(x\_1)=F2'^{-1}[F1'(x\_1)]$. In some embodiments, $y\_2$ may be computed as $y\_2=f2(x\_2)=F2''^{-1}[F1''(x\_2)]$, and then $y\_1$ is computed/obtained by $y\_1=f4(x\_1, x\_2)=F2'''^{-1}[F1(x\_1, x\_2)]$, wherein F2''' is univariate cumulative distribution of $T\_1$ given $T\_2=y\_2=f2(x\_2)=F2'''^{-1}[F1''(x2)]$. In some embodiments, for a N-variate distribution, a first component $y\_\{i1\}$ may be computed first based on $x\_\{i1\}$, wherein i1 is component index of the first component. Then a second component $y\_\{i2\}$ may be computed based on $x\_\{i2\}$, given Then a third component $y\_\{i3\}$ may be computed based on $x\_\{i3\}$, given $T\_\{i1\}=y\_\{i1\}$ and $T\_\{i2\}=y\_\{i2\}$. And so on. And the NA{th} component $y\_\{iN\}$ may be computed based on $x\_\{iN\}$, given $T\_\{i1\}=y\_\{i1\}$, $T\_\{i2\}=y\_\{i2\}$, $T\_\{i(N-1)\}=y\_\{i(N-1)\}$.

In some embodiments, the target behavior (say, histogram of MS) may not be full specified by user. Instead, the user may specify that the number of classes (e.g. of MS) is N and the respective representative target values (e.g. target MS values) for the N classes (say, $y\_1, y\_2, \ldots, y\_N$). To deduce the mapping for the compensation (e.g. compensation/mapping of MS), a similar procedure may be performed: (1) perform classification, classify (e.g. MS) into N classes, (2) compute the N−1 threshold: $T\_1, T\_2, \ldots, T\_\{N-1\}$ and N decision regions (e.g. of MS) (3) compute N centroids (of MS, say $C\_1, C\_2, \ldots, C\_N$), each being centroid of a respective decision region (e.g. of MS), (4) construct N control points based on the N centroids and the N representative target values, with the control point being $(C\_1, y\_1), (C\_2, y\_2), \ldots, (C\_N, y\_N)$, (5) two more control points may/may not be added: 0% point MS and 100%-point MS, (6) Using the method above, the compensation may be the mapping $y=f(x)$ obtained by connecting the control points using some kind of monotonic line.

In some embodiments, the compensation (or associated mapping/functionality) may be computed (e.g. based on artificial intelligence (AI), machine learning, deep learning, neural network (e.g. CNN, RNN, feed-forward network, attention based network, Transformer network or any combination)). Supervised learning, unsupervised learning, semi-supervised learning may be applied to learn the compensation/mapping/functionality. Input of the compensation may be any of (or any feature/magnitude/phase/function/statistics/behavior/histogram of): CI, W, MI/MS/STI, analytics, TSCI, TSMI, TSA. Output of the compensation may be another (i.e. the "compensated") CI, IV, MUMS/STI, analytics, TSCI, TSMI, TSA (or corresponding feature/magnitude/phase/function/statistics/behavior/histogram).

The training target (i.e. training reference) may be yet another CI, W, MI/MS/STI, analytics, TSCI, TSMI, TSA (or corresponding feature/magnitude/phase/function/statistics/behavior/histogram), which may be obtained in some pre-training/pre-calibration stage/phase. An objective/cost/loss function (e.g. measure/norm/score of: similarity/dissimilarity/distance/difference/discrimination/ratio/fraction/variance/variation/divergence/spread/deviation/TRRS/correlation/covariance/autocorrelation/cross-correlation/inner product/mean square/absolute error) between the training target (e.g. target behavior) and the output (e.g. behavior of output) may be used to train the compensation/mapping/functionality. The objective/cost/loss function may be optimized/minimized/maximized, under/not under certain constraint(s) to find the best/optimized compensation/mapping/functionality. The objective/cost/loss function may be parameterized and the optimization/maximization/minimization may be with respect to the set of parameters.

In some embodiments, for searching, a compensation may be computed by performing a search (e.g. exhaustive search, fast search, reduced search). A number of candidate mappings may be determined and tentatively applied to get/compute the respective compensated behavior. A distance or similarity/dis-similarity score between the target behavior and the respective compensated behavior may be computed (e.g. "behavior distance", e.g. histogram distance, vector norm, city-block distance, Euclidean distance, intersection distance, Bhattacharyya distance (B-distance), Kullback-Leibler distance (KL-distance)). The candidate mapping that gives best match (e.g. smallest distance or largest similarity score) may be chosen as the compensation. Multi-stage searching may be applied. For example, a number of candidate first mappings (e.g. mapping applied to CI) may be determined. And for each candidate first mapping, a number of candidate second mappings (e.g. mapping applied to MS or analytics) may be determined. Both the candidate first mapping and candidate second mapping may be tentatively applied to get/compute the respective compensated behavior. A distance/similarity score between target behavior and respective compensated behavior may be computed such that the candidate first mapping and the candidate second mapping that together give best match (e.g. smallest distance or largest similarity score) may be chosen as the respective compensation. In some embodiments, deduction and searching may be applied together. For example, a number of candidate first mapping (e.g. to the CI) may be determined and tentatively applied. Then for each candidate first mapping, a second mapping (e.g. to the MS) may be deduced. Both the candidate first mapping and respective deduced second mapping may be tentatively applied to get/compute the respective compensated behavior. A distance/similarity score between target behavior and respective compensated behavior may be computed such that the candidate first mapping and the respective deduced second mapping that together give best match (e.g. smallest distance or largest similarity score) may be chosen as the respective compensation.

In some embodiments, for different compensation for different MS/MI/STI/analytics, more than one MS/MI/STI/analytics may be computed for the same task, or for different tasks (e.g. a first one for motion detection, a second one for breathing detection, a third one for fall-down detection, etc.). Different compensation may be applied for different MS/MI/STI/analytics. In some embodiments, MI may be MS/MI/STI computed based on TSCI (or compensated TSCI).

The following numbered clauses provide examples for compensated wireless monitoring.

Clause B1. A method/device/system/software of a compensated wireless monitoring system, comprising: transmitting a wireless signal from a Type1 heterogeneous wireless device of the wireless sensing system through a wireless multipath channel of a venue, wherein the wireless multipath channel is impacted by a motion of an object in the venue; receiving the wireless signal by a Type2 heterogeneous wireless device of the system through the wireless multipath channel, wherein the received wireless signal differs from the transmitted wireless signal due to the wireless multipath channel of the venue and the motion of the object; obtaining a time series of channel information (CI) of the wireless multipath channel based on the received wireless signal using a processor, a memory and a set of instructions; computing a time series of motion information (MI) based on the time series of CI (TSCI); computing a time series of analytics based on the time series of MI (TSMI); computing a time series of compensated analytics by applying a compensation to the computation of the time series of analytics (TSA), wherein the compensation comprises a monotonic mapping, monitoring the motion based on the time series of compensated analytics.

Clause B2. The method/device/system/software of the compensated wireless monitoring system in clause B1: wherein the monotonic mapping comprises at least one of: a univariate mapping, a bivariate mapping, a multi-variate mapping, a monotonic increasing mapping, a monotonic decreasing mapping, a monotonic non-decreasing mapping, a monotonic non-increasing mapping, a linear mapping, a nonlinear mapping, an affine mapping, a piecewise linear mapping, a concave mapping, a convex mapping, a quadratic mapping, a cubic mapping, a polynomial mapping, an exponential mapping, a logarithmic mapping, a fitted mapping, a regression mapping, a spline mapping, a function, an inverse function, a function of function, a mapping of another mapping, a composite mapping, a parametric mapping, a non-parametric mapping, a time-varying mapping, or a time-invariant mapping.

Clause B3. The method/device/system/software of the compensated wireless monitoring system in clause B1 (or 2), further comprising: wherein the compensation comprises at least one of: a first compensation tailor-made for a pair of a generic Type1 device and a generic Type2 device, a second compensation tailor-made for the Type1 device, a third compensation tailor-made for the Type2 device, and a fourth compensation tailed-made for the pair of the Type1 device and the Type2 device.

Clause B4. The method/device/system/software of the compensated wireless monitoring system in clause B3 (or 1 or 2), further comprising: wherein the monotonic mapping comprises at least one of: a first monotonic mapping tailor-made for a pair of a generic Type1 device and a generic Type2 device, a second monotonic mapping tailor-made for the Type1 device, a third monotonic mapping tailor-made for the Type2 device, and a fourth monotonic mapping tailed-made for the pair of the Type1 device and the Type2 device.

In some embodiments, the monotonic mapping may be applied to CI, intermediate value (W), MI and/or analytics.

Clause B5. The method/device/system/software of the compensated wireless monitoring system in clause B1 (or 2 or 3 or 4), further comprising: wherein the compensation or the monotonic mapping is applied to at least one of: a CI, a number of CI, a number of CI in a sliding time window, a number of CI in the TSCI, the TSCI, another TSCI obtained based on another wireless signal received by the Type2 device, another TSCI obtained based on yet another wireless signal transmitted by the Type1 device, a feature of a CI, a magnitude of a CI, a phase of a CI, s a component of a CI, a number of components of a CI, a magnitude of a component of a CI, or a phase of a component of a CI; computing a time series of compensated MI based on all compensated CI, compensated features of CI and compensated components of CI; computing the time series of compensated analytics based on the time series of compensated MI.

In some embodiments, the monotonic mapping may be applied to intermediate value (IV) between TSCI and TSMI. IV may be computed based on TSCI; TSMI may be computed based on W.

Clause B6. The method/device/system/software of the compensated wireless monitoring system in clause B1 (or 2 or 3 or 4), further comprising: wherein the compensation or the monotonic mapping is applied to at least one of: an intermediate value(IV) computed based on the TSCI, a number of IV, a number of IV in a sliding time window, a feature of a IV, a magnitude of a IV, a phase of a IV, a component of a IV, a number of components of a IV, a magnitude of a component of a IV, or a phase of a component of a IV; computing a time series of compensated MI based on all compensated IV, compensated features of IV and compensated components of IV; computing the time series of compensated analytics based on the time series of compensated MI.

In some embodiments, the monotonic mapping may be applied to intermediate value (IV) between TSMI and TSA. IV may be computed based on TSMI; TSA may be computed based on IV.

Clause B7. The method/device/system/software of the compensated wireless monitoring system in clause B1 (or 2 or 3 or 4), further comprising: wherein the compensation or the monotonic mapping is applied to at least one of: an intermediate value(IV) computed based on the TSMI, a number of IV, a number of IV in a sliding time window, a feature of a IV, a magnitude of a IV, a phase of a IV, a component of a IV, a number of components of a IV, a magnitude of a component of a IV, or a phase of a component of a IV; computing the time series of compensated analytics based on all compensated IV, compensated features of IV and compensated components of W.

In some embodiments, the monotonic mapping may be applied to MI.

Clause B8. The method/device/system/software of the compensated wireless monitoring system in clause B1 (or 2 or 3 or 4), further comprising: wherein the compensation or the monotonic mapping is applied to at least one of: a MI, a number of MI, a number of MI in a sliding time window, a number of MI in the TSMI, the TSMI, a feature of a MI, a magnitude of a MI, a phase of a MI, a component of a MI, a number of components of a MI, a magnitude of a component of a MI, or a phase of a component of a MI; monitoring the motion based on all compensated MI, compensated features of MI, and compensated component of MI.

In some embodiments, the monotonic mapping may be applied to TSA.

Clause B9. The method/device/system/software of the compensated wireless monitoring system in clause B1 (or 2 or 3 or 4): wherein the compensation or the monotonic mapping is applied to at least one of: an analytics, a number of analytics, a number of analytics in a sliding time window, a number of analytics in the TSA, the TSA, a feature of an analytics, a magnitude of an analytics, a phase of an analytics, a component of an analytics, a number of components of an analytics, a magnitude of a component of an analytics, or a phase of a component of an analytics.

In some embodiments, the monotonic mapping may be changed over time.

Clause B10. The method/device/system/software of the compensated wireless monitoring system in clause B1, further comprising: changing the compensation or the monotonic mapping based on at least one of: a change in a target behavior, a change in the wireless signal, a change in a bandwidth of the wireless signal, a change in a band of the wireless signal, a specification, a system setting, a user input, a situation, an event, a time table, a strategy, a plan.

In some embodiments, the compensation may be computed/learned/derived/deduced/trained in a (past or current or real-time or future) calibration phase.

Clause B11. The method/device/system/software of the compensated wireless monitoring system in clause B1 (to 10), further comprising: in a calibration phase: transmitting a calibration wireless signal from a calibration Type1 heterogeneous wireless device through a calibration wireless multipath channel of a calibration venue, wherein the calibration wireless multipath channel is impacted by a calibration motion of a calibration object in the calibration venue; receiving the calibration wireless signal by a calibration Type2 heterogeneous wireless device through the calibration wireless multipath channel, wherein the received calibration wireless signal differs from the transmitted calibration wireless signal due to the calibration wireless multipath channel of the calibration venue and the calibration motion of the calibration object; obtaining a time series of calibration CI of the calibration wireless multipath channel based on the received calibration wireless signal using a calibration processor, a calibration memory and a set of calibration instructions; determining the compensation based on the time series of calibration CI.

In some embodiments, the monotonic mapping is determined by comparing a "calibration behavior" and a "target behavior". In some embodiments, the goal is to find a compensation or monotonic mapping such that, after the compensation of monotonic mapping is applied, the compensated calibration behavior would be similar to the target behavior.

Clause B12. The method/device/system/software of the compensated wireless monitoring system in clause B11, further comprising: in the calibration phase: computing a time series of calibration MI based on the time series of calibration CI; computing a time series of calibration analytics based on the time series of calibration MI; comparing a behavior associated with the time series of calibration CI, calibration MI or calibration analytics with a target behavior; computing the monotonic mapping based on the comparing of the calibration behavior and the target behavior.

Clause B13. The method/device/system/software of the compensated wireless monitoring system in clause B12: wherein the behavior comprises at least one of: statistical behavior, temporal behavior, frequency behavior, transform domain behavior, projection domain behavior, magnitude behavior, phase behavior, component behavior, histogram, probability distribution, cumulative histogram, characteristic function, moment generating function, cumulative distribution, univariate distribution, univariate histogram, bivariate distribution, bivariate histogram, multi-variate distribution, multi-variate histogram, restricted distribution, restricted histogram, conditional distribution, conditional histogram, histogram of CI, MI or analytics between two time stamps, histogram of observables associated with CI, MI or analytics between two time stamps, histogram of observables associated with CI, MI or analytics restricted to be between the two time stamps, histogram of CI, MI or analytics between two characteristic points of CI, MI or analytics, histogram of observables associated with CI, MI or analytics between two characteristic points of CI, MI or analytics, histogram of observables associated with CI, MI or analytics between two characteristic points of processed CI, MI or analytics, histogram of observables associated with CI, MI or analytics between two characteristic points of the observables, histogram of observables associated with CI, MI or analytics between two characteristic points conditioned on a condition of the two characteristic points, statistics, conditional statistics, trimmed statistics, first order statistics, second order statistics, high order statistics, scatter plots, mean, weighted mean, conditional mean, restricted mean, arithmetic mean, trimmed mean, geometric mean, harmonic mean, mode, median, percentile, maximum, minimum, zero-crossing, range, magnitude, phase, component magnitude, component phase, variance, standard deviation, dispersion, variability, kurtosis, entropy, information, moments, central moments, correlation, correlation coefficient, covariance, auto-correlation function (ACF), auto-covariance function, cross correlation, or cross covariance; wherein any observable associated with an item comprises at least one of: the item, a magnitude of the item, a phase of the item, a feature of the item, a component of the item, a magnitude of the component of the item, a phase of the component of the item, a feature of the component of the item, or a function of any of the above; wherein any characteristic point is one of: a local maximum, a local minimum or a zero crossing.

In some embodiments, possible ways to obtain the monotonic mapping include: (1a) searching, in calibration phase, (1b) deduction, in calibration phase, (2) from user or another device (e.g. server) or system setting/specification.

Clause B14. The method/device/system/software of the compensated wireless monitoring system in clause B12, further comprising: wherein the monotonic mapping is: (1) computed based on a searching or a deduction in the calibration phase; (2) obtained from a specification, a setting, a user input or another device; (3) computed based on supervised learning, unsupervised learning or semi-supervised learning; or (4) obtained by artificial intelligence, machine learning, deep learning or neural network.

In some embodiments, a possible way to obtain the monotonic mapping includes: (1a) searching, in calibration phase. In some embodiments, trial compensation is performed for each candidate monotonic mapping. After compensation, compute similarity score between target behavior and the resulting calibration behavior after compensation.

Clause B15. The method/device/system/software of the compensated wireless monitoring system in clause B14, further comprising: in the calibration phase: determining and searching a number of candidate monotonic mappings; for each candidate monotonic mapping: applying a respective compensation comprising the candidate monotonic mapping to the computation of the TSA, and computing a respective similarity score between the target behavior and the resulting behavior associated with the time series of calibration CI, calibration MI or calibration analytics after the respective compensation is applied; choosing the monotonic mapping as the candidate monotonic mapping with the largest similarity score.

In some embodiments, a possible way to obtain the monotonic mapping includes: (1b) deduction, in calibration phase.

Clause B16. The method/device/system/software of the compensated wireless monitoring system in clause B14, further comprising: in the calibration phase: deducing the monotonic mapping based on the comparing of the target behavior and the behavior associated with the time series of calibration CI, calibration MI or calibration analytics.

In some embodiments, N control points may be obtained, to deduce the monotonic mapping based on the N control points.

Clause B17. The method/device/system/software of the compensated wireless monitoring system in clause B16, further comprising: in the calibration phase: determining the behavior of a univariate observable X associated with CI, MI or analytics based on the time series of calibration CI, the time series of calibration MI or the time series of calibration analytics, wherein the behavior comprises N scalar values $\{x\_1, x\_2, \ldots, x\_N\}$ with $x\_1 < x\_2 < \ldots < x\_N$, determining the target behavior of a univariate target observable Y, wherein the target behavior comprises N scalar values $\{y\_1, y\_2, \ldots, y\_N\}$, with $y\_1 < y\_2 < \ldots < y\_N$, defining N control points of the monotonic mapping by mapping the N scalar values of X to the N scalar values of Y, the control points being $(x\_1, y\_1), (x\_2, y2), \ldots, (x\_N, y\_N)$; deducing the monotonic mapping based on the N control points.

In some embodiments, N control points may be connected with a line (continuous).

Clause B18. The method/device/system/software of the compensated wireless monitoring system in clause B17, further comprising: in the calibration phase: deducing the monotonic mapping as a monotonic line connecting the N control points.

In some embodiments, there is a possible line connecting the control points.

Clause B19. The method/device/system/software of the compensated wireless monitoring system in clause B18, further comprising: wherein the monotonic line comprises at least one of: a linear map, a quadratic map, a cubic map, an affine map, a polynomial map, an exponential map, a logarithmic map, a convex map, a concave map, a spline map, a piecewise linear map, a piecewise quadratic map, a piecewise cubic map, a monotonic increasing map, a monotonic non-decreasing map.

In some embodiments, curve fitting may be used instead (such that some control points may not reside on the fitted curve).

Clause B20. The method/device/system/software of the compensated wireless monitoring system in clause B17, further comprising: deducing the monotonic mapping as a curve that fits the N control points in accordance with a fitting criterion.

In some embodiments, curve fitting may be least square fitting.

Clause B21. The method/device/system/software of the compensated wireless monitoring system in clause B20, further comprising: wherein the curve fits the N control points in accordance with a least-square fitting criterion.

In some embodiments, curve fitting may be obtained by regression.

Clause B22. The method/device/system/software of the compensated wireless monitoring system in clause B17, further comprising: wherein the monotonic mapping is deduced by applying a regression, linear regression, robust linear regression, orthogonal regression, Deming regression, major axis regression, segmented regression, polynomial regression, or regression dilution to the N control points.

In some embodiments, there are possible choices of control points.

Clause B23. The method/device/system/software of the compensated wireless monitoring system in clause B17, further comprising: wherein the N control points comprise at least one of: (a mean of X, a mean of Y), (a weighted mean of X, a weighted mean of Y), (a trimmed mean of X, a trimmed mean of Y), (an arithmetic mean of X, a arithmetic mean of Y), (a geometric mean of X, a geometric mean of Y), (a harmonic mean of X, a harmonic mean of Y), (a median of X, a median of Y), (a mode of X, a mode of Y), (a percentile of X, a percentile of Y), (a 0-percentile of X, a 0-percentile of Y), (a 1-percentile of X, a 1-percentile of Y), (a 5-percentile of X, a 5-percentile of Y), (a 10-percentile of X, a 10-percentile of Y), (a 20-percentile of X, a 20-percentile of Y), (a 30-percentile of X, a 30-percentile of Y), (a 40-percentile of X, a 40-percentile of Y), (a 50-percentile of X, a 50-percentile of Y), (a 60-percentile of X, a 60-percentile of Y), (a 70-percentile of X, a 70-percentile of Y), (a 80-percentile of X, a 80-percentile of Y), (a 90-percentile of X, a 90-percentile of Y), (a 95-percentile of X, a 95-percentile of Y), (a 99-percentile of X, a 99-percentile of Y), or (a 100-percentile of X, a 100-percentile of Y).

In some embodiments, the monotonic mapping may be computed directly based on cumulative distribution function F_X and F_Y.

Clause B24. The method/device/system/software of the compensated wireless monitoring system in clause B16, further comprising: in the calibration phase: determining the behavior of a univariate observable X associated with CI, MI or analytics based on the time series of calibration CI, the time series of calibration MI or the time series of calibration analytics, wherein the behavior comprises a cumulative univariate distribution F_X of X, determining the target behavior of a target observable Y, wherein the target behavior comprises a cumulative univariate target distribution F_Y of Y, deducing the monotonic mapping based on the cumulative univariate distribution F_X and the cumulative univariate target distribution F_Y.

In some embodiments, the monotonic mapping may be computed directly based on a formula of cumulative distribution function F_X and F_Y.

Clause B25. The method/device/system/software of the compensated wireless monitoring system in clause B24, further comprising: deducing the monotonic mapping as $F\_Y^{-1}[F\_X(X)]$, wherein $F\_Y^{-1}$ is the inverse of function F_Y.

In some embodiments, as the formula may be complex, an approximation may be used instead.

Clause B26. The method/device/system/software of the compensated wireless monitoring system in clause B24, further comprising: deducing the monotonic mapping as an approximation of $F\_Y^{-1}(F\_X(X))$, wherein $F\_Y^{-1}$ is the inverse of function F_Y, wherein the approximation comprises at least one of: a linear map, a quadratic map, a cubic map, an affine map, a polynomial map, an exponential map, a logarithmic map, a convex map, a concave map, a spline map, a piecewise linear map, a piecewise quadratic map, or a piecewise cubic map.

In some embodiments, for multi-variate observable X, each X (and Y) is a multi-variate tuple. N control points may be obtained.

Clause B27. The method/device/system/software of the compensated wireless monitoring system in clause B16, further comprising: in the calibration phase: determining the behavior of a multi-variate observable X associated with CI, MI or analytics based on the time series of calibration CI, the time series of calibration MI or the time series of calibration analytics, wherein the behavior comprises N multi-variate tuple $\{x\_1, x\_2, \ldots x\_N\}$, determining the target behavior of a multi-variate target observable Y, wherein the target behavior comprises N multi-variate tuple $\{y\_1, y2, \ldots y\_N\}$, defining N control points of the monotonic mapping by mapping the N multi-variate tuple of X to the N multi-variate tuple of Y, the control points being $(x\_1, y\_1), (x\_2, y\_2), \ldots, (x\_N, y\_N)$; deducing the monotonic mapping based on the N control points.

In some embodiments, hyperplane or manifold may be used to connect some control points (in a piecewise manner).

Clause B28. The method/device/system/software of the compensated wireless monitoring system in clause B27, further comprising: in the calibration phase: deducing the monotonic mapping as a combination of multiple piecewise hyperplanes each connecting some of the N control points.

In some embodiments, hyperplane or manifold may be used to fit/approximate the control points (e.g. in a piecewise manner).

Clause B29. The method/device/system/software of the compensated wireless monitoring system in clause B27, further comprising: in the calibration phase: deducing the monotonic mapping as a manifold or a hyperplane that fits the N control points in accordance with a fitting criterion.

In some embodiments, monotonic mapping may be deduced based on formula.

Clause B30. The method/device/system/software of the compensated wireless monitoring system in clause B27, further comprising: in the calibration phase: deducing the monotonic mapping based on a cumulative distribution function of X and a cumulative distribution function of Y.

In some embodiments, for multi-stage search, searching may be combined with deduction to find the best combination.

Clause B31. The method/device/system/software of the compensated wireless monitoring system in clause B14, further comprising: in the calibration phase: determining the monotonic mapping comprises a first monotonic mapping and a second monotonic mapping; determining and searching a number of candidate first monotonic mappings; for each candidate first monotonic mapping: deducing the respective second monotonic mapping, applying a respective compensation comprising the candidate first monotonic mapping and the respective deduced second monotonic mapping to the computation of the TSA, and computing a respective similarity score between the target behavior and the resulting behavior associated with the time series of calibration CI, calibration MI or calibration analytics after the respective compensation is applied; choosing the monotonic mapping as the candidate first monotonic mapping and the respective deduced second monotonic mapping with the largest similarity score.

Clause B32. The method/device/system/software of the compensated wireless monitoring system in clause B12, further comprising: obtaining the target behavior from a specification, a system setting, a user input, a server, a cloud server, a remote server, a local server, a sensing server, or another device.

Clause B33. The method/device/system/software of the compensated wireless monitoring system in clause B12, further comprising: changing the target behavior based on a specification, a system setting, a user input, a situation, an event, a time table, a strategy, a plan.

Clause B34. The method/device/system/software of the compensated wireless monitoring system in clause B11: wherein a first band of the calibration wireless signal comprises a second band of the wireless signal; wherein a first bandwidth of the calibration wireless signal comprises a second bandwidth of the wireless signal.

Clause B35. The method/device/system/software of the compensated wireless monitoring system in clause B11: wherein the calibration object resembles the object in a first way; wherein the calibration motion of the calibration object resembles the motion of the object in a second way.

Clause B36. The method/device/system/software of the compensated wireless monitoring system in clause B11, further comprising: in a pre-calibration phase before the calibration phase: transmitting a reference wireless signal from a reference Type1 heterogeneous wireless device through a reference wireless multipath channel of a reference venue, wherein the reference wireless multipath channel is impacted by a reference motion of a reference object in the reference venue; receiving the reference wireless signal by a reference Type2 heterogeneous wireless device through the reference wireless multipath channel, wherein the received reference wireless signal differs from the transmitted reference wireless signal due to the reference wireless multipath channel of the reference venue and the reference motion of the reference object; obtaining a time series of reference CI of the reference wireless multipath channel based on the received reference wireless signal using a reference processor, a reference memory and a set of reference instructions; computing a time series of reference MI based on the time series of reference CI; computing a time series of reference analytics based on the time series of reference MI; computing the target behavior as a behavior of at least one of: the time series of reference CI, the time series of reference MI or the time series of reference analytics.

Clause B37. The method/device/system/software of the compensated wireless monitoring system in clause B36, further comprising: wherein the target behavior comprises a set of fundamental behaviors that can appear in the compensated wireless monitoring system.

Clause B38. The method/device/system/software of the compensated wireless monitoring system in clause B11, further comprising: in a re-calibration phase after the calibration phase: computing a time series of re-calibration MI based on a re-calibration TSCI, comparing a behavior of the time series of re-calibration MI with a re-calibration target behavior, and computing a renewed monotonic mapping based on the comparing of the behavior of time series of re-calibration MI and the re-calibration target behavior; replacing the monotonic mapping by the renewed monotonic mapping in the compensation to the computation of the TSA.

In some embodiments, the monotonic mapping is determined by comparing a "calibration behavior" and a "target behavior".

Clause B39. The method/device/system/software of the compensated wireless monitoring system in clause B11 (or 12): wherein the calibration Type1 device is a reference Type1 device; wherein the calibration Type2 device is the Type2 device; wherein the compensation and the monotonic mapping are tailor-made for the Type2 device for compensating the computation of any respective TSA based on any respective TSCI obtained from any respective wireless signal received by the Type2 device for the monitoring of the motion.

Clause B40. The method/device/system/software of the compensated wireless monitoring system in clause B11 (or 12): wherein the calibration Type1 device is the Type1 device; wherein the calibration Type2 device is a reference Type2 device; wherein the compensation and the monotonic mapping are tailor-made for the Type1 device for compensating the computation of any respective TSA based on any respective TSCI obtained from any respective wireless signal transmitted by the Type1 device for the monitoring of the motion.

Clause B41. The method/device/system/software of the compensated wireless monitoring system in clause B11 (or 12): wherein the calibration Type1 device is the Type1 device; wherein the calibration Type2 device is the Type2 device; wherein the compensation and the monotonic mapping are tailor-made for the pair of the Type1 device and the Type2 device for compensating the computation of the TSA based on the TSCI obtained from the wireless signal transmitted between the pair of devices for the monitoring of the motion.

Clause B42. The method/device/system/software of the compensated wireless monitoring system in clause B11 (or 12): wherein the calibration Type1 device is a representative Type1 device; wherein the calibration Type2 device is a representative Type2 device; wherein the compensation and the monotonic mapping are tailor-made for any pair of a generic Type1 device represented by the representative Type1 device and a generic Type2 device represented by the representative Type2 device for compensating the computation of any respective TSA based on any respective TSCI obtained from any respective wireless signal transmitted between any pair of devices for the monitoring of the motion; wherein the Type1 device is a generic Type1 device and the Type2 device is a generic Type2 device.

In some embodiments, the monotonic mapping may be different when Type1 device and Type2 device and wireless signal are same, but a different analytics is used.

Clause B43. The method/device/system/software of the compensated wireless monitoring system in clause B1, comprising: computing a time series of second analytics based on the time series of MI; computing a time series of compensated second analytics by applying a second compensation to the computation of the time series of second analytics, wherein the second compensation comprises a second monotonic mapping, monitoring the motion based on the time series of compensated second analytics.

In some embodiments, the monotonic mapping may be same when Type1 device, Type2 device and wireless signal are same, but a different analytics is used. (e.g. compensation applied to CI or MI).

Clause B44. The method/device/system/software of the compensated wireless monitoring system in clause B43, comprising: wherein the second compensation and the compensation are the same; wherein the second monotonic mapping and the first monotonic mapping are the same.

In some embodiments, the monotonic mapping may be different when Type1 device and Type2 device and wireless signal are same, but a different MI is used.

Clause B45. The method/device/system/software of the compensated wireless monitoring system in clause B1, comprising: computing a time series of second MI based on the TSCI; computing a time series of second analytics based on the time series of second MI; computing a time series of compensated second analytics by applying a second compensation to the computation of the time series of second analytics, wherein the second compensation comprises a second monotonic mapping, monitoring the motion based on the time series of compensated second analytics.

In some embodiments, the monotonic mapping may be same when Type1 device, Type2 device and wireless signal are same, but a different MI is used. (e.g. compensation applied to CI).

Clause B46. The method/device/system/software of the compensated wireless monitoring system in clause B45, comprising: wherein the second compensation and the compensation are the same; wherein the second monotonic mapping and the first monotonic mapping are the same.

In some embodiments, the monotonic mapping may be different when Type1 device is different but Type2 device is same.

Clause B47. The method/device/system/software of the compensated wireless monitoring system in clause B1, comprising: transmitting a second wireless signal from a second Type1 heterogeneous wireless device of the wireless sensing system through the wireless multipath channel of the venue; receiving the second wireless signal by the Type2 heterogeneous wireless device of the system through the wireless multipath channel, wherein the received second wireless signal differs from the transmitted second wireless signal due to the wireless multipath channel of the venue and the motion of the object; obtaining a second TSCI of the wireless multipath channel based on the received second wireless signal using the processor, the memory and the set of instructions; computing a time series of second MI based on the second TSCI; computing a time series of second analytics based on the time series of second MI; computing a time series of compensated second analytics by applying a second compensation to the computation of the time series of second analytics, wherein the second compensation comprises a second monotonic mapping, monitoring the motion based on the time series of compensated second analytics.

In some embodiments, the monotonic mapping may be same when Type1 device is different but Type2 device is same.

Clause B48. The method/device/system/software of the compensated wireless monitoring system in clause B47, comprising: wherein the second compensation and the compensation are the same; wherein the second monotonic mapping and the first monotonic mapping are the same.

In some embodiments, the monotonic mapping may be different when Type2 device is different but Type1 device is same.

Clause B49. The method/device/system/software of the compensated wireless monitoring system in clause B1, comprising: transmitting a second wireless signal from the Type1 heterogeneous wireless device of the wireless sensing system through the wireless multipath channel of the venue; receiving the second wireless signal by a second Type2 heterogeneous wireless device of the system through the wireless multipath channel, wherein the received second wireless signal differs from the transmitted second wireless signal due to the wireless multipath channel of the venue and the motion of the object; obtaining a second TSCI of the wireless multipath channel based on the received second wireless signal using a second processor, a second memory and a second set of instructions; computing a time series of second MI based on the second TSCI; computing a time series of second analytics based on the time series of second MI; computing a time series of compensated second analytics by applying a second compensation to the computation of the time series of second analytics, wherein the second compensation comprises a second monotonic mapping, monitoring the motion based on the time series of compensated second analytics.

In some embodiments, the monotonic mapping may be same when Type2 device is different but Type1 device is same.

Clause B50. The method/device/system/software of the compensated wireless monitoring system in clause B49, comprising: wherein the second compensation and the compensation are the same; wherein the second monotonic mapping and the first monotonic mapping are the same.

In some embodiments, the monotonic mapping may be different when Type1 device and Type2 device are same, but wireless signal is different (e.g. different band/bandwidth).

Clause B51. The method/device/system/software of the compensated wireless monitoring system in clause B1, comprising: transmitting a second wireless signal from the Type1 heterogeneous wireless device of the wireless sensing system through the wireless multipath channel of the venue; receiving the second wireless signal by the Type2 heterogeneous wireless device of the system through the wireless multipath channel, wherein the received second wireless signal differs from the transmitted second wireless signal due to the wireless multipath channel of the venue and the motion of the object; obtaining a second TSCI of the wireless multipath channel based on the received second wireless signal using the processor, the memory and the set of instructions; computing a time series of second MI based on the second TSCI; computing a time series of second analytics based on the time series of second MI; computing a time series of compensated second analytics by applying a second compensation to the computation of the time series of second analytics, wherein the second compensation comprises a second monotonic mapping, monitoring the motion based on the time series of compensated second analytics.

In some embodiments, the monotonic mapping may be same when Type1 device and Type2 device are same but wireless signal is different.

Clause B52. The method/device/system/software of the compensated wireless monitoring system in clause B51, comprising: wherein the second compensation and the compensation are the same; wherein the second monotonic mapping and the first monotonic mapping are the same.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for wireless monitoring, comprising:
   transmitting a wireless signal from a first wireless device through a wireless multipath channel of a venue, wherein the wireless multipath channel is impacted by a motion of an object in the venue;
   receiving the wireless signal by a second wireless device through the wireless multipath channel, wherein the received wireless signal differs from the transmitted wireless signal due to the wireless multipath channel and the motion of the object;
   obtaining a time series of channel information (TSCI) of the wireless multipath channel based on the received wireless signal using a processor, a memory communicatively coupled with the processor and a set of instructions stored in the memory;
   performing a classification of a sliding time window by analyzing channel information (CI) of the TSCI in the sliding time window;
   computing a motion information (MI) for the sliding time window based on the TSCI and the classification of the sliding time window, wherein:
      the MI is computed in a first manner based exclusively on CI of the TSCI in the sliding time window when the sliding time window is classified as a first sliding-window-class based on the classification,
      the MI is computed in a second manner based on at least one CI of the TSCI outside the sliding time window when the sliding time window is classified as a second sliding-window-class based on the classification,
      the MI is computed in a third manner based on a first subset of the CI of the TSCI in the sliding time window without using a second subset of the CI of the TSCI in the sliding time window, when the sliding time window is classified as a third sliding-window-class based on the classification, wherein the first subset and the second subset are disjoint; and
   monitoring the motion of the object based on the MI.

2. The method of claim 1, wherein the MI is computed based on at least one of:
   a similarity score of two temporally adjacent CI of the TSCI;
   an autocorrelation function (ACF) of the TSCI; or
   a characteristic point of the ACF.

3. The method of claim 1, further comprising: computing a test score (TS) for each CI of the TSCI in the sliding time window based on a number of respective temporally neighboring CI, wherein the TS comprises at least one of: a difference, a magnitude, a vector similarity, a vector dissimilarity, an inner product, or an outer product; and classifying each CI of the TSCI in the sliding time window based on the respective TS.

4. The method of claim 3, further comprising:
   computing a link-wise test score (LTS) based on an aggregate of all TS for the CI of the TSCI in the sliding time window; and
   performing the classification of the sliding time window based on the LTS.

5. The method of claim 4, wherein:
   the sliding time window is classified as the first sliding-window-class when the LTS is greater than a first threshold; and the sliding time window is classified as the second sliding-window-class or the third sliding window-class when the LTS is less than a second threshold.

6. The method of claim 5, wherein:
each CI of the TSCI in the sliding time window is classified as a first CI-class when the respective TS is less than a third threshold, and classified as a second CI-class when the respective TS is greater than a fourth threshold.

7. The method of claim 6, wherein:
the sliding time window is classified as the first sliding-window-class when all CI of the TSCI in the sliding time window are first-class CI classified as first CI-class; and
the sliding time window is classified as the second sliding-window-class when all CI of the TSCI in the sliding time window are second-class CI classified as second CI-class, wherein the TSCI in the sliding time window comprises at least one first-class CI and at least one second-class CI.

8. The method of claim 7, further comprising:
identifying at least one run of first-class CI and at least one run of second-class CI in the sliding time window, each run comprising a respective runlength of consecutive CI of a respective same CI-class in the sliding time window, wherein any runlength is one of: a number, a quantity or a count, that is greater than zero; and
classifying the sliding time window based on the runs of first-class CI and second-class CI and the respective run-lengths.

9. The method of claim 8, further comprising:
the sliding time window is classified as the third sliding-window-class when at least one selected run of first-class CI is chosen; and
the sliding time window is classified as the second sliding-window-class when no selected run of first-class CI is chosen.

10. The method of claim 9, further comprising:
choosing at least one selected run of first-class CI based on the runlength of each run of first-class CI and the TS associated with the run; and
computing the MI based on the at least one selected run of first-class CI, wherein the at least one selected run is the at least one run of first-class CI with longest run-lengths among all runs of first-class CI in the sliding time window.

11. The method of claim 10, wherein:
a first selected run is chosen as a beginning run of consecutive first-class CI comprising a CI being the first in the sliding time window when the respective run-length of the beginning run is greater than a first respective threshold;
a second selected run is chosen as a trailing run of consecutive first-class CI comprising a CI being the last in the sliding time window when the respective run-length of the trailing run is greater than a second respective threshold; and
any selected run that is not a beginning run or a trailing run is chosen when the respective run-length of the run is greater than a third respective threshold.

12. The method of claim 11, wherein:
the at least one selected run is chosen such that a quantity of the at least one selected run is less than or equal to a predetermined number; and
the at least one selected run is chosen such that, for each selected run, all the associated TS is less than a threshold.

13. The method of claim 12, further comprising:
when the sliding time window is classified as the third sliding-window-class:
constructing the first subset by including all of the at least one selected run of first-class CI of the TSCI in the sliding time window, and
constructing the second subset by including all second-class CI of the TSCI in the sliding time window; and
when the sliding time window is classified as the second sliding-window-class:
computing the MI as an aggregate of at least one neighboring MI,
wherein each neighboring MI is associated with one of: a past neighboring sliding time window of CI of the TSCI, a future neighboring sliding time window of CI of the TSCI, or a neighboring sliding time window of CI of another TSCI,
wherein a neighboring MI is computed based on at least one CI of the TSCI outside the sliding time window.

14. The method of claim 13, further comprising:
computing at least one tentative MI for the sliding time window, wherein each tentative MI is computed based on a respective selected run of first-class CI of the TSCI in the sliding time window; and
computing the MI as an aggregate of the at least one tentative MI.

15. The method of claim 14, further comprising:
determining a selected run as a beginning run of CI of the TSCI in the sliding time window;
combining the beginning run of CI with a trailing run of CI of the TSCI in a previous sliding time window to form a combined run of CI of the TSCI; and
computing a first tentative MI based on the combined run of CI.

16. The method of claim 14, further comprising:
determining a selected run as a trailing run of CI of the TSCI in the sliding time window;
combining the trailing run of CI with a beginning run of CI of the TSCI in a next sliding time window to form a combined run of CI of the TSCI; and
computing a second tentative MI based on the combined run of CI.

17. The method of claim 14, further comprising:
for each tentative MI computed based on a respective selected run, computing a respective computed weight based on the run-length of the respective selected run; and
computing the MI as a weighted aggregate of the at least one tentative MI, wherein each tentative MI is weighted by the respective computed weight.

18. The method of claim 14, further comprising:
computing the MI as an aggregate of the at least one tentative MI and at least one neighboring MI,
wherein each neighboring MI is associated with one of: a past neighboring sliding time window of CI of the TSCI, a future neighboring sliding time window of CI of the TSCI, or a neighboring sliding time window of CI of another TSCI.

19. A wireless monitoring system, comprising:
a first wireless device configured to transmit a wireless signal through a wireless multipath channel of a venue, wherein the wireless multipath channel is impacted by a motion of an object in the venue;
a second wireless device configured to receive the wireless signal through the wireless multipath channel, wherein the received wireless signal differs from the transmitted wireless signal due to the wireless multipath channel and the motion of the object; and a processor configured for:

obtaining a time series of channel information (TSCI) of the wireless multipath channel based on the received wireless signal using a processor, a memory communicatively coupled with the processor and a set of instructions stored in the memory, performing a classification of a sliding time window by analyzing channel information (CI) of the TSCI in the sliding time window, computing a motion information (MI) for the sliding time window based on the TSCI and the classification of the sliding time window, wherein:

the MI is computed in a first manner based exclusively on CI of the TSCI in the sliding time window when the sliding time window is classified as a first sliding-window-class based on the classification, the MI is computed in a second manner based on at least one CI of the TSCI outside the sliding time window when the sliding time window is classified as a second sliding-window-class based on the classification, the MI is computed in a third manner based on a first subset of the CI of the TSCI in the sliding time window without using a second subset of the CI of the TSCI in the sliding time window, when the sliding time window is classified as a third sliding-window-class based on the classification, wherein the first subset and the second subset are disjoint, and monitoring the motion of the object based on the MI.

\* \* \* \* \*